(12) United States Patent
Matsui et al.

(10) Patent No.: US 7,810,342 B2
(45) Date of Patent: Oct. 12, 2010

(54) AIR CONDITIONING SYSTEM

(75) Inventors: Nobuki Matsui, Osaka (JP); Shuji Ikegami, Osaka (JP); Tomohiro Yabu, Osaka (JP); Satoshi Ishida, Osaka (JP); Junichi Teraki, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 560 days.

(21) Appl. No.: 10/574,899

(22) PCT Filed: Oct. 8, 2004

(86) PCT No.: PCT/JP2004/014933

§ 371 (c)(1),
(2), (4) Date: Apr. 6, 2006

(87) PCT Pub. No.: WO2005/036061

PCT Pub. Date: Apr. 21, 2005

(65) Prior Publication Data

US 2007/0051123 A1    Mar. 8, 2007

(30) Foreign Application Priority Data

Oct. 9, 2003 (JP) ............................. 2003-351268
Mar. 31, 2004 (JP) ............................. 2004-101902

(51) Int. Cl.
*F25B 13/00* (2006.01)
(52) U.S. Cl. ............... 62/324.5; 62/271; 62/94; 62/160; 62/176.1; 62/324.1; 62/324.6
(58) Field of Classification Search .................. 62/271, 62/94, 324.5, 160, 176.1, 324.1, 324.6
See application file for complete search history.

(56) References Cited

U.S. PATENT DOCUMENTS

| 4,430,864 | A | * | 2/1984 | Mathiprakasam | ............... 62/94 |
| 4,930,322 | A | * | 6/1990 | Ashley et al. | .................. 62/271 |
| 4,938,032 | A | * | 7/1990 | Mudford | ....................... 62/160 |
| 5,277,034 | A | * | 1/1994 | Hojo et al. | ..................... 62/160 |
| 5,687,579 | A | * | 11/1997 | Vaynberg | ..................... 62/175 |

(Continued)

FOREIGN PATENT DOCUMENTS

JP    37-001187 Y1    1/1962

(Continued)

*Primary Examiner*—Frantz F Jules
*Assistant Examiner*—Azim Rahim
(74) *Attorney, Agent, or Firm*—Birch, Stewart, Kolasch & Birch, LLP.

(57) ABSTRACT

A refrigerant circuit (10) is provided with two adsorption heat exchangers (31, 32) in addition to an outdoor heat exchanger (21) and an indoor heat exchanger (22). An adsorbent is carried on the surface of each of the adsorption heat exchangers (31, 32). In the adsorption heat exchanger (31, 32) serving as an evaporator, moisture in the air is adsorbed by the adsorbent. In the adsorption heat exchanger (31, 32) serving as a condenser, moisture is desorbed from the adsorbent and then applied to the air. Then, the air dehumidified or humidified by the adsorption heat exchanger (31, 32) is supplied to a room to cope with latent heat load in the room. On the other hand, in the indoor heat exchanger (22), air is cooled or heated. Then, the air cooled or heated by the indoor heat exchanger (22) is supplied to the room to cope with sensible heat load in the room.

28 Claims, 50 Drawing Sheets

U.S. PATENT DOCUMENTS 5,823,006 A * 10/1998 Jung ......................... 62/291
5,950,447 A * 9/1999 Maeda et al. ............... 62/271
6,199,394 B1 * 3/2001 Maeda ...................... 62/271

FOREIGN PATENT DOCUMENTS

| | | |
|---|---|---|
| JP | 46-019869 Y1 | 7/1971 |
| JP | 57-019559 A | 2/1982 |
| JP | 7-265649 A | 10/1995 |
| JP | 08-189667 A | 7/1996 |
| JP | 2001-201106 A | 7/2001 |
| JP | 2002-317997 A | 10/2002 |
| JP | 2003-120956 A | 4/2003 |
| JP | 2003-166730 A | 6/2003 |
| WO | WO-03/029728 A1 | 4/2003 |

* cited by examiner

AIR CONDITIONING SYSTEM

TECHNICAL FIELD

This invention relates to air conditioning systems for coping with indoor sensible heat load and latent heat load.

BACKGROUND ART

An air conditioning system providing cooling and dehumidification of a room is known in the art as disclosed in WO03/029728 pamphlet. The air conditioning system includes a refrigerant circuit provided with a heat-source side outdoor heat exchanger and a utilization side indoor heat exchanger and runs a refrigeration cycle by circulating refrigerant through the refrigerant circuit. Further, the air conditioning system dehumidifies the room by setting the refrigerant evaporation temperature in the indoor heat exchanger below the dew point of the room air and condensing moisture in the room air.

A dehumidifier is also known which includes heat exchangers each provided with an adsorbent on the surface thereof, as disclosed in Japanese Unexamined Patent Publication No. H07-265649. The dehumidifier includes two heat exchangers and operates so that one of the two heat exchangers dehumidifies air and the other is regenerated. During the operation, the heat exchanger adsorbing moisture is supplied with water cooled by a cooling tower while the heat exchanger being regenerated is supplied with warm discharged water. Further, the dehumidifier supplies the air dehumidified by the above operation into the room.

Problems to be Solved

As described above, the air conditioning system disclosed in WO03/029728 pamphlet copes with indoor latent heat load by setting the refrigerant evaporation temperature in the indoor heat exchanger below the dew point of the room air and condensing moisture in the air. In other words, although indoor sensible heat load can be coped with even if the refrigerant evaporation temperature in the indoor heat exchanger is higher than the dew point of the room air, the refrigerant evaporation temperature is set at the lower value in order to cope with the latent heat load. This provides a large difference between high and low pressures in the refrigeration cycle and raises the input to the compressor, which leads to a problem that only a small COP (Coefficient Of Performance) can be attained.

On the other hand, the dehumidifier disclosed in Japanese Unexamined Patent Publication No. H07-265649 supplies water cooled by the cooling tower, i.e., cooled water having not much lower temperature than the room temperature, to the heat exchanger. Therefore, the dehumidifier has a problem that it can cope with indoor latent heat load but cannot cope with indoor sensible heat load.

The present invention has been made in view of the foregoing points and, therefore, its object is to provide an air conditioning system which can cope with both of indoor sensible heat load and latent heat load and attain a high COP.

DISCLOSURE OF THE INVENTION

Solutions taken in the present invention are as follows.

A first solution is intended for an air conditioning system for running a refrigeration cycle by circulating refrigerant through a refrigerant circuit (10) provided with a heat-source side heat exchanger (21) and a utilization side heat exchanger and supplying air having passed through the utilization side heat exchanger to a room to cope with latent heat load and sensible heat load in the room. Further, the refrigerant circuit (10) includes as the utilization side heat exchanger an adsorption heat exchanger (30, 31, 32) provided with an adsorbent on the surface thereof and alternately creates an adsorption action of allowing moisture in the air to adsorb on the adsorption heat exchanger (30, 31, 32) and a regeneration action of allowing moisture to desorb from the adsorption heat exchanger (30, 31, 32).

A second solution is directed to the first solution, wherein the refrigerant circuit (10) includes, as a utilization side heat exchanger, an air heat exchanger (22) for exchanging heat between air and refrigerant in addition to the adsorption heat exchanger (30, 31, 32) and is configured to operates in a mode in which the air heat exchanger (22) serves as an evaporator and the heat-source side heat exchanger (21) serves as a condenser or a mode in which the air heat exchanger (22) serves as a condenser and the heat source-side heat exchanger (21) serves as an evaporator, and the air conditioning system supplies the air having passed through the air heat exchanger (22) to the room to cope with sensible heat load in the room.

A third solution is directed to the second solution, wherein the refrigerant circuit (10) is configured to repeatedly alternate between a mode in which the adsorption heat exchanger (30, 31, 32) serves as an evaporator and a mode in which the adsorption heat exchanger (30, 31, 32) serves as a condenser, dehumidifies air in the adsorption action by allowing moisture in the air to adsorb on the adsorption heat exchanger (30, 31, 32) serving as an evaporator and humidifies air in the regeneration action by allowing moisture to desorb from the adsorption heat exchanger (30, 31, 32) serving as a condenser, and the air conditioning system supplies the air dehumidified or humidified by the adsorption heat exchanger (30, 31, 32) to the room to cope with latent heat load in the room.

A fourth solution is directed to the second solution, wherein the refrigerant circuit (10) includes first and second adsorption heat exchangers (31, 32), is configured to repeatedly alternate between a mode in which the first adsorption heat exchanger (31) serves as an evaporator and the second adsorption heat exchanger (32) serves as a condenser and a mode in which the first adsorption heat exchanger (31) serves as a condenser and the second adsorption heat exchanger (32) serves as an evaporator, dehumidifies air in the adsorption action by allowing moisture in the air to adsorb on the adsorption heat exchanger (31, 32) serving as an evaporator and humidifies air in the regeneration action by allowing moisture to desorb from the adsorption heat exchanger (31, 32) serving as a condenser, and the air conditioning system supplies the air dehumidified or humidified by the adsorption heat exchanger (31, 32) to the room to cope with latent heat load in the room.

A fifth solution is directed to the second solution, wherein the refrigerant circuit (10) includes first and second adsorption heat exchangers (31, 32), is configured to repeatedly alternate between a mode in which the first adsorption heat exchanger (31) serves as an evaporator and the second adsorption heat exchanger (32) is in non-operating condition and a mode in which the second adsorption heat exchanger (32) serves as an evaporator and the first adsorption heat exchanger (31) is in non-operating condition, dehumidifies air in the adsorption action by allowing moisture in the air to adsorb on the adsorption heat exchanger (31, 32) serving as an evaporator and allows moisture to desorb from the adsorption heat exchanger (31, 32) in non-operating condition in the regeneration action by supplying air to the adsorption heat exchanger (31, 32) in non-operating condition, and the air conditioning system supplies the air dehumidified by the adsorption heat exchanger (31, 32) serving as an evaporator or the air humidified by the adsorption heat exchanger (31, 32) in non-operating condition to the room to cope with latent heat load in the room.

A sixth solution is directed to the second solution, wherein the refrigerant circuit (10) includes first and second adsorption heat exchangers (31, 32), is configured to repeatedly alternate between a mode in which the first adsorption heat exchanger (31) serves as a condenser and the second adsorption heat exchanger (32) is in non-operating condition and a mode in which the second adsorption heat exchanger (32) serves as a condenser and the first adsorption heat exchanger (31) is in non-operating condition, allows moisture in the air to adsorb on the adsorption heat exchanger (31, 32) in non-operating condition in the adsorption action and humidifies air in the regeneration action by allowing moisture to desorb from the adsorption heat exchanger (31, 32) serving as a condenser, and the air conditioning system supplies the air dehumidified by the adsorption heat exchanger (31, 32) in non-operating condition or the air humidified by the adsorption heat exchanger (31, 32) serving as a condenser to the room to cope with latent heat load in the room.

A seventh solution is directed to the third, fourth, fifth or sixth solution, wherein the air conditioning system is switchable between a dehumidification cooling operation for supplying air cooled by the air heat exchanger (22) and air dehumidified by the adsorption heat exchanger (30, 31, 32) to the room and a humidification heating operation for supplying air heated by the air heat exchanger (22) and air humidified by the adsorption heat exchanger (30, 31, 32).

An eighth solution is directed to the first solution, wherein the refrigerant circuit (10) includes only first and second adsorption heat exchangers (31, 32) as said utilization side heat exchangers and is configured to run in an operation in which the first and second adsorption heat exchangers (31, 32) alternately serve as an evaporator while the heat-source side heat exchanger (21) serves as a condenser or an operation in which the first and second adsorption heat exchangers (31, 32) alternately serve as a condenser while the heat-source side heat exchanger (21) serves as an evaporator, and the air conditioning system supplies air having passed through the adsorption heat exchanger (31, 32) serving as an evaporator or air having passed through the adsorption heat exchanger (31, 32) serving as a condenser to the room to cope with sensible heat load and latent heat load in the room.

A ninth solution is directed to the eighth solution, wherein the refrigerant circuit (10) is configured to repeatedly alternate between a mode in which the first adsorption heat exchanger (31) serves as an evaporator and the second adsorption heat exchanger (32) serves as a condenser and a mode in which the first adsorption heat exchanger (31) serves as a condenser and the second adsorption heat exchanger (32) serves as an evaporator, dehumidifies air in the adsorption action by allowing moisture in the air to adsorb on the adsorption heat exchanger (31, 32) serving as an evaporator and humidifies air in the regeneration action by allowing moisture to desorb from the adsorption heat exchanger (31, 32) serving as a condenser.

A tenth solution is directed to the eighth solution, wherein the refrigerant circuit (10) is configured to repeatedly alternate between a mode in which the first adsorption heat exchanger (31) serves as an evaporator and the second adsorption heat exchanger (32) is in non-operating condition and a mode in which the second adsorption heat exchanger (32) serves as an evaporator and the first adsorption heat exchanger (31) is in non-operating condition, dehumidifies air in the adsorption action by allowing moisture in the air to adsorb on the adsorption heat exchanger (31, 32) serving as an evaporator and allows moisture to desorb from the adsorption heat exchanger (31, 32) in non-operating condition in the regeneration action by supplying air to the adsorption heat exchanger (31, 32) in non-operating condition.

An eleventh solution is directed to the eighth solution, wherein the refrigerant circuit (10) is configured to repeatedly alternate between a mode in which the first adsorption heat exchanger (31) serves as a condenser and the second adsorption heat exchanger (32) is in non-operating condition and a mode in which the second adsorption heat exchanger (32) serves as a condenser and the first adsorption heat exchanger (31) is in non-operating condition, allows moisture in the air to adsorb on the adsorption heat exchanger (31, 32) in non-operating condition in the adsorption action and humidifies air in the regeneration action by allowing moisture to desorb from the adsorption heat exchanger (31, 32) serving as a condenser.

A twelfth solution is directed to the ninth, tenth or eleventh solution, wherein the air conditioning system is switchable between a dehumidification cooling operation for supplying air having passed through the adsorption heat exchanger (31, 32) serving as an evaporator to the room and a humidification heating operation for supplying air having passed through the adsorption heat exchanger (31, 32) serving as a condenser.

A thirteenth solution is directed to the first, second or eighth solution, wherein the refrigerant circuit (10) is operable in a mode in which the heat-source side heat exchanger (21) and the adsorption heat exchanger (30, 31, 32) concurrently serve as condensers and configured so that during the mode refrigerant flows into the adsorption heat exchanger (30, 31, 32) serving as a condenser after passing through the heat-source side heat exchanger (21).

A fourteenth solution is directed to the second solution, wherein the refrigerant circuit (10) is operable in a mode in which the air heat exchanger (22) and the adsorption heat exchanger (30, 31, 32) concurrently serve as condensers and configured so that during the mode refrigerant flows into the adsorption heat exchanger (30, 31, 32) serving as a condenser after passing through the air heat exchanger (22) serving as a condenser.

A fifteenth solution is directed to the first, second or eighth solution, wherein the refrigerant circuit (10) is operable in a mode in which the heat-source side heat exchanger (21) and the adsorption heat exchanger (30, 31, 32) concurrently serve as condensers and configured so that during the mode refrigerant flows into the heat-source side heat exchanger (21) after passing through the adsorption heat exchanger (30, 31, 32) serving as a condenser.

A sixteenth solution is directed to the second solution, wherein the refrigerant circuit (10) is operable in a mode in which the air heat exchanger (22) and the adsorption heat exchanger (30, 31, 32) concurrently serve as condensers and configured so that during the mode refrigerant flows into the air heat exchanger (22) serving as a condenser after passing through the adsorption heat exchanger (30, 31, 32) serving as a condenser.

A seventeenth solution is directed to the first, second or eighth solution, wherein the refrigerant circuit (10) is operable in a mode in which the heat-source side heat exchanger (21) and the adsorption heat exchanger (30, 31, 32) concurrently serve as evaporators and configured so that during the mode refrigerant flows into the adsorption heat exchanger (30, 31, 32) serving as an evaporator after passing through the heat-source side heat exchanger (21).

An eighteenth solution is directed to the second solution, wherein the refrigerant circuit (10) is operable in a mode in which the air heat exchanger (22) and the adsorption heat exchanger (30, 31, 32) concurrently serve as evaporators and configured so that during the mode refrigerant flows into the adsorption heat exchanger (30, 31, 32) serving as an evaporator after passing through the air heat exchanger (22) serving as an evaporator.

A nineteenth solution is directed to the first, second or eighth solution, wherein the refrigerant circuit (10) is operable in a mode in which the heat-source side heat exchanger (21) and the adsorption heat exchanger (30, 31, 32) concurrently serve as evaporators and configured so that during the mode refrigerant flows into the heat-source side heat exchanger (21) after passing through the adsorption heat exchanger (30, 31, 32) serving as an evaporator.

A twentieth solution is directed to the second solution, wherein the refrigerant circuit (10) is operable in a mode in which the air heat exchanger (22) and the adsorption heat exchanger (30, 31, 32) concurrently serve as evaporators and configured so that during the mode refrigerant flows into the air heat exchanger (22) serving as an evaporator after passing through the adsorption heat exchanger (30, 31, 32) serving as an evaporator.

A twenty-first solution is directed to the second solution, wherein the refrigerant circuit (10) includes first and second adsorption heat exchangers (31, 32) as the utilization side heat exchangers, and the refrigerant circuit (10) comprises a first circuit (11) in which the heat-source side heat exchanger (21), a variable-opening expansion valve (41) and the air heat exchanger (22) are arranged in series and a second circuit (12) in which the first adsorption heat exchanger (31), a variable-opening expansion valve (42) and the second adsorption heat exchanger (32) are arranged in series, the first and second circuits being connected in parallel with each other.

A twenty-second solution is directed to the third, fourth or fifth solution, wherein the refrigerant circuit (10) is configured so that the refrigerant evaporation temperature in one of the heat-source side heat exchanger (21) and the air heat exchanger (22) which serves as an evaporator and the refrigerant evaporation temperature in the adsorption heat exchanger (30, 31, 32) serving as an evaporator can be set to have different values.

A twenty-third solution is directed to the third, fourth or sixth solution, wherein the refrigerant circuit (10) is configured so that the refrigerant condensation temperature in one of the heat-source side heat exchanger (21) and the air heat exchanger (22) which serves as a condenser and the refrigerant condensation temperature in the adsorption heat exchanger (30, 31, 32) serving as a condenser can be set to have different values.

A twenty-fourth solution is directed to the first solution, wherein the air conditioning system includes a heat exchange element (90) for exchanging heat between a first air and a second air, and at least one of the first and second airs is air for adsorption or air for regeneration before passing through the adsorption heat exchanger (30, 31, 32).

A twenty-fifth solution is directed to the first solution, wherein the flow passage for air for adsorption or air for regeneration passing through the adsorption heat exchanger (30, 31, 32) is provided with a latent heat handling element (95) for coping with latent heat in the air.

-Behaviors-

In the first solution, the refrigerant circuit (10) of the air conditioning system is provided with a heat-source side heat exchanger (21) and a utilization side heat exchanger. Further, the refrigerant circuit (10) is provided with a single or a plurality of adsorption heat exchangers (30, 31, 32) as utilization side heat exchangers. The air passing through the adsorption heat exchanger (30, 31, 32) is controlled in absolute humidity by contact with the adsorbent therein. Specifically, when an adsorption action of allowing moisture in the air to adsorb on the adsorbent in the adsorption heat exchanger (30, 31, 32) takes place, the air is dehumidified. On the other hand, when a regeneration action of allowing moisture to desorb from the adsorbent in the adsorption heat exchanger (30, 31, 32) takes place, the air is humidified by the desorbed moisture. The air conditioning system runs a refrigeration cycle by circulating refrigerant through the refrigerant circuit (10) and supplies the air having passed through the utilization side heat exchanger or exchangers to the room to cope with sensible heat load and latent heat load in the room.

In the second solution, both the adsorption heat exchanger (30, 31, 32) and an air heat exchanger (22) are provided as the utilization side heat exchangers in the refrigerant circuit (10). The air passing through the air heat exchanger (22) is controlled in temperature by heat exchange with the refrigerant. Specifically, when the refrigerant circuit operates in a mode in which the air heat exchanger (22) serves as an evaporator, the air is cooled. When the refrigerant circuits operates in a mode in which the air heat exchanger (22) serves as a condenser, the air is heated. The air conditioning system of this solution supplies the air cooled or heated by the air heat exchanger (22) and thereby copes with sensible heat load in the room.

In the third solution, a mode in which the adsorption heat exchanger (30, 31, 32) serves as an evaporator and a mode in which the adsorption heat exchanger (30, 31, 32) serves as a condenser are repeatedly alternated. In the adsorption heat exchanger (30, 31, 32) serving as an evaporator, moisture in the air passing therethrough is adsorbed by the adsorbent and the heat of adsorption produced during the adsorption is taken by the refrigerant. On the other hand, in the adsorption heat exchanger (30, 31, 32) serving as a condenser, moisture is desorbed from the adsorbent heated by the refrigerant and the moisture desorbed from the adsorbent is applied to the air passing therethrough. The air conditioning system of this solution supplies the air dehumidified or humidified by the adsorption heat exchanger (30, 31, 32) to the room and thereby copes with latent heat load in the room.

In the fourth solution, a first adsorption heat exchanger (31) and a second adsorption heat exchanger (32) are provided as the utilization side heat exchangers in the refrigerant circuit (10). The refrigerant circuit (10) in this solution repeatedly alternates between a mode in which one of the first and second adsorption heat exchangers (31, 32) serves as an evaporator and the other serves as a condenser and a mode in which the one serves as a condenser and the other serves as an evaporator. In the adsorption heat exchanger (31, 32) serving as an evaporator, moisture in the air passing therethrough is adsorbed by the adsorbent and the heat of adsorption produced during the adsorption is taken by the refrigerant. On the other hand, in the adsorption heat exchanger (31, 32) serving as a condenser, moisture is desorbed from the adsorbent heated by the refrigerant and the moisture desorbed from the adsorbent is applied to the air passing therethrough. Further, when the air having passed through the adsorption heat exchanger (31, 32) serving as an evaporator is supplied to the room, dehumidified air continuously flows into the room. When the air having passed through the adsorption heat exchanger (31, 32) serving as a condenser is supplied to the room, humidified air continuously flows into the room.

In the fifth solution, a first adsorption heat exchanger (31) and a second adsorption heat exchanger (32) are provided as the utilization side heat exchangers in the refrigerant circuit (10). The refrigerant circuit (10) in this solution repeatedly alternates between a mode in which one of the first and second adsorption heat exchangers (31, 32) serves as an evaporator and the other is in non-operating condition and a mode in which the other serves as an evaporator and the one is in non-operating condition. In the adsorption heat exchanger (31, 32) serving as an evaporator, moisture in the air passing therethrough is adsorbed by the adsorbent and the heat of adsorption produced during the adsorption is taken by the refrigerant. On the other hand, in the adsorption heat exchanger (31, 32) in non-operating condition which is supplied with no refrigerant, moisture is desorbed from the adsorbent in contact with the air passing therethrough. Further, when the air having passed through the adsorption heat exchanger (31, 32) serving as an evaporator is supplied to the room, dehumidified air continuously flows into the room. When the air having passed through the adsorption heat exchanger (31, 32) in non-operating condition is supplied to the room, humidified air continuously flows into the room.

In the sixth solution, a first adsorption heat exchanger (31) and a second adsorption heat exchanger (32) are provided as the utilization side heat exchangers in the refrigerant circuit (10). The refrigerant circuit (10) in this solution repeatedly alternates between a mode in which one of the first and second adsorption heat exchangers (31, 32) serves as a condenser and the other is in non-operating condition and a mode in which the other serves as a condenser and the one is in non-operating condition. In the adsorption heat exchanger (31, 32) in non-operating condition which is supplied with no refrigerant, the adsorbent adsorbs moisture in the air passing therethrough. On the other hand, in the adsorption heat exchanger (31, 32) serving as a condenser, moisture is desorbed from the adsorbent heated by the refrigerant and the moisture desorbed from the adsorbent is applied to the air passing therethrough. Further, when the air having passed through the adsorption heat exchanger (31, 32) serving as a condenser is supplied to the room, humidified air continuously flows into the room. When the air having passed through the adsorption heat exchanger (31, 32) in non-operating condition is supplied to the room, dehumidified air continuously flows into the room.

In the seventh solution, the air conditioning system can be switched between a dehumidification cooling operation and a humidification heating operation.

In the eighth solution, only the first adsorption heat exchanger (31) and the second adsorption heat exchanger (32) are provided in the refrigerant circuit (10). In other words, all the utilization side heat exchangers provided in the refrigerant circuit (10) are first and second adsorption heat exchangers (31, 32). When the refrigerant circuit operates in a mode in which the adsorption heat exchanger (31, 32) serves as an evaporator, moisture in the air passing through the adsorption heat exchanger (31, 32) is adsorbed by the adsorbent and the heat of adsorption produced during the adsorption is taken by the refrigerant. In the adsorption heat exchanger (31, 32) serving as an evaporator, dehumidification and cooling of the air passing therethrough take place. On the other hand, when the refrigerant circuit operates in a mode in which the adsorption heat exchanger (31, 32) serves as a condenser, moisture is desorbed from the adsorbent heated by the refrigerant and the moisture desorbed from the adsorbent is applied to the air passing through the adsorption heat exchanger (31, 32). In the adsorption heat exchanger (31, 32) serving as a condenser, humidification and heating of the air passing therethrough take place. The air conditioning system of this solution supplies the air subjected to dehumidification and cooling or the air subjected to humidification and heating by the adsorption heat exchanger (31, 32) to the room and thereby copes with both sensible heat load and latent heat load in the room.

In the ninth solution, the refrigerant circuit (10) repeatedly alternates between a mode in which one of the first and second adsorption heat exchangers (31, 32) serves as an evaporator and the other serves as a condenser and a mode in which the one serves as a condenser and the other serves as an evaporator. Further, when the air having passed through the adsorption heat exchanger (31, 32) serving as an evaporator is supplied to the room, the air subjected to dehumidification and cooling continuously flows into the room. When the air having passed through the adsorption heat exchanger (31, 32) serving as a condenser is supplied to the room, the air subjected to humidification and heating continuously flows into the room.

In the tenth solution, the refrigerant circuit (10) repeatedly alternates between a mode in which one of the first and second adsorption heat exchangers (31, 32) serves as an evaporator and the other is in non-operating condition and a mode in which the other serves as an evaporator and the one is in non-operating condition. In the adsorption heat exchanger (31, 32) serving as an evaporator, moisture in the air passing therethrough is adsorbed by the adsorbent and the heat of adsorption produced during the adsorption is taken by the refrigerant. On the other hand, in the adsorption heat exchanger (31, 32) in non-operating condition which is supplied with no refrigerant, moisture is desorbed from the adsorbent in contact with the air passing therethrough. Further, when the air having passed through the adsorption heat exchanger (31, 32) serving as an evaporator is supplied to the room, the air subjected to dehumidification and cooling continuously flows into the room.

In the eleventh solution, the refrigerant circuit (10) repeatedly alternates between a mode in which one of the first and second adsorption heat exchangers (31, 32) serves as a condenser and the other is in non-operating condition and a mode in which the other serves as a condenser and the one is in non-operating condition. In the adsorption heat exchanger (31, 32) in non-operating condition which is supplied with no refrigerant, the adsorbent adsorbs moisture in the air passing therethrough. On the other hand, in the adsorption heat exchanger (31, 32) serving as a condenser, moisture is desorbed from the adsorbent heated by the refrigerant and the moisture desorbed from the adsorbent is applied to the air passing therethrough. Further, when the air having passed through the adsorption heat exchanger (31, 32) serving as a condenser is supplied to the room, the air subjected to humidification and heating continuously flows into the room.

In the twelfth solution, the air conditioning system can be switched between a dehumidification cooling operation and a humidification heating operation.

In the thirteenth solution, the refrigerant circuit is operable in a mode in which the heat-source side heat exchanger (21) and the adsorption heat exchanger (30, 31, 32) concurrently serve as condensers. During this mode, the refrigerant circulating through the refrigerant circuit (10) passes through the heat-source side heat exchanger (21) and then flows into the adsorption heat exchanger (30, 31, 32) serving as a condenser. Further, part of the refrigerant condenses in the heat-source side heat exchanger (21) and the remainder condenses in the adsorption heat exchanger (30, 31, 32).

In the fourteenth solution, the refrigerant circuit is operable in a mode in which the air heat exchanger (22) and the adsorption heat exchanger (30, 31, 32) concurrently serve as condensers. During this mode, the refrigerant circulating through the refrigerant circuit (10) passes through the air heat exchanger (22) serving as a condenser and then flows into the adsorption heat exchanger (30, 31, 32) serving as a condenser. Further, part of the refrigerant condenses in the air heat exchanger (22) and the remainder condenses in the adsorption heat exchanger (30, 31, 32).

In the fifteenth solution, the refrigerant circuit is operable in a mode in which the heat-source side heat exchanger (21) and the adsorption heat exchanger (30, 31, 32) concurrently serve as condensers. During this mode, the refrigerant circulating through the refrigerant circuit (10) passes through the adsorption heat exchanger (30, 31, 32) serving as a condenser and then flows into the heat-source side heat exchanger (21). Further, part of the refrigerant condenses in the adsorption heat exchanger (30, 31, 32) and the remainder condenses in the heat-source side heat exchanger (21).

In the sixteenth solution, the refrigerant circuit is operable in a mode in which the air heat exchanger (22) and the adsorption heat exchanger (30, 31, 32) concurrently serve as condensers. During this mode, the refrigerant circulating through the refrigerant circuit (10) passes through the adsorption heat exchanger (30, 31, 32) serving as a condenser and then flows into the air heat exchanger (22) serving as a condenser. Further, part of the refrigerant condenses in the adsorption heat exchanger (30, 31, 32) and the remainder condenses in the air heat exchanger (22).

In the seventeenth solution, the refrigerant circuit is operable in a mode in which the heat-source side heat exchanger (21) and the adsorption heat exchanger (30, 31, 32) concurrently serve as evaporators. During this mode, the refrigerant circulating through the refrigerant circuit (10) passes through the heat-source side heat exchanger (21) and then flows into the adsorption heat exchanger (30, 31, 32) serving as an evaporator. Further, part of the refrigerant evaporates in the heat-source side heat exchanger (21) and the remainder evaporates in the adsorption heat exchanger (30, 31, 32).

In the eighteenth solution, the refrigerant circuit is operable in a mode in which the air heat exchanger (22) and the adsorption heat exchanger (30, 31, 32) concurrently serve as evaporators. During this mode, the refrigerant circulating through the refrigerant circuit (10) passes through the air heat exchanger (22) serving as an evaporator and then flows into the adsorption heat exchanger (30, 31, 32) serving as an evaporator. Further, part of the refrigerant evaporates in the air heat exchanger (22) and the remainder evaporates in the adsorption heat exchanger (30, 31, 32).

In the nineteenth solution, the refrigerant circuit is operable in a mode in which the heat-source side heat exchanger (21) and the adsorption heat exchanger (30, 31, 32) concurrently serve as evaporators. During this mode, the refrigerant circulating through the refrigerant circuit (10) passes through the adsorption heat exchanger (30, 31, 32) serving as an evaporator and then flows into the heat-source side heat exchanger (21). Further, part of the refrigerant evaporates in the adsorption heat exchanger (30, 31, 32) and the remainder evaporates in the heat-source side heat exchanger (21).

In the twentieth solution, the refrigerant circuit is operable in a mode in which the air heat exchanger (22) and the adsorption heat exchanger (30, 31, 32) concurrently serve as evaporators. During this mode, the refrigerant circulating through the refrigerant circuit (10) passes through the adsorption heat exchanger (30, 31, 32) serving as an evaporator and then flows into the air heat exchanger (22) serving as an evaporator. Further, part of the refrigerant evaporates in the adsorption heat exchanger (30, 31, 32) and the remainder evaporates in the air heat exchanger (22).

In the twenty-first solution, the first circuit (11) and the second circuit (12) are connected in parallel with each other in the refrigerant circuit (10). In the first circuit (11), the heat-source side heat exchanger (21), a variable-opening expansion valve (41) and the air heat exchanger (22) are arranged in this order. In the second circuit (12), the first adsorption heat exchanger (31), a variable-opening expansion valve (42) and the second adsorption heat exchanger (32) are arranged in this order. When the expansion valve (41) of the first circuit (11) and the expansion valve (42) of the second circuit (12) are controlled in opening, the flow rate of refrigerant in the first circuit (11) and the flow rate of refrigerant in the second circuit (12) are controlled. In other words, the flow rate of refrigerant in the air heat exchanger (22) for mainly coping with sensible heat load and the flow rate of refrigerant in the adsorption heat exchanger (31, 32) for mainly coping with latent heat load are individually controlled.

In the twenty-second solution, the refrigerant circuit (10) is configured so that the refrigerant evaporation temperature in the heat-source side heat exchanger (21) or the air heat exchanger (22) and the refrigerant evaporation temperature in the adsorption heat exchanger (30, 31, 32) can be set to have different values. Therefore, in the refrigerant circuit (10) in this solution, low-pressure refrigerant introduced into the heat-source side heat exchanger (21) or the air heat exchanger (22) and low-pressure refrigerant introduced into the adsorption heat exchanger (30, 31, 32) can be set to have different pressure values.

In the twenty-third solution, the refrigerant circuit (10) is configured so that the refrigerant evaporation temperature in the heat-source side heat exchanger (21) or the air heat exchanger (22) and the refrigerant condensation temperature in the adsorption heat exchanger (30, 31, 32) can be set to have different values. Therefore, in the refrigerant circuit (10) in this solution, high-pressure refrigerant introduced into the heat-source side heat exchanger (21) or the air heat exchanger (22) and high-pressure refrigerant introduced into the adsorption heat exchanger (30, 31, 32) can be set to have different pressure values.

In the twenty-fourth solution, air for adsorption passes through the adsorption heat exchanger (30, 31, 32) in the adsorption action while air for regeneration passes through the adsorption heat exchanger (30, 31, 32) in the regeneration action. During the time, the air for adsorption or the air for regeneration is supplied to the adsorption heat exchanger (30, 31, 32) after passing through the heat exchange element (90). Therefore, the air for adsorption cooled by the heat exchange element (90) or the air for regeneration heated by the heat exchange element (90) is supplied to the adsorption heat exchanger (30, 31, 32). Hence, in this solution, air dehumidification or humidification in the adsorption heat exchanger (30, 31, 32) can be efficiently implemented.

In the twenty-fifth solution, the air for adsorption passes through the adsorption heat exchanger (30, 31, 32) in the adsorption action while the air for regeneration passes through the adsorption heat exchanger (30, 31, 32) in the regeneration action. During the time, the air for adsorption or the air for regeneration passes through not only the adsorption heat exchanger (30, 31, 32) but also the latent heat handling element (95). When the air for adsorption passes through the adsorption heat exchanger (30, 31, 32) and the latent heat handling element (95), the air for adsorption is dehumidified by both the adsorption heat exchanger (30, 31, 32) and the latent heat handling element (95). When the air for regeneration passes through the adsorption heat exchanger (30, 31, 32) and the latent heat handling element (95), the air for regeneration is humidified by both the adsorption heat exchanger (30, 31, 32) and the latent heat handling element (95).

-Effects-

In the present invention, the refrigerant circuit (10) is provided with one or more adsorption heat exchangers (30, 31, 32) as utilization side heat exchangers and the air conditioning system controls the absolute humidity of the air by passing the air through the adsorption heat exchanger (30, 31, 32). Specifically, the air conditioning system dehumidifies the air not by condensing moisture in the air as in the known system but by adsorbing moisture in the air on the adsorbent. This eliminates the need to set the refrigerant evaporation temperature in the refrigeration cycle below the air dew point unlike the known system and enables the air to be dehumidified even if the refrigerant evaporation temperature is set at the air dew point or higher. Therefore, according to the present invention, the refrigerant evaporation temperature in the refrigeration cycle can be set higher than in the known system even when the air is dehumidified, which reduces the difference between high and low pressures in the refrigeration cycle. As a result, power required for refrigerant compression can be reduced, thereby improving the COP of the refrigeration cycle.

Further, in the present invention, moisture is desorbed from the adsorption heat exchanger (30, 31, 32) intended for a regeneration action and the desorbed moisture is applied to the air passing through the adsorption heat exchanger (30, 31, 32). If the air humidified during passage through the adsorption heat exchanger (30, 31, 32) is supplied to the room, this provides room humidification. Specifically, the known air conditioning system of the type that condenses moisture in the air can only provide room dehumidification but not room humidification. The air conditioning system of the present invention can also provide room humidification by supplying the air humidified by the adsorption heat exchanger (30, 31, 32) into the room.

In the second solution, the refrigerant circuit (10) is provided with an air heat exchanger (22) and the air temperature is controlled by passing the air through the air heat exchanger (22). Therefore, what is needed to be done in the adsorption heat exchanger (30, 31, 32) is mainly to control the air absolute humidity and what is needed to be done in the air heat exchanger (22) is mainly to control the air temperature. Hence, according to this solution, the temperature and absolute humidity of the air supplied to the room can be adequately controlled, which ensures that the sensible and latent heat loads in the room are coped with.

In the third and fourth solutions, the adsorption heat exchanger (30, 31, 32) intended for an adsorption action serves as an evaporator. Therefore, the refrigerant in the adsorption heat exchanger (30, 31, 32) can take the heat of adsorption produced when moisture in the air is adsorbed on the adsorption heat exchanger (30, 31, 32). This increases the amount of moisture adsorbed by the adsorption heat exchanger (30, 31, 32). Further, in these solutions, the adsorption heat exchanger (30, 31, 32) intended for a regeneration action serves as a condenser. Therefore, the refrigerant in the adsorption heat exchanger (30, 31, 32) can sufficiently heat the adsorbent on the adsorption heat exchanger (30, 31, 32). This increases the amount of moisture desorbed from the adsorption heat exchanger (30, 31, 32).

Additionally, in the fourth solution, the refrigerant circuit (10) includes first and second adsorption heat exchangers (31, 32) as the utilization side heat exchangers and concurrently creates an adsorption action for one of them and a regeneration action for the other. Therefore, according to this solution, the dehumidified or humidified air can be continuously supplied to the room by supplying to the room the air having passed through the adsorption heat exchanger (31, 32) intended for an adsorption action or the adsorption heat exchanger (31, 32) intended for a regeneration action.

In the fifth solution, the adsorption heat exchanger (31, 32) intended for an adsorption action serves as an evaporator and meanwhile the adsorption heat exchanger (31, 32) intended for a regeneration action is stopped from being supplied with refrigerant. In the sixth solution, the adsorption heat exchanger (31, 32) intended for an adsorption action is stopped from being supplied with refrigerant and meanwhile the adsorption heat exchanger (31, 32) intended for a regeneration action serves as a condenser. Therefore, according to these solutions, the switch between an adsorption action and a regeneration action can be implemented simply by making and breaking the introduction of refrigerant into the adsorption heat exchangers, which prevents the complication of the refrigerant circuit (10).

In the eighth solution, only first and second adsorption heat exchangers (31, 32) are provided as the utilization side heat exchangers in the refrigerant circuit (10) and the air conditioning system copes with both sensible and latent heat loads in the room by supplying the air having passed through the adsorption heat exchangers (31, 32) to the room. Therefore, according to this solution, the number of types of heat exchanger provided as utilization side heat exchangers in the refrigerant circuit (10) can be minimized, thereby preventing the complication of the refrigerant circuit (10).

In the ninth solution, the adsorption heat exchanger (31, 32) intended for an adsorption action serves as an evaporator. Therefore, the refrigerant in the adsorption heat exchanger (31, 32) can take the heat of adsorption produced when moisture in the air is adsorbed on the adsorption heat exchanger (31, 32). This increases the amount of moisture adsorbed by the adsorption heat exchanger (31, 32). Further, in this solution, the adsorption heat exchanger (31, 32) intended for a regeneration action serves as a condenser. Therefore, the refrigerant in the adsorption heat exchanger (31, 32) can sufficiently heat the adsorbent on the adsorption heat exchanger (31, 32). This increases the amount of moisture desorbed from the adsorption heat exchanger (31, 32).

Additionally, in the ninth solution, the refrigerant circuit (10) includes first and second adsorption heat exchangers (31, 32) as the utilization side heat exchangers and concurrently creates an adsorption action for one of them and a regeneration action for the other. Therefore, according to this solution, the air controlled in humidity and temperature can be continuously supplied to the room by supplying to the room the air having passed through the adsorption heat exchanger (31, 32) intended for an adsorption action or the adsorption heat exchanger (31, 32) intended for a regeneration action.

In the tenth solution, the adsorption heat exchanger (31, 32) intended for an adsorption action serves as an evaporator and meanwhile the adsorption heat exchanger (31, 32) intended for a regeneration action is stopped from being supplied with refrigerant. In the eleventh solution, the adsorption heat exchanger (31, 32) intended for an adsorption action is stopped from being supplied with refrigerant and meanwhile the adsorption heat exchanger (31, 32) intended for a regeneration action serves as a condenser. Therefore, according to these solutions, the switch between an adsorption action and a regeneration action can be implemented simply by making and breaking the introduction of refrigerant into the adsorption heat exchangers, which prevents the complication of the refrigerant circuit (10).

In the thirteenth solution, during a mode in which the heat-source side heat exchanger (21) and the adsorption heat exchanger (30, 31, 32) both serve as condensers, the refrigerant flows into the adsorption heat exchanger (30, 31, 32)

after passing through the heat-source side heat exchanger (21). In the fourteenth solution, during a mode in which the air heat exchanger (22) and the adsorption heat exchanger (30, 31, 32) both serve as condensers, the refrigerant flows into the adsorption heat exchanger (30, 31, 32) after passing through the air heat exchanger (22). Therefore, according to these solutions, vapor-liquid two-phase refrigerant obtained by partly condensing gas refrigerant in the heat-source side heat exchanger (21) or the air heat exchanger (22) can be introduced into the adsorption heat exchanger (30, 31, 32). As a result, the temperature of the entire adsorption heat exchanger (30, 31, 32) can almost reach the condensation temperature of the refrigerant. Hence, the adsorbent carried on the surface of the adsorption heat exchanger (30, 31, 32) can be uniformly heated.

In the fifteenth solution, during a mode in which the heat-source side heat exchanger (21) and the adsorption heat exchanger (30, 31, 32) both serve as condensers, the refrigerant flows into the heat-source side heat exchanger (21) after passing through the adsorption heat exchanger (30, 31, 32). In the sixteenth solution, during a mode in which the air heat exchanger (22) and the adsorption heat exchanger (30, 31, 32) both serve as condensers, the refrigerant flows into the air heat exchanger (22) after passing through the adsorption heat exchanger (30, 31, 32). Therefore, according to these solutions, compressed refrigerant is first introduced into the adsorption heat exchanger (30, 31, 32). In other words, the highest-temperature refrigerant just after compressed can be introduced into the adsorption heat exchanger (30, 31, 32). Hence, according to these solutions, the adsorbent carried on the surface of the adsorption heat exchanger (30, 31, 32) can be set at a high temperature, which ensures the regeneration of the adsorbent.

In the seventeenth solution, during a mode in which the heat-source side heat exchanger (21) and the adsorption heat exchanger (30, 31, 32) both serve as evaporators, the refrigerant flows into the adsorption heat exchanger (30, 31, 32) after passing through the heat-source side heat exchanger (21). In the eighteenth solution, during a mode in which the air heat exchanger (22) and the adsorption heat exchanger (30, 31, 32) both serve as evaporators, the refrigerant flows into the adsorption heat exchanger (30, 31, 32) after passing through the air heat exchanger (22). According to these solutions, refrigerant slightly reduced in pressure owing to pressure loss during passage through the heat-source side heat exchanger (21) or the air heat exchanger (22) is introduced into the adsorption heat exchanger (30, 31, 32). Therefore, the refrigerant evaporation temperature in the adsorption heat exchanger (30, 31, 32) can be set lower than that in the heat-source side heat exchanger (21) or the air heat exchanger (22). This increases the amount of heat taken by refrigerant in the adsorption heat exchanger (30, 31, 32) and thereby increases the amount of moisture adsorbed on the adsorption heat exchanger (30, 31, 32).

In the nineteenth solution, during a mode in which the heat-source side heat exchanger (21) and the adsorption heat exchanger (30, 31, 32) both serve as evaporators, the refrigerant flows into the heat-source side heat exchanger (21) after passing through the adsorption heat exchanger (30, 31, 32). In the twentieth solution, during a mode in which the air heat exchanger (22) and the adsorption heat exchanger (30, 31, 32) both serve as evaporators, the refrigerant flows into the air heat exchanger (22) after passing through the adsorption heat exchanger (30, 31, 32). In these solutions, the refrigerant flowing in vapor-liquid phase coexistence into the adsorption heat exchanger (30, 31, 32) flows out of it as it is in vapor-liquid phase coexistence and is then fed to the heat-source side heat exchanger (21) or the air heat exchanger (22). Therefore, the temperature of the entire adsorption heat exchanger (30, 31, 32) is almost equal to the refrigerant evaporation temperature, which provides uniform cooling of the adsorbent disposed on the surface of the adsorption heat exchanger (30, 31, 32).

According to the twenty-first solution, the air conditioning system can individually control each of the flow rates of refrigerant in the first circuit (11) and the second circuit (12) connected in parallel with each other. This makes it possible to properly control the flow rate of refrigerant in the air heat exchanger (22) to an appropriate value to the sensible heat load in the room and properly control the flow rate of refrigerant in the adsorption heat exchanger (31, 32) to an appropriate value to the latent heat load in the room. Therefore, according to this solution, the operating condition of the air conditioning system can be properly controlled according to the sensible and latent heat loads in the room.

In the twenty-second solution, the refrigerant evaporation temperature in the heat-source side heat exchanger (21) or the air heat exchanger (22) and the refrigerant evaporation temperature in the adsorption heat exchanger (30, 31, 32) can be set to have different values. This makes it possible to individually set the amount of heat taken by refrigerant in the heat-source side heat exchanger (21) or the air heat exchanger (22) having an effect mainly on the capacity to cope with sensible heat load and the amount of heat taken by refrigerant in the adsorption heat exchanger (30, 31, 32) having an effect mainly on the capacity to cope with latent heat load. Therefore, according to this solution, the capacity to cope with the sensible heat load and the capacity to cope with the latent heat load in the air conditioning system can be set at appropriate values, respectively.

In the twenty-third solution, the refrigerant condensation temperature in the heat-source side heat exchanger (21) or the air heat exchanger (22) and the refrigerant condensation temperature in the adsorption heat exchanger (30, 31, 32) can be set to have different values. This makes it possible to individually set the amount of heat released from refrigerant in the heat-source side heat exchanger (21) or the air heat exchanger (22) having an effect mainly on the capacity to cope with sensible heat load and the amount of heat released from refrigerant in the adsorption heat exchanger (30, 31, 32) having an effect mainly on the capacity to cope with latent heat load. Therefore, according to this solution, the capacity to cope with the sensible heat load and the capacity to cope with the latent heat load in the air conditioning system can be set at appropriate values, respectively.

In the twenty-fourth solution, a heat exchange element (90) is provided for exchanging heat between a first air and a second air and air for adsorption cooled or air for regeneration heated by the heat exchange element (90) is supplied to the adsorption heat exchanger (30, 31, 32). Therefore, according to this solution, air dehumidification or humidification in the adsorption heat exchanger (30, 31, 32) can take place with efficiency, which prevents the dehumidification capacity or the humidification capacity from being deteriorated.

In the twenty-fifth solution, a latent heat handling element (95) for coping with latent heat in the air is disposed in the flow passage for air for adsorption or air for regeneration, so that the air for adsorption or the air for regeneration can pass through both the adsorption heat exchanger (30, 31, 32) and the latent heat handling element (95). Therefore, according to this solution, the latent heat of the air for adsorption or the air for regeneration can be coped with in both the latent heat handling element (95) and the adsorption heat exchanger (30, 31, 32), which makes it possible to enhance the air dehumidification capacity or the air humidification capacity.

BEST MODE FOR CARRYING OUT THE INVENTION

Figure 1A:
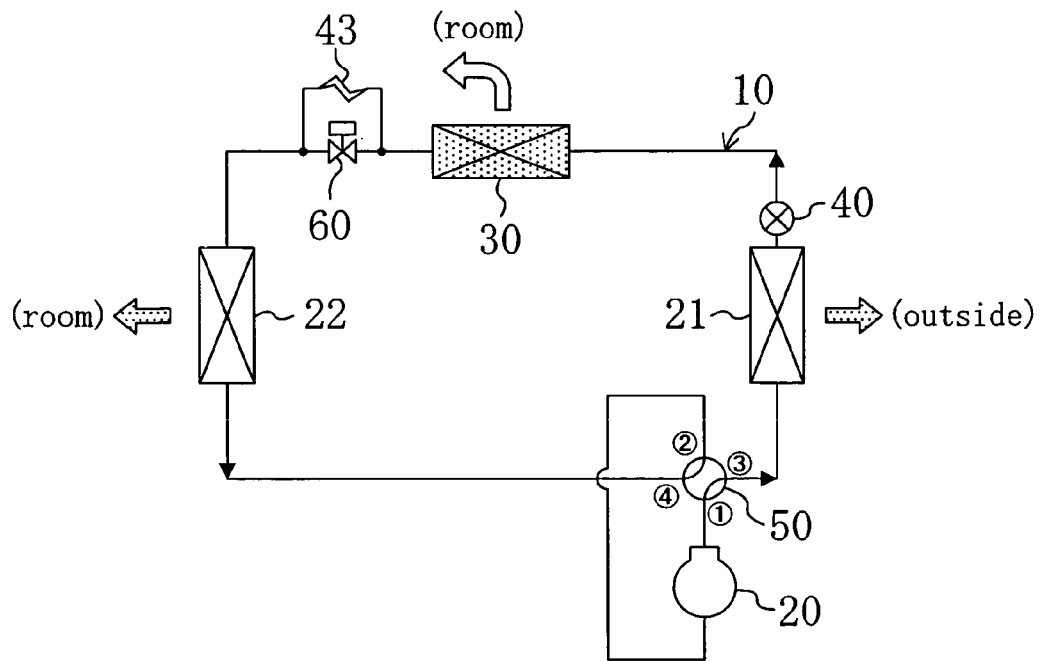
FIG. 1 is a schematic diagram showing the configuration of a refrigerant circuit in Embodiment 1 and its behavior during the dehumidification cooling operation.

Embodiments of the present invention will be described in detail below with reference to the drawings.

Embodiment 1 of the Invention

Embodiment 1 of the present invention is described. An air conditioning system of the present embodiment copes with both of indoor sensible heat load and latent heat load. The air conditioning system includes a refrigerant circuit (10) and runs a vapor compression refrigeration cycle by circulating refrigerant through the refrigerant circuit (10).

As shown in FIGS. 1 and 2, the refrigerant circuit (10) is provided with a single compressor (20), a single four-way selector valve (50) and a single motor-operated expansion valve (40). Further, the refrigerant circuit (10) is provided with a single outdoor heat exchanger (21), a single indoor heat exchanger (22) and a single adsorption heat exchanger (30). In this refrigerant circuit (10), the outdoor heat exchanger (21) constitutes a heat-source side heat exchanger while the indoor heat exchanger (22) and the adsorption heat exchanger (30) constitute utilization side heat exchangers.

A description is given to the configuration of the refrigerant circuit (10). The compressor (20) is connected at its discharge side to the first port of the four-way selector valve (50) and connected at its suction side to the second port of the four-way selector valve (50). In the refrigerant circuit (10), the outdoor heat exchanger (21), the motor-operated expansion valve (40), the adsorption heat exchanger (30) and the indoor heat exchanger (22) are arranged in this order from the third toward fourth port of the four-way selector valve (50).

The refrigerant circuit (10) is further provided with a solenoid valve (60) and a capillary tube (43). The solenoid valve (60) is disposed between the adsorption heat exchanger (30) and the indoor heat exchanger (22). The capillary tube (43) is connected at one end between the solenoid valve (60) and the adsorption heat exchanger (30) and connected at the other end between the solenoid valve (60) and the indoor heat exchanger (22).

The outdoor heat exchanger (21), the indoor heat exchanger (22) and the adsorption heat exchanger (30) are cross-fin type fin-and-tube heat exchangers composed of a heat exchanger tube and a large number of fins. Out of these heat exchangers, the adsorption heat exchanger (30) has an adsorbent carried on the fin surfaces. Adsorbents used include zeolite and silica gel. On the other hand, each of the outdoor heat exchanger (21) and the indoor heat exchanger (22) have no adsorbent carried on the fin surfaces and provides only heat exchange between air and refrigerant. Thus, the indoor heat exchanger (22) constitutes an air heat exchanger that provides only heat exchange between air and refrigerant.

The four-way selector valve (50) switches between a first position (a position shown in FIG. 1) in which the first and third ports communicate and the second and fourth ports communicate and a second position (a position shown in FIG. 2) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 1.

During the dehumidification cooling operation, the four-way selector valve (50) is set to the first position so that the outdoor heat exchanger (21) serves as a condenser and the indoor heat exchanger (22) serves as an evaporator. Further, an adsorption action in which the adsorption heat exchanger (30) serves as an evaporator and a regeneration action in which the adsorption heat exchanger (30) serves as a condenser are repeatedly alternated.

Furthermore, during the dehumidification cooling operation, outdoor air is supplied to the outdoor heat exchanger (21) and room air is supplied to the indoor heat exchanger (22) and the adsorption heat exchanger (30). Then, the air cooled by the indoor heat exchanger (22) is continuously supplied to the room, while the air dehumidified by the adsorption heat exchanger (30) is intermittently supplied to the room.

During the adsorption action, as shown in FIG. 1(A), the solenoid valve (60) is opened and the opening of the motor-operated expansion valve (40) is appropriately controlled. Under these conditions, refrigerant discharged from the compressor (20) condenses in the outdoor heat exchanger (21), is reduced in pressure by the motor-operated expansion valve (40), evaporates while passing through the adsorption heat exchanger (30) and the indoor heat exchanger (22) in this order, is sucked into and then compressed by the compressor (20).

During the adsorption action, the outdoor air having taken heat from refrigerant in the outdoor heat exchanger (21) is discharged to the outside atmosphere while the room air cooled by the indoor heat exchanger (22) is returned to the room. Further, in the adsorption heat exchanger (30), moisture in the room air is adsorbed by the adsorbent to dehumidify the room air and the heat of adsorption produced during the dehumidification is taken by the refrigerant. The room air dehumidified by the adsorption heat exchanger (30) is returned to the room.

Figure 1B:
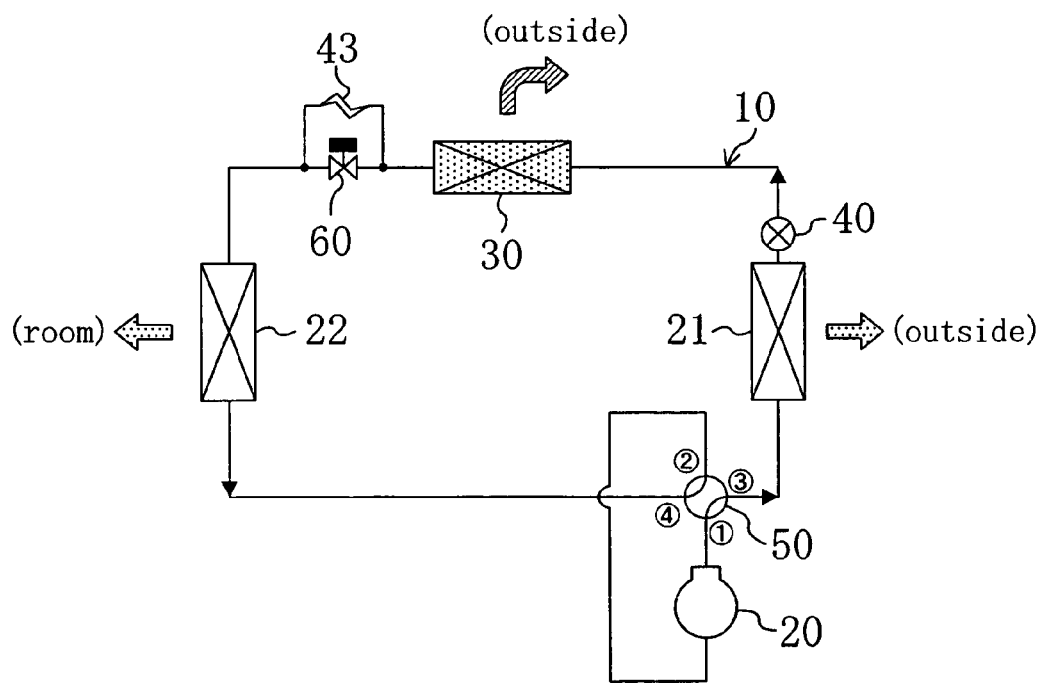

During the regeneration action, as shown in FIG. 1(B), the solenoid valve (60) is closed and the opening of the motor-operated expansion valve (40) is set fully open. Under these conditions, refrigerant discharged from the compressor (20) condenses while passing through the outdoor heat exchanger (21) and the adsorption heat exchanger (30) in this order, is reduced in pressure by the capillary tube (43), evaporates in the indoor heat exchanger (22), is sucked into and then compressed by the compressor (20).

During the regeneration action, the outdoor air having taken heat from refrigerant in the outdoor heat exchanger (21) is discharged to the outside atmosphere while the room air cooled by the indoor heat exchanger (22) is returned to the room. Further, in the adsorption heat exchanger (30), the adsorbent is regenerated by heating from refrigerant and moisture desorbed from the adsorbent is applied to the room air. The moisture desorbed from the adsorption heat exchanger (30) is discharged to the outside atmosphere together with the room air.

<Humidification Heating Operation>

The system's behavior during the humidification heating operation is described with reference to FIG. 2.

During the humidification heating operation, the four-way selector valve (50) is set to the second position so that the indoor heat exchanger (22) serves as a condenser and the outdoor heat exchanger (21) serves as an evaporator. Further, an adsorption action in which the adsorption heat exchanger (30) serves as an evaporator and a regeneration action in which the adsorption heat exchanger (30) serves as a condenser are repeatedly alternated.

Furthermore, during the humidification heating operation, outdoor air is supplied to the outdoor heat exchanger (21) while room air is supplied to the indoor heat exchanger (22) and the adsorption heat exchanger (30). Then, the air heated by the indoor heat exchanger (22) is continuously supplied to the room, while the air humidified by the adsorption heat exchanger (30) is intermittently supplied to the room.

Figure 2A:
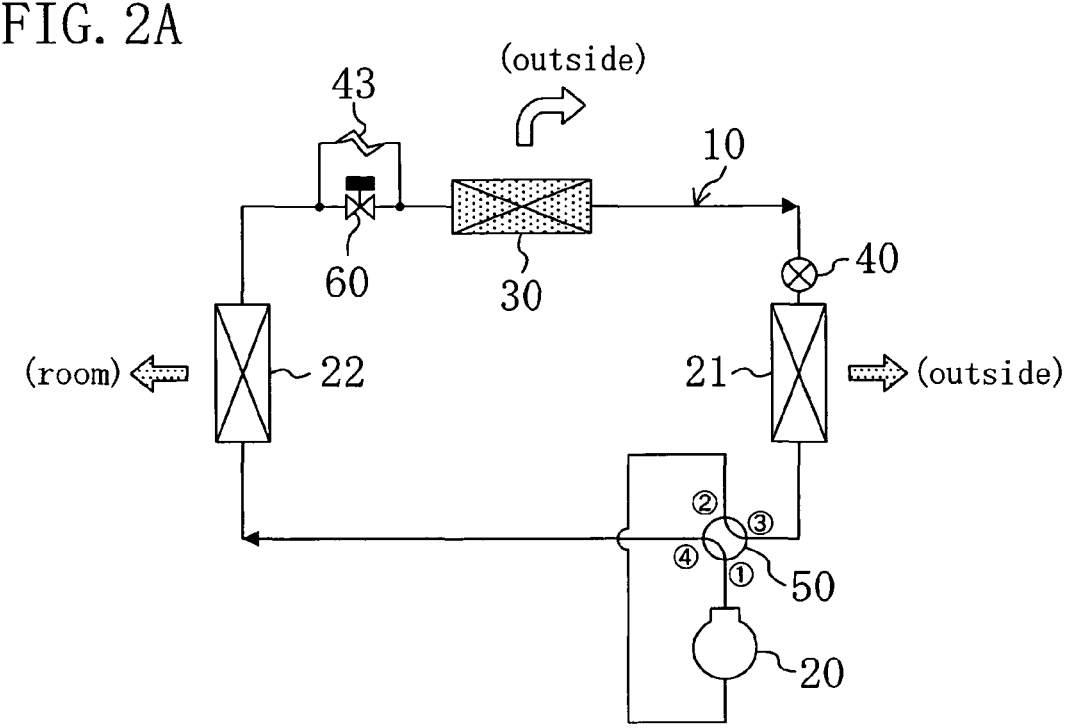
FIG. 2 is a schematic diagram showing the configuration of the refrigerant circuit in Embodiment 1 and its behavior during the humidification heating operation.

During the adsorption action, as shown in FIG. 2(A), the solenoid valve (60) is closed and the motor-operated expansion valve (40) is set fully open. Under these conditions, refrigerant discharged from the compressor (20) condenses in the indoor heat exchanger (22), is reduced in pressure by the capillary tube (43), evaporates while passing through the adsorption heat exchanger (30) and the outdoor heat exchanger (21) in this order, is sucked into and then compressed by the compressor (20).

During the adsorption action, the outdoor air having released heat to refrigerant in the outdoor heat exchanger (21) is discharged to the outside atmosphere while the room air heated by the indoor heat exchanger (22) is returned to the room. Further, in the adsorption heat exchanger (30), moisture in the room air is adsorbed by the adsorbent and the heat of adsorption produced during the adsorption is taken by the refrigerant. The room air dried by the adsorption heat exchanger (30) is discharged to the outside atmosphere.

Figure 2B:
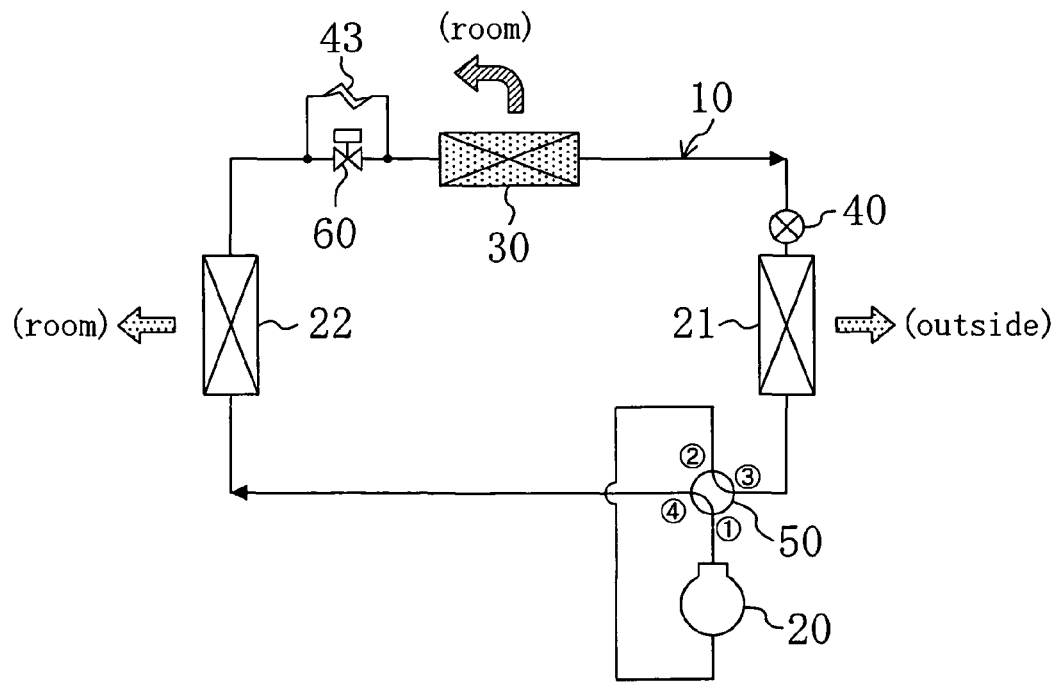

During the regeneration action, as shown in FIG. 2(B), the solenoid valve (60) is opened and the opening of the motor-operated expansion valve (40) is appropriately controlled. Under these conditions, refrigerant discharged from the compressor (20) condenses while passing through the indoor heat exchanger (22) and the adsorption heat exchanger (30) in this order, is reduced in pressure by the motor-operated expansion valve (40), evaporates in the outdoor heat exchanger (21), is sucked into and then compressed by the compressor (20).

During the regeneration action, the outdoor air having released heat to refrigerant in the outdoor heat exchanger (21) is discharged to the outside atmosphere while the room air heated by the indoor heat exchanger (22) is returned to the room. Further, in the adsorption heat exchanger (30), the adsorbent is regenerated by heating from refrigerant and moisture desorbed from the adsorbent is applied to the room air. The room air humidified by the adsorption heat exchanger (30) is returned to the room.

Effects of Embodiment 1

In the present embodiment, the adsorption heat exchanger (30) is disposed as a utilization side heat exchanger in the refrigerant circuit (10) and the absolute humidity of air is controlled by passing the air through the adsorption heat exchanger (30). In other words, the air is dehumidified not by condensing moisture in the air as in the known technique but by adsorbing the moisture in the air on an adsorbent. This eliminates the need to set the refrigerant evaporation temperature in the refrigeration cycle below the dew point of air and enables air dehumidification even if the refrigerant evaporation temperature is set at the air dew point or higher.

Therefore, according to the present embodiment, the refrigerant evaporation temperature in the refrigeration cycle can be set higher than conventionally done in dehumidifying air, which reduces the difference between high and low pressures in the refrigeration cycle. As a result, the power consumption of the compressor (20) can be reduced, thereby improving the COP of the refrigeration cycle.

Further, in the present embodiment, moisture is desorbed from the adsorption heat exchanger (30) intended for a regeneration action and the desorbed moisture is applied to the air passing through the adsorption heat exchanger (30). Then, the air humidified during the passage through the adsorption heat exchanger (30) is supplied to the room, which provides room humidification. Specifically, although the known air conditioning system of the type that condenses moisture in the air can only provide room dehumidification but not room humidification, the air conditioning system of the present embodiment can also provide room humidification by supplying the air humidified by the adsorption heat exchanger (30) to the room.

Embodiment 2 of the Invention

Embodiment 2 of the present invention is described. An air conditioning system of the present embodiment varies in the configuration of the refrigerant circuit (10) from the air conditioning system of Embodiment 1.

As shown in FIGS. 3 and 4, the refrigerant circuit (10) is provided with a single compressor (20), a single motor-operated expansion valve (40), and two four-way selector valves (51, 52). Further, the refrigerant circuit (10) is provided with a single outdoor heat exchanger (21), a single indoor heat exchanger (22) and a single adsorption heat exchanger (30). In this refrigerant circuit (10), the outdoor heat exchanger (21) constitutes a heat-source side heat exchanger while the indoor heat exchanger (22) and the adsorption heat exchanger (30) constitute utilization side heat exchangers. The outdoor heat exchanger (21), the indoor heat exchanger (22) and the adsorption heat exchanger (30) are configured to be the same as those in Embodiment 1.

A description is given to the configuration of the refrigerant circuit (10). The compressor (20) is connected at its discharge side to the first port of the first four-way selector valve (51) and connected at its suction side to the second port of the first four-way selector valve (51). The first four-way selector valve (51) is connected at its third port to the first port of the second four-way selector valve (52) and connected at its fourth port to the second port of the second four-way selector valve (52) via the adsorption heat exchanger (30). In the refrigerant circuit (10), the outdoor heat exchanger (21), the motor-operated expansion valve (40) and the indoor heat exchanger (22) are arranged in this order from the third to fourth port of the second four-way selector valve (52).

Figure 3A:
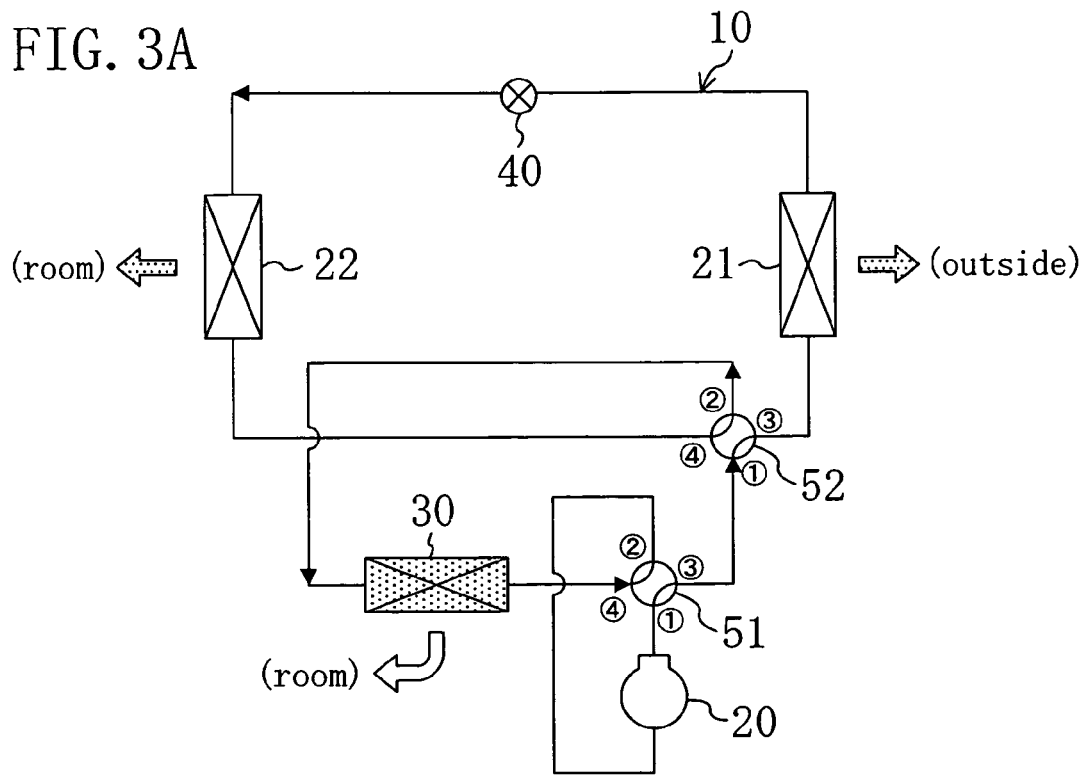
FIG. 3 is a schematic diagram showing the configuration of a refrigerant circuit in Embodiment 2 and its behavior during the dehumidification cooling operation.
Figure 3B:
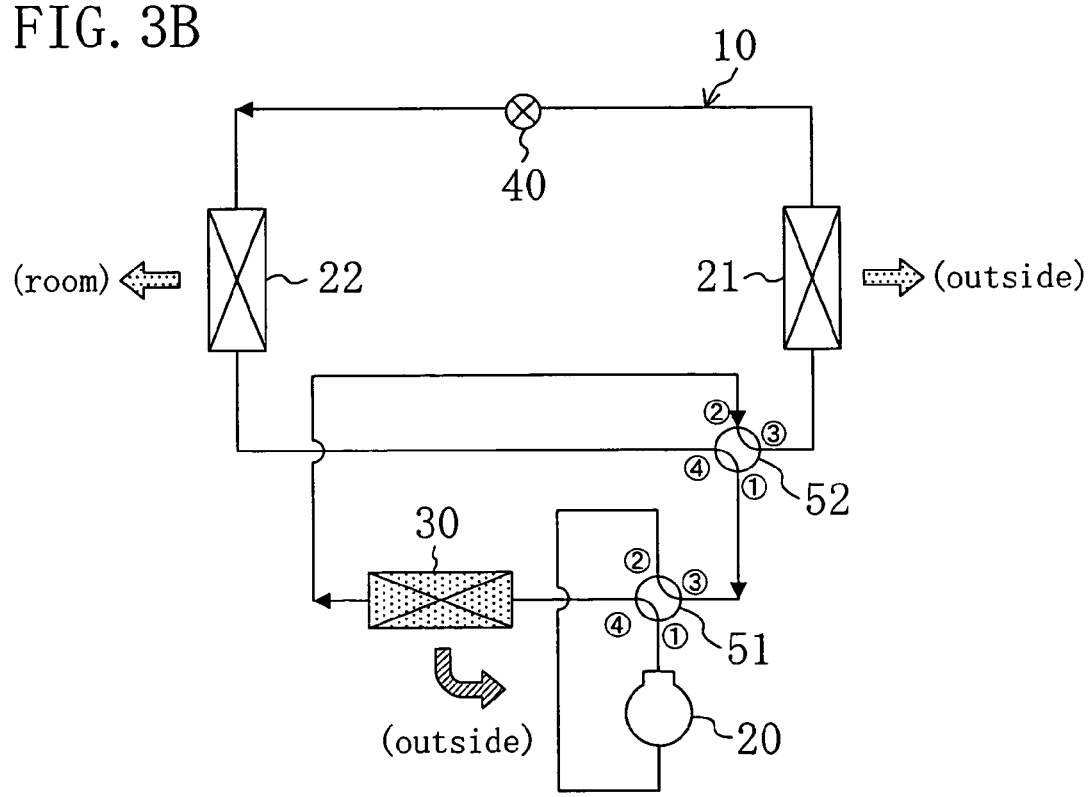
Figure 4A:
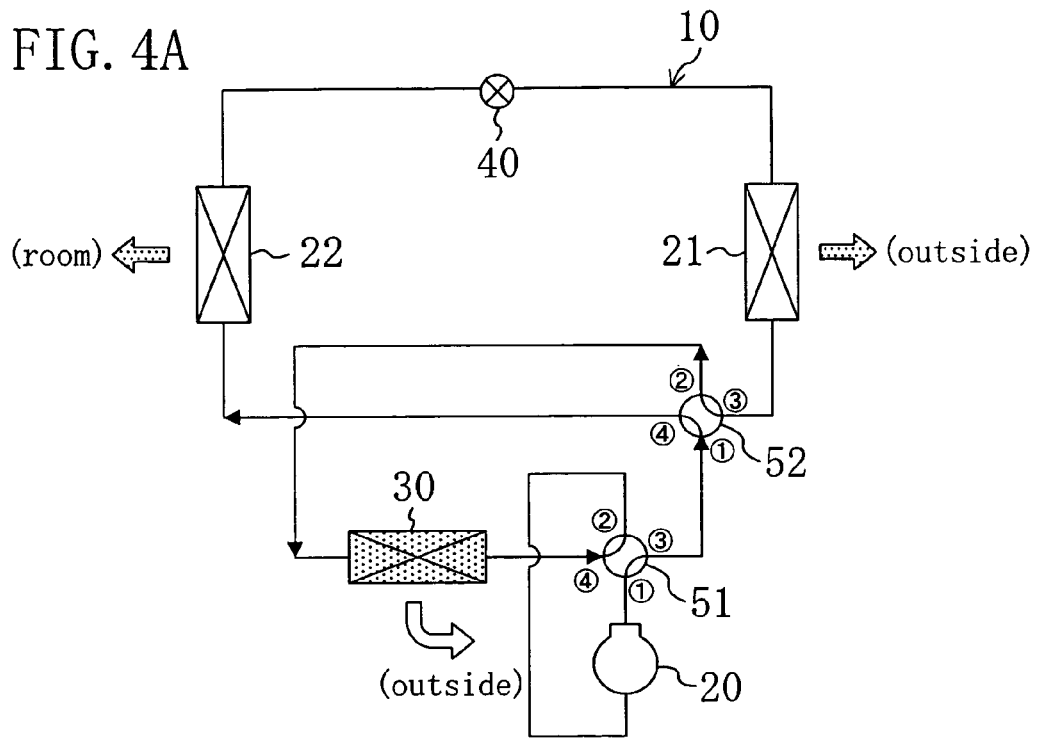
FIG. 4 is a schematic diagram showing the configuration of the refrigerant circuit in Embodiment 2 and its behavior during the humidification heating operation.
Figure 4B:
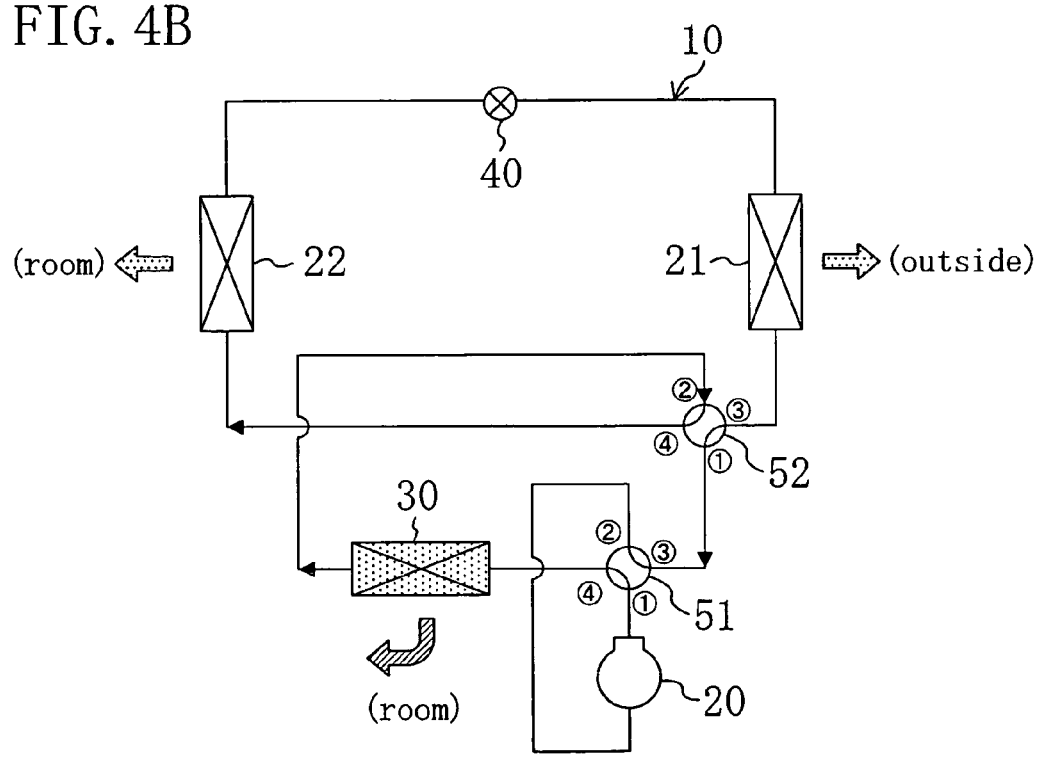

The first four-way selector valve (51) switches between a first position (a position shown in FIGS. 3(A) and 4(A)) in which the first and third ports communicate and the second and fourth ports communicate and a second position (a position shown in FIGS. 3(B) and 4(B)) in which the first and fourth ports communicate and the second and third ports communicate. On the other hand, the second four-way selector valve (52) switches between a first position (a position shown in FIGS. 3(A) and 4(B)) in which the first and third ports communicate and the second and fourth ports communicate and a second position (a position shown in FIGS. 3(B) and 4(A)) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 3.

During the dehumidification cooling operation, the outdoor heat exchanger (21) serves as a condenser and the indoor heat exchanger (22) serves as an evaporator. Further, an adsorption action in which the adsorption heat exchanger (30) serves as an evaporator and a regeneration action in which the adsorption heat exchanger (30) serves as a condenser are repeatedly alternated.

Furthermore, during the dehumidification cooling operation, outdoor air is supplied to the outdoor heat exchanger (21) while room air is supplied to the indoor heat exchanger (22) and the adsorption heat exchanger (30). Then, the air cooled by the indoor heat exchanger (22) is continuously supplied to the room while the air dehumidified by the adsorption heat exchanger (30) is intermittently supplied to the room.

During the adsorption action, as shown in FIG. 3(A), the first four-way selector valve (51) and the second four-way selector valve (52) are set to their first positions and the opening of the motor-operated expansion valve (40) is appropriately controlled. Under these conditions, refrigerant discharged from the compressor (20) condenses in the outdoor heat exchanger (21), is reduced in pressure by the motor-operated expansion valve (40), evaporates while passing through the indoor heat exchanger (22) and the adsorption heat exchanger (30) in this order, is sucked into and then compressed by the compressor (20).

During the adsorption action, the outdoor air having taken heat from refrigerant in the outdoor heat exchanger (21) is discharged to the outside atmosphere while the room air cooled by the indoor heat exchanger (22) is returned to the room. Further, in the adsorption heat exchanger (30), moisture in the room air is adsorbed by the adsorbent to dehumidify the room air and the heat of adsorption produced during the dehumidification is taken by the refrigerant. The room air dehumidified by the adsorption heat exchanger (30) is returned to the room.

During the regeneration action, as shown in FIG. 3(B), the first four-way selector valve (51) and the second four-way selector valve (52) are set to their second positions and the opening of the motor-operated expansion valve (40) is appropriately controlled. Under these conditions, refrigerant discharged from the compressor (20) condenses while passing through the adsorption heat exchanger (30) and the outdoor heat exchanger (21) in this order, is reduced in pressure by the motor-operated expansion valve (40), evaporates in the indoor heat exchanger (22), is sucked into and then compressed by the compressor (20).

During the regeneration action, the outdoor air having taken heat from refrigerant in the outdoor heat exchanger (21) is discharged to the outside atmosphere while the room air cooled by the indoor heat exchanger (22) is returned to the room. Further, in the adsorption heat exchanger (30), the adsorbent is regenerated by heating from refrigerant and moisture desorbed from the adsorbent is applied to the room air. The moisture desorbed from the adsorption heat exchanger (30) is discharged to the outside atmosphere together with the room air.

<Humidification Heating Operation>

The system's behavior during the humidification heating operation is described with reference to FIG. 4.

During the humidification heating operation, the indoor heat exchanger (22) serves as a condenser and the outdoor heat exchanger (21) serves as an evaporator. Further, an adsorption action in which the adsorption heat exchanger (30) serves as an evaporator and a regeneration action in which the adsorption heat exchanger (30) serves as a condenser are repeatedly alternated.

Furthermore, during the humidification heating operation, outdoor air is supplied to the outdoor heat exchanger (21) while room air is supplied to the indoor heat exchanger (22) and the adsorption heat exchanger (30). Then, the air heated by the indoor heat exchanger (22) is continuously supplied to the room while the air humidified by the adsorption heat exchanger (30) is intermittently supplied to the room.

During the adsorption action, as shown in FIG. 4(A), the first four-way selector valve (51) is set to the first position, the second four-way selector valve (52) is set to the second position, and the opening of the motor-operated expansion valve

(40) is appropriately controlled. Under these conditions, refrigerant discharged from the compressor (20) condenses in the indoor heat exchanger (22), is reduced in pressure by the motor-operated expansion valve (40), evaporates while passing through the outdoor heat exchanger (21) and the adsorption heat exchanger (30) in this order, is sucked into and then compressed by the compressor (20).

During the adsorption action, the outdoor air having released heat to refrigerant in the outdoor heat exchanger (21) is discharged to the outside atmosphere while the room air heated by the indoor heat exchanger (22) is returned to the room. Further, in the adsorption heat exchanger (30), moisture in the room air is adsorbed by the adsorbent and the heat of adsorption produced during the adsorption is taken by the refrigerant. The room air dried by the adsorption heat exchanger (30) is discharged to the outside atmosphere.

During the regeneration action, as shown in FIG. 2(B), the first four-way selector valve (51) is set to the second position, the second four-way selector valve (52) is set to the first position, and the opening of the motor-operated expansion valve (40) is appropriately controlled. Under these conditions, refrigerant discharged from the compressor (20) condenses while passing through the adsorption heat exchanger (30) and the indoor heat exchanger (22) in this order, is reduced in pressure by the motor-operated expansion valve (40), evaporates in the outdoor heat exchanger (21), is sucked into and then compressed by the compressor (20).

During the regeneration action, the outdoor air having released heat to refrigerant in the outdoor heat exchanger (21) is discharged to the outside atmosphere while the room air heated by the indoor heat exchanger (22) is returned to the room. Further, in the adsorption heat exchanger (30), the adsorbent is regenerated by heating from refrigerant and moisture desorbed from the adsorbent is applied to the room air. The room air humidified by the adsorption heat exchanger (30) is returned to the room.

Effects of Embodiment 2

According to the present embodiment, the following effect can be obtained in addition to the effects obtained by the above Embodiment 1. Specifically, in the second action during the dehumidification cooling operation and the second action during the humidification heating operation in the present embodiment, the refrigerant discharged from the compressor (20) is first introduced into the adsorption heat exchanger (30). Therefore, the refrigerant at the highest temperature can be introduced into the adsorption heat exchanger (30) to utilize for the heating of the adsorbent. This makes it possible to sufficiently increase the temperature of the adsorbent and thereby ensure the regeneration of the adsorbent.

Embodiment 3 of the Invention

Embodiment 3 of the present invention is described. An air conditioning system of the present embodiment varies in the configuration of the refrigerant circuit (10) from the air conditioning system of Embodiment 1.

As shown in FIGS. 3 and 4, the refrigerant circuit (10) is provided with a single compressor (20), a single motor-operated expansion valve (40), a single four-way selector valve (50) and two solenoid valves (61, 62). Further, the refrigerant circuit (10) is provided with a single outdoor heat exchanger (21), a single indoor heat exchanger (22) and a single adsorption heat exchanger (30). In this refrigerant circuit (10), the outdoor heat exchanger (21) constitutes a heat-source side heat exchanger while the indoor heat exchanger (22) and the adsorption heat exchanger (30) constitute utilization side heat exchangers. The outdoor heat exchanger (21), the indoor heat exchanger (22) and the adsorption heat exchanger (30) are configured to be the same as those in Embodiment 1.

A description is given to the configuration of the refrigerant circuit (10). The compressor (20) is connected at its discharge side to the first port of the four-way selector valve (50) and connected at its suction side to the second port of the four-way selector valve (50). In the refrigerant circuit (10), the outdoor heat exchanger (21), the motor-operated expansion valve (40), the first solenoid valve (61) and the indoor heat exchanger (22) are arranged in this order from the third to fourth port of the four-way selector valve (50). The adsorption heat exchanger (30) is connected at one end between the indoor heat exchanger (22) and the four-way selector valve (50) and connected at the other end between the motor-operated expansion valve (40) and the first solenoid valve (61) via the second solenoid valve (62).

The four-way selector valve (50) switches between a first position (a position shown in FIG. 5) in which the first and third ports communicate and the second and fourth ports communicate and a second position (a position shown in FIG. 6) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 5.

During the dehumidification cooling operation, the four-way selector valve (50) is set to the first position, the opening of the motor-operated expansion valve (40) is appropriately controlled and the outdoor heat exchanger (21) serves as a condenser. Further, a first mode in which the adsorption heat exchanger (30) serves as an evaporator and the indoor heat exchanger (22) is in non-operating condition and a second mode in which the indoor heat exchanger (22) serves as an evaporator and the adsorption heat exchanger (30) is in non-operating condition are repeatedly alternated.

Furthermore, during the dehumidification cooling operation, outdoor air is supplied to the outdoor heat exchanger (21). Furthermore, in the dehumidification cooling operation, room air is supplied to only the adsorption heat exchanger (30) during the first mode but supplied to both the adsorption heat exchanger (30) and the indoor heat exchanger (22) during the second mode. Then, the air having passed through the adsorption heat exchanger (30) and the air having passed through the indoor heat exchanger (22) are alternately supplied to the room.

Figure 5A:
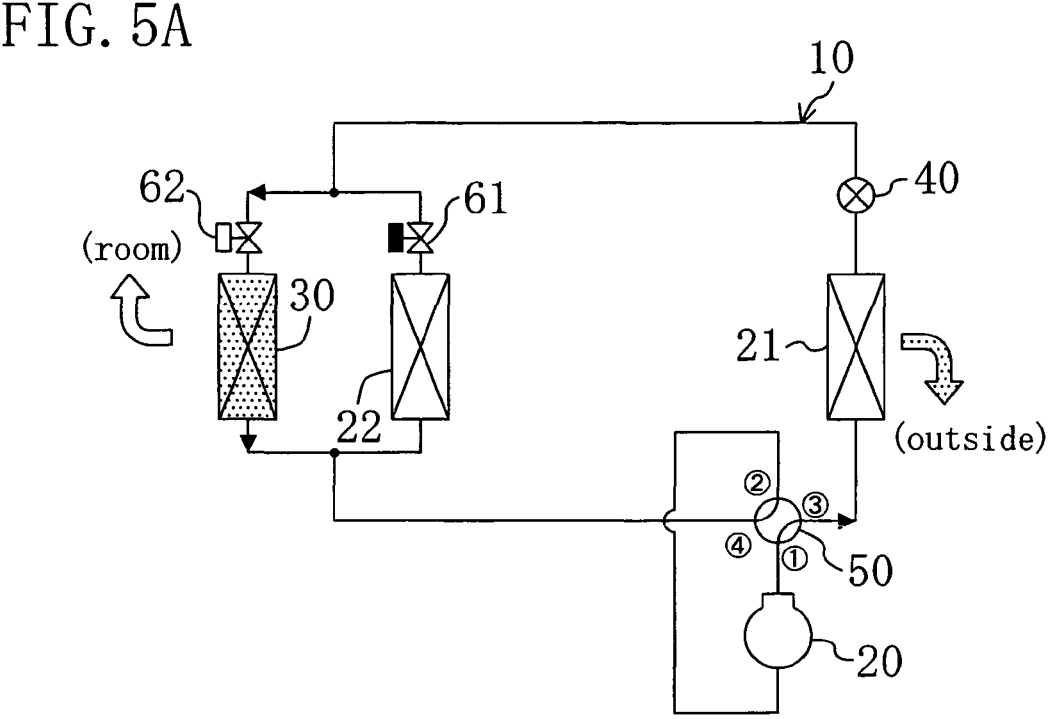
FIG. 5 is a schematic diagram showing the configuration of a refrigerant circuit in Embodiment 3 and its behavior during the dehumidification cooling operation.

In the first mode, an adsorption action for the adsorption heat exchanger (30) takes place. During the first mode, as shown in FIG. 5(A), the first solenoid valve (61) is closed and the second solenoid valve (62) is opened. Under these conditions, refrigerant discharged from the compressor (20) condenses in the outdoor heat exchanger (21), is reduced in pressure by the motor-operated expansion valve (40), evaporates in the adsorption heat exchanger (30), is sucked into and then compressed by the compressor (20). In this case, the flow of refrigerant into the indoor heat exchanger (22) is shut off by the first solenoid valve (61).

During the first mode, the outdoor air having taken heat from refrigerant in the outdoor heat exchanger (21) is discharged to the outside atmosphere. In the adsorption heat exchanger (30), moisture in the room air is adsorbed by the adsorbent to dehumidify the room air and the heat of adsorption produced during the dehumidification is taken by the refrigerant. The room air dehumidified by the adsorption heat exchanger (30) is returned to the room.

Figure 5B:
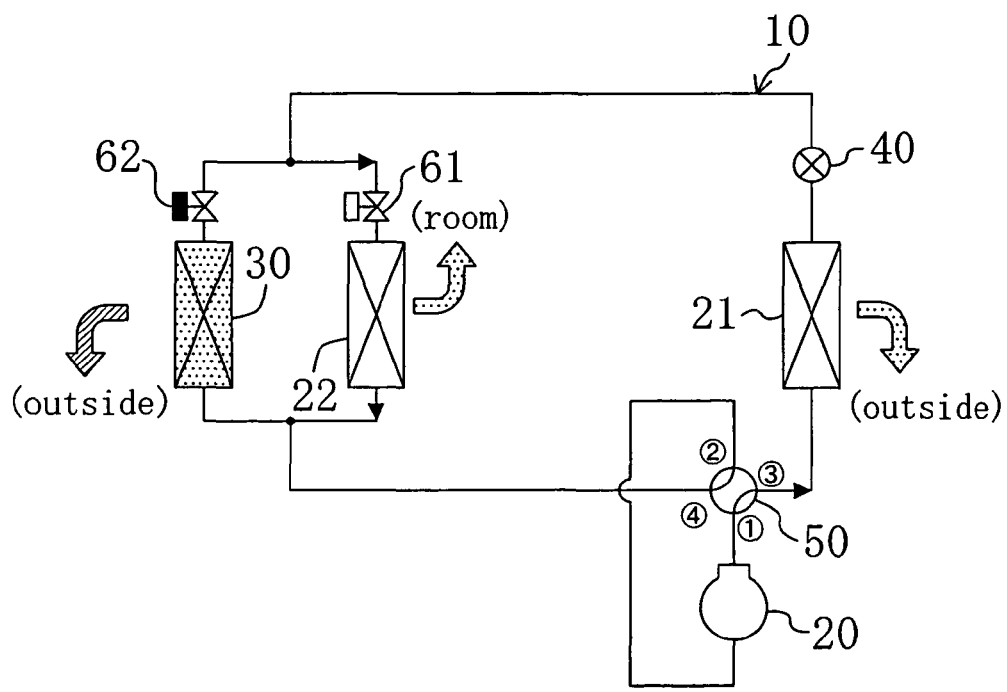

In the second mode, a regeneration action for the adsorption heat exchanger (30) takes place. During the second mode, as shown in FIG. 5(B), the first solenoid valve (61) is opened and the second solenoid valve (62) is closed. Under these conditions, refrigerant discharged from the compressor (20) condenses in the outdoor heat exchanger (21), is reduced in pressure by the motor-operated expansion valve (40), evaporates in the indoor heat exchanger (22), is sucked into and then compressed by the compressor (20). In this case, the flow of refrigerant into the adsorption heat exchanger (30) is shut off by the second solenoid valve (62).

During the second mode, the outdoor air having taken heat from refrigerant in the outdoor heat exchanger (21) is discharged to the outside atmosphere while the room air cooled by the indoor heat exchanger (22) is returned to the room. In the adsorption heat exchanger (30), the room air having relatively low absolute humidity comes into contact with the adsorbent so that moisture is desorbed from the adsorbent. The moisture desorbed from the adsorption heat exchanger (30) is discharged to the outside atmosphere together with the room air.

<Humidification Heating Operation>

The system's behavior during the humidification heating operation is described with reference to FIG. 6.

During the humidification heating operation, the four-way selector valve (50) is set to the second position and the outdoor heat exchanger (21) serves as an evaporator. Further, a first mode in which the adsorption heat exchanger (30) serves as a condenser and the indoor heat exchanger (22) is in non-operating condition and a second mode in which the indoor heat exchanger (22) serves as a condenser and the adsorption heat exchanger (30) is in non-operating condition are repeatedly alternated.

Furthermore, during the humidification heating operation, outdoor air is supplied to the outdoor heat exchanger (21). In the humidification heating operation, room air is supplied to only the adsorption heat exchanger (30) during the first mode but supplied to both the adsorption heat exchanger (30) and the indoor heat exchanger (22) during the second mode. Then, the air having passed through the adsorption heat exchanger (30) and the air having passed through the indoor heat exchanger (22) are alternately supplied to the room.

Figure 6A:
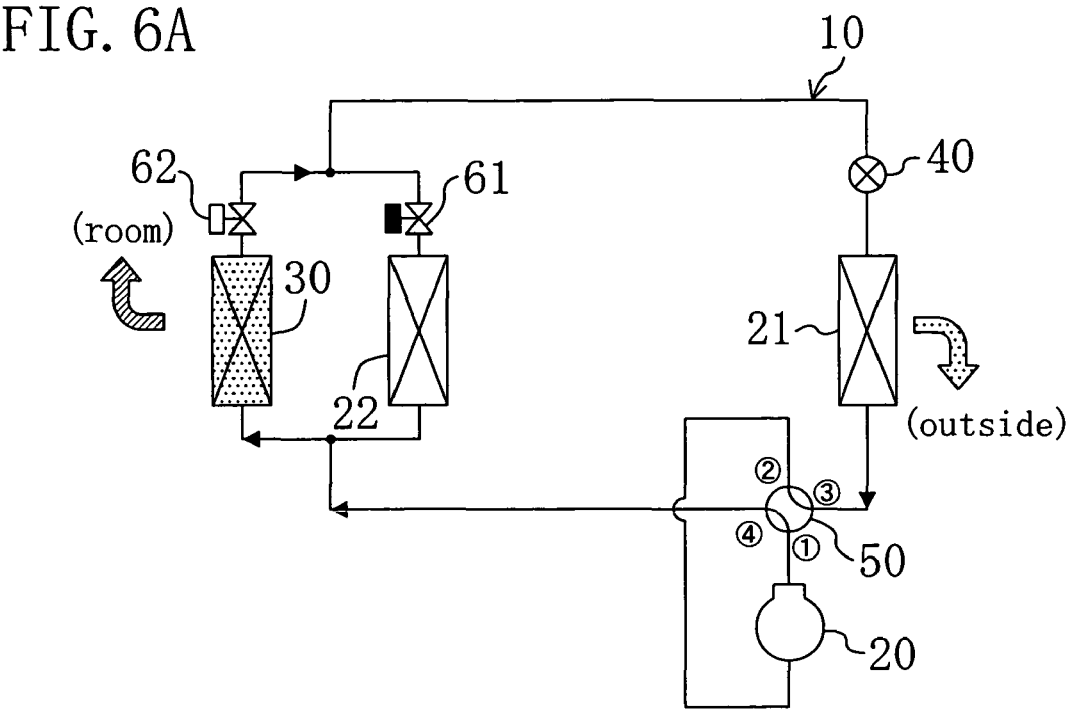
FIG. 6 is a schematic diagram showing the configuration of the refrigerant circuit in Embodiment 3 and its behavior during the humidification heating operation.

In the first mode, a regeneration action for the adsorption heat exchanger (30) takes place. During the first mode, as shown in FIG. 6(A), the first solenoid valve (61) is closed and the second solenoid valve (62) is opened. Under these conditions, refrigerant discharged from the compressor (20) condenses in the adsorption heat exchanger (30), is reduced in pressure by the motor-operated expansion valve (40), evaporates in the outdoor heat exchanger (21), is sucked into and then compressed by the compressor (20). In this case, the flow of refrigerant into the indoor heat exchanger (22) is shut off by the first solenoid valve (61).

During the first mode, the outdoor air having taken heat from refrigerant in the outdoor heat exchanger (21) is discharged to the outside atmosphere. In the adsorption heat exchanger (30), moisture is desorbed from the adsorbent heated by refrigerant and the desorbed moisture is applied to the room air. The room air humidified by the adsorption heat exchanger (30) is returned to the room.

Figure 6B:
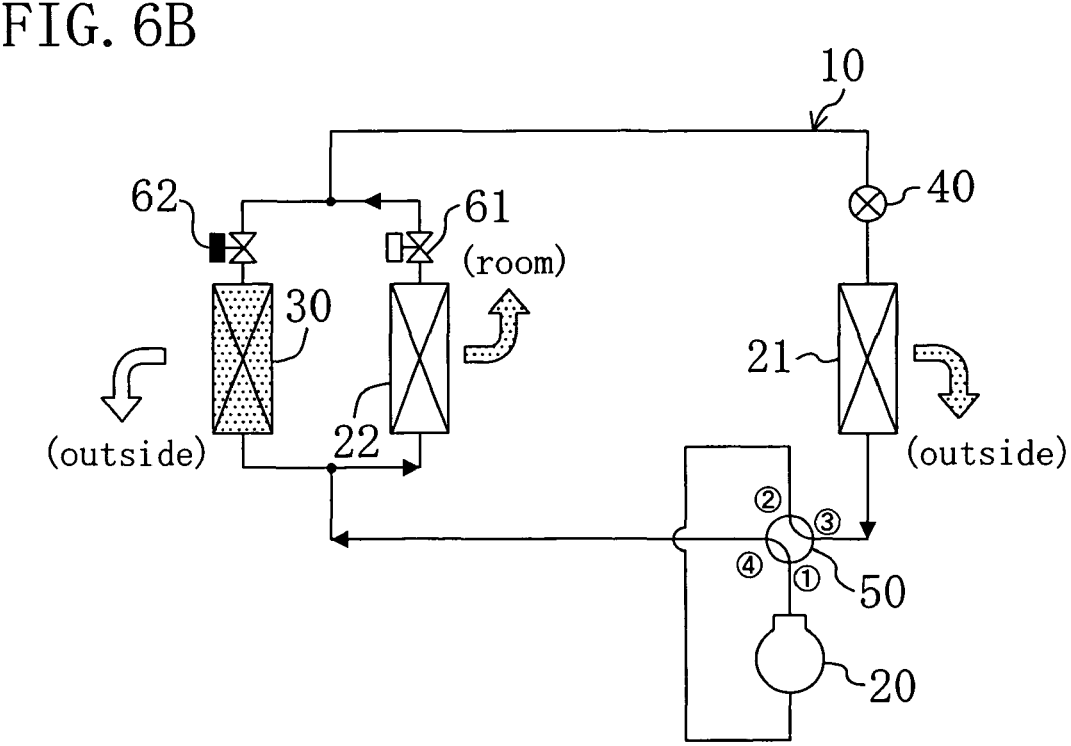

In the second mode, an adsorption action for the adsorption heat exchanger (30) takes place. During the second mode, as shown in FIG. 6(B), the first solenoid valve (61) is opened and the second solenoid valve (62) is closed. Under these conditions, refrigerant discharged from the compressor (20) condenses in the indoor heat exchanger (22), is reduced in pressure by the motor-operated expansion valve (40), evaporates in the outdoor heat exchanger (21), is sucked into and then compressed by the compressor (20). In this case, the flow of refrigerant into the adsorption heat exchanger (30) is shut off by the second solenoid valve (62).

During the second mode, the outdoor air having taken heat from refrigerant in the outdoor heat exchanger (21) is discharged to the outside atmosphere while the room air heated by the indoor heat exchanger (22) is returned to the room. In the adsorption heat exchanger (30), the room air comes into contact with the adsorbent so that moisture in the room air is adsorbed by the adsorbent. The room air dried by the first adsorption heat exchanger (31) is discharged to the outside atmosphere.

Effects of Embodiment 3

According to the present embodiment, the same effects as obtained by the above Embodiment 1 can be obtained.

Embodiment 4 of the Invention

Embodiment 4 of the present invention is described. An air conditioning system of the present embodiment varies in the configuration of the refrigerant circuit (10) from the air conditioning system of Embodiment 1.

As shown in FIGS. 7 and 8, the refrigerant circuit (10) is provided with a single compressor (20), a single motor-operated expansion valve (40) and two four-way selector valves (51, 52). Further, the refrigerant circuit (10) is provided with a single outdoor heat exchanger (21) and two adsorption heat exchangers (31, 32). In this refrigerant circuit (10), the outdoor heat exchanger (21) constitutes a heat-source side heat exchanger while the first and second adsorption heat exchangers (31, 32) constitute utilization side heat exchangers. In other words, only the two adsorption heat exchangers (31, 32) are provided as utilization side heat exchangers in the refrigerant circuit (10) in the present embodiment. The outdoor heat exchanger (21) and each of the adsorption heat exchangers (31, 32) are configured to be the same as those in Embodiment 1.

A description is given to the configuration of the refrigerant circuit (10). The compressor (20) is connected at its discharge side to the first port of the first four-way selector valve (51) and connected at its suction side to the second port of the first four-way selector valve (51). The first four-way selector valve (51) is connected at its third port to the first port of the second four-way selector valve (52) via the outdoor heat exchanger (21) and connected at its fourth port to the second port of the second four-way selector valve (52). In the refrigerant circuit (10), the first adsorption heat exchanger (31), the motor-operated expansion valve (40) and the second adsorption heat exchanger (32) are arranged in this order from the third to fourth port of the second four-way selector valve (52).

The first four-way selector valve (51) switches between a first position (a position shown in FIG. 7) in which the first and third ports communicate and the second and fourth ports communicate and a second position (a position shown in FIG. 8) in which the first and fourth ports communicate and the second and third ports communicate. On the other hand, the second four-way selector valve (52) switches between a first position (a position shown in FIGS. 7(A) and 8(B)) in which the first and third ports communicate and the second and fourth ports communicate and a second position (a position shown in FIGS. 7(B) and 8(A)) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 7.

During the dehumidification cooling operation, the first four-way selector valve (51) is set to the first position, the opening of the motor-operated expansion valve (40) is appropriately controlled and the outdoor heat exchanger (21) serves as a condenser. Further, a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated.

Furthermore, during the dehumidification cooling operation, outdoor air is supplied to the outdoor heat exchanger (21) and room air is supplied to the first and second adsorption heat exchangers (31, 32). Then, the air having passed through the first adsorption heat exchanger (31) and the air having passed through the second adsorption heat exchanger (32) are alternately supplied to the room.

Figure 7A:
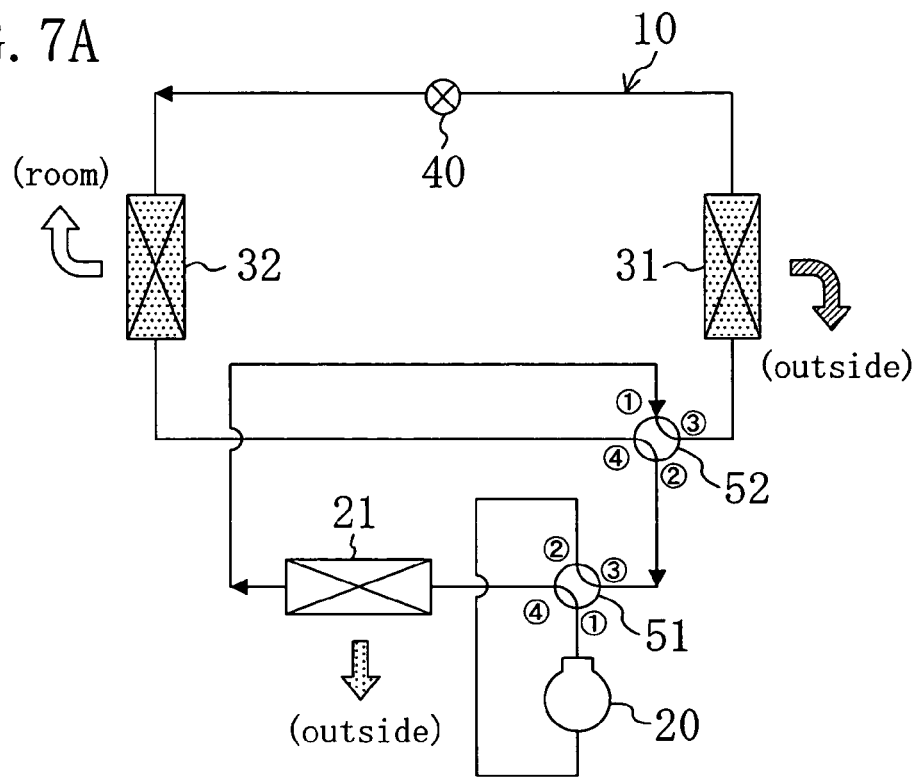
FIG. 7 is a schematic diagram showing the configuration of a refrigerant circuit in Embodiment 4 and its behavior during the dehumidification cooling operation.

In the first mode, a regeneration action for the first adsorption heat exchanger (31) and an adsorption action for the second adsorption heat exchanger (32) concurrently take place. During the first mode, as shown in FIG. 7(A), the second four-way selector valve (52) is set to the first position. Under these conditions, refrigerant discharged from the compressor (20) condenses while passing through the outdoor heat exchanger (21) and the first adsorption heat exchanger (31) in this order, is reduced in pressure by the motor-operated expansion valve (40), evaporates in the second adsorption heat exchanger (32), is sucked into and then compressed by the compressor (20).

During the first mode, the outdoor air having taken heat from refrigerant in the outdoor heat exchanger (21) is discharged to the outside atmosphere. In the first adsorption heat exchanger (31), moisture is desorbed from the adsorbent heated by refrigerant and the desorbed moisture is applied to the air. The moisture desorbed from the first adsorption heat exchanger (31) is discharged to the outside atmosphere together with the room air. In the second adsorption heat exchanger (32), moisture in the room air is adsorbed by the adsorbent to dehumidify the room air and the heat of adsorption produced during the dehumidification is taken by the refrigerant. The room air dehumidified by the second adsorption heat exchanger (32) is returned to the room.

Furthermore, the first mode is continued over a predetermined period of time also after the adsorbent of the first adsorption heat exchanger (31) is saturated. Since, in this case, no heat of adsorption is produced in the first adsorption heat exchanger (31), the room air is cooled by the first adsorption heat exchanger (31) and the cooled room air is returned to the room.

Figure 7B:
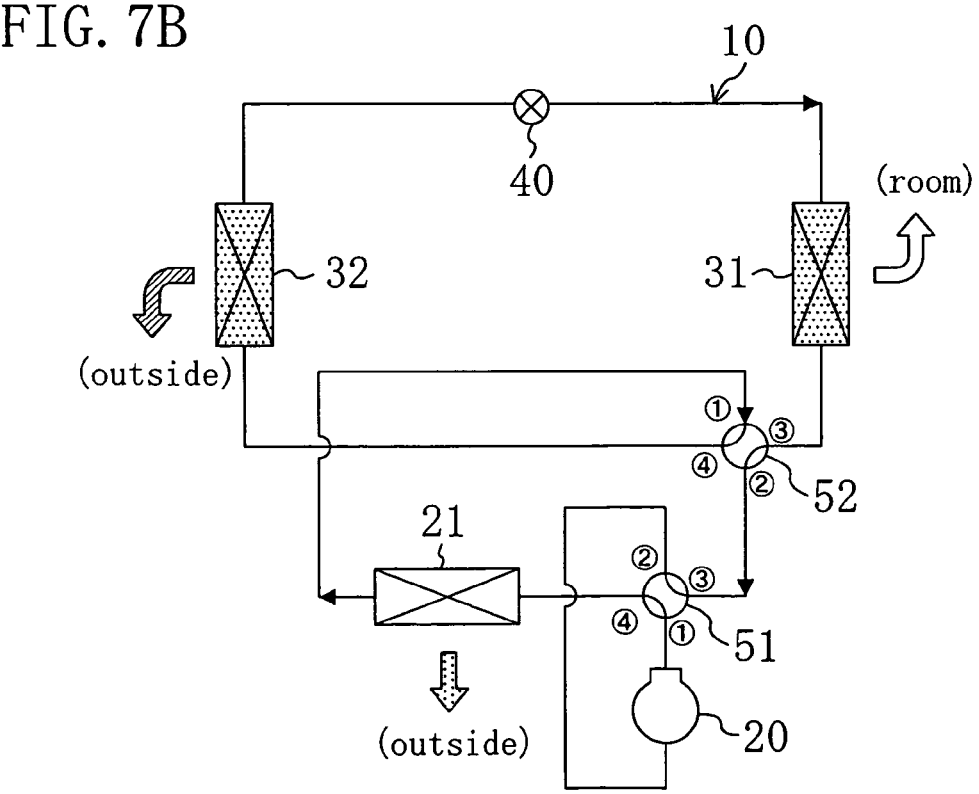

In the second mode, an adsorption action for the first adsorption heat exchanger (31) and a regeneration action for the second adsorption heat exchanger (32) concurrently take place. During the second mode, as shown in FIG. 7(B), the second four-way selector valve (52) is set to the second position. Under these conditions, refrigerant discharged from the compressor (20) condenses while passing through the outdoor heat exchanger (21) and the second adsorption heat exchanger (32) in this order, is reduced in pressure by the motor-operated expansion valve (40), evaporates in the first adsorption heat exchanger (31), is sucked into and then compressed by the compressor (20).

During the second mode, the outdoor air having taken heat from refrigerant in the outdoor heat exchanger (21) is discharged to the outside atmosphere. In the first adsorption heat exchanger (31), moisture in the room air is adsorbed by the adsorbent to dehumidify the room air and the heat of adsorption produced during the dehumidification is taken by the refrigerant. The room air dehumidified by the first adsorption heat exchanger (31) is returned to the room. In the second adsorption heat exchanger (32), moisture is desorbed from the adsorbent heated by refrigerant and the desorbed moisture is applied to the air. The moisture desorbed from the second adsorption heat exchanger (32) is discharged to the outside atmosphere together with the room air.

Furthermore, the second mode is continued over a predetermined period of time also after the adsorbent of the second adsorption heat exchanger (32) is saturated. Since, in this case, no heat of adsorption is produced in the second adsorption heat exchanger (32), the room air is cooled by the second adsorption heat exchanger (32) and the cooled room air is returned to the room.

<Humidification Heating Operation>

The system's behavior during the humidification heating operation is described with reference to FIG. 8.

During the humidification heating operation, the first four-way selector valve (51) is set to the second position, the opening of the motor-operated expansion valve (40) is appropriately controlled and the outdoor heat exchanger (21) serves as an evaporator. Further, a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated.

Furthermore, during the humidification heating operation, outdoor air is supplied to the outdoor heat exchanger (21) and room air is supplied to the first and second adsorption heat exchangers (31, 32). Then, the air cooled by the indoor heat exchanger (22) is continuously supplied to the room, while the air dehumidified by the first adsorption heat exchanger (31) and the air dehumidified by the second adsorption heat exchanger (32) are alternately supplied to the room.

Figure 8A:
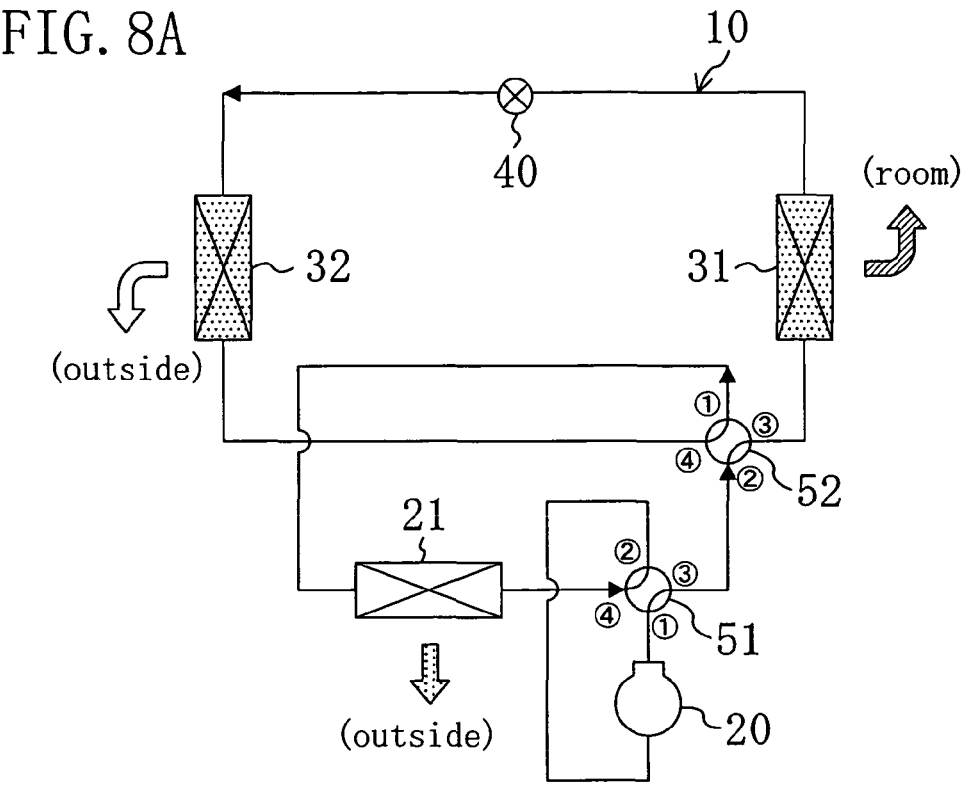
FIG. 8 is a schematic diagram showing the configuration of the refrigerant circuit in Embodiment 4 and its behavior during the humidification heating operation.

In the first mode, a regeneration action for the first adsorption heat exchanger (31) and an adsorption action for the second adsorption heat exchanger (32) concurrently take place. During the first mode, as shown in FIG. 8(A), the second four-way selector valve (52) is set to the second position. Under these conditions, refrigerant discharged from the compressor (20) condenses in the first adsorption heat exchanger (31), is reduced in pressure by the motor-operated expansion valve (40), evaporates while passing through the second adsorption heat exchanger (32) and the outdoor heat exchanger (21) in this order, is sucked into and then compressed by the compressor (20).

During the first mode, the outdoor air having released heat to refrigerant in the outdoor heat exchanger (21) is discharged to the outside atmosphere. In the first adsorption heat exchanger (31), moisture is desorbed from the adsorbent heated by refrigerant and the desorbed moisture is applied to the air. The room air humidified by the first adsorption heat exchanger (31) is returned to the room. In the second adsorption heat exchanger (32), moisture in the room air is adsorbed by the adsorbent to dehumidify the room air and the heat of adsorption produced during the dehumidification is taken by the refrigerant. The room air dried by the second adsorption heat exchanger (32) is discharged to the outside atmosphere.

Furthermore, the first mode is continued over a predetermined period of time also after the regeneration of the first adsorption heat exchanger (31) is completed. Since, in this case, no moisture is desorbed from the first adsorption heat exchanger (31), the room air is heated by the first adsorption heat exchanger (31) and the heated room air is returned to the room.

Figure 8B:
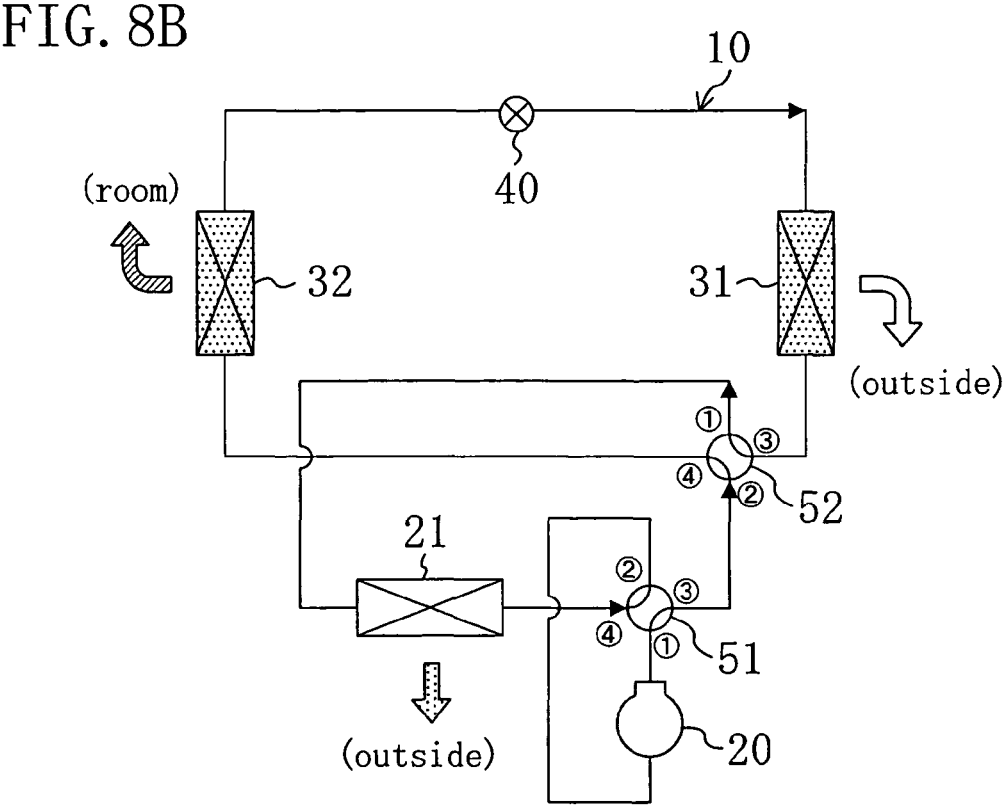

In the second mode, an adsorption action for the first adsorption heat exchanger (31) and a regeneration action for the second adsorption heat exchanger (32) concurrently take place. During the second mode, as shown in FIG. 8(B), the second four-way selector valve (52) is set to the first position. Under these conditions, refrigerant discharged from the compressor (20) condenses in the second adsorption heat exchanger (32), is reduced in pressure by the motor-operated expansion valve (40), evaporates while passing through the first adsorption heat exchanger (31) and the outdoor heat exchanger (21) in this order, is sucked into and then compressed by the compressor (20).

During the second mode, the outdoor air having released heat to refrigerant in the outdoor heat exchanger (21) is discharged to the outside atmosphere. In the first adsorption heat exchanger (31), moisture in the room air is adsorbed by the adsorbent to dehumidify the room air and the heat of adsorption produced during the dehumidification is taken by the refrigerant. The room air dried by the first adsorption heat exchanger (31) is discharged to the outside atmosphere. In the second adsorption heat exchanger (32), moisture is desorbed from the adsorbent heated by refrigerant and the desorbed moisture is applied to the air. The room air humidified by the second adsorption heat exchanger (32) is returned to the room.

Furthermore, the second mode is continued over a predetermined period of time also after the regeneration of the second adsorption heat exchanger (32) is completed. Since, in this case, no moisture is desorbed from the second adsorption heat exchanger (32), the room air is heated by the second adsorption heat exchanger (32) and the heated room air is returned to the room.

Effects of Embodiment 4

According to the present embodiment, the following effect can be obtained in addition to the effects obtained by the above Embodiment 1. Specifically, in the present embodiment, an adsorption action for one of the two adsorption heat exchangers (31, 32) and a regeneration action for the other concurrently take place. Therefore, according to the present embodiment, the air having passed through the adsorption heat exchanger (31, 32) intended for an adsorption action or the adsorption heat exchanger (31, 32) intended for a regeneration action is supplied to the room, which provides a continuous supply of humidity and temperature-controlled air to the room.

Embodiment 5 of the Invention

Embodiment 5 of the present invention is described. An air conditioning system of the present embodiment varies in the configuration of the refrigerant circuit (10) from the air conditioning system of Embodiment 1.

As shown in FIGS. 9 and 10, the refrigerant circuit (10) is provided with a single compressor (20), two motor-operated expansion valves (41, 42) and a single four-way selector valve (50). Further, the refrigerant circuit (10) is provided with a single outdoor heat exchanger (21) and two adsorption heat exchangers (31, 32). In this refrigerant circuit (10), the outdoor heat exchanger (21) constitutes a heat-source side heat exchanger while the first and second adsorption heat exchangers (31, 32) constitute utilization side heat exchangers. In other words, only the two adsorption heat exchangers (31, 32) are provided as utilization side heat exchangers in the refrigerant circuit (10) in the present embodiment. The outdoor heat exchanger (21) and each of the adsorption heat exchangers (31, 32) are configured to be the same as those in Embodiment 1.

A description is given to the configuration of the refrigerant circuit (10). The compressor (20) is connected at its discharge side to the first port of the four-way selector valve (50) and connected at its suction side to the second port of the four-way selector valve (50). In the refrigerant circuit (10), the first adsorption heat exchanger (31), the first motor-operated expansion valve (41), the outdoor heat exchanger (21), the second motor-operated expansion valve (42) and the second adsorption heat exchanger (32) are arranged in this order from the third to fourth port of the four-way selector valve (50).

Figure 9A:
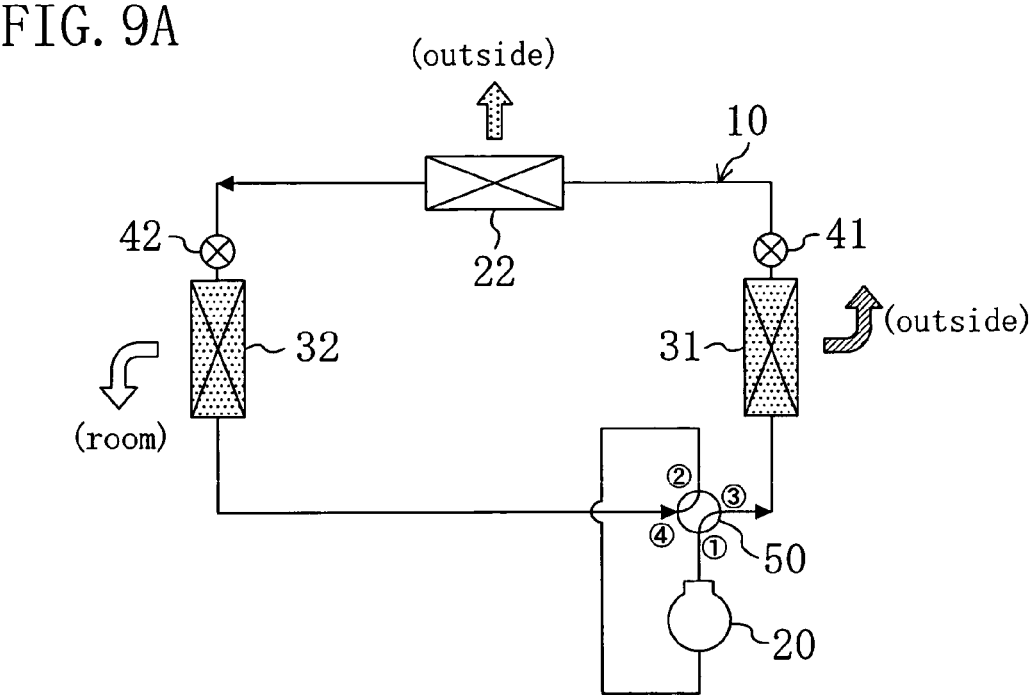
FIG. 9 is a schematic diagram showing the configuration of a refrigerant circuit in Embodiment 5 and its behavior during the dehumidification cooling operation.
Figure 9B:
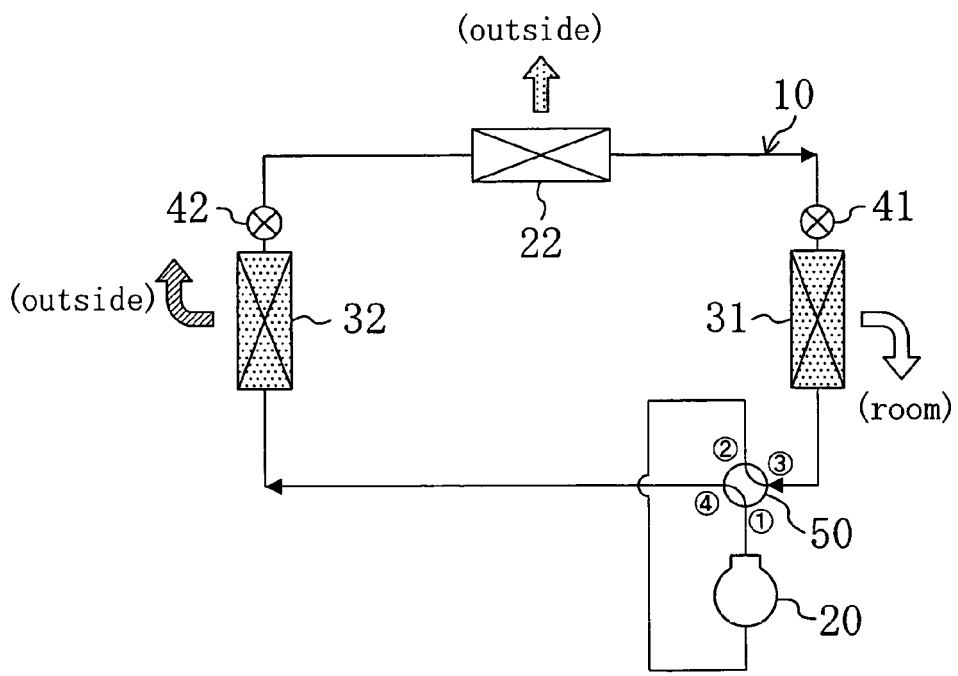
Figure 10A:
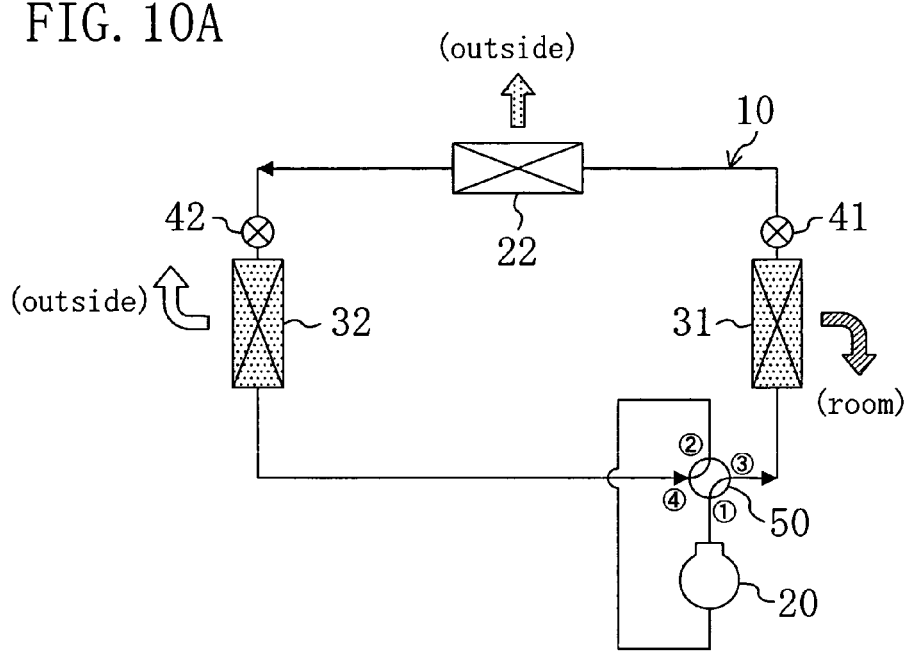
FIG. 10 is a schematic diagram showing the configuration of the refrigerant circuit in Embodiment 5 and its behavior during the humidification heating operation.
Figure 10B:
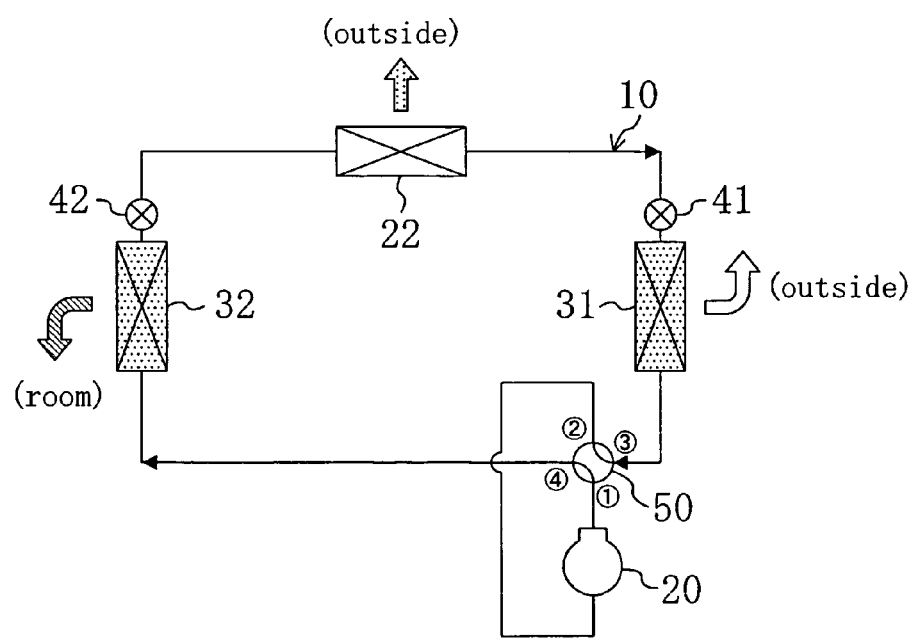

The four-way selector valve (50) switches between a first position (a position shown in FIGS. 9(A) and 10(A)) in which the first and third ports communicate and the second and fourth ports communicate and a second position (a position shown in FIGS. 9(B) and 10(B)) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 9.

During the dehumidification cooling operation, the four-way selector valve (50) is set to the first position and the outdoor heat exchanger (21) serves as a condenser. Further, a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated.

Furthermore, during the dehumidification cooling operation, outdoor air is supplied to the outdoor heat exchanger (21) and room air is supplied to the first and second adsorption heat exchangers (31, 32). Then, the air having passed through the first adsorption heat exchanger (31) and the air having passed through the second adsorption heat exchanger (32) are alternately supplied to the room.

In the first mode, a regeneration action for the first adsorption heat exchanger (31) and an adsorption action for the second adsorption heat exchanger (32) concurrently take place. During the first mode, as shown in FIG. 9(A), the four-way selector valve (50) is set to the first position, the first motor-operated expansion valve (41) is set to a full open position and the opening of the second motor-operated expansion valve (42) is appropriately controlled. Under these conditions, refrigerant discharged from the compressor (20) condenses while passing through the first adsorption heat exchanger (31) and the outdoor heat exchanger (21) in this order, is reduced in pressure by the second motor-operated expansion valve (42), evaporates in the second adsorption heat exchanger (32), is sucked into and then compressed by the compressor (20).

During the first mode, the outdoor air having taken heat from refrigerant in the outdoor heat exchanger (21) is discharged to the outside atmosphere. In the first adsorption heat exchanger (31), moisture is desorbed from the adsorbent heated by refrigerant and the desorbed moisture is applied to the air. The moisture desorbed from the first adsorption heat exchanger (31) is discharged to the outside atmosphere together with the air. In the second adsorption heat exchanger (32), moisture in the room air is adsorbed by the adsorbent to dehumidify the room air and the heat of adsorption produced during the dehumidification is taken by the refrigerant. The room air dehumidified by the second adsorption heat exchanger (32) is returned to the room.

Furthermore, the first mode is continued over a predetermined period of time also after the adsorbent of the first adsorption heat exchanger (31) is saturated. Since, in this case, no heat of adsorption is produced in the first adsorption heat exchanger (31), the room air is cooled by the first adsorption heat exchanger (31) and the cooled room air is returned to the room.

In the second mode, an adsorption action for the first adsorption heat exchanger (31) and a regeneration action for the second adsorption heat exchanger (32) concurrently take place. During the second mode, as shown in FIG. 9(B), the four-way selector valve (50) is set to the second position, the opening of the first motor-operated expansion valve (41) is appropriately controlled and the second motor-operated expansion valve (42) is set to a full open position. Under these conditions, refrigerant discharged from the compressor (20) condenses while passing through the second adsorption heat exchanger (32) and the outdoor heat exchanger (21) in this order, is reduced in pressure by the first motor-operated expansion valve (41), evaporates in the first adsorption heat exchanger (31), is sucked into and then compressed by the compressor (20).

During the second mode, the outdoor air having taken heat from refrigerant in the outdoor heat exchanger (21) is discharged to the outside atmosphere. In the first adsorption heat exchanger (31), moisture in the room air is adsorbed by the adsorbent to dehumidify the room air and the heat of adsorption produced during the dehumidification is taken by the refrigerant. The room air dehumidified by the first adsorption heat exchanger (31) is returned to the room. In the second adsorption heat exchanger (32), moisture is desorbed from the adsorbent heated by refrigerant and the desorbed moisture is applied to the air. The moisture desorbed from the second adsorption heat exchanger (32) is discharged to the outside atmosphere together with the air.

Furthermore, the second mode is continued over a predetermined period of time also after the adsorbent of the second adsorption heat exchanger (32) is saturated. Since, in this case, no heat of adsorption is produced in the second adsorption heat exchanger (32), the room air is cooled by the second adsorption heat exchanger (32) and the cooled room air is returned to the room.

<Humidification Heating Operation>

The system's behavior during the humidification heating operation is described with reference to FIG. 10.

During the humidification heating operation, the four-way selector valve (50) is set to the first position and the outdoor heat exchanger (21) serves as an evaporator. Further, a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated.

Furthermore, during the humidification heating operation, outdoor air is supplied to the outdoor heat exchanger (21) and room air is supplied to the first and second adsorption heat exchangers (31, 32). Then, the air having passed through the first adsorption heat exchanger (31) and the air having passed through the second adsorption heat exchanger (32) are alternately supplied to the room.

In the first mode, a regeneration action for the first adsorption heat exchanger (31) and an adsorption action for the second adsorption heat exchanger (32) concurrently take place. During the first mode, as shown in FIG. 10(A), the four-way selector valve (50) is set to the first position, the opening of the first motor-operated expansion valve (41) is appropriately controlled and the second motor-operated expansion valve (42) is set to the full open position. Under these conditions, refrigerant discharged from the compressor (20) condenses in the first adsorption heat exchanger (31), is reduced in pressure by the first motor-operated expansion valve (41), evaporates while passing through the outdoor heat exchanger (21) and the second adsorption heat exchanger (32) in this order, is sucked into and then compressed by the compressor (20).

During the first mode, the outdoor air having released heat to refrigerant in the outdoor heat exchanger (21) is discharged to the outside atmosphere. In the first adsorption heat exchanger (31), moisture is desorbed from the adsorbent heated by refrigerant and the desorbed moisture is applied to the air. The room air humidified by the first adsorption heat exchanger (31) is returned to the room. In the second adsorption heat exchanger (32), moisture in the room air is adsorbed by the adsorbent to dehumidify the room air and the heat of adsorption produced during the dehumidification is taken by the refrigerant. The room air dried by the second adsorption heat exchanger (32) is discharged to the outside atmosphere.

Furthermore, the first mode is continued over a predetermined period of time also after the regeneration of the first adsorption heat exchanger (31) is completed. Since, in this case, no moisture is desorbed from the first adsorption heat exchanger (31), the room air is heated by the first adsorption heat exchanger (31) and the heated room air is returned to the room.

In the second mode, an adsorption action for the first adsorption heat exchanger (31) and a regeneration action for the second adsorption heat exchanger (32) concurrently take place. During the second mode, as shown in FIG. 10(B), the four-way selector valve (50) is set to the second position, the first motor-operated expansion valve (41) is set to the full open position and the opening of the second motor-operated expansion valve (42) is appropriately controlled. Under these conditions, refrigerant discharged from the compressor (20) condenses in the second adsorption heat exchanger (32), is reduced in pressure by the second motor-operated expansion valve (42), evaporates while passing through the outdoor heat exchanger (21) and the first adsorption heat exchanger (31) in this order, is sucked into and then compressed by the compressor (20).

During the second mode, the outdoor air having released heat to refrigerant in the outdoor heat exchanger (21) is discharged to the outside atmosphere. In the first adsorption heat exchanger (31), moisture in the room air is adsorbed by the adsorbent to dehumidify the room air and the heat of adsorption produced during the dehumidification is taken by the refrigerant. The room air dried by the first adsorption heat exchanger (31) is discharged to the outside atmosphere. In the second adsorption heat exchanger (32), moisture is desorbed from the adsorbent heated by refrigerant and the desorbed moisture is applied to the air. The room air humidified by the second adsorption heat exchanger (32) is returned to the room.

Furthermore, the second mode is continued over a predetermined period of time also after the regeneration of the second adsorption heat exchanger (32) is completed. Since, in this case, no moisture is desorbed from the second adsorption heat exchanger (32), the room air is heated by the second adsorption heat exchanger (32) and the heated room air is returned to the room.

Effects of Embodiment 5

According to the present embodiment, the same effects as obtained in the above Embodiment 4 can be obtained.

Embodiment 6 of the Invention

Embodiment 6 of the present invention is described. An air conditioning system of the present embodiment varies in the configuration of the refrigerant circuit (10) from the air conditioning system of Embodiment 1.

As shown in FIGS. 11 and 12, the refrigerant circuit (10) is provided with a single compressor (20), a single motor-operated expansion valve (40), a single four-way selector valve (50) and two solenoid valves (61, 62). Further, the refrigerant circuit (10) is provided with a single outdoor heat exchanger (21) and two adsorption heat exchangers (31, 32). In this refrigerant circuit (10), the outdoor heat exchanger (21) constitutes a heat-source side heat exchanger while the first and second adsorption heat exchangers (31, 32) constitute utilization side heat exchangers. In other words, only the two adsorption heat exchangers (31, 32) are provided as utilization side heat exchangers in the refrigerant circuit (10) in the present embodiment. The outdoor heat exchanger (21) and each of the adsorption heat exchangers (31, 32) are configured to be the same as those in Embodiment 1.

A description is given to the configuration of the refrigerant circuit (10). The compressor (20) is connected at its discharge side to the first port of the four-way selector valve (50) and connected at its suction side to the second port of the four-way selector valve (50). The third port of the four-way selector valve (50) is connected to one end of the outdoor heat exchanger (21). The other end of the outdoor heat exchanger (21) is connected via the motor-operated expansion valve (40) to one end of the first solenoid valve (61) and one end of the second solenoid valve (62). The other end of the first solenoid valve (61) and the other end of the second solenoid valve (62) are connected to one end of the first adsorption heat exchanger (31) and one end of the second adsorption heat exchanger (32), respectively. The other end of the first adsorption heat exchanger (31) and the other end of the second adsorption heat exchanger (32) are both connected to the fourth port of the four-way selector valve (50).

The four-way selector valve (50) switches between a first position (a position shown in FIG. 11) in which the first and third ports communicate and the second and fourth ports communicate and a second position (a position shown in FIG. 12) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 11.

During the dehumidification cooling operation, the four-way selector valve (50) is set to the first position, the opening of the motor-operated expansion valve (40) is appropriately controlled and the outdoor heat exchanger (21) serves as a condenser. Further, a first mode in which the first adsorption heat exchanger (31) serves as an evaporator and the second adsorption heat exchanger (32) is in non-operating condition and a second mode in which the second adsorption heat exchanger (32) serves as an evaporator and the first adsorption heat exchanger (31) is in non-operating condition are repeatedly alternated.

Furthermore, during the dehumidification cooling operation, outdoor air is supplied to the outdoor heat exchanger (21) and room air is supplied to the first and second adsorption heat exchangers (31, 32). Then, the air having passed through the first adsorption heat exchanger (31) and the air having passed through the second adsorption heat exchanger (32) are alternately supplied to the room.

Figure 11A:
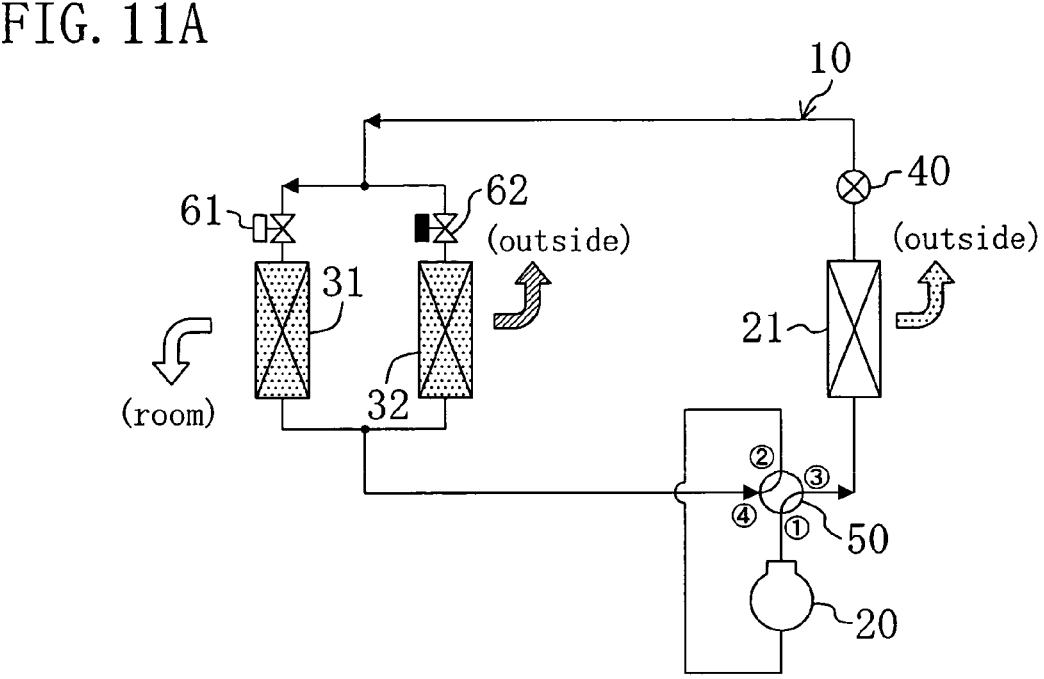
FIG. 11 is a schematic diagram showing the configuration of a refrigerant circuit in Embodiment 6 and its behavior during the dehumidification cooling operation.

In the first mode, an adsorption action for the first adsorption heat exchanger (31) and a regeneration action for the second adsorption heat exchanger (32) concurrently take place. During the first mode, as shown in FIG. 11(A), the first solenoid valve (61) is opened and the second solenoid valve (62) is closed. Under these conditions, refrigerant discharged from the compressor (20) condenses in the outdoor heat exchanger (21), is reduced in pressure by the motor-operated expansion valve (40), evaporates in the first adsorption heat exchanger (31), is sucked into and then compressed by the compressor (20). In this case, the flow of refrigerant into the second adsorption heat exchanger (32) is shut off by the second solenoid valve (62).

During the first mode, the outdoor air having taken heat from refrigerant in the outdoor heat exchanger (21) is discharged to the outside atmosphere. In the first adsorption heat exchanger (31), moisture in the room air is adsorbed by the adsorbent to dehumidify the room air and the heat of adsorption produced during the dehumidification is taken by the refrigerant. The room air dehumidified by the first adsorption heat exchanger (31) is returned to the room. In the second adsorption heat exchanger (32), the room air having relatively low absolute humidity comes into contact with the adsorbent so that moisture is desorbed from the adsorbent. The moisture desorbed from the second adsorption heat exchanger (32) is discharged to the outside atmosphere together with the air.

Furthermore, the first mode is continued over a predetermined period of time also after the adsorbent of the first adsorption heat exchanger (31) is saturated. Since, in this case, no heat of adsorption is produced in the first adsorption heat exchanger (31), the room air is cooled by the first adsorption heat exchanger (31) and the cooled room air is returned to the room.

Figure 11B:
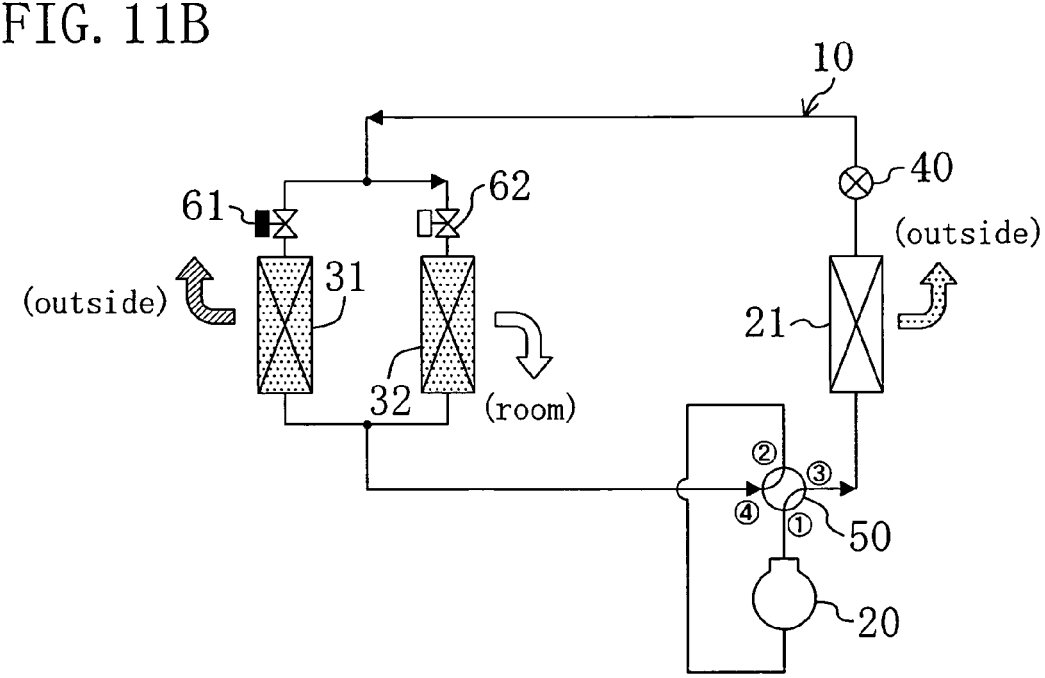

In the second mode, an adsorption action for the first adsorption heat exchanger (31) and a regeneration action for the second adsorption heat exchanger (32) concurrently take place. During the second mode, as shown in FIG. 11(B), the first solenoid valve (61) is closed and the second solenoid valve (62) is opened. Under these conditions, refrigerant discharged from the compressor (20) condenses in the outdoor heat exchanger (21), is reduced in pressure by the motor-operated expansion valve (40), evaporates in the second adsorption heat exchanger (32), is sucked into and then compressed by the compressor (20). In this case, the flow of refrigerant into the first adsorption heat exchanger (31) is shut off by the first solenoid valve (61).

During the second mode, the outdoor air having taken heat from refrigerant in the outdoor heat exchanger (21) is discharged to the outside atmosphere. In the first adsorption heat exchanger (31), the room air having relatively low absolute humidity comes into contact with the adsorbent so that moisture is desorbed from the adsorbent. The moisture desorbed from the first adsorption heat exchanger (31) is discharged to the outside atmosphere together with the air. In the second adsorption heat exchanger (32), moisture in the room air is adsorbed by the adsorbent to dehumidify the room air and the heat of adsorption produced during the dehumidification is taken by the refrigerant. The room air dehumidified by the second adsorption heat exchanger (32) is returned to the room.

Furthermore, the second mode is continued over a predetermined period of time also after the adsorbent of the second adsorption heat exchanger (32) is saturated. Since, in this case, no heat of adsorption is produced in the second adsorption heat exchanger (32), the room air is cooled by the second adsorption heat exchanger (32) and the cooled room air is returned to the room.

<Humidification Heating Operation>

The system's behavior during the humidification heating operation is described with reference to FIG. 12.

During the humidification heating operation, the four-way selector valve (50) is set to the second position, the opening of the motor-operated expansion valve (40) is appropriately controlled and the outdoor heat exchanger (21) serves as an evaporator. Further, a first mode in which the first adsorption heat exchanger (31) serves as a condenser and the second adsorption heat exchanger (32) is in non-operating condition and a second mode in which the second adsorption heat exchanger (32) serves as a condenser and the first adsorption heat exchanger (31) is in non-operating condition are repeatedly alternated.

Furthermore, during the humidification heating operation, outdoor air is supplied to the outdoor heat exchanger (21) and room air is supplied to the first and second adsorption heat exchangers (31, 32). Then, the air having passed through the first adsorption heat exchanger (31) and the air having passed through the second adsorption heat exchanger (32) are alternately supplied to the room.

Figure 12A:
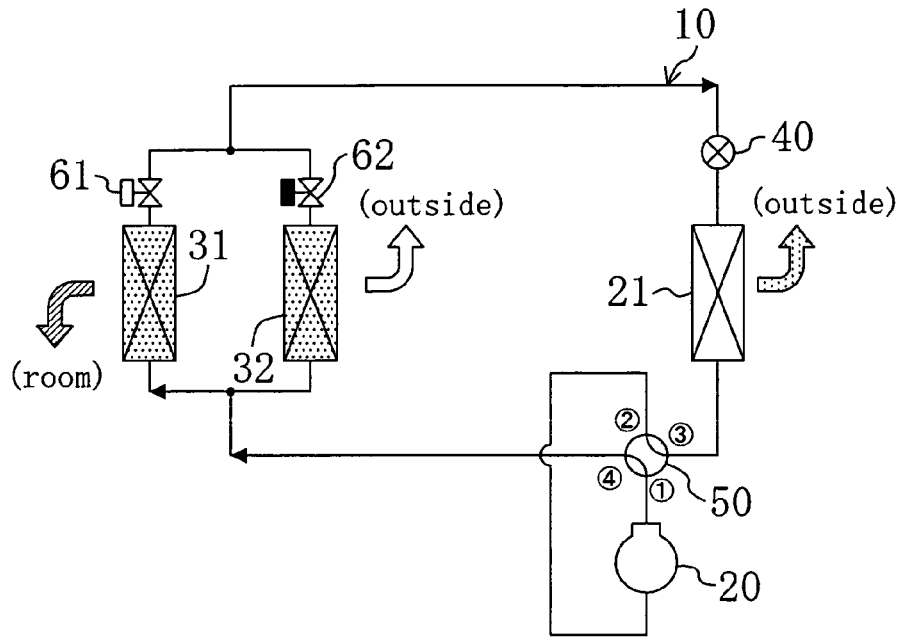
FIG. 12 is a schematic diagram showing the configuration of the refrigerant circuit in Embodiment 6 and its behavior during the humidification heating operation.

In the first mode, a regeneration action for the first adsorption heat exchanger (31) and an adsorption action for the second adsorption heat exchanger (32) concurrently take place. During the first mode, as shown in FIG. 12(A), the first solenoid valve (61) is opened and the second solenoid valve (62) is closed. Under these conditions, refrigerant discharged from the compressor (20) condenses in the first adsorption heat exchanger (31), is reduced in pressure by the motor-operated expansion valve (40), evaporates in the outdoor heat exchanger (21), is sucked into and then compressed by the compressor (20). In this case, the flow of refrigerant into the second adsorption heat exchanger (32) is shut off by the second solenoid valve (62).

During the first mode, the outdoor air having taken heat from refrigerant in the outdoor heat exchanger (21) is discharged to the outside atmosphere. In the first adsorption heat exchanger (31), moisture is desorbed from the adsorbent heated by refrigerant and the desorbed moisture is applied to the air. The room air humidified by the first adsorption heat exchanger (31) is returned to the room. In the second adsorption heat exchanger (32), the room air comes into contact with the adsorbent so that moisture in the room air is adsorbed by the adsorbent. The room air dried by the second adsorption heat exchanger (32) is discharged to the outside atmosphere.

Furthermore, the first mode is continued over a predetermined period of time also after the regeneration of the first adsorption heat exchanger (31) is completed. Since, in this case, no moisture is desorbed from the first adsorption heat exchanger (31), the room air is heated by the first adsorption heat exchanger (31) and the heated room air is returned to the room.

Figure 12B:
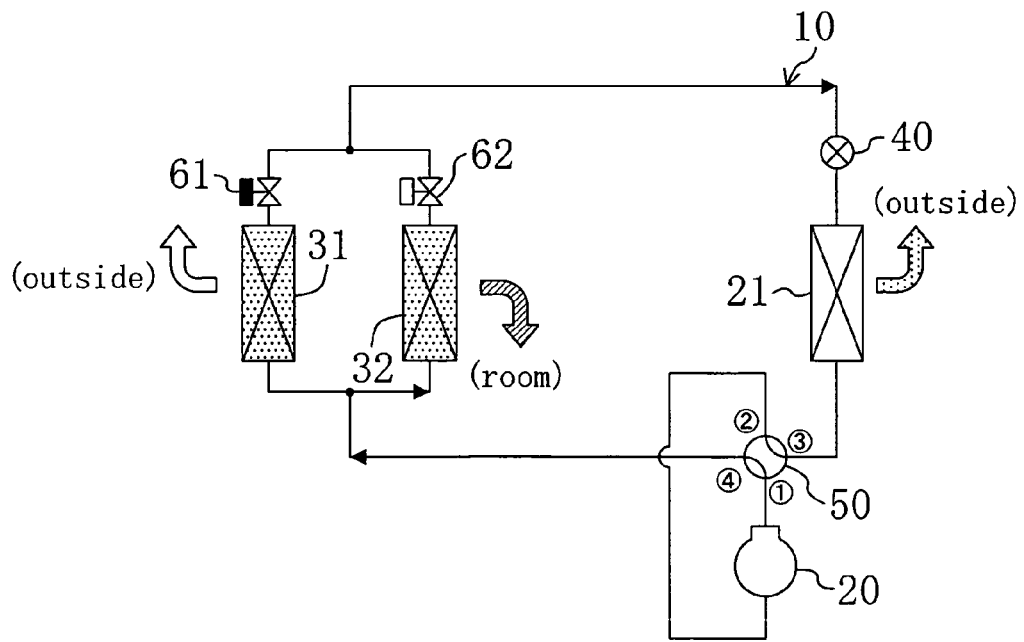

In the second mode, an adsorption action for the first adsorption heat exchanger (31) and a regeneration action for the second adsorption heat exchanger (32) concurrently take place. During the second mode, as shown in FIG. 12(B), the first solenoid valve (61) is closed and the second solenoid valve (62) is opened. Under these conditions, refrigerant discharged from the compressor (20) condenses in the second adsorption heat exchanger (32), is reduced in pressure by the motor-operated expansion valve (40), evaporates in the outdoor heat exchanger (21), is sucked into and then compressed by the compressor (20). In this case, the flow of refrigerant into the first adsorption heat exchanger (31) is shut off by the first solenoid valve (61).

During the second mode, the outdoor air having taken heat from refrigerant in the outdoor heat exchanger (21) is discharged to the outside atmosphere. In the first adsorption heat exchanger (31), the room air comes into contact with the adsorbent so that moisture in the room air is adsorbed by the adsorbent. The room air dried by the first adsorption heat exchanger (31) is discharged to the outside atmosphere. In the second adsorption heat exchanger (32), moisture is desorbed from the adsorbent heated by refrigerant and the desorbed moisture is applied to the air. The room air humidified by the second adsorption heat exchanger (32) is returned to the room.

Furthermore, the second mode is continued over a predetermined period of time also after the regeneration of the second adsorption heat exchanger (32) is completed. Since, in this case, no moisture is desorbed from the second adsorption heat exchanger (32), the room air is heated by the second adsorption heat exchanger (32) and the heated room air is returned to the room.

Effects of Embodiment 6

According to the present embodiment, the following effect can be obtained in addition to the effects obtained by the above Embodiment 1. Specifically, in the present embodiment, the switching between the first and second modes during the dehumidification cooling operation or the humidification heating operation is implemented by opening and closing the two solenoid valves (61, 62), respectively, one open and the other closed. The switching between the first and second modes is frequently carried out at relatively short time intervals (for example, every five to ten minutes). Therefore, according to the present embodiment, relatively high-durability solenoid valves (61, 62) can be used to switch between the first and second modes, which ensures the reliability of the air conditioning system.

Embodiment 7 of the Invention

Embodiment 7 of the present invention is described. An air conditioning system of the present embodiment varies in the configuration of the refrigerant circuit (10) from the air conditioning system of Embodiment 1.

Figure 13A:
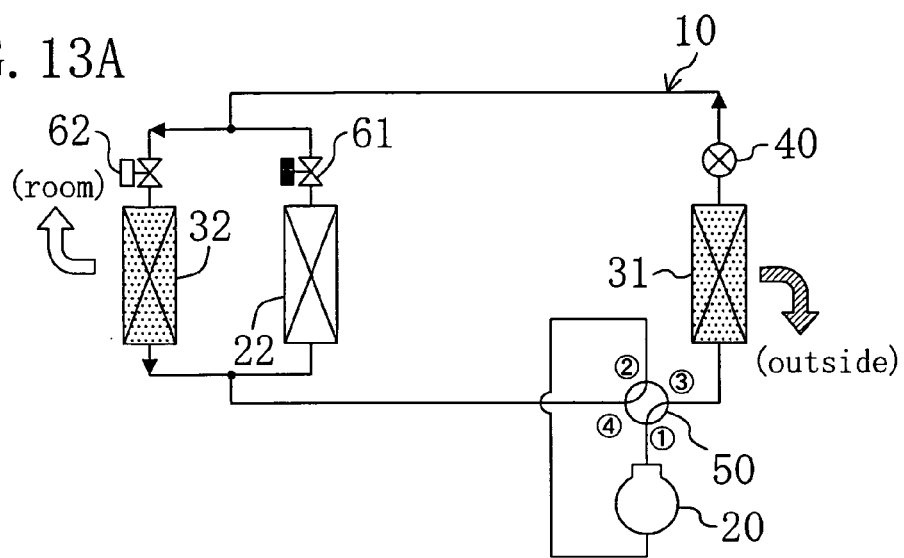
FIG. 13 is a schematic diagram showing the configuration of a refrigerant circuit in Embodiment 7 and its behavior during the dehumidification cooling operation.
Figure 13A:
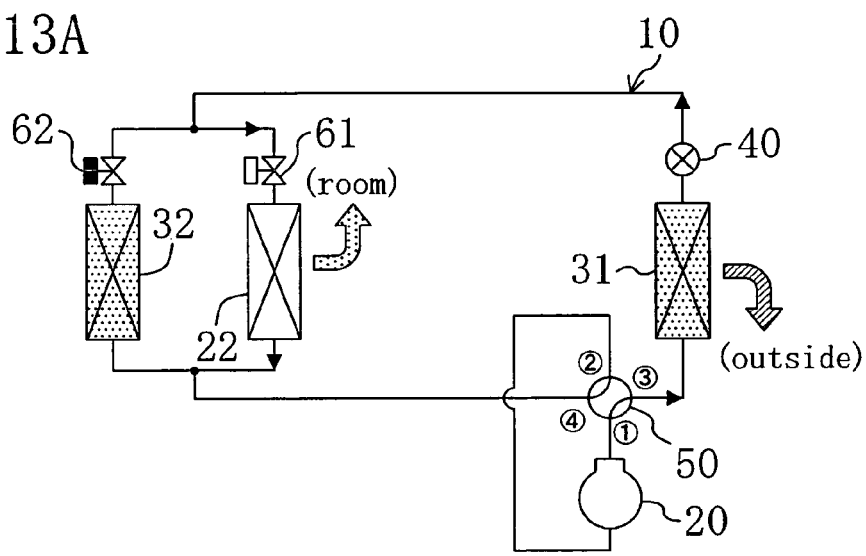

As shown in FIGS. 13 and 14, the refrigerant circuit (10) is provided with a single compressor (20), a single motor-operated expansion valve (40), a single four-way selector valve (50) and two solenoid valves (61, 62). Further, the refrigerant circuit (10) is provided with a single indoor heat exchanger (22) and two adsorption heat exchangers (31, 32).

In this refrigerant circuit (10), the indoor heat exchanger (22) and the first and second adsorption heat exchangers (31, 32) constitute utilization side heat exchangers. Further, in this refrigerant circuit (10), the first adsorption heat exchanger (31) also constitutes a heat-source side heat exchanger. The indoor heat exchanger (22) and each of the adsorption heat exchangers (31, 32) are configured to be the same as those in Embodiment 1.

A description is given to the configuration of the refrigerant circuit (10). The compressor (20) is connected at its discharge side to the first port of the four-way selector valve (50) and connected at its suction side to the second port of the four-way selector valve (50). In the refrigerant circuit (10), the first adsorption heat exchanger (31), the motor-operated expansion valve (40), the first solenoid valve (61) and the indoor heat exchanger (22) are arranged in this order from the third to fourth port of the four-way selector valve (50). The second adsorption heat exchanger (32) is connected at one end between the indoor heat exchanger (22) and the four-way selector valve (50) and connected at the other end between the motor-operated expansion valve (40) and the first solenoid valve (61) via the second solenoid valve (62).

Figure 13C:
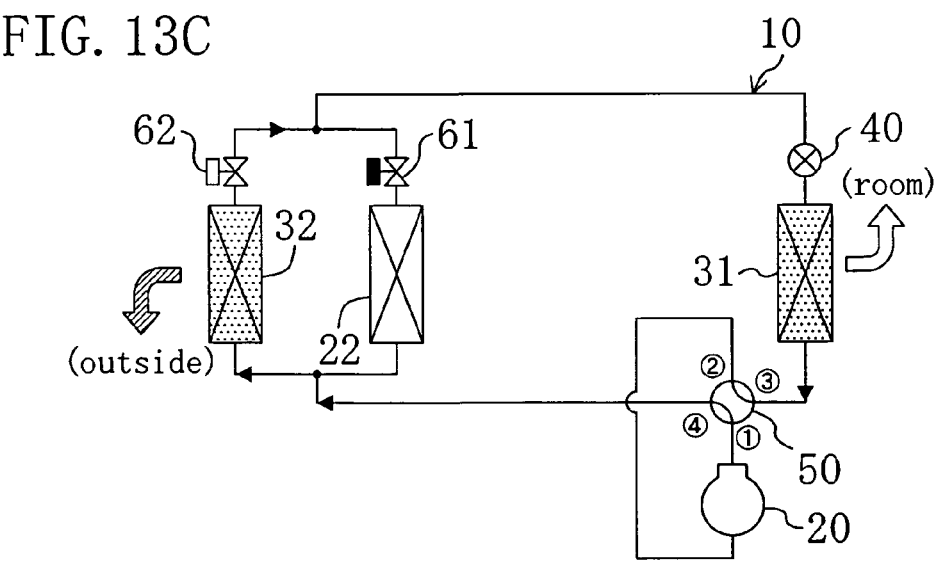
Figure 14A:
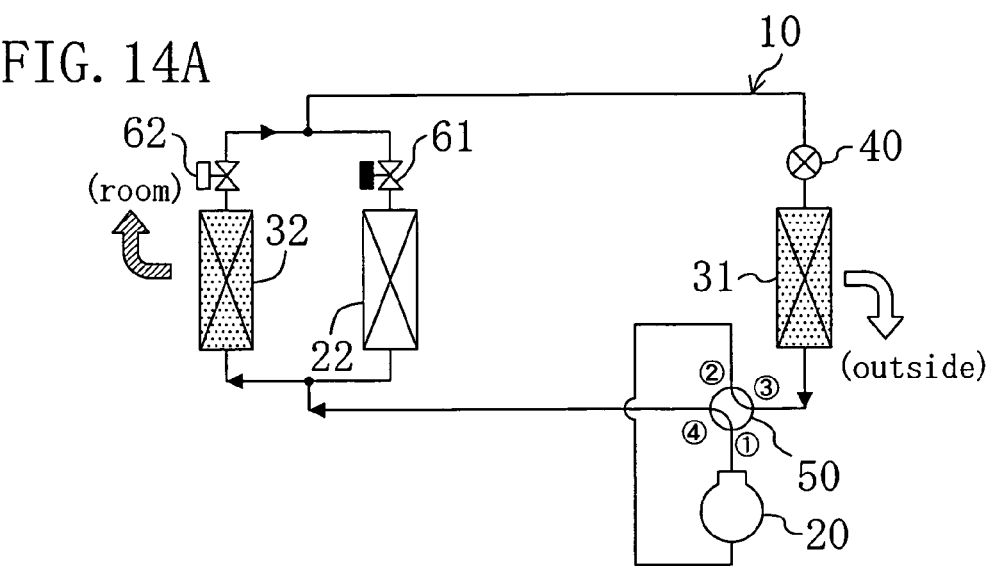
FIG. 14 is a schematic diagram showing the configuration of the refrigerant circuit in Embodiment 7 and its behavior during the humidification heating operation.
Figure 14B:
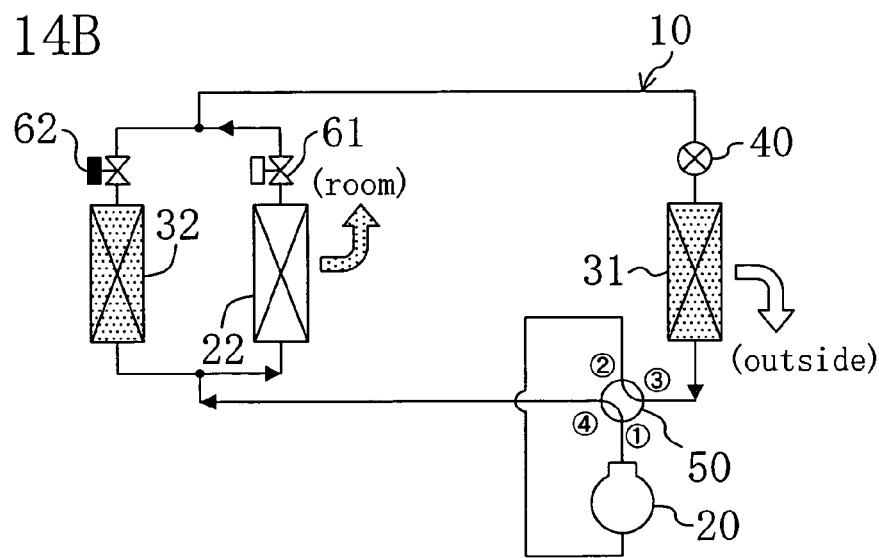
Figure 14C:
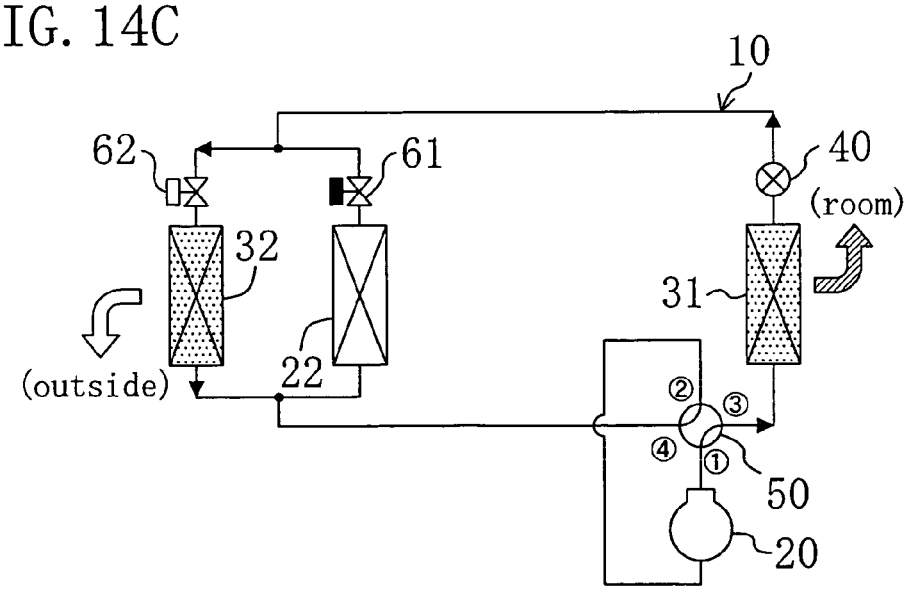

The four-way selector valve (50) switches between a first position (a position shown in FIGS. 13(A), 13(B) and 14(C)) in which the first and third ports communicate and the second and fourth ports communicate and a second position (a position shown in FIGS. 13(C), 14(A) and 14(B)) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 13.

During the dehumidification cooling operation, first, second and third modes are repeated in this order. In the first mode, the first adsorption heat exchanger (31) serves as a condenser, the second adsorption heat exchanger (32) serves as an evaporator and the indoor heat exchanger (22) is in non-operating condition. In the second mode, the first adsorption heat exchanger (31) serves as a condenser, the indoor heat exchanger (22) serves as an evaporator and the second adsorption heat exchanger (32) is in non-operating condition. In the third mode, the second adsorption heat exchanger (32) serves as a condenser, the first adsorption heat exchanger (31) serves as an evaporator and the indoor heat exchanger (22) is in non-operating condition.

Furthermore, during the dehumidification cooling operation, outdoor air is supplied to the first adsorption heat exchanger (31). Furthermore, in the dehumidification cooling operation, room air is supplied only to the second adsorption heat exchanger (32) during the first and third modes but supplied only to the indoor heat exchanger (22) during the second mode.

In the first mode, a regeneration action for the first adsorption heat exchanger (31) and an adsorption action for the second adsorption heat exchanger (32) concurrently take place. During the first mode, as shown in FIG. 13(A), the four-way selector valve (50) is set to the first position, the first solenoid valve (61) is closed and the second solenoid valve (62) is opened. Under these conditions, refrigerant discharged from the compressor (20) condenses in the first adsorption heat exchanger (31), is reduced in pressure by the motor-operated expansion valve (40), evaporates in the second adsorption heat exchanger (32), is sucked into and then compressed by the compressor (20). In this case, the flow of refrigerant into the indoor heat exchanger (22) is shut off by the first solenoid valve (61).

During the first mode, in the first adsorption heat exchanger (31), moisture is desorbed from the adsorbent heated by refrigerant and the desorbed moisture is applied to the air. The moisture desorbed from the first adsorption heat exchanger (31) is discharged to the outside atmosphere together with the air. In the second adsorption heat exchanger (32), moisture in the room air is adsorbed by the adsorbent to dehumidify the room air and the heat of adsorption produced during the dehumidification is taken by the refrigerant. The room air dehumidified by the second adsorption heat exchanger (32) is returned to the room.

In the second mode, the first adsorption heat exchanger (31) functions as a heat-source side heat exchanger. During the second mode, as shown in FIG. 13(B), the four-way selector valve (50) is set to the first position, the first solenoid valve (61) is opened and the second solenoid valve (62) is closed. Under these conditions, refrigerant discharged from the compressor (20) condenses in the first adsorption heat exchanger (31), is reduced in pressure by the motor-operated expansion valve (40), evaporates in the indoor heat exchanger (22), is sucked into and then compressed by the compressor (20). In this case, the flow of refrigerant into the second adsorption heat exchanger (32) is shut off by the second solenoid valve (62). During the second mode, the outdoor air having taken heat from refrigerant in the first adsorption heat exchanger (31) is discharged to the outside atmosphere and the room air cooled by the indoor heat exchanger (22) is returned to the room.

In the third mode, a regeneration action for the second adsorption heat exchanger (32) and an adsorption action for the first adsorption heat exchanger (31) concurrently take place. During the third mode, as shown in FIG. 13(C), the four-way selector valve (50) is set to the second position, the first solenoid valve (61) is closed and the second solenoid valve (62) is opened. Under these conditions, refrigerant discharged from the compressor (20) condenses in the second adsorption heat exchanger (32), is reduced in pressure by the motor-operated expansion valve (40), evaporates in the first adsorption heat exchanger (31), is sucked into and then compressed by the compressor (20). In this case, the flow of refrigerant into the indoor heat exchanger (22) is shut off by the first solenoid valve (61).

During the third mode, in the first adsorption heat exchanger (31), moisture in the room air is adsorbed by the adsorbent to dehumidify the room air and the heat of adsorption produced during the dehumidification is taken by the refrigerant. The air dehumidified by the first adsorption heat exchanger (31) is supplied to the room. In the second adsorption heat exchanger (32), moisture is desorbed from the adsorbent heated by refrigerant and the desorbed moisture is applied to the air. The moisture desorbed from the second adsorption heat exchanger (32) is discharged to the outside atmosphere together with the air.

<Humidification Heating Operation>

The system's behavior during the humidification heating operation is described with reference to FIG. 14.

During the humidification heating operation, first, second and third modes are repeated in this order. In the first mode, the second adsorption heat exchanger (32) serves as a condenser, the first adsorption heat exchanger (31) serves as an evaporator and the indoor heat exchanger (22) is in non-operating condition. In the second mode, the indoor heat exchanger (22) serves as a condenser, the first adsorption heat exchanger (31) serves as an evaporator and the second adsorption heat exchanger (32) is in non-operating condition. In the third mode, the first adsorption heat exchanger (31) serves as a condenser, the second adsorption heat exchanger (32) serves as an evaporator and the indoor heat exchanger (22) is in non-operating condition.

Furthermore, during the humidification heating operation, outdoor air is supplied to the first adsorption heat exchanger (31). Furthermore, in the dehumidification cooling operation, room air is supplied only to the second adsorption heat exchanger (32) during the first and third modes but supplied only to the indoor heat exchanger (22) during the second mode.

In the first mode, an adsorption action for the first adsorption heat exchanger (31) and a regeneration action for the second adsorption heat exchanger (32) concurrently take place. During the first mode, as shown in FIG. 14(A), the four-way selector valve (50) is set to the second position, the first solenoid valve (61) is closed and the second solenoid valve (62) is opened. Under these conditions, refrigerant discharged from the compressor (20) condenses in the second adsorption heat exchanger (32), is reduced in pressure by the motor-operated expansion valve (40), evaporates in the first adsorption heat exchanger (31), is sucked into and then compressed by the compressor (20). In this case, the flow of refrigerant into the indoor heat exchanger (22) is shut off by the first solenoid valve (61).

During the first mode, in the second adsorption heat exchanger (32), moisture is desorbed from the adsorbent heated by refrigerant and the desorbed moisture is applied to the air. The room air humidified by the second adsorption heat exchanger (32) is returned to the room. In the first adsorption heat exchanger (31), moisture in the outdoor air is adsorbed by the adsorbent and the heat of adsorption produced during the adsorption is taken by the refrigerant. The outdoor air dried by the first adsorption heat exchanger (31) is discharged to the outside atmosphere.

In the second mode, the first adsorption heat exchanger (31) functions as a heat-source side heat exchanger. During the second mode, as shown in FIG. 14(B), the four-way selector valve (50) is set to the second position, the first solenoid valve (61) is opened and the second solenoid valve (62) is closed. Under these conditions, refrigerant discharged from the compressor (20) condenses in the indoor heat exchanger (22), is reduced in pressure by the motor-operated expansion valve (40), evaporates in the first adsorption heat exchanger (31), is sucked into and then compressed by the compressor (20). In this case, the flow of refrigerant into the second adsorption heat exchanger (32) is shut off by the second solenoid valve (62). During the second mode, the outdoor air having released heat to refrigerant in the first adsorption heat exchanger (31) is discharged to the outside atmosphere and the room air heated by the indoor heat exchanger (22) is returned to the room.

In the third mode, a regeneration action for the first adsorption heat exchanger (31) and an adsorption action for the second adsorption heat exchanger (32) concurrently take place. During the third mode, as shown in FIG. 14(C), the four-way selector valve (50) is set to the first position, the first solenoid valve (61) is closed and the second solenoid valve (62) is opened. Under these conditions, refrigerant discharged from the compressor (20) condenses in the first adsorption heat exchanger (31), is reduced in pressure by the motor-operated expansion valve (40), evaporates in the second adsorption heat exchanger (32), is sucked into and then compressed by the compressor (20). In this case, the flow of refrigerant into the indoor heat exchanger (22) is shut off by the first solenoid valve (61).

During the third mode, in the first adsorption heat exchanger (31), moisture is desorbed from the adsorbent heated by refrigerant and the desorbed moisture is applied to the air. The air humidified by the first adsorption heat exchanger (31) is supplied to the room. In the second adsorption heat exchanger (32), moisture in the room air is adsorbed by the adsorbent and the heat of adsorption produced during the adsorption is taken by the refrigerant. The air dried by the second adsorption heat exchanger (32) is discharged to the outside atmosphere.

Effects of Embodiment 7

According to the present embodiment, the same effects as obtained in the above Embodiment 1 can be obtained.

Embodiment 8 of the Invention

Embodiment 8 of the present invention is described. An air conditioning system of the present embodiment varies in the configuration of the refrigerant circuit (10) from the air conditioning system of Embodiment 1.

As shown in FIGS. 15 and 16, the refrigerant circuit (10) is provided with a single compressor (20), a single motor-operated expansion valve (40) and two four-way selector valves (51, 52). Further, the refrigerant circuit (10) is provided with a single outdoor heat exchanger (21), a single indoor heat exchanger (22) and two adsorption heat exchangers (31, 32). In this refrigerant circuit (10), the outdoor heat exchanger (21) constitutes a heat-source side heat exchanger while the indoor heat exchanger (22) and the first and second adsorption heat exchangers (31, 32) constitute utilization side heat exchangers. The outdoor heat exchanger (21), the indoor heat exchanger (22) and each of the adsorption heat exchangers (31, 32) are configured to be the same as those in Embodiment 1.

A description is given to the configuration of the refrigerant circuit (10). The compressor (20) is connected at its discharge side to the first port of the first four-way selector valve (51) and connected at its suction side to the second port of the first four-way selector valve (51). The outdoor heat exchanger (21) is connected at one end to the third port of the first four-way selector valve (51) and connected at the other end to the first port of the second four-way selector valve (52). The indoor heat exchanger (22) is connected at one end to the fourth port of the first four-way selector valve (51) and connected at the other end to the second port of the second four-way selector valve (52). In the refrigerant circuit (10), the first adsorption heat exchanger (31), the motor-operated expansion valve (40) and the second adsorption heat exchanger (32) are arranged in this order from the third to fourth port of the second four-way selector valve (52).

The first four-way selector valve (51) switches between a first position (a position shown in FIG. 15) in which the first and third ports communicate and the second and fourth ports communicate and a second position (a position shown in FIG. 16) in which the first and fourth ports communicate and the second and third ports communicate. On the other hand, the second four-way selector valve (52) switches between a first position (a position shown in FIGS. 15(A) and 16(B)) in which the first and third ports communicate and the second and fourth ports communicate and a second position (a position shown in FIGS. 15(B) and 16(A)) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 15.

During the dehumidification cooling operation, the first four-way selector valve (51) is set to the first position, the opening of the motor-operated expansion valve (40) is appropriately controlled, the outdoor heat exchanger (21) serves as a condenser and the indoor heat exchanger (22) serves as an evaporator. Further, a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated.

Furthermore, during the dehumidification cooling operation, outdoor air is supplied to the outdoor heat exchanger (21) and room air is supplied to the indoor heat exchanger (22) and the first and second adsorption heat exchangers (31, 32). Then, the air having passed through the indoor heat exchanger (22) is continuously supplied to the room while the air having passed through the first adsorption heat exchanger (31) and the air having passed through the second adsorption heat exchanger (32) are alternately supplied to the room.

Figure 15A:
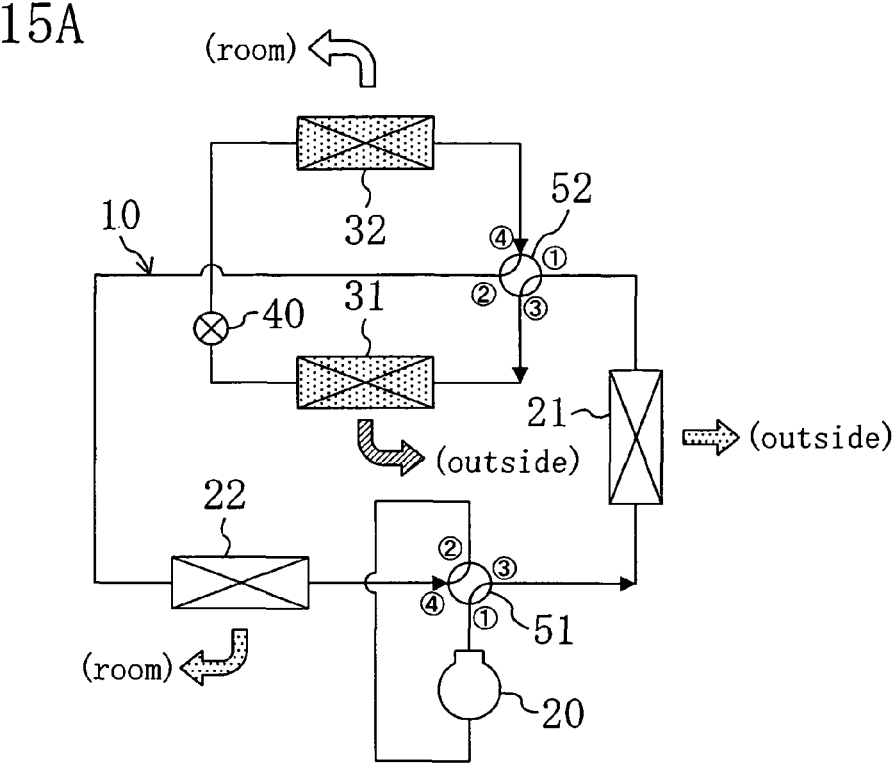
FIG. 15 is a schematic diagram showing the configuration of a refrigerant circuit in Embodiment 8 and its behavior during the dehumidification cooling operation.

In the first mode, a regeneration action for the first adsorption heat exchanger (31) and an adsorption action for the second adsorption heat exchanger (32) concurrently take place. During the first mode, as shown in FIG. 15(A), the second four-way selector valve (52) is set to the first position. Under these conditions, refrigerant discharged from the compressor (20) condenses while passing through the outdoor heat exchanger (21) and the first adsorption heat exchanger (31) in this order, is reduced in pressure by the motor-operated expansion valve (40), evaporates while passing through the second adsorption heat exchanger (32) and the indoor heat exchanger (22) in this order, is sucked into and then compressed by the compressor (20).

During the first mode, the outdoor air having taken heat from refrigerant in the outdoor heat exchanger (21) is discharged to the outside atmosphere while the room air cooled by the indoor heat exchanger (22) is returned to the room. In the first adsorption heat exchanger (31), moisture is desorbed from the adsorbent heated by refrigerant and the desorbed moisture is applied to the air. The moisture desorbed from the first adsorption heat exchanger (31) is discharged to the outside atmosphere together with the air. In the second adsorption heat exchanger (32), moisture in the room air is adsorbed by the adsorbent to dehumidify the room air and the heat of adsorption produced during the dehumidification is taken by the refrigerant. The room air dehumidified by the second adsorption heat exchanger (32) is returned to the room.

Figure 15B:
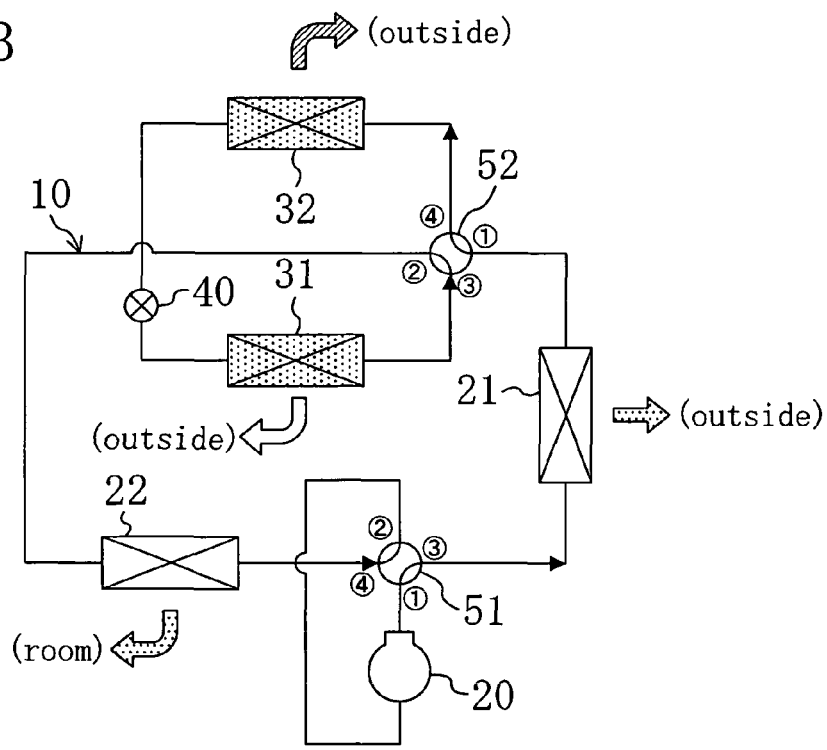

In the second mode, an adsorption action for the first adsorption heat exchanger (31) and a regeneration action for the second adsorption heat exchanger (32) concurrently take place. During the second mode, as shown in FIG. 15(B), the second four-way selector valve (52) is set to the second position. Under these conditions, refrigerant discharged from the compressor (20) condenses while passing through the outdoor heat exchanger (21) and the second adsorption heat exchanger (32) in this order, is reduced in pressure by the motor-operated expansion valve (40), evaporates while passing through the first adsorption heat exchanger (31) and the indoor heat exchanger (22) in this order, is sucked into and then compressed by the compressor (20).

During the second mode, the outdoor air having taken heat from refrigerant in the outdoor heat exchanger (21) is discharged to the outside atmosphere while the room air cooled by the indoor heat exchanger (22) is returned to the room. In the first adsorption heat exchanger (31), moisture in the room air is adsorbed by the adsorbent to dehumidify the room air and the heat of adsorption produced during the dehumidification is taken by the refrigerant. The room air dehumidified by the first adsorption heat exchanger (31) is returned to the room. In the second adsorption heat exchanger (32), moisture is desorbed from the adsorbent heated by refrigerant and the desorbed moisture is applied to the air. The moisture desorbed from the second adsorption heat exchanger (32) is discharged to the outside atmosphere together with the air.

<Humidification Heating Operation>

The system's behavior during the humidification heating operation is described with reference to FIG. 16.

During the humidification heating operation, the first four-way selector valve (51) is set to the second position, the opening of the motor-operated expansion valve (40) is appropriately controlled, the indoor heat exchanger (22) serves as a condenser and the outdoor heat exchanger (21) serves as an evaporator. Further, a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated.

Furthermore, during the humidification heating operation, outdoor air is supplied to the outdoor heat exchanger (21) and room air is supplied to the indoor heat exchanger (22) and the first and second adsorption heat exchangers (31, 32). Then, the air having passed through the indoor heat exchanger (22) is continuously supplied to the room, while the air having passed through the first adsorption heat exchanger (31) and the air having passed through the second adsorption heat exchanger (32) are alternately supplied to the room.

Figure 16A:
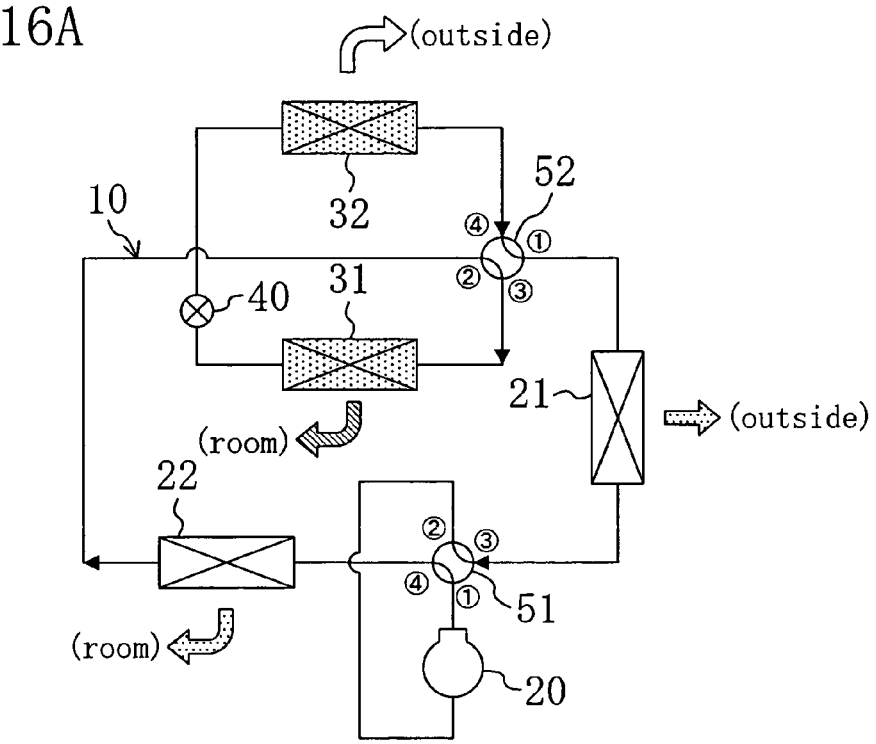
FIG. 16 is a schematic diagram showing the configuration of the refrigerant circuit in Embodiment 8 and its behavior during the humidification heating operation.

In the first mode, a regeneration action for the first adsorption heat exchanger (31) and an adsorption action for the second adsorption heat exchanger (32) concurrently take place. During the first mode, as shown in FIG. 16(A), the second four-way selector valve (52) is set to the second position. Under these conditions, refrigerant discharged from the compressor (20) condenses while passing through the indoor heat exchanger (22) and the first adsorption heat exchanger (31) in this order, is reduced in pressure by the motor-operated expansion valve (40), evaporates while passing through the second adsorption heat exchanger (32) and the outdoor heat exchanger (21) in this order, is sucked into and then compressed by the compressor (20).

During the first mode, the outdoor air having released heat to refrigerant in the outdoor heat exchanger (21) is discharged to the outside atmosphere while the room air heated by the indoor heat exchanger (22) is returned to the room. In the first adsorption heat exchanger (31), moisture is desorbed from the adsorbent heated by refrigerant and the desorbed moisture is applied to the air. The room air humidified by the first adsorption heat exchanger (31) is returned to the room. In the second adsorption heat exchanger (32), moisture in the room air is adsorbed by the adsorbent to dehumidify the room air and the heat of adsorption produced during the dehumidification is taken by the refrigerant. The room air dried by the second adsorption heat exchanger (32) is discharged to the outside atmosphere.

Figure 16B:
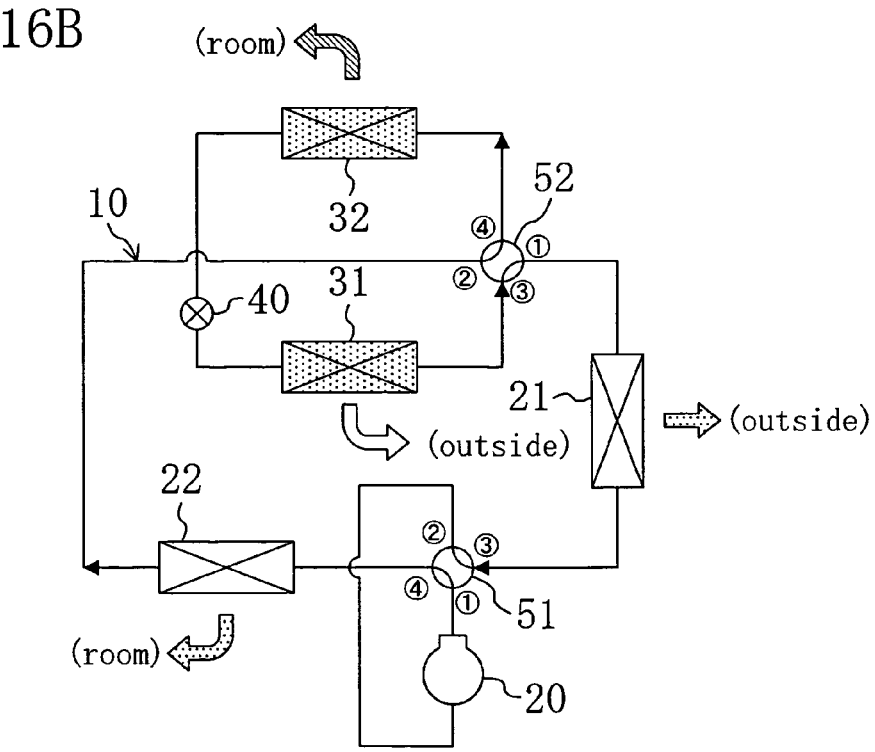

In the second mode, an adsorption action for the first adsorption heat exchanger (31) and a regeneration action for the second adsorption heat exchanger (32) concurrently take place. During the second mode, as shown in FIG. 16(B), the second four-way selector valve (52) is set to the first position. Under these conditions, refrigerant discharged from the compressor (20) condenses while passing through the indoor heat exchanger (22) and the second adsorption heat exchanger (32) in this order, is reduced in pressure by the motor-operated expansion valve (40), evaporates while passing through the first adsorption heat exchanger (31) and the outdoor heat exchanger (21) in this order, is sucked into and then compressed by the compressor (20).

During the second mode, the outdoor air having released heat to refrigerant in the outdoor heat exchanger (21) is discharged to the outside atmosphere while the room air heated by the indoor heat exchanger (22) is returned to the room. In the first adsorption heat exchanger (31), moisture in the room air is adsorbed by the adsorbent to dehumidify the room air and the heat of adsorption produced during the dehumidification is taken by the refrigerant. The room air dried by the first adsorption heat exchanger (31) is discharged to the outside atmosphere. In the second adsorption heat exchanger (32), moisture is desorbed from the adsorbent heated by refrigerant and the desorbed moisture is applied to the room air. The room air humidified by the second adsorption heat exchanger (32) is returned to the room.

Effects of Embodiment 8

According to the present embodiment, the following effect can be obtained in addition to the effects obtained by the above Embodiment 1.

Even in the case where the air conditioning system of the present embodiment is configured as a so-called separate type, it can be avoided that the number of steps for installation work increases. Specifically, if the air conditioning system employs the structure in which the compressor (20), the first four-way selector valve (51) and the outdoor heat exchanger (21) are contained in an outdoor-side unit and the first and second adsorption heat exchangers (32), the indoor heat exchanger (22), the second four-way selector valve (52) and the motor-operated expansion valve (40) are contained in a room-side unit, it is needed only to connect the outdoor-side unit and the room-side unit through two connecting pipes. Therefore, according to the present embodiment, it can be avoided to increase the number of connecting pipes for connecting the outdoor-side unit and the room-side unit. As a result, the number of steps for installation work can be reduced to the same number of steps for installation work for common air conditioners.

Modification of Embodiment 8

In the air conditioning system of the present embodiment, the refrigerant circuit (10) may be provided with a bridge circuit (70).

As shown in FIGS. 17 and 18, the bridge circuit (70) is formed by connecting four check valves (71-74) in a bridge configuration. In the bridge circuit (70), the inflow side of the first check valve (71) is connected to the outflow side of the second check valve (72), the inflow side of the second check valve (72) is connected to the inflow side of the third check valve (73), the outflow side of the third check valve (73) is connected to the inflow side of the fourth check valve (74), and the outflow side of the fourth check valve (74) is connected to the outflow side of the first check valve (71).

In the refrigerant circuit (10) of this modification, the outdoor heat exchanger (21) is connected via the bridge circuit (70) to the first port of the second four-way selector valve (52) and the indoor heat exchanger (22) is connected via the bridge circuit (70) to the second port of the second four-way selector valve (52). More specifically, in the bridge circuit (70), the outdoor heat exchanger (21) is connected between the first check vale (71) and the second check valve (72) and the first port of the second four-way selector valve (52) is connected between the first check valve (71) and the fourth check valve (74). Further, in the bridge circuit (70), the second port of the second four-way selector valve (52) is connected between the second check valve (72) and the third check valve (73) and the indoor heat exchanger (22) is connected between the third check valve (73) and the fourth check valve (74).

In the case of the above refrigerant circuit (10), refrigerant circulates therethrough during each of the first and second modes in the dehumidification cooling operation and during each of the first and second modes in the humidification heating operation as in the case where the refrigerant circuit (10) is provided with no bridge circuit (70).

Figure 17A:
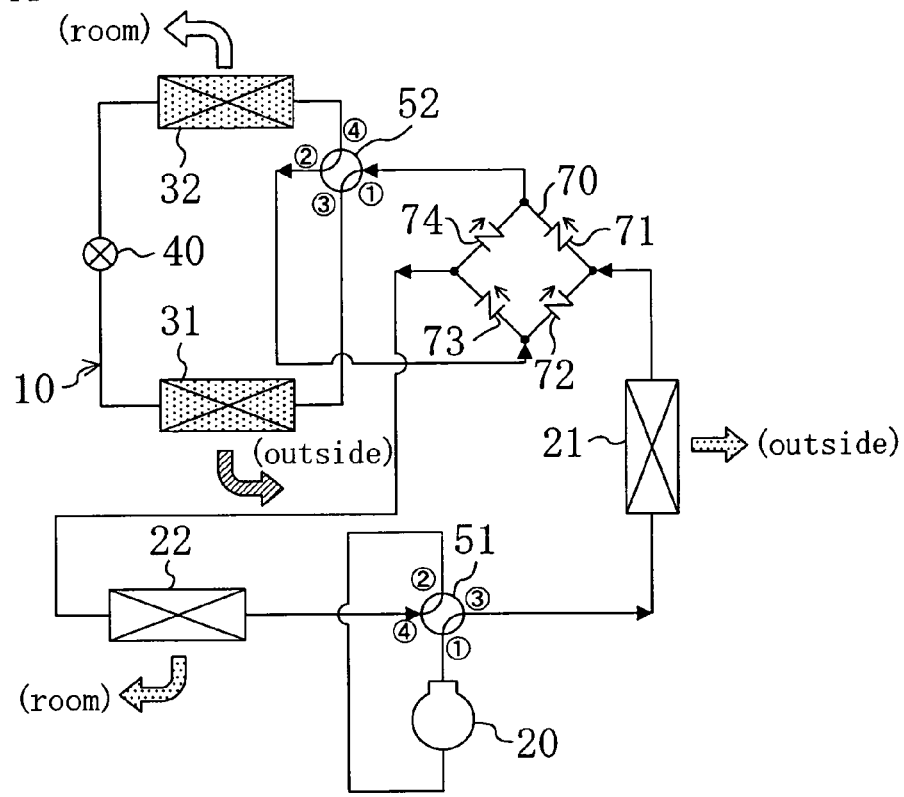
FIG. 17 is a schematic diagram showing the configuration of a refrigerant circuit in a modification of Embodiment 8 and its behavior during the dehumidification cooling operation.
Figure 17B:
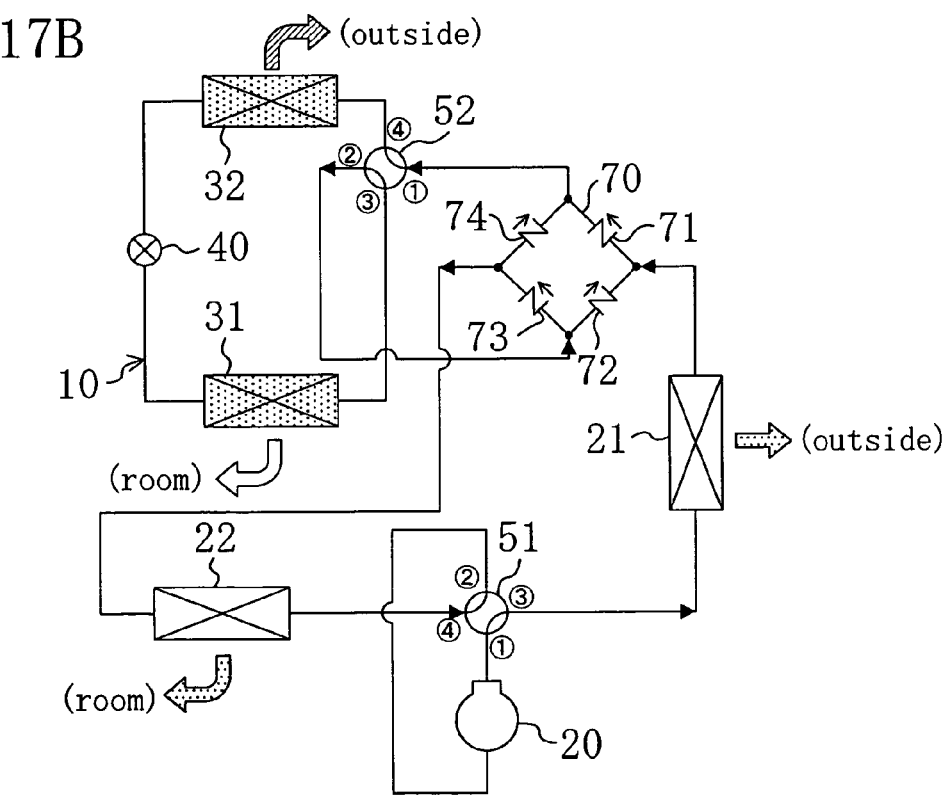

During the first mode in the dehumidification cooling operation, as shown in FIG. 17(A), the first four-way selector valve (51) and the second four-way selector valve (52) are set to their first positions. The refrigerant having flowed out of the outdoor heat exchanger (21) passes through the first check valve (71) and then flows into the first adsorption heat exchanger (31) and the refrigerant having flowed out of the second adsorption heat exchanger (32) passes through the third check valve (73) and then flows into the indoor heat exchanger (22). On the other hand, during the second mode in the dehumidification cooling operation, as shown in FIG. 17(B), the first four-way selector valve (51) is set to the first position but the second four-way selector valve (52) is set to the second position. The refrigerant having flowed out of the outdoor heat exchanger (21) passes through the first check valve (71) and then flows into the second adsorption heat exchanger (32) and the refrigerant having flowed out of the first adsorption heat exchanger (31) passes through the third check valve (73) and then flows into the indoor heat exchanger (22).

Figure 18A:
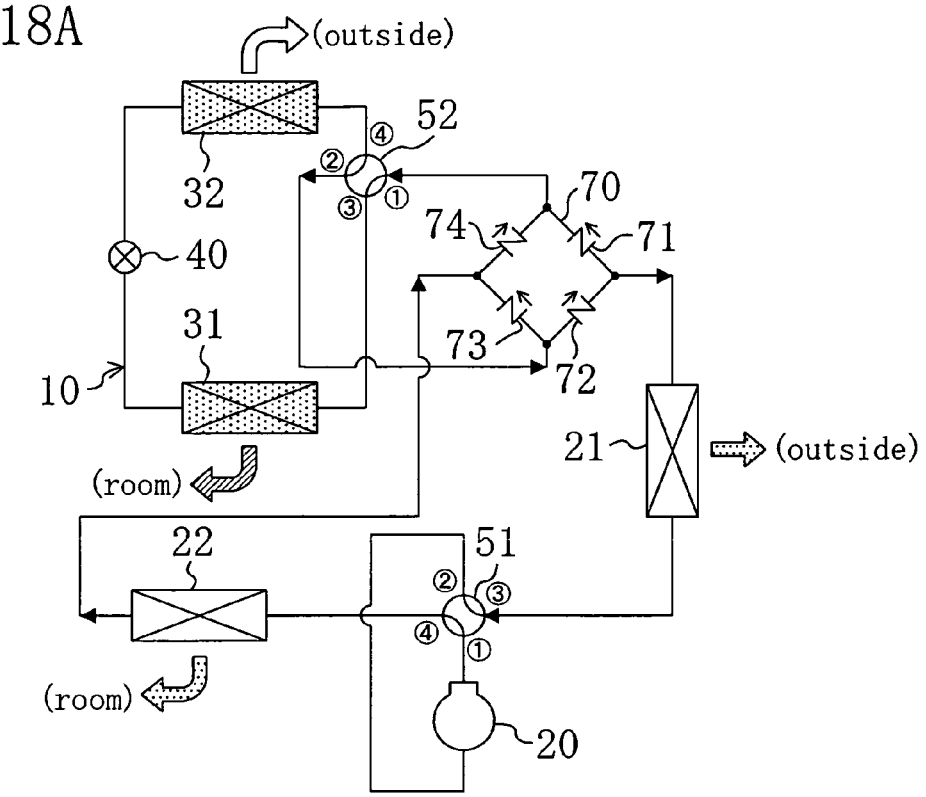
FIG. 18 is a schematic diagram showing the configuration of the refrigerant circuit in the modification of Embodiment 8 and its behavior during the humidification heating operation.
Figure 18B:
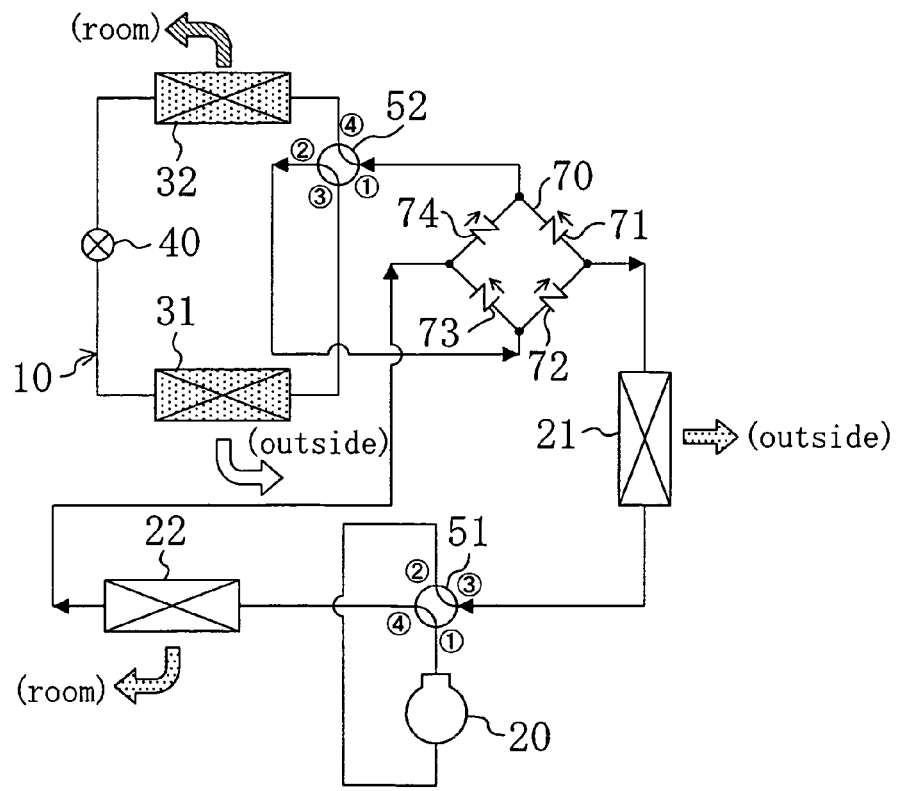

During the first mode in the humidification heating operation, as shown in FIG. 18(A), the first four-way selector valve (51) is set to the second position and the second four-way selector valve (52) is set to the first position. The refrigerant having flowed out of the indoor heat exchanger (22) passes through the fourth check valve (74) and then flows into the first adsorption heat exchanger (31) and the refrigerant having flowed out of the second adsorption heat exchanger (32) passes through the second check valve (72) and then flows into the outdoor heat exchanger (21). On the other hand, during the second mode in the humidification heating operation, as shown in FIG. 18(B), the first four-way selector valve (51) and the second four-way selector valve (52) are set to their second positions. The refrigerant having flowed out of the indoor heat exchanger (22) passes through the fourth check valve (74) and then flows into the second adsorption heat exchanger (32) and the refrigerant having flowed out of the first adsorption heat exchanger (31) passes through the second check valve (72) and then flows into the outdoor heat exchanger (21).

As described above, the refrigerant circuit (10) of this modification is provided with a bridge circuit (70). Thus, in the first four-way selector valve (51) and the second four-way selector valve (52), their first ports are always under higher pressure while their second ports are always under lower pressure. Therefore, according to this modification, it becomes possible to use pilot-operated four-way selector valves each of which has a port always being under higher pressure and a port always being under lower pressure.

Embodiment 9 of the Invention

Embodiment 9 of the present invention is described. An air conditioning system of the present embodiment varies in the configuration of the refrigerant circuit (10) from the air conditioning system of Embodiment 8.

As shown in FIGS. 19 and 20, the refrigerant circuit (10) is provided with a single compressor (20), two motor-operated expansion valves (41, 42) and two four-way selector valves (51, 52). Further, the refrigerant circuit (10) is provided with a single outdoor heat exchanger (21), a single indoor heat exchanger (22) and two adsorption heat exchangers (31, 32). In this refrigerant circuit (10), the outdoor heat exchanger (21) constitutes a heat-source side heat exchanger while the indoor heat exchanger (22) and the first and second adsorption heat exchangers (31, 32) constitute utilization side heat exchangers. The outdoor heat exchanger (21), the indoor heat exchanger (22) and each of the adsorption heat exchangers (31, 32) are configured to be the same as those in Embodiment 8.

A description is given to the configuration of the refrigerant circuit (10). The compressor (20) is connected at its discharge side to the first port of the first four-way selector valve (51) and connected at its suction side to the second port of the first four-way selector valve (51). The outdoor heat exchanger (21) is connected at one end to the third port of the first four-way selector valve (51) and connected at the other end to the first port of the second four-way selector valve (52). The second port of the second four-way selector valve (52) is connected to the fourth port of the first four-way selector valve (51). In the refrigerant circuit (10), the first adsorption heat exchanger (31), the first motor-operated expansion valve (41), the indoor heat exchanger (22), the second motor-operated expansion valve (42) and the second adsorption heat exchanger (32) are arranged in this order from the third to fourth port of the second four-way selector valve (52).

The first four-way selector valve (51) switches between a first position (a position shown in FIG. 19) in which the first and third ports communicate and the second and fourth ports communicate and a second position (a position shown in FIG. 20) in which the first and fourth ports communicate and the second and third ports communicate. On the other hand, the second four-way selector valve (52) switches between a first position (a position shown in FIGS. 19(A) and 20(B)) in which the first and third ports communicate and the second and fourth ports communicate and a second position (a position shown in FIGS. 19(B) and 20(A)) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 19.

During the dehumidification cooling operation, the first four-way selector valve (51) is set to the first position, the openings of the first and second motor-operated expansion valves (41, 42) are individually controlled as appropriate, the outdoor heat exchanger (21) serves as a condenser and the indoor heat exchanger (22) serves as an evaporator. Further, a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated.

The air flow during the first mode is the same as that during the first mode in the dehumidification cooling operation in Embodiment 8. Further, the air flow during the second mode is the same as that during the second mode in the dehumidification cooling operation in Embodiment 8.

Figure 19A:
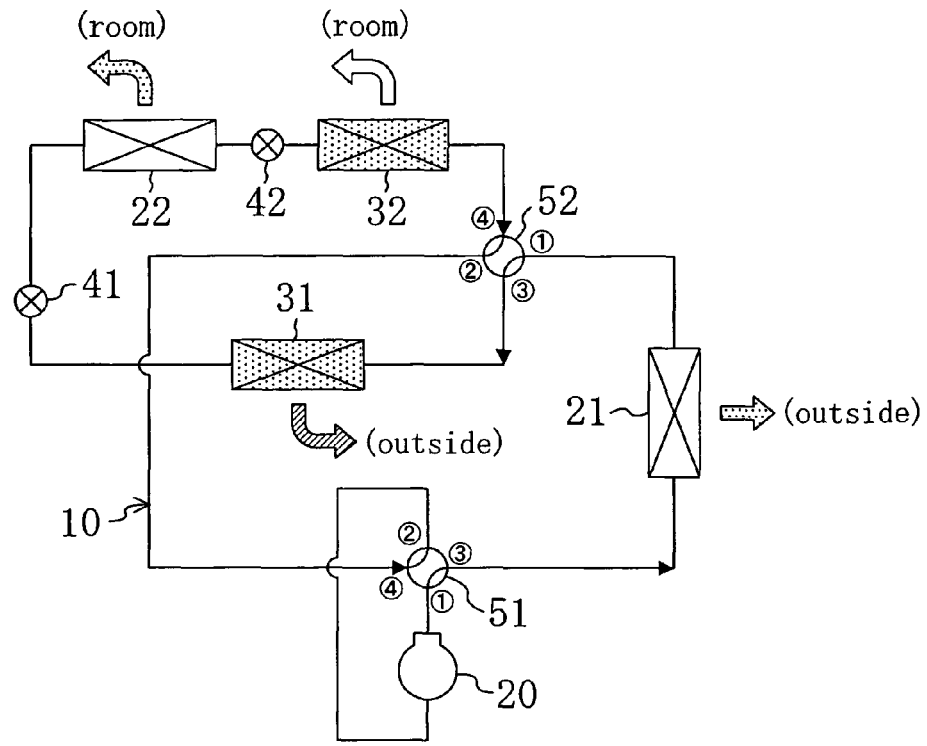
FIG. 19 is a schematic diagram showing the configuration of a refrigerant circuit in Embodiment 9 and its behavior during the dehumidification cooling operation.

In the first mode, a regeneration action for the first adsorption heat exchanger (31) and an adsorption action for the second adsorption heat exchanger (32) concurrently take place. During the first mode, as shown in FIG. 19(A), the second four-way selector valve (52) is set to the first position. Under these conditions, refrigerant discharged from the compressor (20) condenses while passing through the outdoor heat exchanger (21) and the first adsorption heat exchanger (31) in this order, is reduced in pressure by the first motor-operated expansion valve (41), evaporates in the indoor heat exchanger (22), is reduced in pressure by the second motor-operated expansion valve (42), evaporates in the second adsorption heat exchanger (32), is sucked into and then compressed by the compressor (20).

Figure 19B:
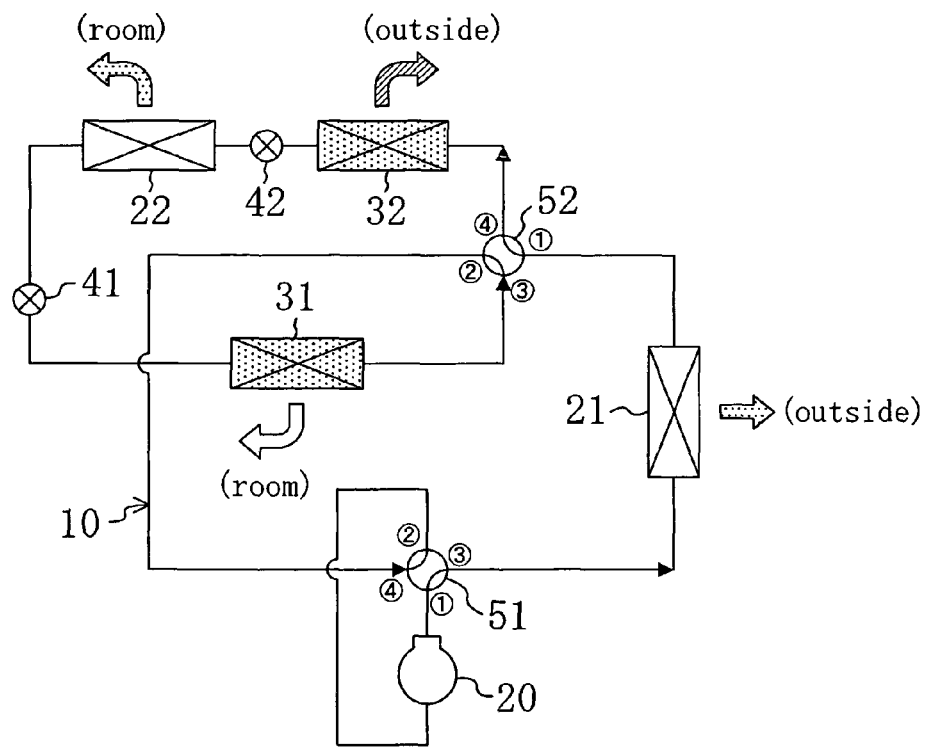

In the second mode, an adsorption action for the first adsorption heat exchanger (31) and a regeneration action for the second adsorption heat exchanger (32) concurrently take place. During the second mode, as shown in FIG. 19(B), the second four-way selector valve (52) is set to the second position. Under these conditions, refrigerant discharged from the compressor (20) condenses while passing through the outdoor heat exchanger (21) and the second adsorption heat exchanger (32) in this order, is reduced in pressure by the second motor-operated expansion valve (42), evaporates in the indoor heat exchanger (22), is reduced in pressure by the first motor-operated expansion valve (41), evaporates in the first adsorption heat exchanger (31), is sucked into and then compressed by the compressor (20).

Furthermore, during the dehumidification cooling operation, the room air cooled by the indoor heat exchanger (22) is supplied to the room while the room air dehumidified by the second adsorption heat exchanger (32) during the first mode and the room air dehumidified by the first adsorption heat exchanger (31) during the second mode are alternately supplied to the room.

<Humidification Heating Operation>

The system's behavior during the humidification heating operation is described with reference to FIG. 20.

During the humidification heating operation, the first four-way selector valve (51) is set to the second position, the openings of the first and second motor-operated expansion valves (41, 42) are individually controlled as appropriate, the indoor heat exchanger (22) serves as a condenser and the outdoor heat exchanger (21) serves as an evaporator. Further, a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated.

The air flow during the first mode is the same as that during the first mode in the humidification heating operation in Embodiment 8. Further, the air flow during the second mode is the same as that during the second mode in the humidification heating operation in Embodiment 8.

Figure 20A:
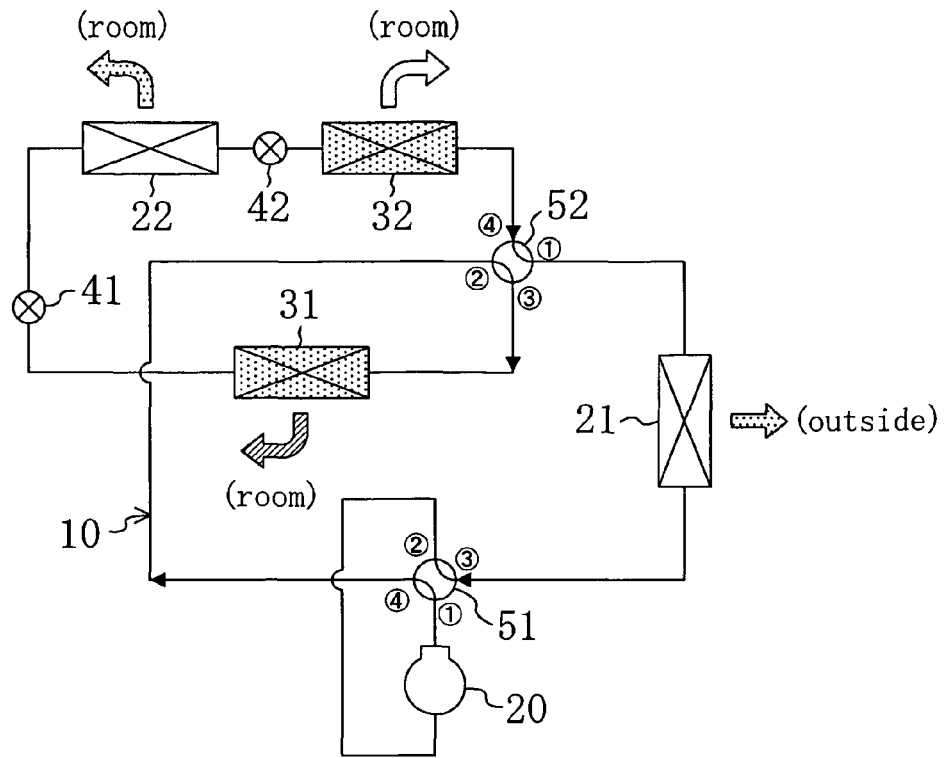
FIG. 20 is a schematic diagram showing the configuration of the refrigerant circuit in Embodiment 9 and its behavior during the humidification heating operation.

In the first mode, a regeneration action for the first adsorption heat exchanger (31) and an adsorption action for the second adsorption heat exchanger (32) concurrently take place. During the first mode, as shown in FIG. 20(A), the second four-way selector valve (52) is set to the second position. Under these conditions, refrigerant discharged from the compressor (20) condenses in the first adsorption heat exchanger (31), is reduced in pressure by the first motor-operated expansion valve (41), condenses in the indoor heat exchanger (22), is reduced in pressure by the second motor-operated expansion valve (42), evaporates while passing through the second adsorption heat exchanger (32) and the outdoor heat exchanger (21) in this order, is sucked into and then compressed by the compressor (20).

Figure 20B:
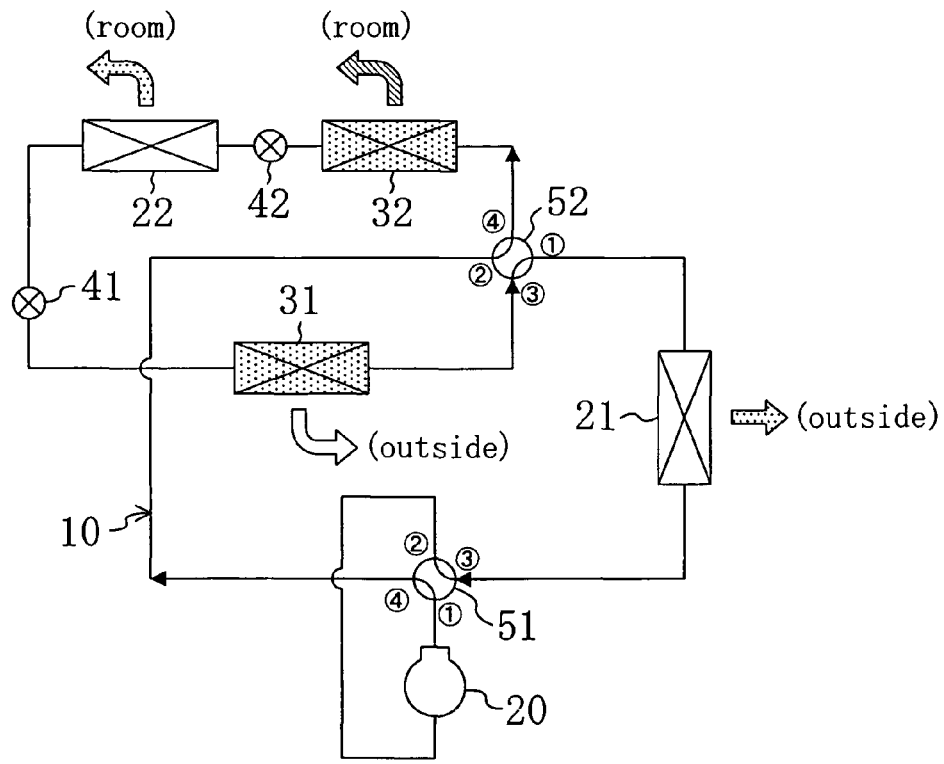

In the second mode, an adsorption action for the first adsorption heat exchanger (31) and a regeneration action for the second adsorption heat exchanger (32) concurrently take place. During the second mode, as shown in FIG. 20(B), the second four-way selector valve (52) is set to the first position. Under these conditions, refrigerant discharged from the compressor (20) condenses in the second adsorption heat exchanger (32), is reduced in pressure by the second motor-operated expansion valve (42), condenses in the indoor heat exchanger (22), is reduced in pressure by the first motor-operated expansion valve (41), evaporates while passing through the first adsorption heat exchanger (31) and the outdoor heat exchanger (21) in this order, is sucked into and then compressed by the compressor (20).

Furthermore, during the humidification heating operation, the room air heated by the indoor heat exchanger (22) is supplied to the room while the room air humidified by the first adsorption heat exchanger (31) during the first mode and the room air humidified by the second adsorption heat exchanger (32) during the second mode are alternately supplied to the room.

Effects of Embodiment 9

According to the present embodiment, the following effect can be obtained in addition to the effects obtained by the above Embodiment 1. Specifically, during the dehumidification cooling operation in the present embodiment, the refrigerant evaporation temperature in the adsorption heat exchanger (31, 32) serving as an evaporator can be set below that in the indoor heat exchanger (22). This ensures that refrigerant takes the heat of adsorption produced by the adsorption heat exchanger (31, 32), which increases the amount of moisture adsorbed by the adsorption heat exchanger (31, 32). Further, during the humidification heating operation in the present embodiment, the refrigerant condensation temperature in the adsorption heat exchanger (31, 32) serving as a condenser can be set higher than that in the indoor heat exchanger (22). This provides a sufficient temperature increase of the adsorbent disposed in the adsorption heat exchanger (31, 32), which ensures the regeneration of the adsorbent.

Embodiment 10 of the Invention

Embodiment 10 of the present invention is described. An air conditioning system of the present embodiment varies in the configuration of the refrigerant circuit (10) from the air conditioning system of Embodiment 8.

As shown in FIGS. 21 and 22, the refrigerant circuit (10) is provided with a single compressor (20), a single motor-operated expansion valve (40) and two four-way selector valves (51, 52). Further, the refrigerant circuit (10) is provided with a single outdoor heat exchanger (21), a single indoor heat exchanger (22) and two adsorption heat exchangers (31, 32).

In this refrigerant circuit (10), the outdoor heat exchanger (21) constitutes a heat-source side heat exchanger while the indoor heat exchanger (22) and the first and second adsorption heat exchangers (31, 32) constitute utilization side heat exchangers. The outdoor heat exchanger (21), the indoor heat exchanger (22) and each of the adsorption heat exchangers (31, 32) are configured to be the same as those in Embodiment 8.

A description is given to the configuration of the refrigerant circuit (10). The compressor (20) is connected at its discharge side to the first port of the first four-way selector valve (51) and connected at its suction side to the second port of the first four-way selector valve (51). The first adsorption heat exchanger (31) is connected at one end to the third port of the first four-way selector valve (51) and connected at the other end to the first port of the second four-way selector valve (52). The second adsorption heat exchanger (32) is connected at one end to the fourth port of the first four-way selector valve (51) and connected at the other end to the second port of the second four-way selector valve (52). In the refrigerant circuit (10), the outdoor heat exchanger (21), the motor-operated expansion valve (40) and the indoor heat exchanger (22) are arranged in this order from the third to fourth port of the second four-way selector valve (52).

Figure 21A:
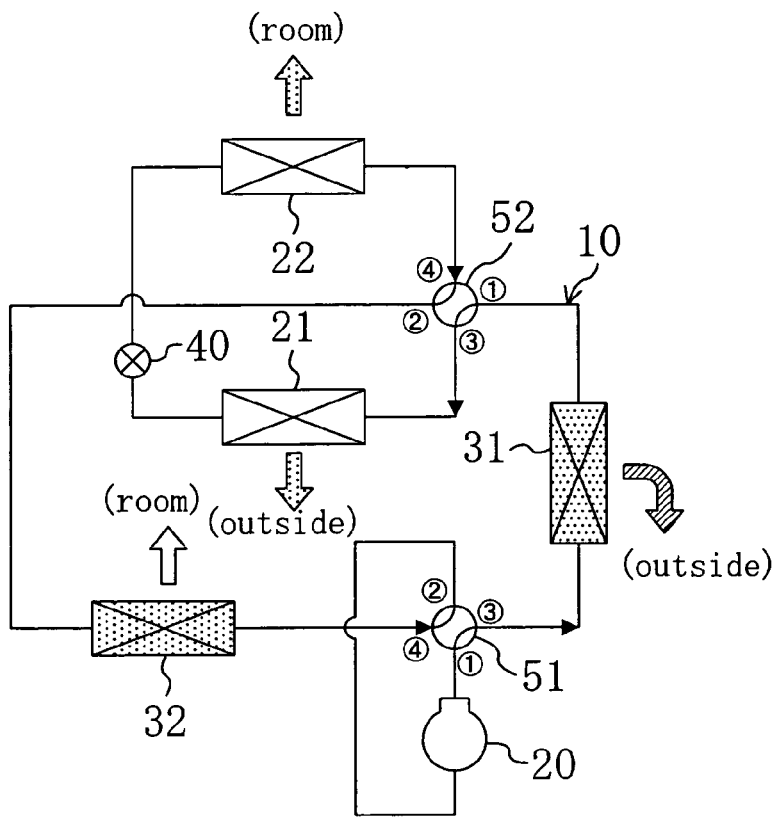
FIG. 21 is a schematic diagram showing the configuration of a refrigerant circuit in Embodiment 10 and its behavior during the dehumidification cooling operation.
Figure 21B:
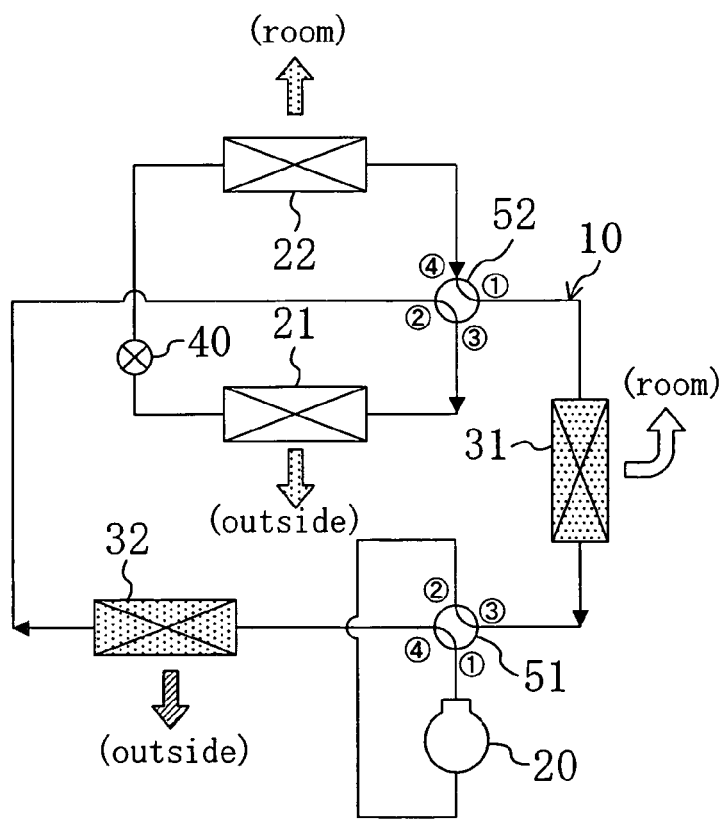
Figure 22A:
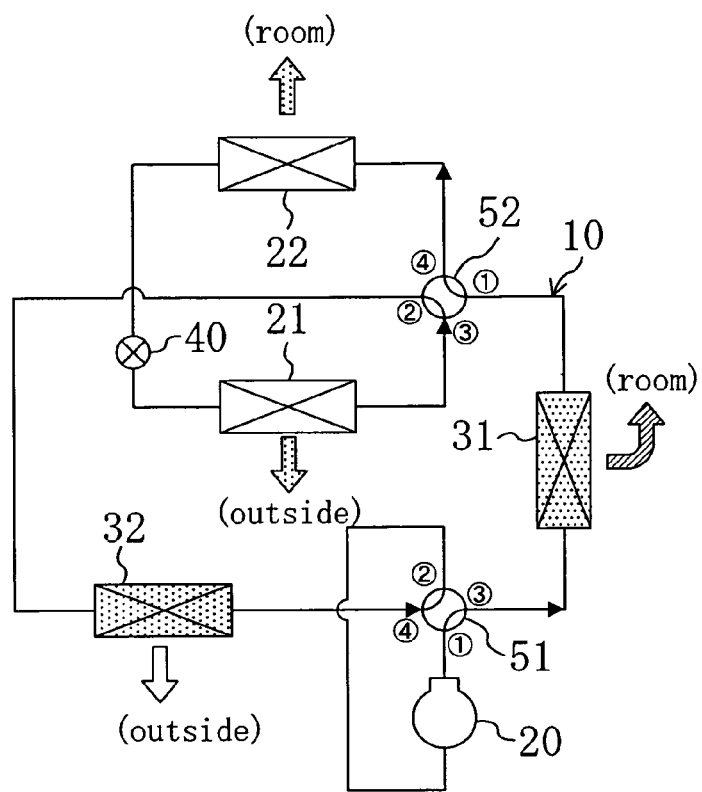
FIG. 22 is a schematic diagram showing the configuration of the refrigerant circuit in Embodiment 10 and its behavior during the humidification heating operation.
Figure 22B:
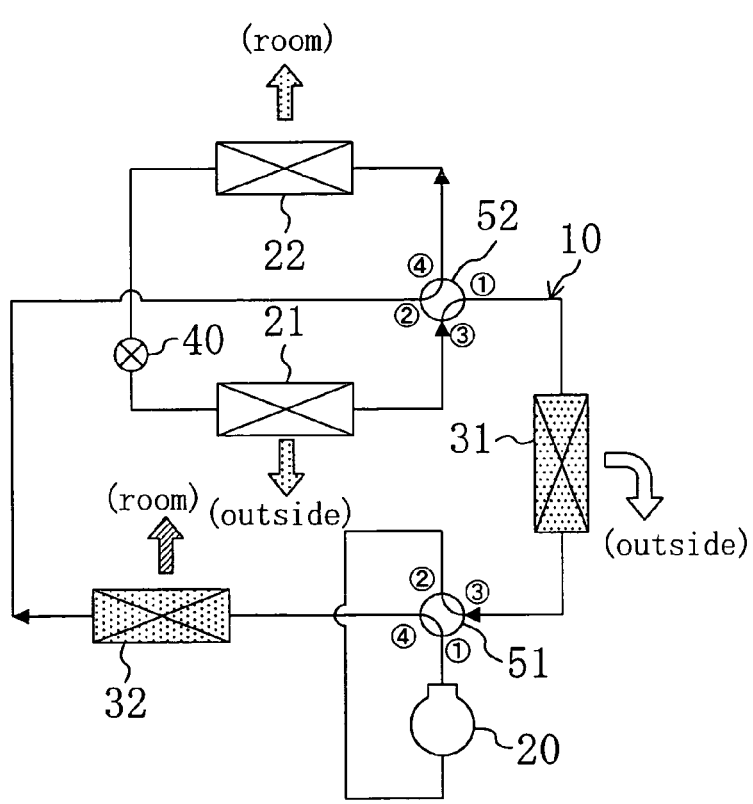

The first four-way selector valve (51) switches between a first position (a position shown in FIGS. 21(A) and 22(A)) in which the first and third ports communicate and the second and fourth ports communicate and a second position (a position shown in FIGS. 21(B) and 22(B)) in which the first and fourth ports communicate and the second and third ports communicate. On the other hand, the second four-way selector valve (52) switches between a first position (a position shown in FIGS. 21(A) and 22(B)) in which the first and third ports communicate and the second and fourth ports communicate and a second position (a position shown in FIGS. 21(B) and 22(A)) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 21.

During the dehumidification cooling operation, the outdoor heat exchanger (21) serves as a condenser and the indoor heat exchanger (22) serves as an evaporator. Further, a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated.

The air flow during the first mode is the same as that during the first mode in the dehumidification cooling operation in Embodiment 8. Further, the air flow during the second mode is the same as that during the second mode in the dehumidification cooling operation in Embodiment 8.

In the first mode, a regeneration action for the first adsorption heat exchanger (31) and an adsorption action for the second adsorption heat exchanger (32) concurrently take place. During the first mode, as shown in FIG. 21(A), the first four-way selector valve (51) and the second four-way selector valve (52) are set to their first positions and the opening of the motor-operated expansion valve (40) is appropriately controlled. Under these conditions, refrigerant discharged from the compressor (20) condenses while passing through the first adsorption heat exchanger (31) and the outdoor heat exchanger (21) in this order, is reduced in pressure by the motor-operated expansion valve (40), evaporates while passing through the indoor heat exchanger (22) and the second adsorption heat exchanger (32) in this order, is sucked into and then compressed by the compressor (20).

In the second mode, an adsorption action for the first adsorption heat exchanger (31) and a regeneration action for the second adsorption heat exchanger (32) concurrently take place. During the second mode, as shown in FIG. 21(B), the first four-way selector valve (51) and the second four-way selector valve (52) are set to their second positions and the opening of the motor-operated expansion valve (40) is appropriately controlled. Under these conditions, refrigerant discharged from the compressor (20) condenses while passing through the second adsorption heat exchanger (32) and the outdoor heat exchanger (21) in this order, is reduced in pressure by the motor-operated expansion valve (40), evaporates while passing through the indoor heat exchanger (22) and the first adsorption heat exchanger (31), is sucked into and then compressed by the compressor (20).

Furthermore, during the dehumidification cooling operation, the room air cooled by the indoor heat exchanger (22) is supplied to the room while the room air dehumidified by the second adsorption heat exchanger (32) during the first mode and the room air dehumidified by the first adsorption heat exchanger (31) during the second mode are alternately supplied to the room.

<Humidification Heating Operation>

The system's behavior during the humidification heating operation is described with reference to FIG. 22.

During the humidification heating operation, the indoor heat exchanger (22) serves as a condenser and the outdoor heat exchanger (21) serves as an evaporator. Further, a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated.

The air flow during the first mode is the same as that during the first mode in the humidification heating operation in Embodiment 8. Further, the air flow during the second mode is the same as that during the second mode in the humidification heating operation in Embodiment 8.

In the first mode, a regeneration action for the first adsorption heat exchanger (31) and an adsorption action for the second adsorption heat exchanger (32) concurrently take place. During the first mode, as shown in FIG. 22(A), the first four-way selector valve (51) is set to the first position, the second four-way selector valve (52) is set to the second position and the opening of the motor-operated expansion valve (40) is appropriately controlled. Under these conditions, refrigerant discharged from the compressor (20) condenses while passing through the first adsorption heat exchanger (31) and the indoor heat exchanger (22) in this order, is reduced in pressure by the motor-operated expansion valve (40), evaporates while passing through the outdoor heat exchanger (21) and the second adsorption heat exchanger (32) in this order, is sucked into and then compressed by the compressor (20).

In the second mode, an adsorption action for the first adsorption heat exchanger (31) and a regeneration action for the second adsorption heat exchanger (32) concurrently take place. During the second mode, as shown in FIG. 22(B), the first four-way selector valve (51) is set to the second position, the second four-way selector valve (52) is set to the first position and the opening of the motor-operated expansion valve (40) is appropriately controlled. Under these conditions, refrigerant discharged from the compressor (20) condenses while passing through the second adsorption heat exchanger (32) and the indoor heat exchanger (22) in this order, is reduced in pressure by the motor-operated expansion valve (40), evaporates while passing through the outdoor heat exchanger (21) and the first adsorption heat exchanger (31) in this order, is sucked into and then compressed by the compressor (20).

Furthermore, during the humidification heating operation, the room air heated by the indoor heat exchanger (22) is supplied to the room while the room air humidified by the first adsorption heat exchanger (31) during the first mode and the room air humidified by the second adsorption heat exchanger (32) during the second mode are alternately supplied to the room.

Effects of Embodiment 10

According to the present embodiment, the following effect can be obtained in addition to the effects obtained by the above Embodiment 1. Specifically, in the present embodiment, the refrigerant discharged from the compressor (20) is first introduced into the adsorption heat exchanger (31, 32) serving as a condenser. Therefore, the refrigerant at the highest temperature can be introduced into the adsorption heat exchanger to use it for heating the adsorbent, which provides a sufficient temperature increase of the adsorbent to ensure the regeneration of the adsorbent.

Embodiment 11 of the Invention

Embodiment 11 of the present invention is described. An air conditioning system of the present embodiment varies in the configuration of the refrigerant circuit (10) from the air conditioning system of Embodiment 8.

As shown in FIGS. 23 and 24, the refrigerant circuit (10) is provided with a single compressor (20), two motor-operated expansion valves (41, 42) and two four-way selector valves (51, 52). Further, the refrigerant circuit (10) is provided with a single outdoor heat exchanger (21), a single indoor heat exchanger (22) and two adsorption heat exchangers (31, 32). In this refrigerant circuit (10), the outdoor heat exchanger (21) constitutes a heat-source side heat exchanger while the indoor heat exchanger (22) and the first and second adsorption heat exchangers (31, 32) constitute utilization side heat exchangers. The outdoor heat exchanger (21), the indoor heat exchanger (22) and each of the adsorption heat exchangers (31, 32) are configured to be the same as those in Embodiment 8.

A description is given to the configuration of the refrigerant circuit (10). The compressor (20) is connected at its discharge side to the first port of the first four-way selector valve (51) and connected at its suction side to the second port of the first four-way selector valve (51). The second four-way selector valve (52) is connected at the first port thereof to the third port of the first four-way selector valve (51) and connected at the second port thereof to the fourth port of the first four-way selector valve (51). In the refrigerant circuit (10), the outdoor heat exchanger (21), the first motor-operated expansion valve (41) and the indoor heat exchanger (22) are arranged in this order from the third to fourth port of the first four-way selector valve (51). Further, in the refrigerant circuit (10), the first adsorption heat exchanger (31), the second motor-operated expansion valve (42) and the second adsorption heat exchanger (32) are arranged in this order from the third to fourth port of the second four-way selector valve (52).

In the above refrigerant circuit (10), a pipeline portion thereof running from the third to fourth port of the first four-way selector valve (51) constitutes a first circuit (11) and a pipeline portion thereof running from the third to fourth port of the second four-way selector valve (52) constitutes a second circuit (12). Further, in the refrigerant circuit (10), the second circuit (12) is connected to the first circuit (11) via the second four-way selector valve (52) and the first circuit (11) and the second circuit (12) are arranged in parallel with each other.

The first four-way selector valve (51) switches between a first position (a position shown in FIG. 23) in which the first and third ports communicate and the second and fourth ports communicate and a second position (a position shown in FIG. 24) in which the first and fourth ports communicate and the second and third ports communicate. On the other hand, the second four-way selector valve (52) switches between a first position (a position shown in FIGS. 23(A) and 24(B)) in which the first and third ports communicate and the second and fourth ports communicate and a second position (a position shown in FIGS. 23(B) and 24(A)) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 23.

During the dehumidification cooling operation, the first four-way selector valve (51) is set to the first position, the opening of the first motor-operated expansion valve (41) is appropriately controlled, the outdoor heat exchanger (21) in the first circuit (11) serves as a condenser and the indoor heat exchanger (22) therein serves as an evaporator. Thus, refrigerant discharged from the compressor (20) and then flowing into the first circuit (11) condenses in the outdoor heat exchanger (21), is reduced in pressure by the first motor-operated expansion valve (41), evaporates in the indoor heat exchanger (22), is sucked into and then compressed by the compressor (20).

Further, during the dehumidification cooling operation, a first mode in which the first adsorption heat exchanger (31) in the second circuit (21) serves as a condenser and the second adsorption heat exchanger (32) therein serves as an evaporator and a second mode in which the second adsorption heat exchanger (32) in the second circuit (21) serves as a condenser and the first adsorption heat exchanger (31) therein serves as an evaporator are repeatedly alternated.

The air flow during the first mode is the same as that during the first mode in the dehumidification cooling operation in Embodiment 8. Further, the air flow during the second mode is the same as that during the second mode in the dehumidification cooling operation in Embodiment 8.

Figure 23A:
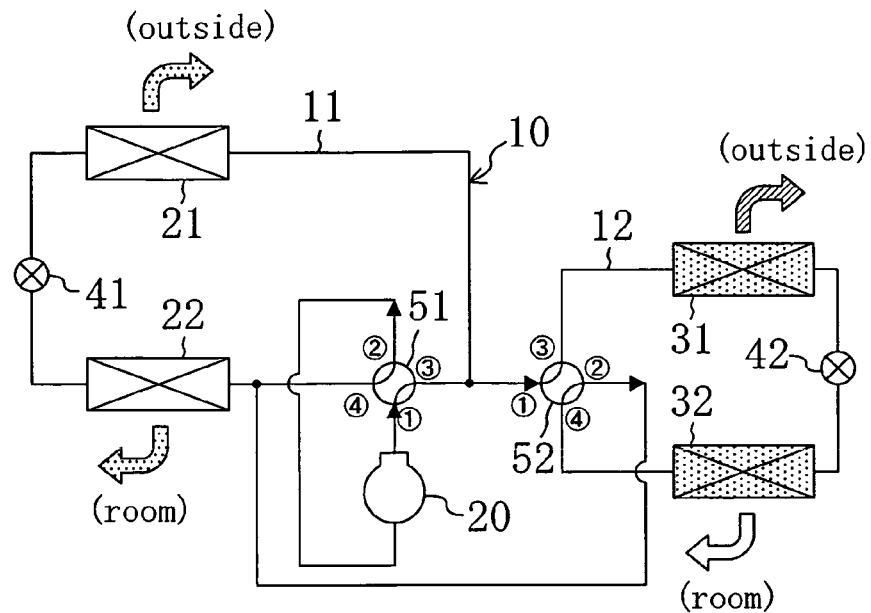
FIG. 23 is a schematic diagram showing the configuration of a refrigerant circuit in Embodiment 11 and its behavior during the dehumidification cooling operation.

In the first mode, a regeneration action for the first adsorption heat exchanger (31) and an adsorption action for the second adsorption heat exchanger (32) concurrently take place. During the first mode, as shown in FIG. 23(A), the second four-way selector valve (52) is set to the first position and the opening of the second motor-operated expansion valve (42) is appropriately controlled. Under these conditions, refrigerant discharged from the compressor (20) and then flowing into the second circuit (12) condenses in the first adsorption heat exchanger (31), is reduced in pressure by the second motor-operated expansion valve (42), evaporates in the second adsorption heat exchanger (32), is sucked into and then compressed by the compressor (20).

Figure 23B:
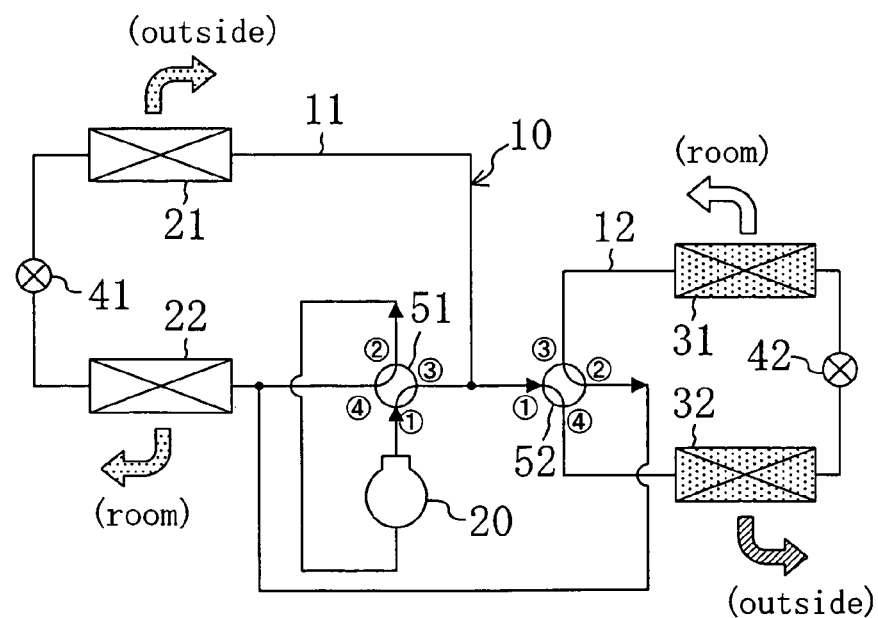

In the second mode, an adsorption action for the first adsorption heat exchanger (31) and a regeneration action for the second adsorption heat exchanger (32) concurrently take place. During the second mode, as shown in FIG. 23(B), the second four-way selector valve (52) is set to the second position and the opening of the second motor-operated expansion valve (42) is appropriately controlled. Under these conditions, refrigerant discharged from the compressor (20) and flowing into the second circuit (12) condenses in the second adsorption heat exchanger (32), is reduced in pressure by the second motor-operated expansion valve (42), evaporates in the first adsorption heat exchanger (31), is sucked into and then compressed by the compressor (20).

Furthermore, during the dehumidification cooling operation, the room air cooled by the indoor heat exchanger (22) is supplied to the room while the room air dehumidified by the second adsorption heat exchanger (32) during the first mode and the room air dehumidified by the first adsorption heat exchanger (31) during the second mode are alternately supplied to the room.

<Humidification Heating Operation>

The system's behavior during the humidification heating operation is described with reference to FIG. 24.

During the humidification heating operation, the first four-way selector valve (51) is set to the second position, the opening of the first motor-operated expansion valve (41) is appropriately controlled, the indoor heat exchanger (22) in the first circuit (11) serves as a condenser and the outdoor heat exchanger (21) therein serves as an evaporator. Thus, refrigerant discharged from the compressor (20) and then flowing into the first circuit (11) condenses in the indoor heat exchanger (22), is reduced in pressure by the first motor-operated expansion valve (41), evaporates in the outdoor heat exchanger (21), is sucked into and then compressed by the compressor (20).

Further, during the humidification heating operation, a first mode in which the first adsorption heat exchanger (31) in the second circuit (21) serves as a condenser and the second adsorption heat exchanger (32) therein serves as an evaporator and a second mode in which the second adsorption heat exchanger (32) in the second circuit (21) serves as a condenser and the first adsorption heat exchanger (31) therein serves as an evaporator are repeatedly alternated.

The air flow during the first mode is the same as that during the first mode in the humidification heating operation in Embodiment 8. Further, the air flow during the second mode is the same as that during the second mode in the humidification heating operation in Embodiment 8.

Figure 24A:
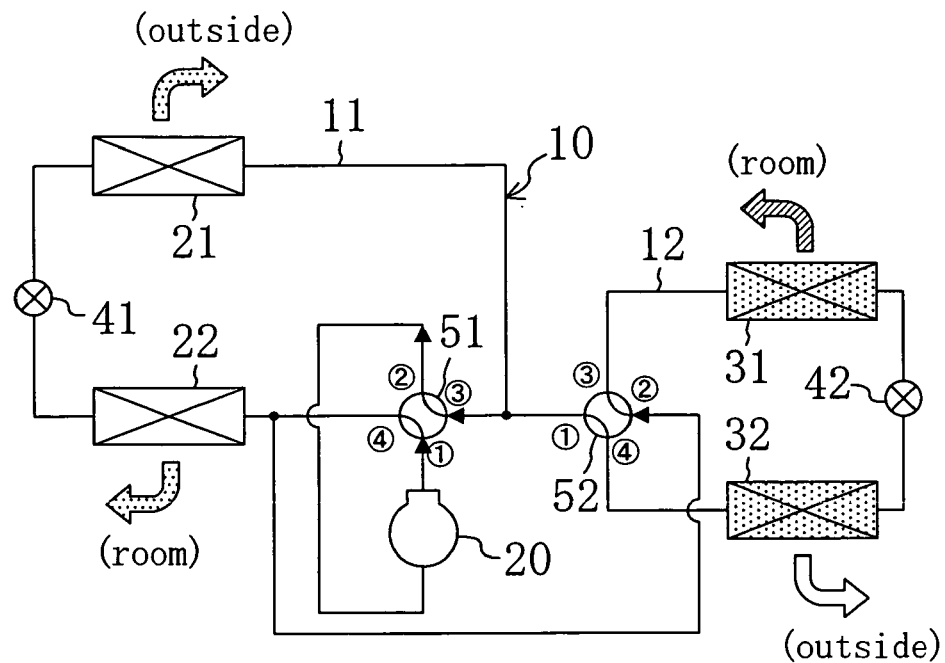
FIG. 24 is a schematic diagram showing the configuration of the refrigerant circuit in Embodiment 11 and its behavior during the humidification heating operation.

In the first mode, a regeneration action for the first adsorption heat exchanger (31) and an adsorption action for the second adsorption heat exchanger (32) concurrently take place. During the first mode, as shown in FIG. 24(A), the second four-way selector valve (52) is set to the second position and the opening of the second motor-operated expansion valve (42) is appropriately controlled. Under these conditions, refrigerant discharged from the compressor (20) and then flowing into the second circuit (12) condenses in the first adsorption heat exchanger (31), is reduced in pressure by the second motor-operated expansion valve (42), evaporates in the second adsorption heat exchanger (32), is sucked into and then compressed by the compressor (20).

Figure 24B:
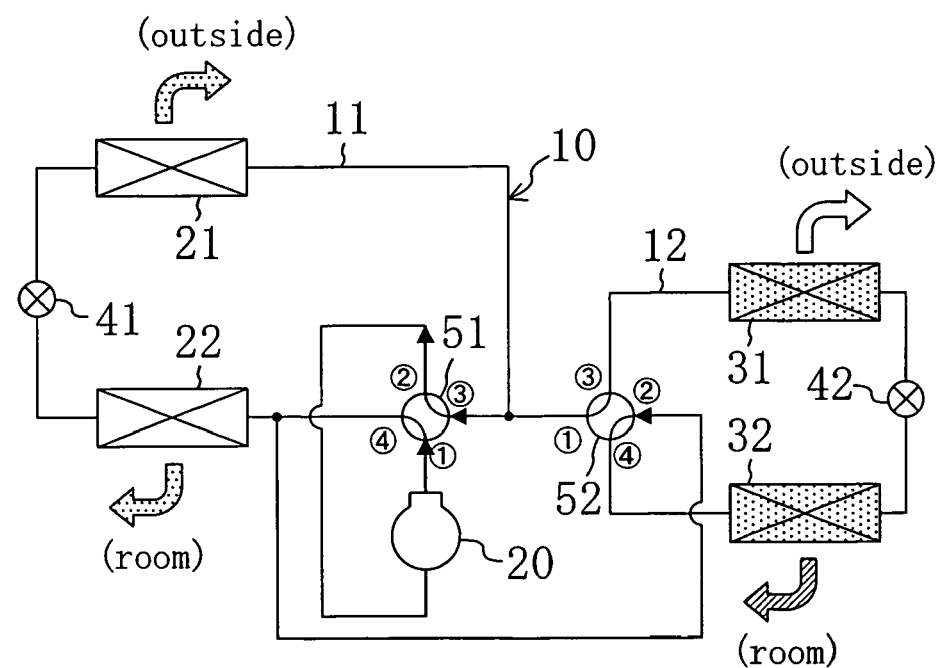

In the second mode, an adsorption action for the first adsorption heat exchanger (31) and a regeneration action for the second adsorption heat exchanger (32) concurrently take place. During the second mode, as shown in FIG. 24(B), the second four-way selector valve (52) is set to the first position and the opening of the second motor-operated expansion valve (42) is appropriately controlled. Under these conditions, refrigerant discharged from the compressor (20) and then flowing into the second circuit (12) condenses in the second adsorption heat exchanger (32), is reduced in pressure by the second motor-operated expansion valve (42), evaporates in the first adsorption heat exchanger (31), is sucked into and then compressed by the compressor (20).

Furthermore, during the humidification heating operation, the room air heated by the indoor heat exchanger (22) is supplied to the room while the room air humidified by the first adsorption heat exchanger (31) during the first mode and the room air humidified by the second adsorption heat exchanger (32) during the second mode are alternately supplied to the room.

Effects of Embodiment 11

According to the present embodiment, the following effects can be obtained in addition to the effects obtained by the above Embodiment 1.

First, in the refrigerant circuit (10) in the present embodiment, the first circuit (11) and the second circuit (12) are connected in parallel with each other. Therefore, the opening control over the first motor-operated expansion valve (41) disposed in the first circuit (11) need only be implemented so that the degree of superheat of refrigerant at the exit of the first circuit (11) is kept constant. Further, the opening control over the second motor-operated expansion valve (42) disposed in the second circuit (12) need only be implemented so that the degree of superheat of refrigerant at the exit of the second circuit (12) is kept constant. In other words, the control over the first motor-operated expansion valve (41) can be implemented in consideration of only the conditions of refrigerant in the first circuit (11) and the control over the second motor-operated expansion valve (42) can be implemented in consideration of only the conditions of refrigerant in the second circuit (12). Hence, according to the present embodiment, the operation control over the air conditioning system can be simplified.

Next, in the refrigerant circuit (10) in the present embodiment, the first four-way selector valve (51) and the second four-way selector valve (52) have their first ports always brought under higher pressure and their second ports always brought under lower pressure. Therefore, according to the present modification, it becomes possible to use pilot-operated four-way selector valves each of which has a port always being under higher pressure and a port always being under lower pressure.

Embodiment 12 of the Invention

Embodiment 12 of the present invention is described. An air conditioning system of the present embodiment varies in the configuration of the refrigerant circuit (10) from the air conditioning system of Embodiment 8.

As shown in FIGS. 25 and 26, the refrigerant circuit (10) is provided with a single compressor (20), two motor-operated expansion valves (41, 42) and two four-way selector valves (51, 52). Further, the refrigerant circuit (10) is provided with a single outdoor heat exchanger (21), a single indoor heat exchanger (22) and two adsorption heat exchangers (31, 32). In this refrigerant circuit (10), the outdoor heat exchanger (21) constitutes a heat-source side heat exchanger while the indoor heat exchanger (22) and the first and second adsorption heat exchangers (31, 32) constitute utilization side heat exchangers. The outdoor heat exchanger (21), the indoor heat exchanger (22) and each of the adsorption heat exchangers (31, 32) are configured to be the same as those in Embodiment 8.

A description is given to the configuration of the refrigerant circuit (10). The compressor (20) is connected at its discharge side to both the first port of the first four-way selector valve (51) and the second port of the second four-way selector valve (52) and connected at its suction side to both the second port of the first four-way selector valve (51) and the second port of the second four-way selector valve (52). In the refrigerant circuit (10), the outdoor heat exchanger (21), the first motor-operated expansion valve (41) and the indoor heat exchanger (22) are arranged in this order from the third to fourth port of the first four-way selector valve (51). Further, in the refrigerant circuit (10), the first adsorption heat exchanger (31), the second motor-operated expansion valve (42) and the second adsorption heat exchanger (32) are arranged in this order from the third to fourth port of the second four-way selector valve (52).

In the above refrigerant circuit (10), a pipeline portion thereof running from the third to fourth port of the first four-way selector valve (51) constitutes a first circuit (11) and a pipeline portion thereof running from the third to fourth port of the second four-way selector valve (52) constitutes a second circuit (12). Further, in the refrigerant circuit (10), the first circuit (11) is connected to the compressor (20) via the first four-way selector valve (51), the second circuit (12) is connected to the compressor (20) via the second four-way selector valve (52) and the first circuit (11) and the second circuit (12) are arranged in parallel with each other.

The first four-way selector valve (51) switches between a first position (a position shown in FIG. 25) in which the first and third ports communicate and the second and fourth ports communicate and a second position (a position shown in FIG. 26) in which the first and fourth ports communicate and the second and third ports communicate. On the other hand, the second four-way selector valve (52) switches between a first position (a position shown in FIGS. 25(A) and 26(A)) in which the first and third ports communicate and the second and fourth ports communicate and a second position (a position shown in FIGS. 25(B) and 26(B)) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 25.

During the dehumidification cooling operation, the first four-way selector valve (51) is set to the first position, the opening of the first motor-operated expansion valve (41) is appropriately controlled, the outdoor heat exchanger (21) in the first circuit (11) serves as a condenser and the indoor heat exchanger (22) therein serves as an evaporator. Thus, refrigerant discharged from the compressor (20) and then flowing into the first circuit (11) condenses in the outdoor heat exchanger (21), is reduced in pressure by the first motor-operated expansion valve (41), evaporates in the indoor heat exchanger (22), is sucked into and then compressed by the compressor (20).

Further, during the dehumidification cooling operation, a first mode in which the first adsorption heat exchanger (31) in the second circuit (21) serves as a condenser and the second adsorption heat exchanger (32) therein serves as an evaporator and a second mode in which the second adsorption heat exchanger (32) in the second circuit (21) serves as a condenser and the first adsorption heat exchanger (31) therein serves as an evaporator are repeatedly alternated.

The air flow during the first mode is the same as that during the first mode in the dehumidification cooling operation in Embodiment 8. Further, the air flow during the second mode is the same as that during the second mode in the dehumidification cooling operation in Embodiment 8.

Figure 25A:
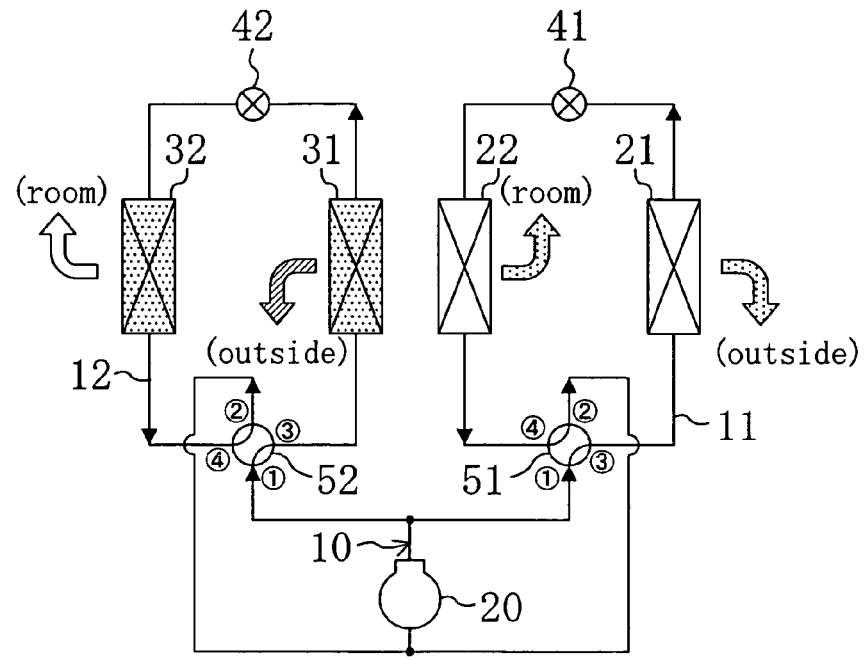
FIG. 25 is a schematic diagram showing the configuration of a refrigerant circuit in Embodiment 12 and its behavior during the dehumidification cooling operation.

In the first mode, a regeneration action for the first adsorption heat exchanger (31) and an adsorption action for the second adsorption heat exchanger (32) concurrently take place. During the first mode, as shown in FIG. 25(A), the second four-way selector valve (52) is set to the first position and the opening of the second motor-operated expansion valve (42) is appropriately controlled. Under these conditions, refrigerant discharged from the compressor (20) and then flowing into the second circuit (12) condenses in the first adsorption heat exchanger (31), is reduced in pressure by the second motor-operated expansion valve (42), evaporates in the second adsorption heat exchanger (32), is sucked into and then compressed by the compressor (20).

Figure 25B:
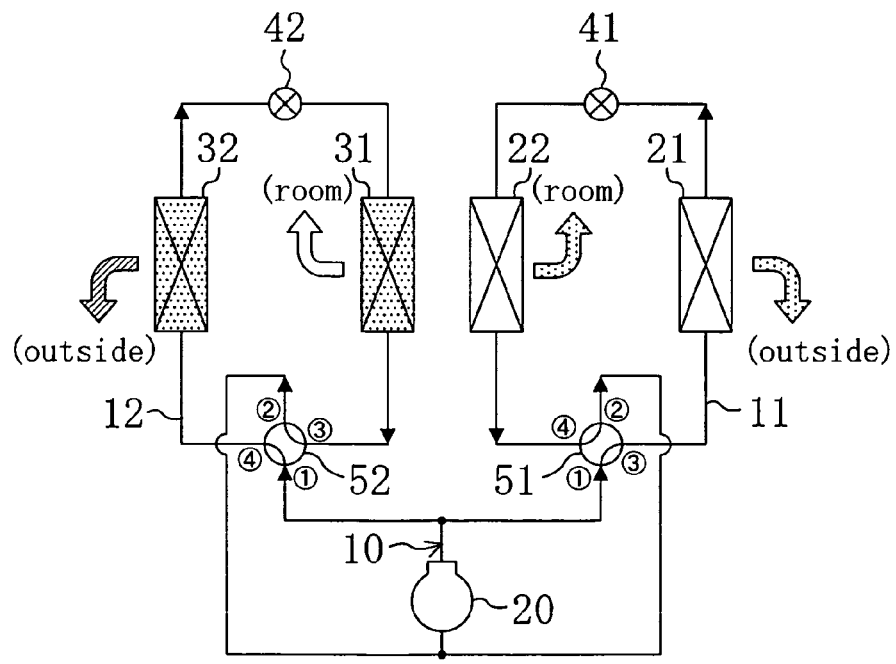

In the second mode, an adsorption action for the first adsorption heat exchanger (31) and a regeneration action for the second adsorption heat exchanger (32) concurrently take place. During the second mode, as shown in FIG. 25(B), the second four-way selector valve (52) is set to the second position and the opening of the second motor-operated expansion valve (42) is appropriately controlled. Under these conditions, refrigerant discharged from the compressor (20) and flowing into the second circuit (12) condenses in the second adsorption heat exchanger (32), is reduced in pressure by the second motor-operated expansion valve (42), evaporates in the first adsorption heat exchanger (31), is sucked into and then compressed by the compressor (20).

Furthermore, during the dehumidification cooling operation, the room air cooled by the indoor heat exchanger (22) is supplied to the room while the room air dehumidified by the second adsorption heat exchanger (32) during the first mode and the room air dehumidified by the first adsorption heat exchanger (31) during the second mode are alternately supplied to the room.

<Humidification Heating Operation>

The system's behavior during the humidification heating operation is described with reference to FIG. 26.

During the humidification heating operation, the first four-way selector valve (51) is set to the second position, the opening of the first motor-operated expansion valve (41) is appropriately controlled, the indoor heat exchanger (22) in the first circuit (11) serves as a condenser and the outdoor heat exchanger (21) therein serves as an evaporator. Thus, refrigerant discharged from the compressor (20) and then flowing into the first circuit (11) condenses in the indoor heat exchanger (22), is reduced in pressure by the first motor-operated expansion valve (41), evaporates in the outdoor heat exchanger (21), is sucked into and then compressed by the compressor (20).

Further, during the humidification heating operation, a first mode in which the first adsorption heat exchanger (31) in the second circuit (21) serves as a condenser and the second adsorption heat exchanger (32) therein serves as an evaporator and a second mode in which the second adsorption heat exchanger (32) in the second circuit (21) serves as a condenser and the first adsorption heat exchanger (31) therein serves as an evaporator are repeatedly alternated.

The air flow during the first mode is the same as that during the first mode in the humidification heating operation in Embodiment 8. Further, the air flow during the second mode is the same as that during the second mode in the humidification heating operation in Embodiment 8.

Figure 26A:
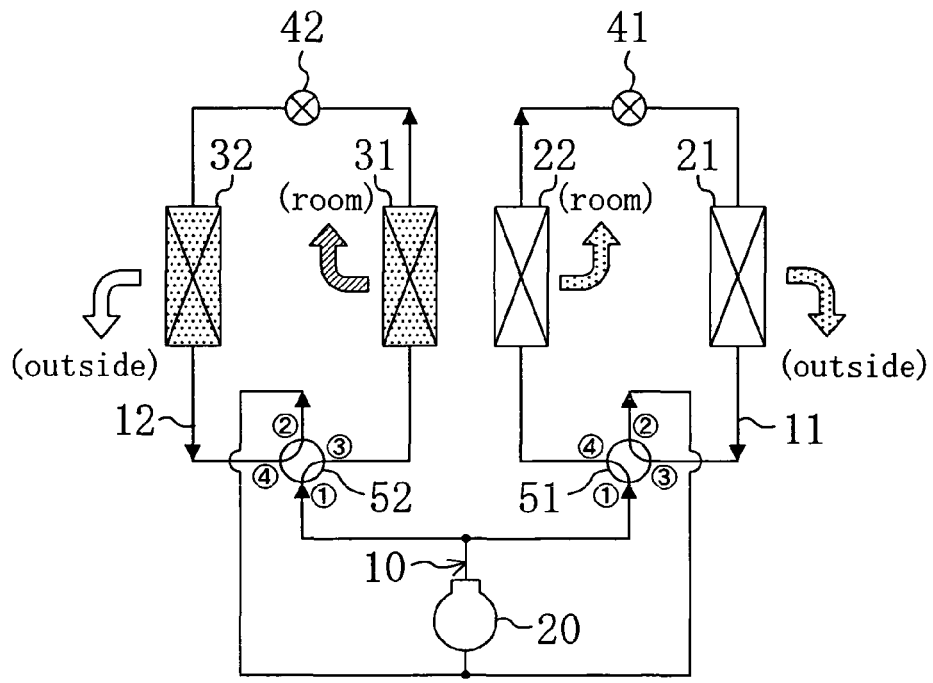
FIG. 26 is a schematic diagram showing the configuration of the refrigerant circuit in Embodiment 12 and its behavior during the humidification heating operation.

In the first mode, a regeneration action for the first adsorption heat exchanger (31) and an adsorption action for the second adsorption heat exchanger (32) concurrently take place. During the first mode, as shown in FIG. 26(A), the second four-way selector valve (52) is set to the first position and the opening of the second motor-operated expansion valve (42) is appropriately controlled. Under these conditions, refrigerant discharged from the compressor (20) and then flowing into the second circuit (12) condenses in the first adsorption heat exchanger (31), is reduced in pressure by the second motor-operated expansion valve (42), evaporates in the second adsorption heat exchanger (32), is sucked into and then compressed by the compressor (20).

Figure 26B:
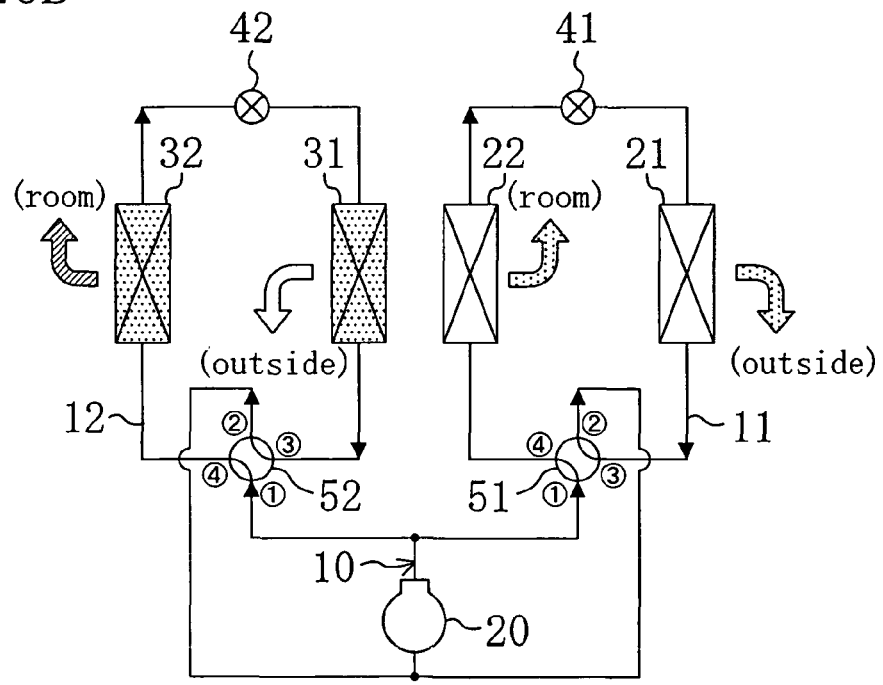

In the second mode, an adsorption action for the first adsorption heat exchanger (31) and a regeneration action for the second adsorption heat exchanger (32) concurrently take place. During the second mode, as shown in FIG. 26(B), the second four-way selector valve (52) is set to the second position and the opening of the second motor-operated expansion valve (42) is appropriately controlled. Under these conditions, refrigerant discharged from the compressor (20) and then flowing into the second circuit (12) condenses in the second adsorption heat exchanger (32), is reduced in pressure by the second motor-operated expansion valve (42), evaporates in the first adsorption heat exchanger (31), is sucked into and then compressed by the compressor (20).

Furthermore, during the humidification heating operation, the room air heated by the indoor heat exchanger (22) is supplied to the room while the room air humidified by the first adsorption heat exchanger (31) during the first mode and the room air humidified by the second adsorption heat exchanger (32) during the second mode are alternately supplied to the room.

Effects of Embodiment 12

According to the present embodiment, the same effects as obtained in the above Embodiment 11 can be obtained.

Embodiment 13 of the Invention

Embodiment 13 of the present invention is described. An air conditioning system of the present embodiment varies in the configuration of the refrigerant circuit (10) from the air conditioning system of Embodiment 8.

As shown in FIGS. 27 and 28, the refrigerant circuit (10) is provided with a single compressor (20), a single gas-liquid separator (23), two motor-operated expansion valves (41, 42) and two four-way selector valves (51, 52). Further, the refrigerant circuit (10) is provided with a single outdoor heat exchanger (21), a single indoor heat exchanger (22) and two adsorption heat exchangers (31, 32). In this refrigerant circuit (10), the outdoor heat exchanger (21) constitutes a heat-source side heat exchanger while the indoor heat exchanger (22) and the first and second adsorption heat exchangers (31, 32) constitute utilization side heat exchangers. The outdoor heat exchanger (21), the indoor heat exchanger (22) and each of the adsorption heat exchangers (31, 32) are configured to be the same as those in Embodiment 8.

A description is given to the configuration of the refrigerant circuit (10). The compressor (20) is connected at its discharge side to the first port of the first four-way selector valve (51) and connected at its suction side to the second port of the first four-way selector valve (51). In the refrigerant circuit (10), the outdoor heat exchanger (21), the gas-liquid separator (23), the first motor-operated expansion valve (41) and the indoor heat exchanger (22) are arranged in this order from the third to fourth port of the first four-way selector valve (51). The second four-way selector valve (52) is connected at its first port to the gas-side exit of the gas-liquid separator (23) and connected at its second port to the fourth port of the first four-way selector valve (51). Further, in the refrigerant circuit (10), the first adsorption heat exchanger (31), the second motor-operated expansion valve (42) and the second adsorption heat exchanger (32) are arranged in this order from the third to fourth port of the second four-way selector valve (52).

The first four-way selector valve (51) switches between a first position (a position shown in FIG. 27) in which the first and third ports communicate and the second and fourth ports communicate and a second position (a position shown in FIG. 28) in which the first and fourth ports communicate and the second and third ports communicate. On the other hand, the second four-way selector valve (52) switches between a first position (a position shown in FIGS. 27(A) and 28(B)) in which the first and third ports communicate and the second and fourth ports communicate and a second position (a position shown in FIGS. 27(B) and 28(A)) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 27.

During the dehumidification cooling operation, the first four-way selector valve (51) is set to the first position, the opening of the first motor-operated expansion valve (41) is appropriately controlled, the outdoor heat exchanger (21) serves as a condenser and the indoor heat exchanger (22) serves as an evaporator. Under these conditions, refrigerant discharged from the compressor (20) partly condenses in the outdoor heat exchanger (21) and then flows into the gas-liquid separator (23) so that it is separated into liquid and gas refrigerants. Then, the liquid refrigerant having flowed out of the gas-liquid separator (23) is reduced in pressure by the first motor-operated expansion valve (41), evaporates in the indoor heat exchanger (22), is sucked into and then compressed by the compressor (20).

Further, during the dehumidification cooling operation, a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated.

The air flow during the first mode is the same as that during the first mode in the dehumidification cooling operation in Embodiment 8. Further, the air flow during the second mode is the same as that during the second mode in the dehumidification cooling operation in Embodiment 8.

Figure 27A:
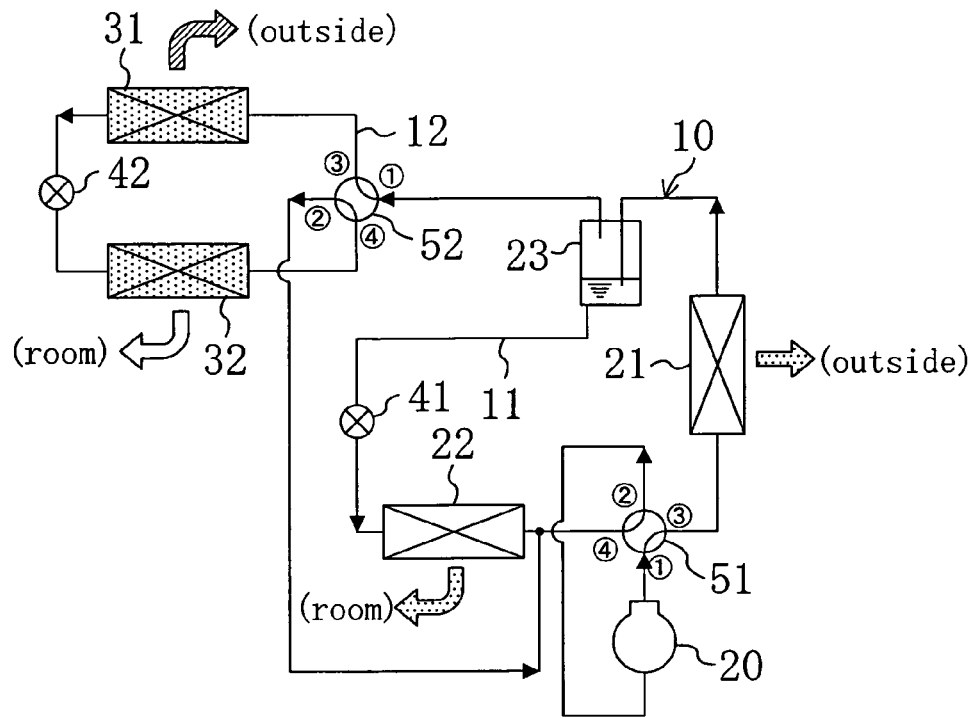
FIG. 27 is a schematic diagram showing the configuration of a refrigerant circuit in Embodiment 13 and its behavior during the dehumidification cooling operation.

In the first mode, a regeneration action for the first adsorption heat exchanger (31) and an adsorption action for the second adsorption heat exchanger (32) concurrently take place. During the first mode, as shown in FIG. 27(A), the second four-way selector valve (52) is set to the first position and the opening of the second motor-operated expansion valve (42) is appropriately controlled. Under these conditions, gas refrigerant having flowed out of the gas-liquid separator (23) condenses in the first adsorption heat exchanger (31), is reduced in pressure by the second motor-operated expansion valve (42), evaporates in the second adsorption heat exchanger (32), is sucked into and then compressed by the compressor (20).

Figure 27B:
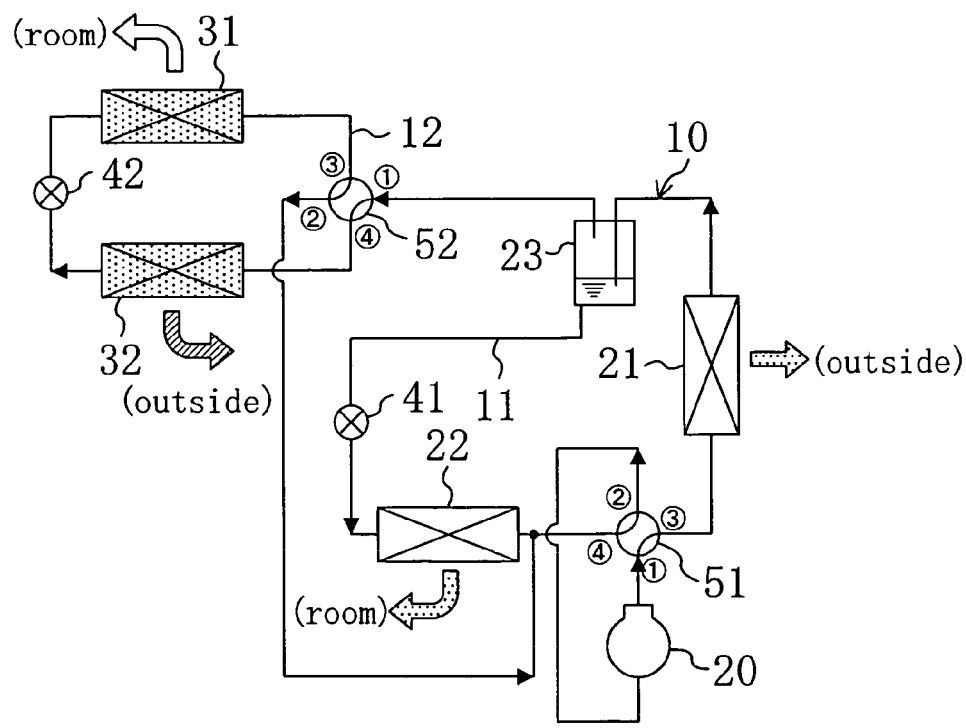

In the second mode, an adsorption action for the first adsorption heat exchanger (31) and a regeneration action for the second adsorption heat exchanger (32) concurrently take place. During the second mode, as shown in FIG. 27(B), the second four-way selector valve (52) is set to the second position and the opening of the second motor-operated expansion valve (42) is appropriately controlled. Under these conditions, gas refrigerant having flowed out of the gas-liquid separator (23) condenses in the second adsorption heat exchanger (32), is reduced in pressure by the second motor-operated expansion valve (42), evaporates in the first adsorption heat exchanger (31), is sucked into and then compressed by the compressor (20).

Furthermore, during the dehumidification cooling operation, the room air cooled by the indoor heat exchanger (22) is supplied to the room while the room air dehumidified by the second adsorption heat exchanger (32) during the first mode and the room air dehumidified by the first adsorption heat exchanger (31) during the second mode are alternately supplied to the room.

<Humidification Heating Operation>

The system's behavior during the humidification heating operation is described with reference to FIG. 28.

During the humidification heating operation, the first four-way selector valve (51) is set to the second position, the opening of the first motor-operated expansion valve (41) is appropriately controlled, the indoor heat exchanger (22) serves as a condenser and the outdoor heat exchanger (21) serves as an evaporator. Under these conditions, refrigerant discharged from the compressor (20) is divided into two streams: one stream toward the indoor heat exchanger (22) and the other stream toward the second four-way selector valve (52). Then, the refrigerant having flowed toward the indoor heat exchanger (22) condenses in the indoor heat exchanger (22), is reduced in pressure by the first motor-operated expansion valve (41), and then flows into the gas-liquid separator (23).

Further, during the humidification heating operation, a first mode in which the first adsorption heat exchanger (31) in the second circuit (12) serves as a condenser and the second adsorption heat exchanger (32) therein serves as an evaporator and a second mode in which the second adsorption heat exchanger (32) serves as a condenser and the first adsorption heat exchanger (31) serves as an evaporator are repeatedly alternated.

The air flow during the first mode is the same as that during the first mode in the humidification heating operation in Embodiment 8. Further, the air flow during the second mode is the same as that during the second mode in the humidification heating operation in Embodiment 8.

Figure 28A:
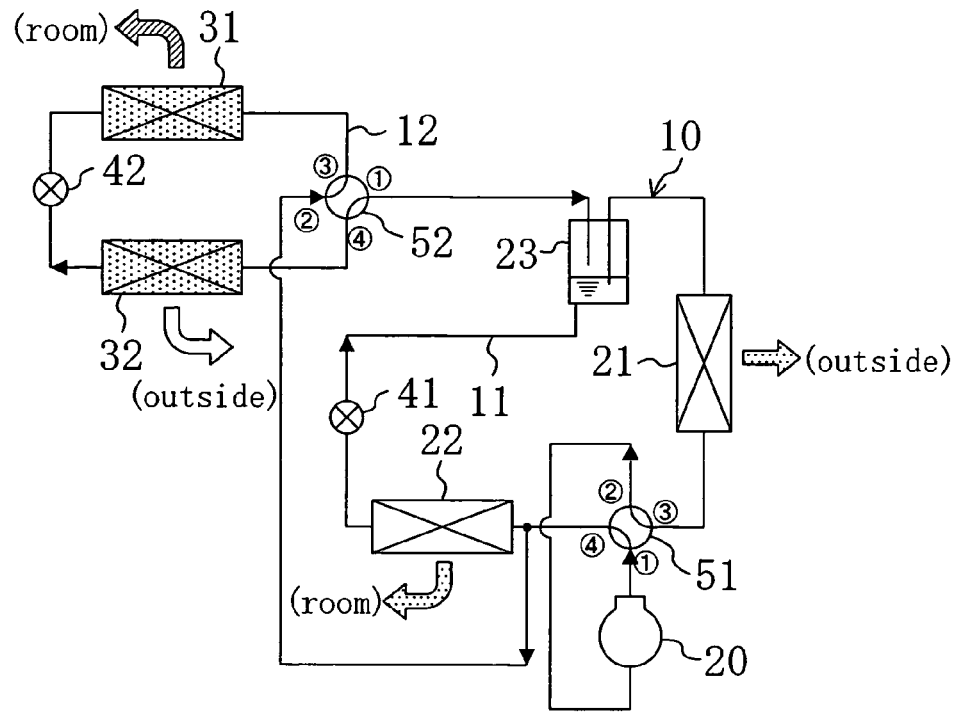
FIG. 28 is a schematic diagram showing the configuration of the refrigerant circuit in Embodiment 13 and its behavior during the humidification heating operation.

In the first mode, a regeneration action for the first adsorption heat exchanger (31) and an adsorption action for the second adsorption heat exchanger (32) concurrently take place. During the first mode, as shown in FIG. 28(A), the second four-way selector valve (52) is set to the second position and the opening of the second motor-operated expansion valve (42) is appropriately controlled. Under these conditions, refrigerant having flowed toward the second four-way selector valve (52) condenses in the first adsorption heat exchanger (31), is reduced in pressure by the second motor-operated expansion valve (42), evaporates in the second adsorption heat exchanger (32), flows into the gas-liquid separator (23) and merges therein with refrigerant flowing from the indoor heat exchanger (22). The refrigerant having flowed out of the gas-liquid separator (23) evaporates in the outdoor heat exchanger (21) and is sucked into and then compressed by the compressor (20).

Figure 28B:
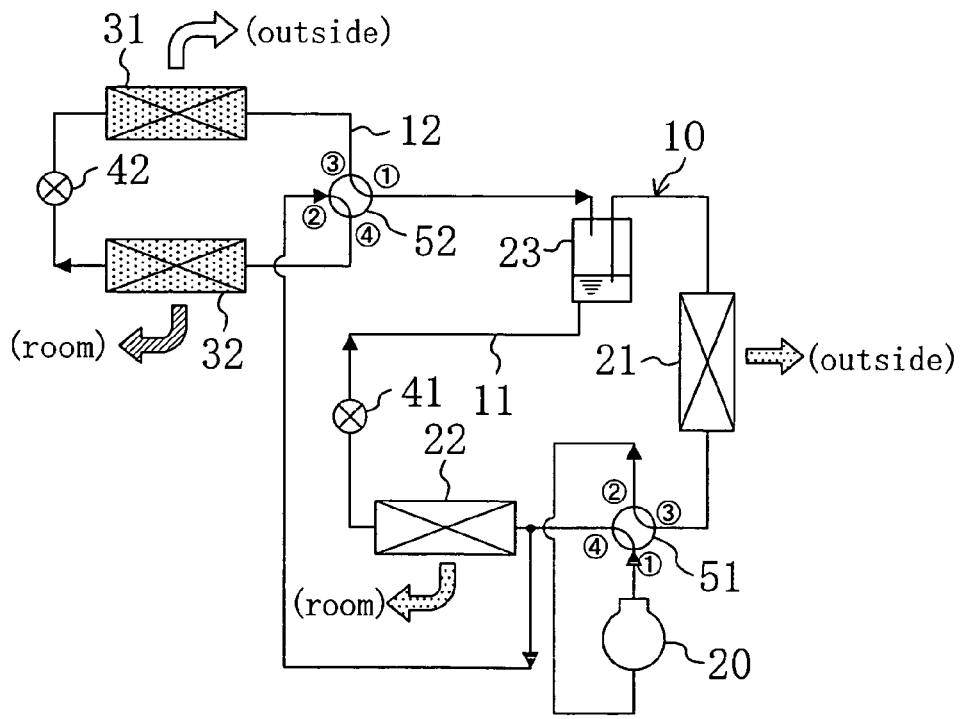

In the second mode, an adsorption action for the first adsorption heat exchanger (31) and a regeneration action for the second adsorption heat exchanger (32) concurrently take place. During the second mode, as shown in FIG. 28(B), the second four-way selector valve (52) is set to the first position and the opening of the second motor-operated expansion valve (42) is appropriately controlled. Under these conditions, refrigerant having flowed toward the second four-way selector valve (52) condenses in the second adsorption heat exchanger (32), is reduced in pressure by the second motor-operated expansion valve (42), evaporates in the first adsorption heat exchanger (31), flows into the gas-liquid separator (23) and then merges therein with refrigerant flowing from the indoor heat exchanger (22). The refrigerant having flowed out of the gas-liquid separator (23) evaporates in the outdoor heat exchanger (21), is sucked into and then compressed by the compressor (20).

Furthermore, during the humidification heating operation, the room air heated by the indoor heat exchanger (22) is supplied to the room while the room air humidified by the first adsorption heat exchanger (31) during the first mode and the room air humidified by the second adsorption heat exchanger (32) during the second mode are alternately supplied to the room.

Effects of Embodiment 13

According to the present embodiment, the following effects can be obtained in addition to the effects obtained by the above Embodiment 1.

First, in the case where the air conditioning system of the present embodiment is configured as a so-called separate type, it can be avoided that the number of steps for installation work increases. Specifically, if the air conditioning system employs the structure in which the compressor (20), the first four-way selector valve (51) and the outdoor heat exchanger (21) are contained in an outdoor-side unit and the first and second adsorption heat exchangers (32), the indoor heat exchanger (22), the second four-way selector valve (52), the first and second motor-operated expansion valves (41, 42) and the gas-liquid separator (23) are contained in a room-side unit, it is needed only to connect the outdoor-side unit and the room-side unit through two connecting pipes. Therefore, according to the present embodiment, it can be avoided to increase the number of connecting pipes for connecting the outdoor-side unit and the room-side unit. As a result, the number of steps for installation work can be reduced to the same number of steps for installation work for common air conditioners.

Next, during the dehumidification cooling operation, the refrigerant having flowed out of the outdoor heat exchanger (21) is separated into liquid and gas refrigerants by the gas-liquid separator (23) and only the separated gas refrigerant is supplied to the adsorption heat exchanger (31, 32) serving as a condenser. Therefore, according to the present embodiment, a sufficient amount of heat is available for the adsorbent in the adsorption heat exchanger (31, 32) serving as a condenser. This ensures the regeneration of the adsorbent.

Modification of Embodiment 13

In the refrigerant circuit (10) in the present embodiment, as shown in FIGS. 29 and 30, it may be possible that the outdoor heat exchanger (21) and the first adsorption heat exchanger (31) change places and the indoor heat exchanger (22) and the second adsorption heat exchanger (32) change places.

Specifically, in the refrigerant circuit (10) of the present modification, the first adsorption heat exchanger (31), the gas-liquid separator (23), the first motor-operated expansion valve (41) and the second adsorption heat exchanger (32) are arranged in this order from the third to fourth port of the first four-way selector valve (51). Further, in this refrigerant circuit (10), the outdoor heat exchanger (21), the second motor-operated expansion valve (42) and the indoor heat exchanger (22) are arranged in this order from the third to fourth port of the second four-way selector valve (52).

Figure 29A:
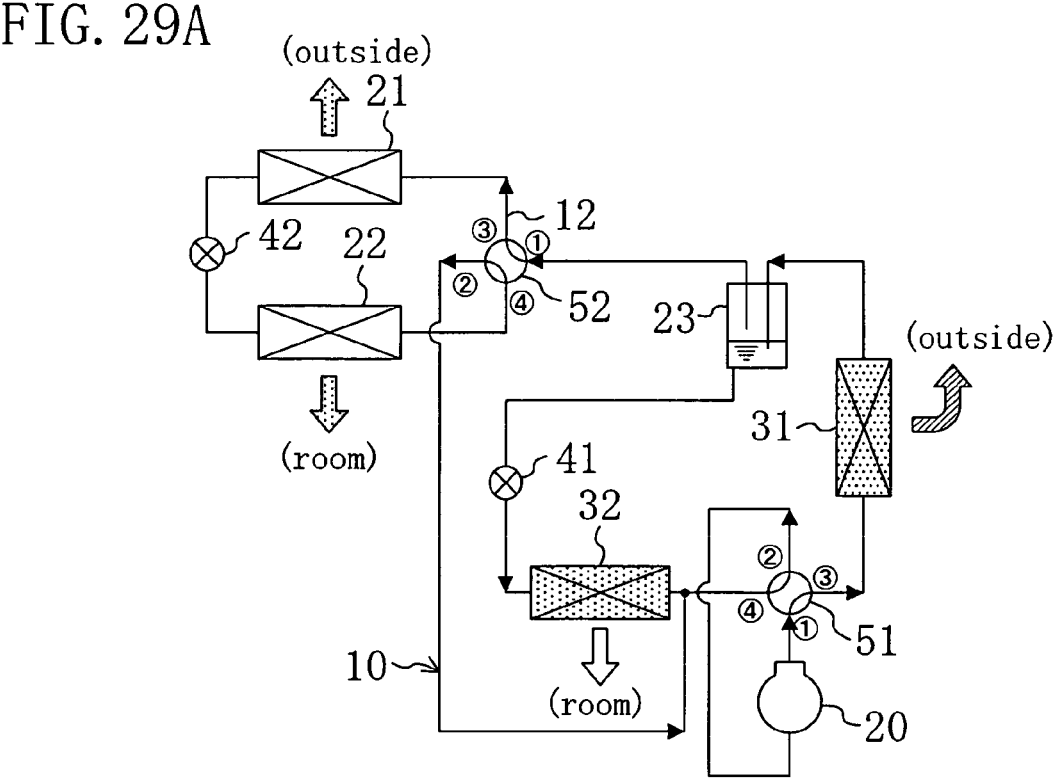
FIG. 29 is a schematic diagram showing the configuration of a refrigerant circuit in a modification of Embodiment 13 and its behavior during the dehumidification cooling operation.

During the first mode in the dehumidification cooling operation, as shown in FIG. 29(A), the first four-way selector valve (51) and the second four-way selector valve (52) are set to their first positions and the openings of the first motor-operated expansion valve (41) and the second motor-operated expansion valve (42) are individually controlled as appropriate. Under these conditions, refrigerant discharged from the compressor (20) condenses in the first adsorption heat exchanger (31) and then flows into the gas-liquid separator (23). The liquid refrigerant having flowed out of the gas-liquid separator (23) is reduced in pressure by the first motor-operated expansion valve (41), evaporates in the second adsorption heat exchanger (32), is sucked into and then compressed by the compressor (20). On the other hand, the gas refrigerant having flowed out of the gas-liquid separator (23) condenses in the outdoor heat exchanger (21), is reduced in pressure by the second motor-operated expansion valve (42), evaporates in the indoor heat exchanger (22), is sucked into and then compressed by the compressor (20).

Figure 29B:
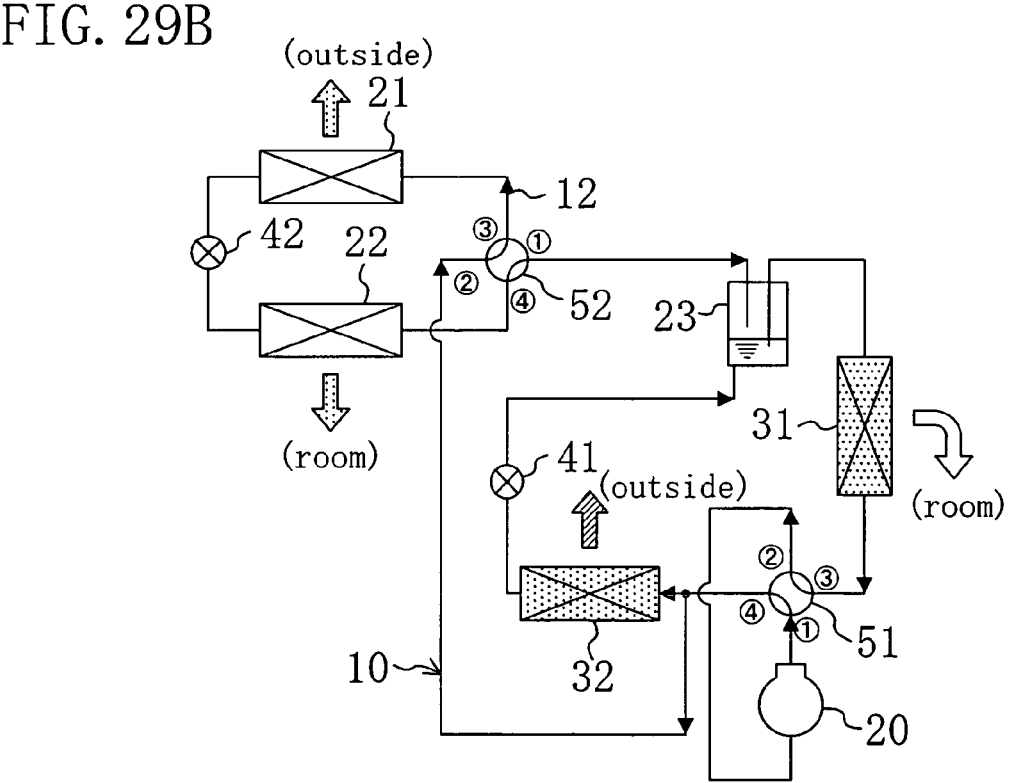

During the second mode in the dehumidification cooling operation, as shown in FIG. 29(B), the first four-way selector valve (51) and the second four-way selector valve (52) are set to their second positions and the openings of the first motor-operated expansion valve (41) and the second motor-operated expansion valve (42) are individually controlled as appropriate. Under these conditions, part of refrigerant discharged from the compressor (20) flows into the second adsorption heat exchanger (32) and the rest flows into the outdoor heat exchanger (21). The refrigerant having flowed into the second adsorption heat exchanger (32) condenses therein, is reduced in pressure by the first motor-operated expansion valve (41) and then flows into the gas-liquid separator (23). The refrigerant having flowed into the outdoor heat exchanger (21) condenses therein, is reduced in pressure by the second motor-operated expansion valve (42), evaporates in the indoor heat exchanger (22) and then flows into the gas-liquid separator (23). The refrigerant having flowed out of the gas-liquid separator (23) evaporates in the first adsorption heat exchanger (31), is sucked into and then compressed by the compressor (20).

Figure 30A:
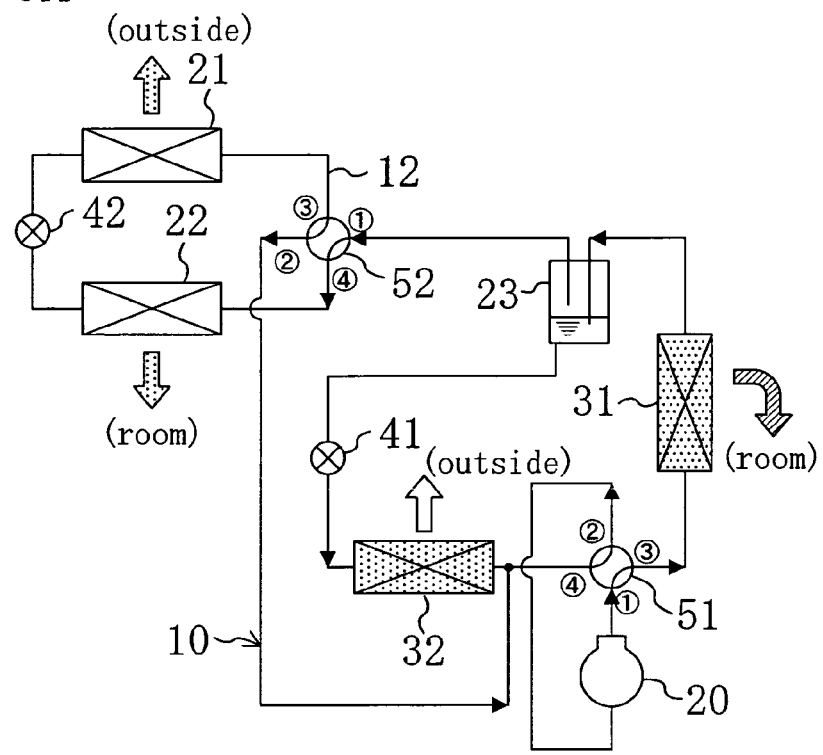
FIG. 30 is a schematic diagram showing the configuration of the refrigerant circuit in the modification of Embodiment 13 and its behavior during the humidification heating operation.

During the first mode in the humidification heating operation, as shown in FIG. 30(A), the first four-way selector valve (51) is set to the first position, the second four-way selector valve (52) is set to the second position and the openings of the first motor-operated expansion valve (41) and the second motor-operated expansion valve (42) are individually controlled as appropriate. Under these conditions, refrigerant discharged from the compressor (20) condenses in the first adsorption heat exchanger (31) and then flows into the gas-liquid separator (23). The liquid refrigerant having flowed out of the gas-liquid separator (23) is reduced in pressure by the first motor-operated expansion valve (41), evaporates in the second adsorption heat exchanger (32), is sucked into and then compressed by the compressor (20). On the other hand, the gas refrigerant having flowed out of the gas-liquid separator (23) condenses in the indoor heat exchanger (22), is reduced in pressure by the second motor-operated expansion valve (42), evaporates in the outdoor heat exchanger (21), is sucked into and then compressed by the compressor (20).

Figure 30B:
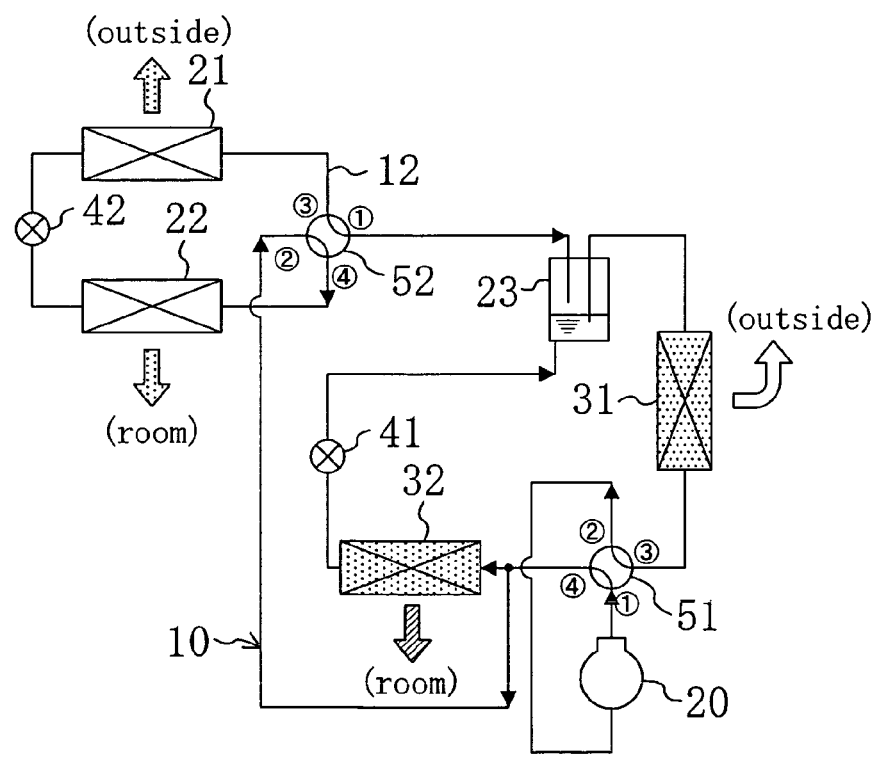

During the second mode in the humidification heating operation, as shown in FIG. 30(B), the first four-way selector valve (51) is set to the second position, the second four-way selector valve (52) is set to the first position and the openings of the first motor-operated expansion valve (41) and the second motor-operated expansion valve (42) are individually controlled as appropriate. Under these conditions, part of refrigerant discharged from the compressor (20) flows into the second adsorption heat exchanger (32) and the rest flows into the indoor heat exchanger (22). The refrigerant having flowed into the second adsorption heat exchanger (32) condenses therein, is reduced in pressure by the first motor-operated expansion valve (41) and then flows into the gas-liquid separator (23). The refrigerant having flowed into the indoor heat exchanger (22) condenses therein, is reduced in pressure by the second motor-operated expansion valve (42), evaporates in the outdoor heat exchanger (21) and then flows into the gas-liquid separator (23). The refrigerant having flowed out of the gas-liquid separator (23) evaporates in the first adsorption heat exchanger (31), is sucked into and then compressed by the compressor (20).

Embodiment 14 of the Invention

Embodiment 14 of the present invention is described. An air conditioning system of the present embodiment varies in the configuration of the refrigerant circuit (10) from the air conditioning system of Embodiment 8.

As shown in FIGS. 31 and 32, the refrigerant circuit (10) is provided with a single compressor (20), a single motor-operated expansion valve (40), a single four-way selector valve (50) and two solenoid valves (61, 62). Further, the refrigerant circuit (10) is provided with a single outdoor heat exchanger (21), a single indoor heat exchanger (22) and two adsorption heat exchangers (31, 32). In this refrigerant circuit (10), the outdoor heat exchanger (21) constitutes a heat-source side heat exchanger while the indoor heat exchanger (22) and the first and second adsorption heat exchangers (31, 32) constitute utilization side heat exchangers. The outdoor heat exchanger (21), the indoor heat exchanger (22) and each of the adsorption heat exchangers (31, 32) are configured to be the same as those in Embodiment 8.

A description is given to the configuration of the refrigerant circuit (10). The compressor (20) is connected at its discharge side to one end of the first adsorption heat exchanger (31) and one end of the second adsorption heat exchanger (32) and connected at its suction side to the second port of the four-way selector valve (50). The other end of the first adsorption heat exchanger (31) and the other end of the second adsorption heat exchanger (32) are both connected to the first port of the four-way selector valve (50) via the first solenoid valve (61) and the second solenoid valve (62), respectively. In the refrigerant circuit (10), the outdoor heat exchanger (21), the motor-operated expansion valve (40) and the indoor heat exchanger (22) are arranged in this order from the third to fourth port of the four-way selector valve (50).

The four-way selector valve (50) switches between a first position (a position shown in FIG. 31) in which the first and third ports communicate and the second and fourth ports communicate and a second position (a position shown in FIG. 32) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 31.

During the dehumidification cooling operation, the four-way selector valve (50) is set to the first position, the opening of the motor-operated expansion valve (40) is appropriately controlled, the outdoor heat exchanger (21) serves as a condenser and the indoor heat exchanger (22) serves as an evaporator. Further, a first mode in which the first adsorption heat exchanger (31) serves as a condenser and the second adsorption heat exchanger (32) is in non-operating condition and a second mode in which the second adsorption heat exchanger (32) serves as a condenser and the first adsorption heat exchanger (31) is in non-operating condition are repeatedly alternated.

Furthermore, during the dehumidification cooling operation, outdoor air is supplied to the outdoor heat exchanger (21) and room air is supplied to the first and second adsorption heat exchangers (31, 32). Then, the air having passed through the indoor heat exchanger (22) is continuously supplied to the room while the air having passed through the first adsorption heat exchanger (31) and the air having passed through the second adsorption heat exchanger (32) are alternately supplied to the room.

Figure 31A:
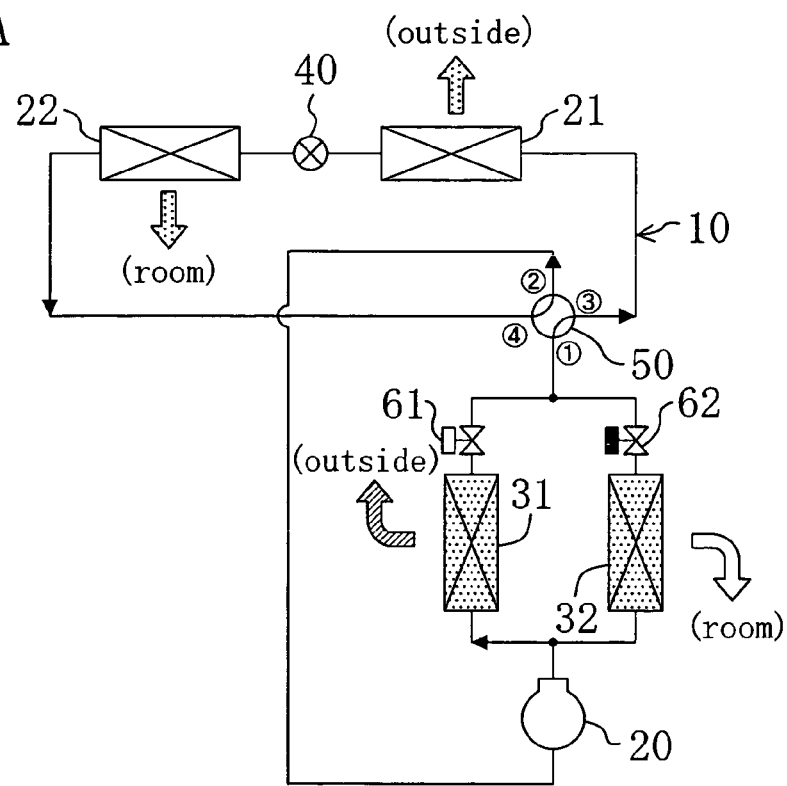
FIG. 31 is a schematic diagram showing the configuration of a refrigerant circuit in Embodiment 14 and its behavior during the dehumidification cooling operation.

In the first mode, a regeneration action for the first adsorption heat exchanger (31) and an adsorption action for the second adsorption heat exchanger (32) concurrently take place. During the first mode, as shown in FIG. 31(A), the first solenoid valve (61) is opened and the second solenoid valve (62) is closed. Under these conditions, refrigerant discharged from the compressor (20) condenses while passing through the first adsorption heat exchanger (31) and the outdoor heat exchanger (21) in this order, is reduced in pressure by the motor-operated expansion valve (40), evaporates in the indoor heat exchanger (22), is sucked into and then compressed by the compressor (20). In this case, the flow of refrigerant into the second adsorption heat exchanger (32) is shut off by the second solenoid valve (62).

During the first mode, the outdoor air having taken heat from refrigerant in the outdoor heat exchanger (21) is discharged to the outside atmosphere while the room air cooled by the indoor heat exchanger (22) is returned to the room. In the first adsorption heat exchanger (31), moisture is desorbed from the adsorbent heated by refrigerant and the desorbed moisture is applied to the air. The moisture desorbed from the first adsorption heat exchanger (31) is discharged to the outside atmosphere together with the air. In the second adsorption heat exchanger (32), moisture in the room air is adsorbed by the adsorbent to dehumidify the room air. The room air dehumidified by the second adsorption heat exchanger (32) is returned to the room.

Figure 31B:
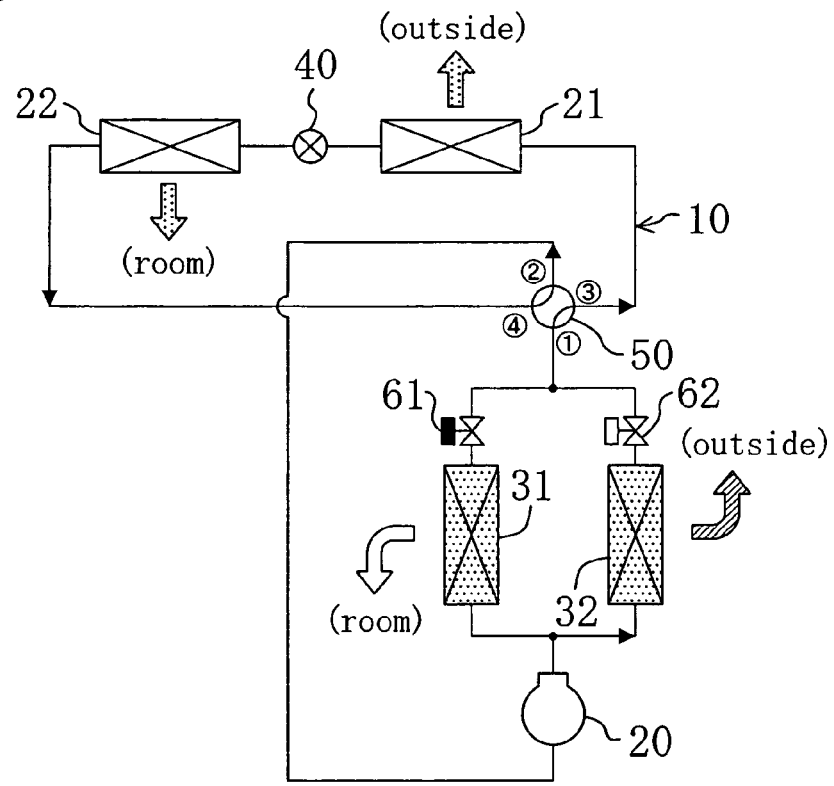

In the second mode, an adsorption action for the first adsorption heat exchanger (31) and a regeneration action for the second adsorption heat exchanger (32) concurrently take place. During the second mode, as shown in FIG. 31(B), the first solenoid valve (61) is closed and the second solenoid valve (62) is opened. Under these conditions, refrigerant discharged from the compressor (20) condenses while passing through the second adsorption heat exchanger (32) and the outdoor heat exchanger (21) in this order, is reduced in pressure by the motor-operated expansion valve (40), evaporates in the indoor heat exchanger (22), is sucked into and then compressed by the compressor (20). In this case, the flow of refrigerant into the first adsorption heat exchanger (31) is shut off by the first solenoid valve (61).

During the second mode, the outdoor air having taken heat from refrigerant in the outdoor heat exchanger (21) is discharged to the outside atmosphere while the room air cooled by the indoor heat exchanger (22) is returned to the room. In the first adsorption heat exchanger (31), moisture in the room air is adsorbed by the adsorbent to dehumidify the room air. The room air dehumidified by the first adsorption heat exchanger (31) is returned to the room. In the second adsorption heat exchanger (32), moisture is desorbed from the adsorbent heated by refrigerant and the desorbed moisture is applied to the air. The moisture desorbed from the second adsorption heat exchanger (32) is discharged to the outside atmosphere together with the air.

<Humidification Heating Operation>

The system's behavior during the humidification heating operation is described with reference to FIG. 31.

During the humidification heating operation, the four-way selector valve (50) is set to the second position, the opening of the motor-operated expansion valve (40) is appropriately controlled, the indoor heat exchanger (22) serves as a condenser and the outdoor heat exchanger (21) serves as an evaporator. Further, a first mode in which the first adsorption heat exchanger (31) serves as a condenser and the second adsorption heat exchanger (32) is in non-operating condition and a second mode in which the second adsorption heat exchanger (32) serves as a condenser and the first adsorption heat exchanger (31) is in non-operating condition are repeatedly alternated.

Furthermore, during the humidification heating operation, outdoor air is supplied to the outdoor heat exchanger (21) and room air is supplied to the indoor heat exchanger (22) and the first and second adsorption heat exchangers (31, 32). Then, the air having passed through the indoor heat exchanger (22) is continuously supplied to the room while the air having passed through the first adsorption heat exchanger (31) and the air having passed through the second adsorption heat exchanger (32) are alternately supplied to the room.

Figure 32A:
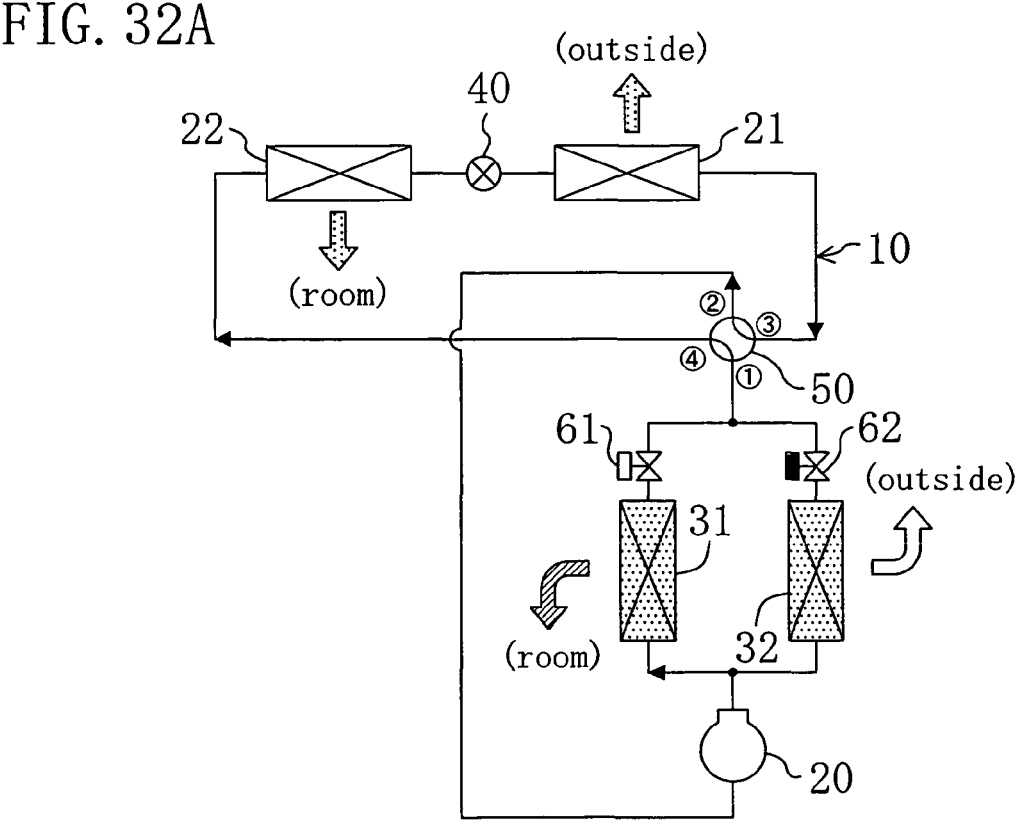
FIG. 32 is a schematic diagram showing the configuration of the refrigerant circuit in Embodiment 14 and its behavior during the humidification heating operation.

In the first mode, a regeneration action for the first adsorption heat exchanger (31) and an adsorption action for the second adsorption heat exchanger (32) concurrently take place. During the first mode, as shown in FIG. 32(A), the first solenoid valve (61) is opened and the second solenoid valve (62) is closed. Under these conditions, refrigerant discharged from the compressor (20) condenses while passing through the first adsorption heat exchanger (31) and the indoor heat exchanger (22) in this order, is reduced in pressure by the motor-operated expansion valve (40), evaporates in the outdoor heat exchanger (21), is sucked into and then compressed by the compressor (20). In this case, the flow of refrigerant into the second adsorption heat exchanger (32) is shut off by the second solenoid valve (62).

During the first mode, the outdoor air having released heat to refrigerant in the outdoor heat exchanger (21) is discharged to the outside atmosphere while the room air heated by the indoor heat exchanger (22) is returned to the room. In the first adsorption heat exchanger (31), moisture is desorbed from the adsorbent heated by refrigerant and the desorbed moisture is applied to the air. The room air dried by the first adsorption heat exchanger (31) is discharged to the outside atmosphere. In the second adsorption heat exchanger (32), moisture in the room air is adsorbed by the adsorbent to dehumidify the room air. The room air humidified by the second adsorption heat exchanger (32) is returned to the room.

Figure 32B:
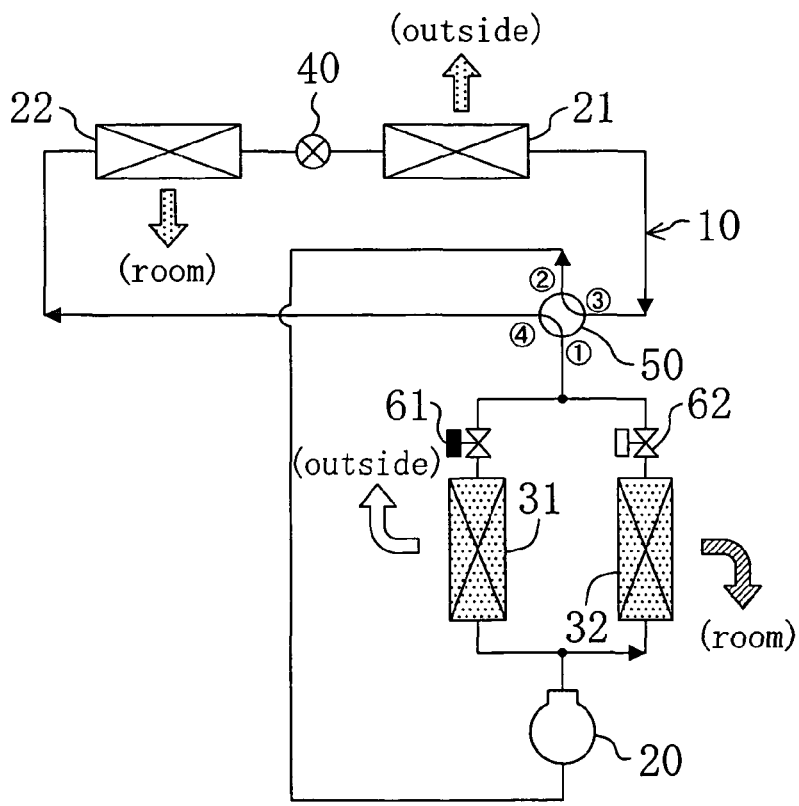

In the second mode, an adsorption action for the first adsorption heat exchanger (31) and a regeneration action for the second adsorption heat exchanger (32) concurrently take place. During the second mode, as shown in FIG. 32(B), the first solenoid valve (61) is closed and the second solenoid valve (62) is opened. Under these conditions, refrigerant discharged from the compressor (20) condenses while passing through the second adsorption heat exchanger (32) and the indoor heat exchanger (22) in this order, is reduced in pressure by the motor-operated expansion valve (40), evaporates in the outdoor heat exchanger (21), is sucked into and then compressed by the compressor (20). In this case, the flow of refrigerant into the first adsorption heat exchanger (31) is shut off by the first solenoid valve (61).

During the second mode, the outdoor air having released heat to refrigerant in the outdoor heat exchanger (21) is discharged to the outside atmosphere while the room air heated by the indoor heat exchanger (22) is returned to the room. In the first adsorption heat exchanger (31), moisture in the room air is adsorbed by the adsorbent to dehumidify the room air. The room air humidified by the first adsorption heat exchanger (31) is returned to the room. In the second adsorption heat exchanger (32), moisture is desorbed from the adsorbent heated by refrigerant and the desorbed moisture is applied to the air. The room air dried by the second adsorption heat exchanger (32) is discharged to the outside atmosphere.

Effects of Embodiment 14

According to the present embodiment, the following effect can be obtained in addition to the effects obtained by the above Embodiment 1. Specifically, in the present embodiment, the switching between the first and second modes during the dehumidification cooling operation or the humidification heating operation is implemented by opening and closing the two solenoid valves (61, 62), respectively, one open and the other closed. The switching between the first and second modes is frequently carried out at relatively short time intervals (for example, every five to ten minutes). Therefore, according to the present embodiment, relatively high-durability solenoid valves (61, 62) can be used to switch between the first and second modes, which ensures the reliability of the air conditioning system.

Embodiment 15 of the Invention

Embodiment 15 of the present invention is described. An air conditioning system of the present embodiment varies in the configuration of the refrigerant circuit (10) from the air conditioning system of Embodiment 8.

As shown in FIGS. 33 and 34, the refrigerant circuit (10) is provided with a single compressor (20), a single motor-operated expansion valve (40), a single four-way selector valve (50) and two solenoid valves (61, 62). Further, the refrigerant circuit (10) is provided with a single outdoor heat exchanger (21), a single indoor heat exchanger (22) and two adsorption heat exchangers (31, 32). In this refrigerant circuit (10), the outdoor heat exchanger (21) constitutes a heat-source side heat exchanger and the indoor heat exchanger (22) and the first and second adsorption heat exchangers (31, 32) constitute utilization side heat exchangers. The outdoor heat exchanger (21), the indoor heat exchanger (22) and each of the adsorption heat exchangers (31, 32) are configured to be the same as those in Embodiment 8.

A description is given to the configuration of the refrigerant circuit (10). The compressor (20) is connected at its discharge side to the first port of the four-way selector valve (50) and connected at its suction side to the second port of the four-way selector valve (50). One end of the first adsorption heat exchanger (31) and one end of the second adsorption heat exchanger (32) are connected to the fourth port of the four-way selector valve (50). The other end of the first adsorption heat exchanger (31) and the other end of the second adsorption heat exchanger (32) are both connected to one end of the indoor heat exchanger (22) via the first solenoid valve (61) and the second solenoid valve (62), respectively. The other end of the indoor heat exchanger (22) is connected to one end of the outdoor heat exchanger (21) via the motor-operated expansion valve (40) and the other end of the outdoor heat exchanger (21) is connected to the third port of the four-way selector valve (50).

The four-way selector valve (50) switches between a first position (a position shown in FIG. 33) in which the first and third ports communicate and the second and fourth ports communicate and a second position (a position shown in FIG. 34) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 33.

During the dehumidification cooling operation, the four-way selector valve (50) is set to the first position, the opening of the motor-operated expansion valve (40) is appropriately controlled, the outdoor heat exchanger (21) serves as a condenser and the indoor heat exchanger (22) serves as an evaporator. Further, a first mode in which the first adsorption heat exchanger (31) serves as an evaporator and the second adsorption heat exchanger (32) is in non-operating condition and a second mode in which the second adsorption heat exchanger (32) serves as an evaporator and the first adsorption heat exchanger (31) is in non-operating condition are repeatedly alternated.

Furthermore, during the dehumidification cooling operation, outdoor air is supplied to the outdoor heat exchanger (21) and room air is supplied to the indoor heat exchanger (22) and the first and second adsorption heat exchangers (31, 32). Then, the air having passed through the indoor heat exchanger (22) is continuously supplied to the room while the air having passed through the first adsorption heat exchanger (31) and the air having passed through the second adsorption heat exchanger (32) are alternately supplied to the room.

Figure 33A:
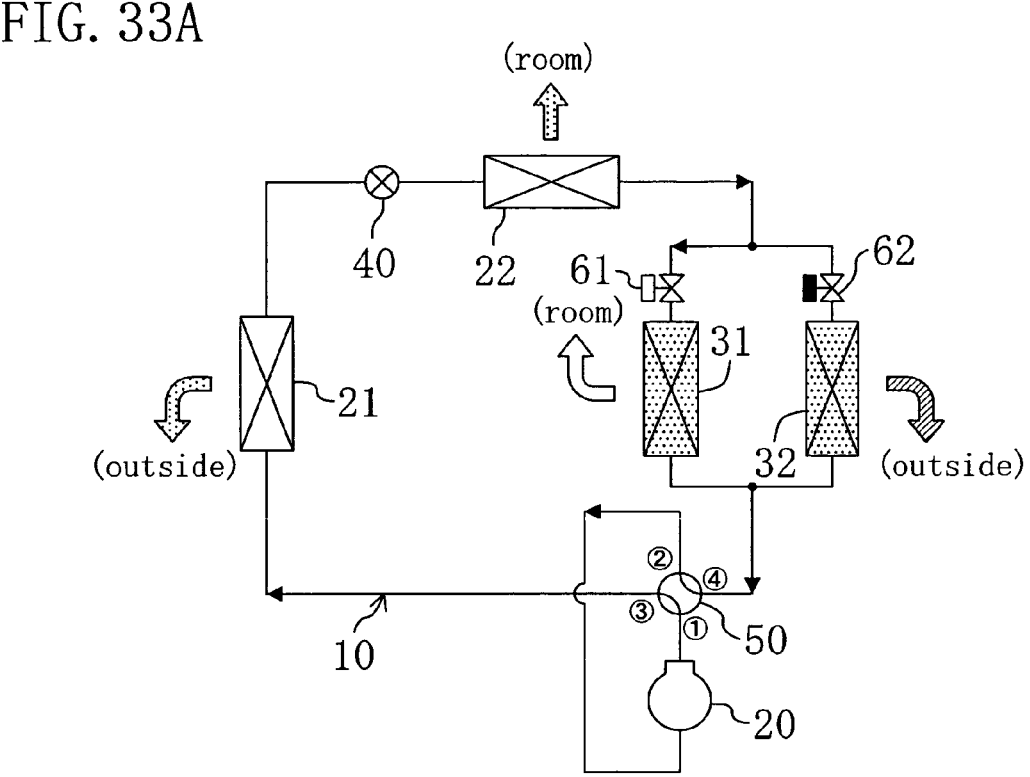
FIG. 33 is a schematic diagram showing the configuration of a refrigerant circuit in Embodiment 15 and its behavior during the dehumidification cooling operation.

In the first mode, an adsorption action for the first adsorption heat exchanger (31) and a regeneration action for the second adsorption heat exchanger (32) concurrently take place. During the first mode, as shown in FIG. 33(A), the first solenoid valve (61) is opened and the second solenoid valve (62) is closed. Under these conditions, refrigerant discharged from the compressor (20) condenses in the outdoor heat exchanger (21), is reduced in pressure by the motor-operated expansion valve (40), evaporates while passing through the indoor heat exchanger (22) and the first adsorption heat exchanger (31) in this order, is sucked into and then compressed by the compressor (20). In this case, the flow of refrigerant into the second adsorption heat exchanger (32) is shut off by the second solenoid valve (62).

During the first mode, the outdoor air having taken heat from refrigerant in the outdoor heat exchanger (21) is discharged to the outside atmosphere while the room air cooled by the indoor heat exchanger (22) is returned to the room. In the first adsorption heat exchanger (31), moisture in the room air is adsorbed by the adsorbent to dehumidify the room air and the heat of adsorption produced during the dehumidification is taken by the refrigerant. The room air dehumidified by the first adsorption heat exchanger (31) is returned to the room. In the second adsorption heat exchanger (32), room air having relatively low absolute humidity comes into contact with the adsorbent so that moisture is desorbed from the adsorbent. The moisture desorbed from the second adsorption heat exchanger (32) is discharged to the outside atmosphere together with the air.

Figure 33B:
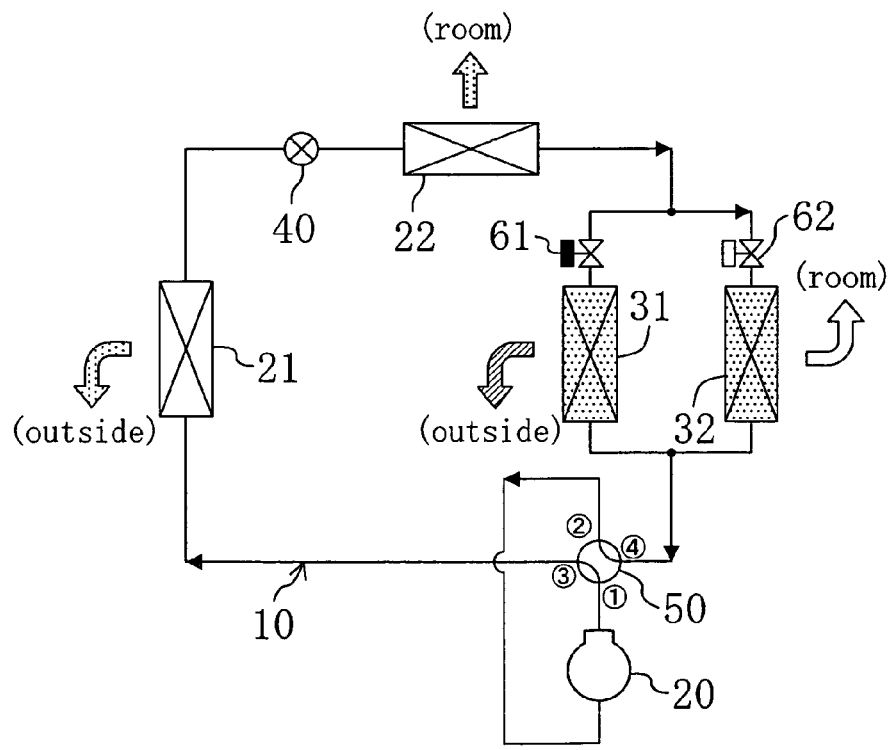

In the second mode, a regeneration action for the first adsorption heat exchanger (31) and an adsorption action for the second adsorption heat exchanger (32) concurrently take place. During the second mode, as shown in FIG. 33(B), the first solenoid valve (61) is closed and the second solenoid valve (62) is opened. Under these conditions, refrigerant discharged from the compressor (20) condenses in the outdoor heat exchanger (21), is reduced in pressure by the motor-operated expansion valve (40), evaporates while passing through the indoor heat exchanger (22) and the second adsorption heat exchanger (32) in this order, is sucked into and then compressed by the compressor (20). In this case, the flow of refrigerant into the first adsorption heat exchanger (31) is shut off by the first solenoid valve (61).

During the second mode, the outdoor air having taken heat from refrigerant in the outdoor heat exchanger (21) is discharged to the outside atmosphere while the room air cooled by the indoor heat exchanger (22) is returned to the room. In the second adsorption heat exchanger (32), moisture in the room air is adsorbed by the adsorbent to dehumidify the room air and the heat of adsorption produced during the dehumidification is taken by the refrigerant. The room air dehumidified by the second adsorption heat exchanger (32) is returned to the room. In the first adsorption heat exchanger (31), room air having relatively low absolute humidity comes into contact with the adsorbent so that moisture is desorbed from the adsorbent. The moisture desorbed from the first adsorption heat exchanger (31) is discharged to the outside atmosphere together with the air.

<Humidification Heating Operation>

The system's behavior during the humidification heating operation is described with reference to FIG. 34.

During the humidification heating operation, the four-way selector valve (50) is set to the second position, the opening of the motor-operated expansion valve (40) is appropriately controlled, the indoor heat exchanger (22) serves as a condenser and the outdoor heat exchanger (21) serves as an evaporator. Further, a first mode in which the first adsorption heat exchanger (31) serves as a condenser and the second adsorption heat exchanger (32) is in non-operating condition and a second mode in which the second adsorption heat exchanger (32) serves as a condenser and the first adsorption heat exchanger (31) is in non-operating condition are repeatedly alternated.

Furthermore, during the humidification heating operation, outdoor air is supplied to the outdoor heat exchanger (21) and room air is supplied to the indoor heat exchanger (22) and the first and second adsorption heat exchangers (31, 32). Then, the air having passed through the indoor heat exchanger (22) is continuously supplied to the room while the air having passed through the first adsorption heat exchanger (31) and the air having passed through the second adsorption heat exchanger (32) are alternately supplied to the room.

Figure 34A:
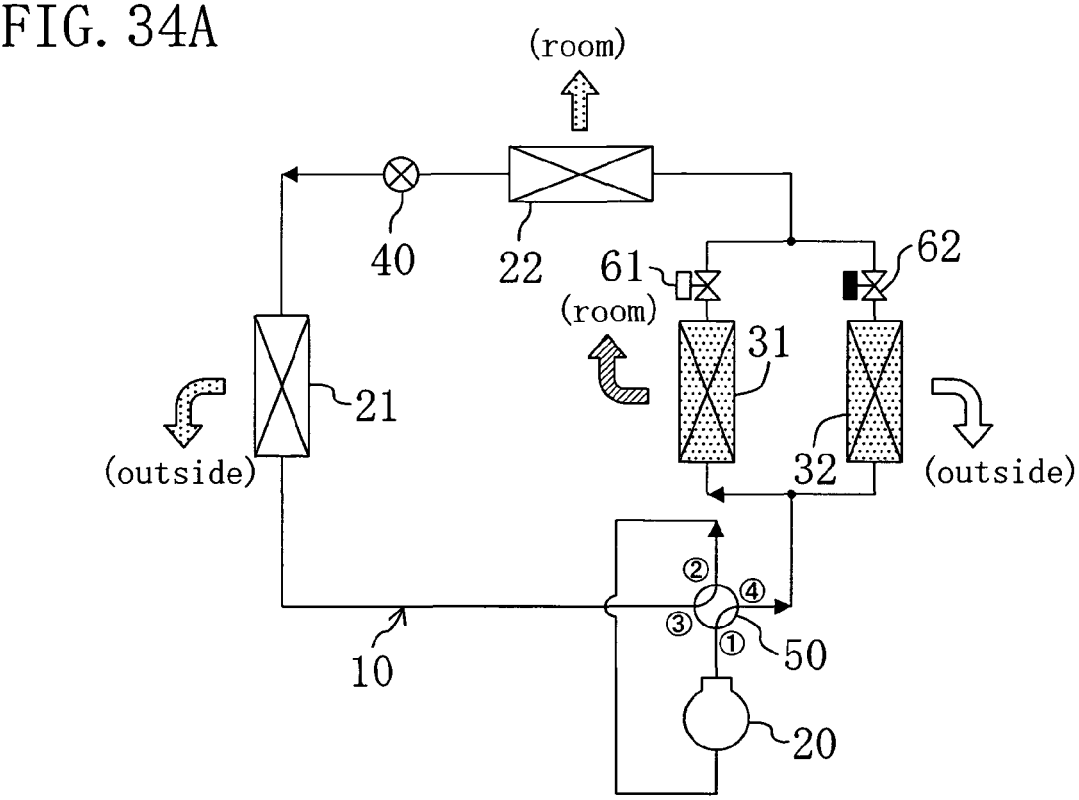
FIG. 34 is a schematic diagram showing the configuration of the refrigerant circuit in Embodiment 15 and its behavior during the humidification heating operation.

In the first mode, a regeneration action for the first adsorption heat exchanger (31) and an adsorption action for the second adsorption heat exchanger (32) concurrently take place. During the first mode, as shown in FIG. 34(A), the first solenoid valve (61) is opened and the second solenoid valve (62) is closed. Under these conditions, refrigerant discharged from the compressor (20) condenses while passing through the first adsorption heat exchanger (31) and the indoor heat exchanger (22) in this order, is reduced in pressure by the motor-operated expansion valve (40), evaporates in the outdoor heat exchanger (21), is sucked into and then compressed by the compressor (20). In this case, the flow of refrigerant into the second adsorption heat exchanger (32) is shut off by the second solenoid valve (62).

During the first mode, the outdoor air having released heat to refrigerant in the outdoor heat exchanger (21) is discharged to the outside atmosphere while the room air heated by the indoor heat exchanger (22) is returned to the room. In the first adsorption heat exchanger (31), moisture is desorbed from the adsorbent heated by refrigerant and the desorbed moisture is applied to the air. The room air humidified by the first adsorption heat exchanger (31) is returned to the room. In the second adsorption heat exchanger (32), the room air comes into contact with the adsorbent so that moisture in the room air is adsorbed by the adsorbent. The room air dried by the second adsorption heat exchanger (32) is discharged to the outside atmosphere.

Figure 34B:
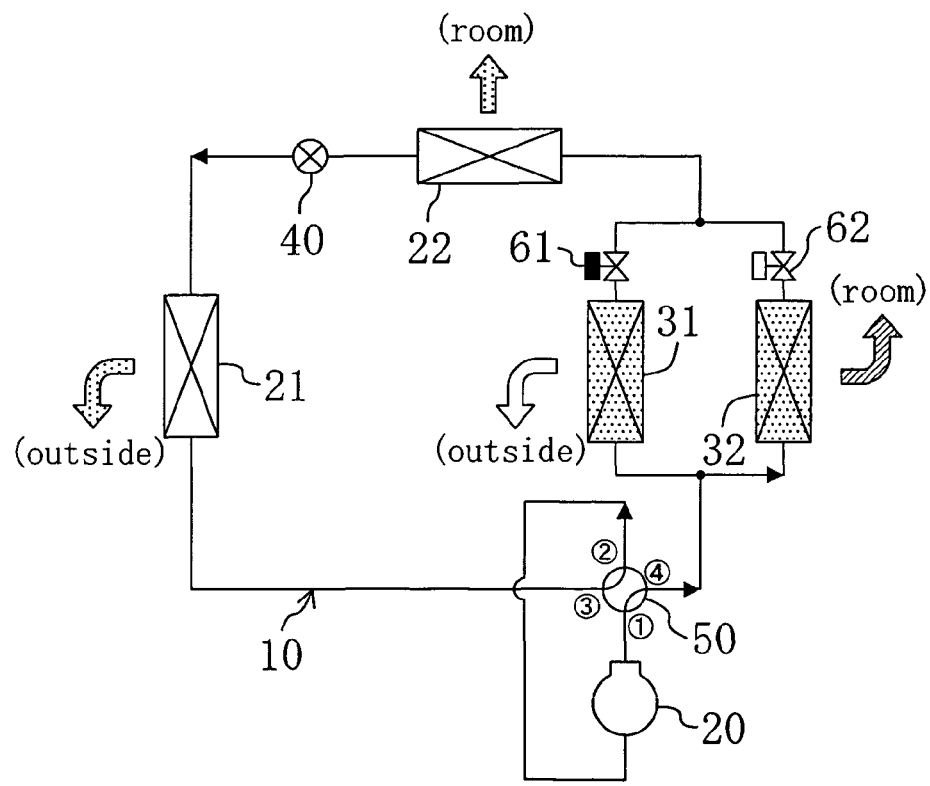

In the second mode, an adsorption action for the first adsorption heat exchanger (31) and a regeneration action for the second adsorption heat exchanger (32) concurrently take place. During the second mode, as shown in FIG. 34(B), the first solenoid valve (61) is closed and the second solenoid valve (62) is opened. Refrigerant discharged from the compressor (20) condenses while passing through the second adsorption heat exchanger (32) and the indoor heat exchanger (22) in this order, is reduced in pressure by the motor-operated expansion valve (40), evaporates in the outdoor heat exchanger (21), is sucked into and then compressed by the compressor (20). In this case, the flow of refrigerant into the first adsorption heat exchanger (31) is shut off by the first solenoid valve (61).

During the second mode, the outdoor air having released heat to refrigerant in the outdoor heat exchanger (21) is discharged to the outside atmosphere while the room air heated by the indoor heat exchanger (22) is returned to the room. In the first adsorption heat exchanger (31), the room air comes into contact with the adsorbent so that moisture in the room air is adsorbed by the adsorbent. The room air dried by the first adsorption heat exchanger (31) is discharged to the outside atmosphere. In the second adsorption heat exchanger (32), moisture is desorbed from the adsorbent heated by refrigerant and the desorbed moisture is applied to the air. The room air humidified by the second adsorption heat exchanger (32) is returned to the room.

Effects of Embodiment 15

According to the present embodiment, the same effects as obtained in the above Embodiment 14 can be obtained.

Modification 1 of Embodiment 15

Figure 35A:
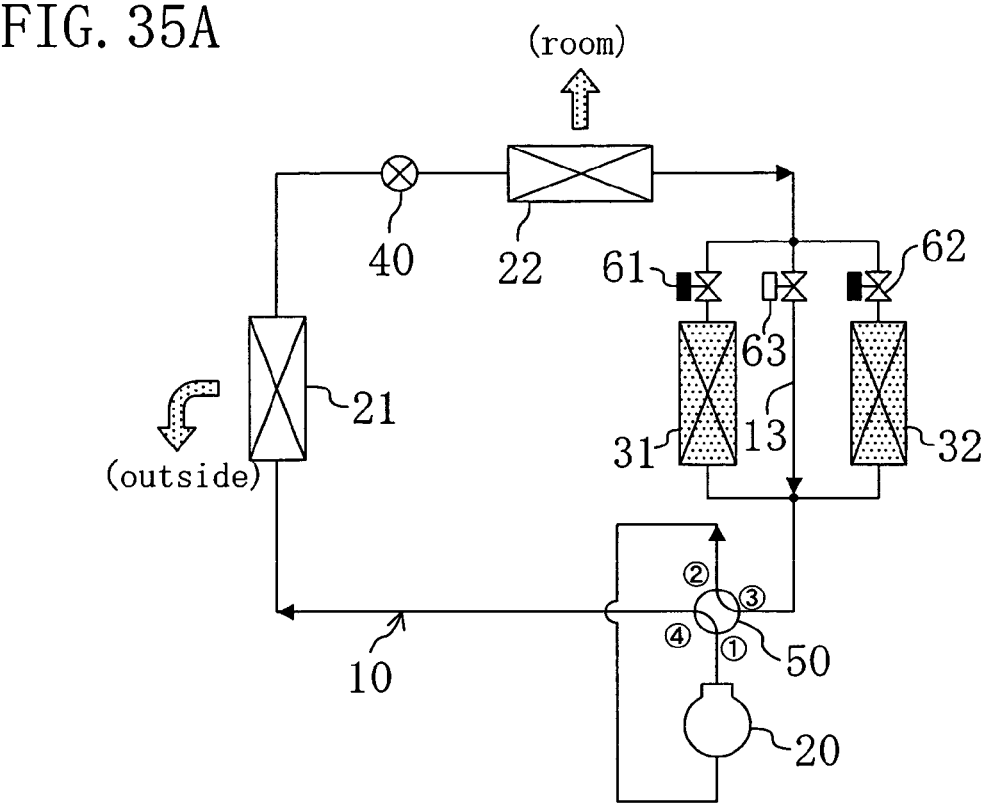
FIG. 35 is a schematic diagram showing the configuration of a refrigerant circuit in Modification 1 of Embodiment 15 and its behaviors during cooling operation and during heating operation.
Figure 35B:
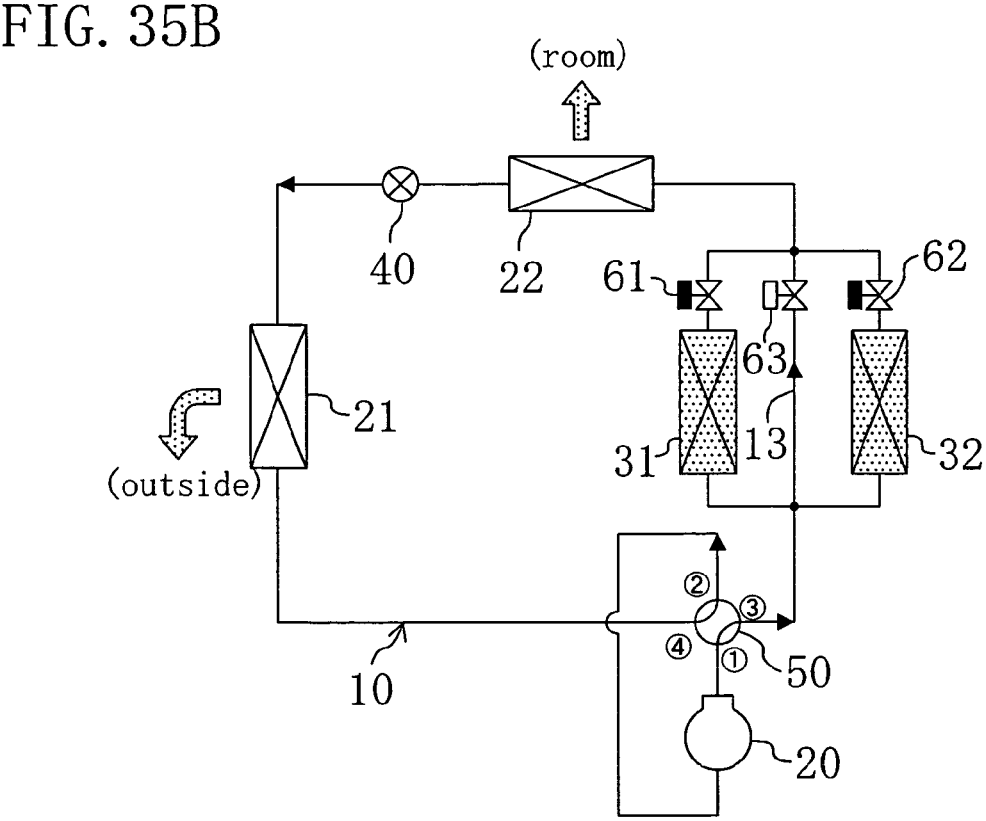

In the air conditioning system of the present embodiment, as shown in FIG. 35, the refrigerant circuit (10) may be provided with a bypass line (13). The bypass line (13) is connected at one end to the indoor heat exchanger (22) and connected at the other end to the fourth port of the four-way selector valve (50). Further, the bypass line (13) is provided with a third solenoid valve (63). When room dehumidification or humidification is not necessary, the first solenoid valve (61) and second solenoid valve (62) are closed and the third solenoid valve (63) is opened so that both the first adsorption heat exchanger (31) and the second adsorption heat exchanger (32) are brought into non-operating condition. Thus, during the cooling operation, only the air cooled by the indoor heat exchanger (22) is supplied to the room. On the other hand, during the heating operation, only the air heated by the indoor heat exchanger (22) is supplied to the room.

Modification 2 of Embodiment 15

In the air conditioning system of the present embodiment, as shown in FIGS. 36 and 37, the outdoor heat exchanger (21) and the indoor heat exchanger (22) may change places in the refrigerant circuit (10). Specifically, in the refrigerant circuit (10) in the present modification, the indoor heat exchanger (22) is connected at one end to the third port of the four-way selector valve (50) and connected at the other end to one end of the outdoor heat exchanger (21) via the motor-operated expansion valve (40). Further, the other end of the outdoor heat exchanger (21) is connected to both the first solenoid valve (61) and the second solenoid valve (62).

<Dehumidification Cooling Operation>

The system's behavior during the dehumidification cooling operation is described with reference to FIG. 36.

During the dehumidification cooling operation, the four-way selector valve (50) is set to the second position, the opening of the motor-operated expansion valve (40) is appropriately controlled, the outdoor heat exchanger (21) serves as a condenser and the indoor heat exchanger (22) serves as an evaporator. Further, a first mode in which the first adsorption heat exchanger (31) serves as a condenser and the second adsorption heat exchanger (32) is in non-operating condition and a second mode in which the second adsorption heat exchanger (32) serves as a condenser and the first adsorption heat exchanger (31) is in non-operating condition are repeatedly alternated.

Furthermore, during the dehumidification cooling operation, outdoor air is supplied to the outdoor heat exchanger (21) and room air is supplied to the indoor heat exchanger (22) and the first and second adsorption heat exchangers (31, 32). Then, the air having passed through the indoor heat exchanger (22) is continuously supplied to the room while the air having passed through the first adsorption heat exchanger (31) and the air having passed through the second adsorption heat exchanger (32) are alternately supplied to the room.

Figure 36A:
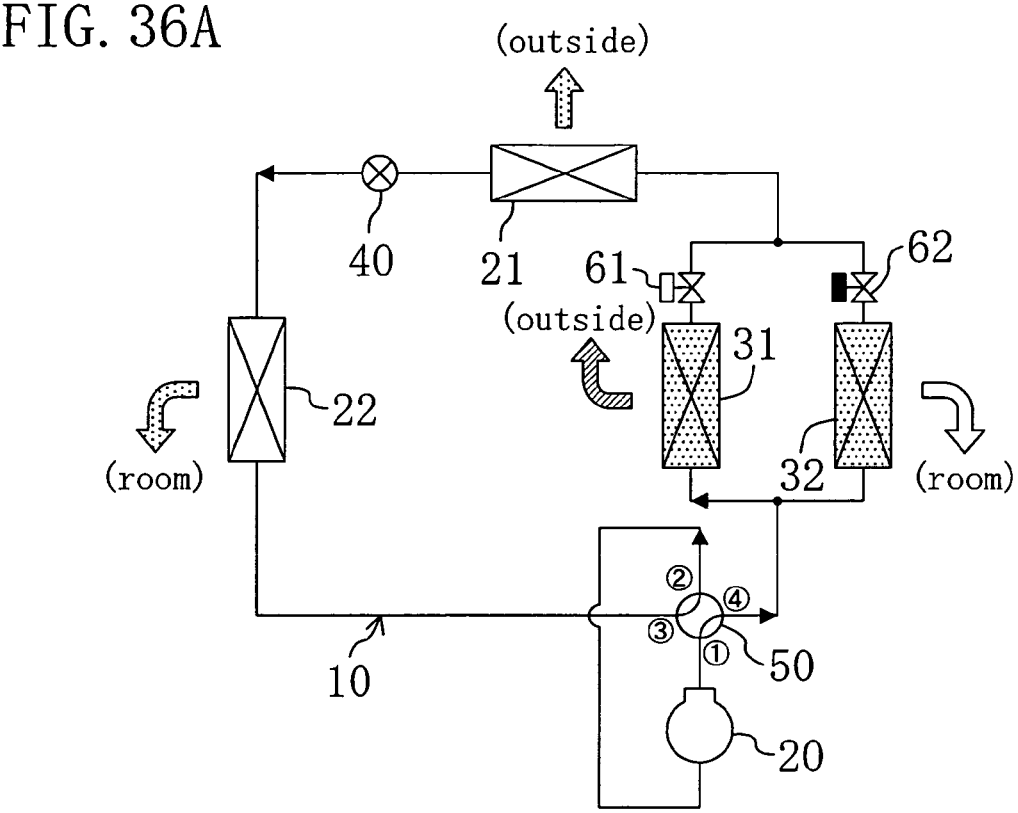
FIG. 36 is a schematic diagram showing the configuration of a refrigerant circuit in Modification 2 of Embodiment 15 and its behavior during the dehumidification cooling operation.

In the first mode, a regeneration action for the first adsorption heat exchanger (31) and an adsorption action for the second adsorption heat exchanger (32) concurrently take place. During the first mode, as shown in FIG. 36(A), the first solenoid valve (61) is opened and the second solenoid valve (62) is closed. Under these conditions, refrigerant discharged from the compressor (20) condenses while passing through the first adsorption heat exchanger (31) and the outdoor heat exchanger (21) in this order, is reduced in pressure by the motor-operated expansion valve (40), evaporates in the indoor heat exchanger (22), is sucked into and then compressed by the compressor (20). In this case, the flow of refrigerant into the second adsorption heat exchanger (32) is shut off by the second solenoid valve (62).

During the first mode, the outdoor air having taken heat from refrigerant in the outdoor heat exchanger (21) is discharged to the outside atmosphere while the room air cooled by the indoor heat exchanger (22) is returned to the room. In the first adsorption heat exchanger (31), moisture is desorbed from the adsorbent heated by refrigerant and the desorbed moisture is discharged to the outside atmosphere together with the air. In the second adsorption heat exchanger (32), the room air comes into contact with the adsorbent so that moisture in the room air is adsorbed by the adsorbent. The room air dehumidified by the second adsorption heat exchanger (32) is returned to the room.

Figure 36B:
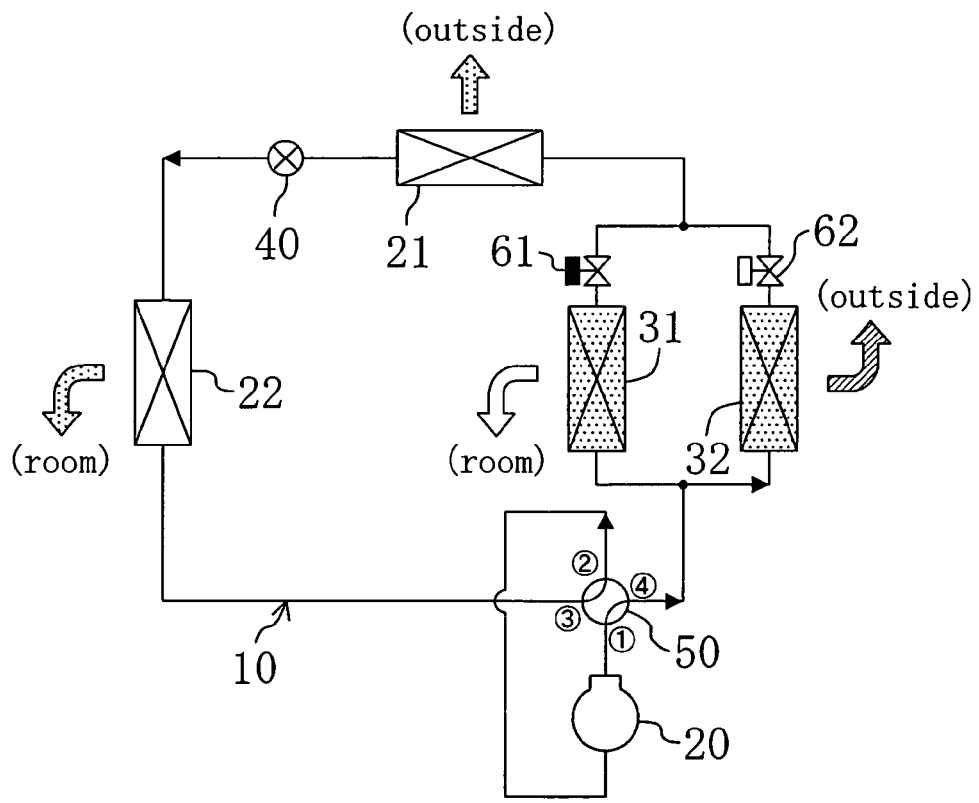

In the second mode, an adsorption action for the first adsorption heat exchanger (31) and a regeneration action for the second adsorption heat exchanger (32) concurrently take place. During the second mode, as shown in FIG. 36(B), the first solenoid valve (61) is closed and the second solenoid valve (62) is opened. The refrigerant discharged from the compressor (20) condenses while passing through the second adsorption heat exchanger (32) and the outdoor heat exchanger (21) in this order, is reduced in pressure by the motor-operated expansion valve (40), evaporates in the indoor heat exchanger (22), is sucked into and then compressed by the compressor (20). In this case, the flow of refrigerant into the first adsorption heat exchanger (31) is shut off by the first solenoid valve (61).

During the second mode, the outdoor air having taken heat from refrigerant in the outdoor heat exchanger (21) is discharged to the outside atmosphere while the room air cooled by the indoor heat exchanger (22) is returned to the room. In the first adsorption heat exchanger (31), the room air comes into contact with the adsorbent so that moisture in the room air is adsorbed by the adsorbent. The room air dehumidified by the first adsorption heat exchanger (31) is returned to the room. In the second adsorption heat exchanger (32), moisture is desorbed from the adsorbent heated by refrigerant and the desorbed moisture is discharged to the outside atmosphere together with the air.

<Humidification Heating Operation>

The system's behavior during the humidification heating operation is described with reference to FIG. 37.

During the humidification heating operation, the four-way selector valve (50) is set to the first position, the opening of the motor-operated expansion valve (40) is appropriately controlled, the indoor heat exchanger (22) serves as a condenser and the outdoor heat exchanger (21) serves as an evaporator. Further, a first mode in which the first adsorption heat exchanger (31) serves as an evaporator and the second adsorption heat exchanger (32) is in non-operating condition and a second mode in which the second adsorption heat exchanger (32) serves as an evaporator and the first adsorption heat exchanger (31) is in non-operating condition are repeatedly alternated.

Furthermore, during the humidification heating operation, outdoor air is supplied to the outdoor heat exchanger (21) and room air is supplied to the indoor heat exchanger (22) and the first and second adsorption heat exchangers (31, 32). Then, the air having passed through the indoor heat exchanger (22) is continuously supplied to the room while the air having passed through the first adsorption heat exchanger (31) and the air having passed through the second adsorption heat exchanger (32) are alternately supplied to the room.

Figure 37A:
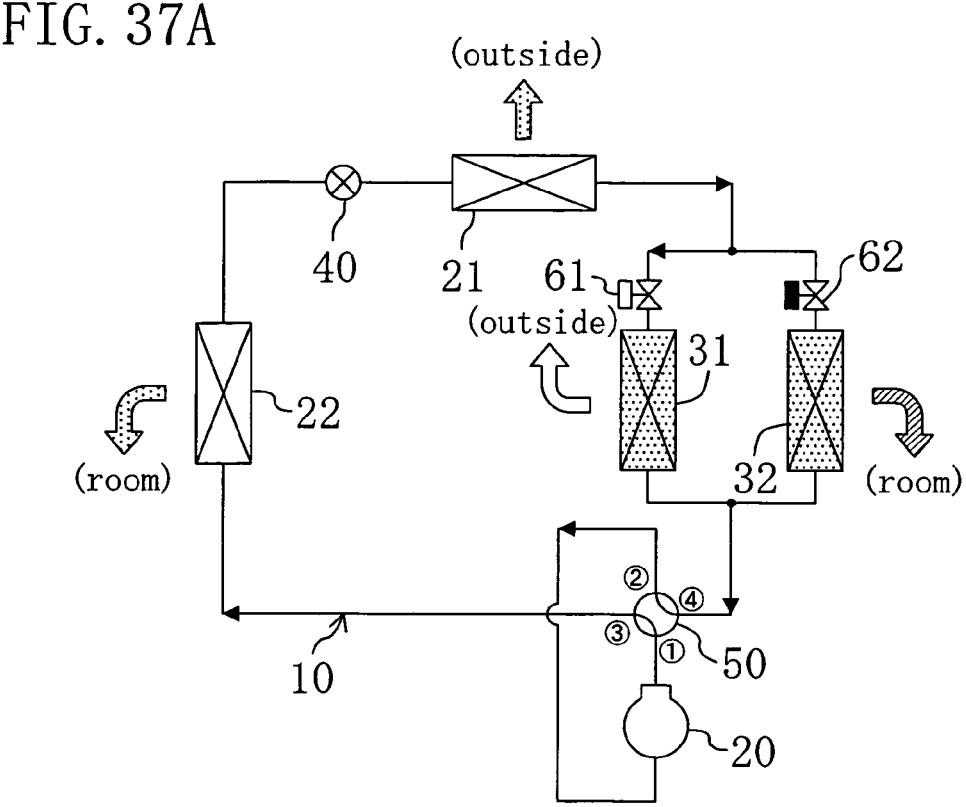
FIG. 37 is a schematic diagram showing the configuration of the refrigerant circuit in Modification 2 of Embodiment 15 and its behavior during the humidification heating operation.

In the first mode, an adsorption action for the first adsorption heat exchanger (31) and a regeneration action for the second adsorption heat exchanger (32) concurrently take place. During the first mode, as shown in FIG. 37(A), the first solenoid valve (61) is opened and the second solenoid valve (62) is closed. Under these conditions, refrigerant discharged from the compressor (20) condenses in the indoor heat exchanger (22), is reduced in pressure by the motor-operated expansion valve (40), evaporates while passing through the outdoor heat exchanger (21) and the first adsorption heat exchanger (31) in this order, is sucked into and then compressed by the compressor (20). In this case, the flow of refrigerant into the second adsorption heat exchanger (32) is shut off by the second solenoid valve (62).

During the first mode, the outdoor air having released heat to refrigerant in the outdoor heat exchanger (21) is discharged to the outside atmosphere while the room air heated by the indoor heat exchanger (22) is returned to the room. In the first adsorption heat exchanger (31), moisture in the room air is adsorbed by the adsorbent and the heat of adsorption produced during the adsorption is taken by the refrigerant. The room air dried by the first adsorption heat exchanger (31) is discharged to the outside atmosphere. In the second adsorption heat exchanger (32), room air having relatively low absolute humidity comes into contact with the adsorbent and moisture desorbed from the adsorbent is applied to the room air. The room air humidified by the second adsorption heat exchanger (32) is returned to the room.

Figure 37B:
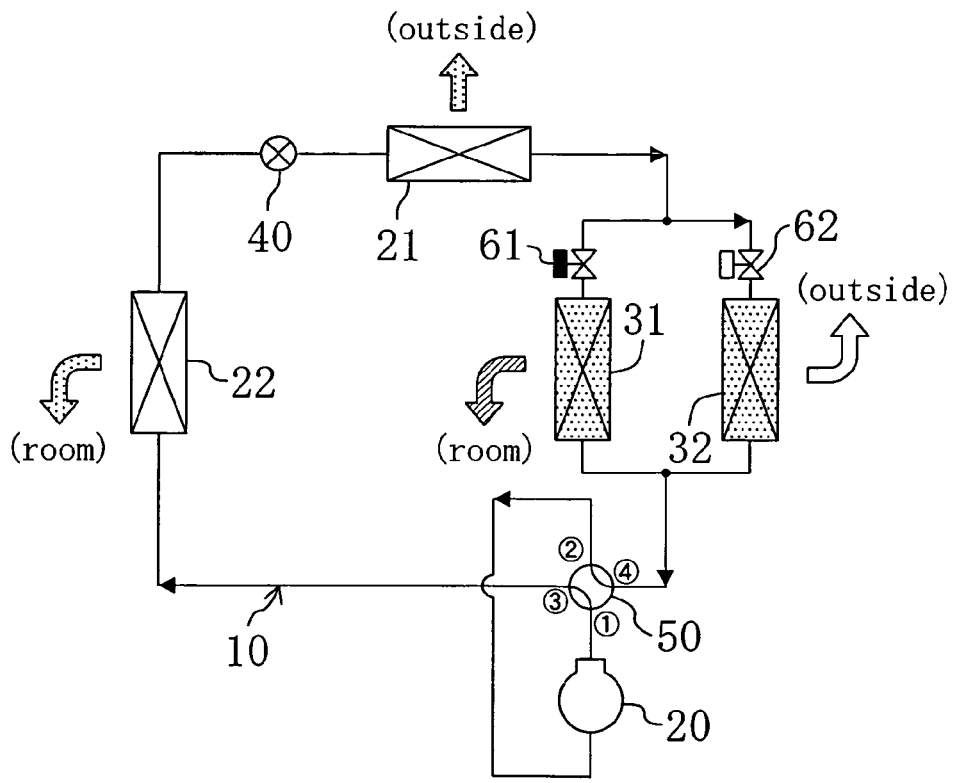

In the second mode, a regeneration action for the first adsorption heat exchanger (31) and an adsorption action for the second adsorption heat exchanger (32) concurrently take place. During the second mode, as shown in FIG. 37(B), the first solenoid valve (61) is closed and the second solenoid valve (62) is opened. Under these conditions, refrigerant discharged from the compressor (20) condenses in the indoor heat exchanger (22), is reduced in pressure by the motor-operated expansion valve (40), evaporates while passing through the outdoor heat exchanger (21) and the second adsorption heat exchanger (32) in this order, is sucked into and then compressed by the compressor (20). In this case, the flow of refrigerant into the first adsorption heat exchanger (31) is shut off by the first solenoid valve (61).

During the second mode, the outdoor air having released heat to refrigerant in the outdoor heat exchanger (21) is discharged to the outside atmosphere while the room air heated by the indoor heat exchanger (22) is returned to the room. In the second adsorption heat exchanger (32), moisture in the room air is adsorbed by the adsorbent and the heat of adsorption produced during the adsorption is taken by the refrigerant. The room air dried by the second adsorption heat exchanger (32) is discharged to the outside atmosphere. In the first adsorption heat exchanger (31), room air having relatively low absolute humidity comes into contact with the adsorbent and moisture desorbed from the adsorbent is applied to the room air. The room air humidified by the first adsorption heat exchanger (31) is returned to the room.

Embodiment 16 of the Invention

Embodiment 16 of the present invention is described. An air conditioning system of the present embodiment varies in the configuration of the refrigerant circuit (10) from the air conditioning system of Embodiment 15.

As shown in FIGS. 38 and 39, the refrigerant circuit (10) is provided with a single compressor (20), a single motor-operated expansion valve (40), a single four-way selector valve (50) and two solenoid valves (61, 62). Further, the refrigerant circuit (10) is provided with a single outdoor heat exchanger (21), a single indoor heat exchanger (22) and two adsorption heat exchangers (31, 32). In this refrigerant circuit (10), the outdoor heat exchanger (21) constitutes a heat-source side heat exchanger and the indoor heat exchanger (22) and the first and second adsorption heat exchangers (31, 32) constitute utilization side heat exchangers. The outdoor heat exchanger (21), the indoor heat exchanger (22) and each of the adsorption heat exchangers (31, 32) are configured to be the same as those in Embodiment 15.

A description is given to the configuration of the refrigerant circuit (10). The compressor (20) is connected at its discharge side to the first port of the four-way selector valve (50) and connected at its suction side to the second port of the four-way selector valve (50). The third port of the four-way selector valve (50) is connected to one end of the outdoor heat exchanger (21). The other end of the outdoor heat exchanger (21) is connected to one end of the first adsorption heat exchanger (31) and one end of the second adsorption heat exchanger (32) via the motor-operated expansion valve (40). The other end of the first adsorption heat exchanger (31) and the other end of the second adsorption heat exchanger (32) are both connected to one end of the indoor heat exchanger (22) via the first solenoid valve (61) and the second solenoid valve (62), respectively. The other end of the indoor heat exchanger (22) is connected to the fourth port of the four-way selector valve (50).

The four-way selector valve (50) switches between a first position (a position shown in FIG. 38) in which the first and third ports communicate and the second and fourth ports communicate and a second position (a position shown in FIG. 39) in which the first and fourth ports communicate and the second and third ports communicate.

-Operational Behavior-

The air conditioning system of the present embodiment performs a dehumidification cooling operation and a humidification heating operation.

<Dehumidification Cooling Operation>

The system's behavior during the dehumidification cooling operation is described with reference to FIG. 38.

During the dehumidification cooling operation, the four-way selector valve (50) is set to the first position, the opening of the motor-operated expansion valve (40) is appropriately controlled, the outdoor heat exchanger (21) serves as a condenser and the indoor heat exchanger (22) serves as an evaporator. Further, a first mode in which the first adsorption heat exchanger (31) serves as an evaporator and the second adsorption heat exchanger (32) is in non-operating condition and a second mode in which the second adsorption heat exchanger (32) in the second circuit (12) serves as an evaporator and the first adsorption heat exchanger (31) is in non-operating condition are repeatedly alternated.

The air flow during the first mode is the same as that during the first mode in the dehumidification cooling operation in Embodiment 15. Further, the air flow during the second mode is the same as that during the second mode in the dehumidification cooling operation in Embodiment 15.

Figure 38A:
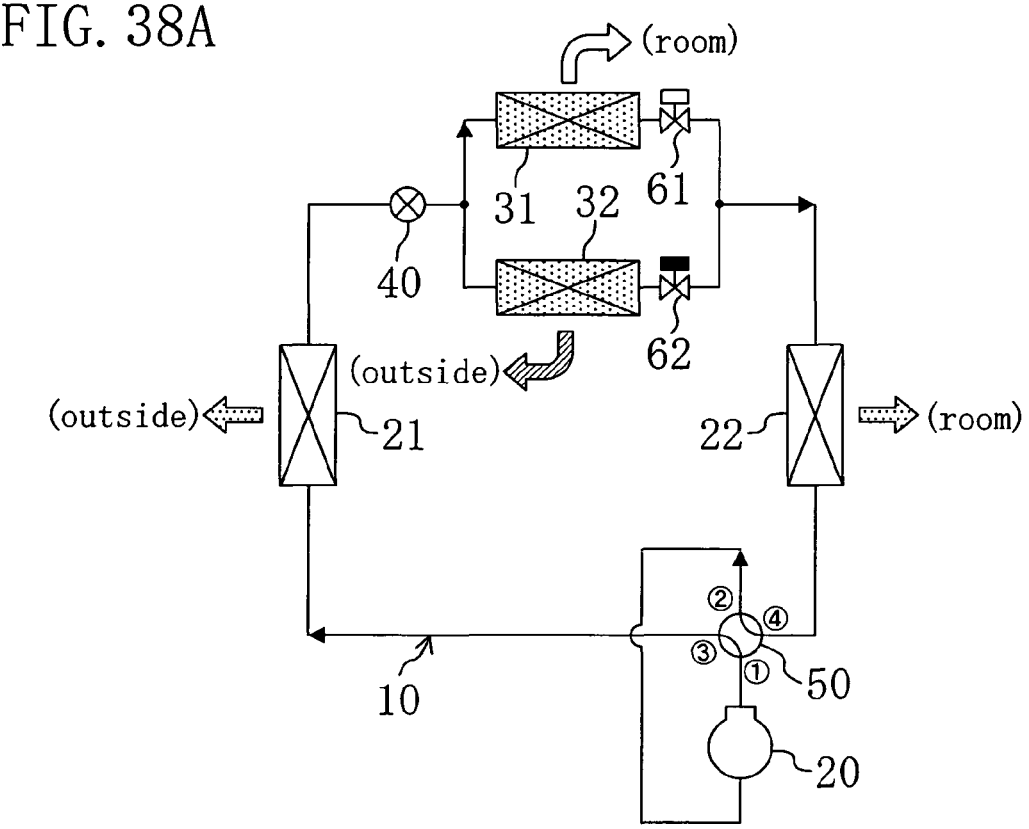
FIG. 38 is a schematic diagram showing the configuration of a refrigerant circuit in Embodiment 16 and its behavior during the dehumidification cooling operation.

In the first mode, an adsorption action for the first adsorption heat exchanger (31) and a regeneration action for the second adsorption heat exchanger (32) concurrently take place. During the first mode, as shown in FIG. 38(A), the first solenoid valve (61) is opened and the second solenoid valve (62) is closed. Under these conditions, refrigerant discharged from the compressor (20) condenses in the outdoor heat exchanger (21), is reduced in pressure by the motor-operated expansion valve (40), evaporates while passing through the first adsorption heat exchanger (31) and the indoor heat exchanger (22) in this order, is sucked into and then compressed by the compressor (20). In this case, the flow of refrigerant into the second adsorption heat exchanger (32) is shut off by the second solenoid valve (62).

Figure 38B:
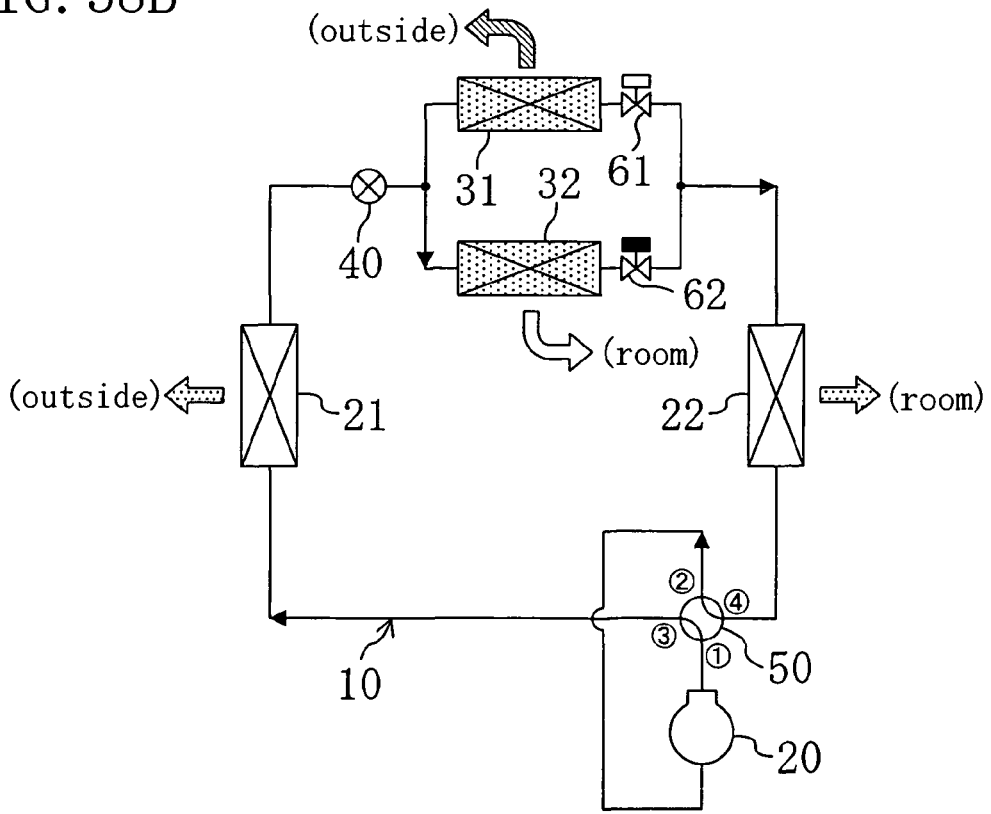

In the second mode, a regeneration action for the first adsorption heat exchanger (31) and an adsorption action for the second adsorption heat exchanger (32) concurrently take place. During the second mode, as shown in FIG. 38(B), the first solenoid valve (61) is closed and the second solenoid valve (62) is opened. Under these conditions, refrigerant discharged from the compressor (20) condenses in the outdoor heat exchanger (21), is reduced in pressure by the motor-operated expansion valve (40), evaporates while passing through the second adsorption heat exchanger (32) and the indoor heat exchanger (22) in this order, is sucked into and then compressed by the compressor (20). In this case, the flow of refrigerant into the first adsorption heat exchanger (31) is shut off by the first solenoid valve (61).

Furthermore, during the dehumidification cooling operation, the room air cooled by the indoor heat exchanger (22) is supplied to the room while the room air dehumidified by the first adsorption heat exchanger (31) during the first mode and the room air dehumidified by the second adsorption heat exchanger (32) during the second mode are alternately supplied to the room.

<Humidification Heating Operation>

The system's behavior during the humidification heating operation is described with reference to FIG. 39.

During the humidification heating operation, the four-way selector valve (50) is set to the second position, the opening of the motor-operated expansion valve (40) is appropriately controlled, the indoor heat exchanger (22) serves as a condenser and the outdoor heat exchanger (21) serves as an evaporator. Further, a first mode in which the first adsorption heat exchanger (31) serves as a condenser and the second adsorption heat exchanger (32) is in non-operating condition and a second mode in which the second adsorption heat exchanger (32) in the second circuit (12) serves as a condenser and the first adsorption heat exchanger (31) is in non-operating condition are repeatedly alternated.

The air flow during the first mode is the same as that during the first mode in the humidification heating operation in Embodiment 15. Further, the air flow during the second mode is the same as that during the second mode in the humidification heating operation in Embodiment 15.

Figure 39A:
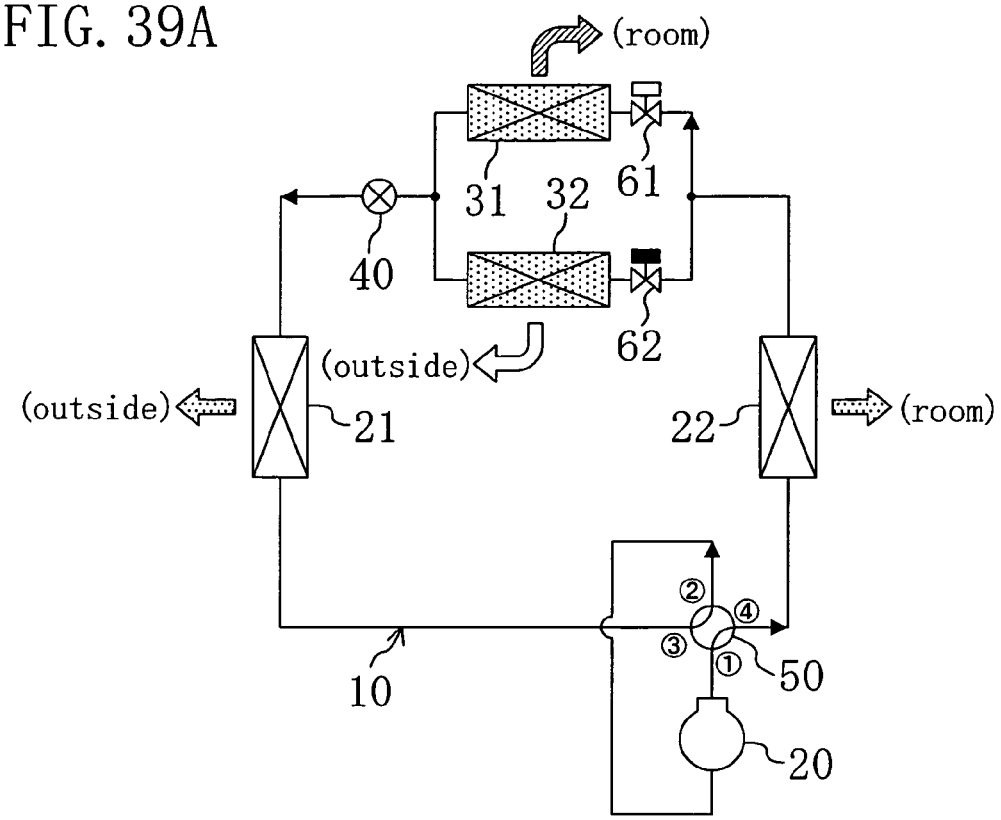
FIG. 39 is a schematic diagram showing the configuration of the refrigerant circuit in Embodiment 16 and its behavior during the humidification heating operation.

In the first mode, a regeneration action for the first adsorption heat exchanger (31) and an adsorption action for the second adsorption heat exchanger (32) concurrently take place. During the first mode, as shown in FIG. 39(A), the first solenoid valve (61) is opened and the second solenoid valve (62) is closed. Under these conditions, refrigerant discharged from the compressor (20) condenses while passing through the indoor heat exchanger (22) and the first adsorption heat exchanger (31) in this order, is reduced in pressure by the motor-operated expansion valve (40), evaporates in the outdoor heat exchanger (21), is sucked into and then compressed by the compressor (20). In this case, the flow of refrigerant into the second adsorption heat exchanger (32) is shut off by the second solenoid valve (62).

Figure 39B:
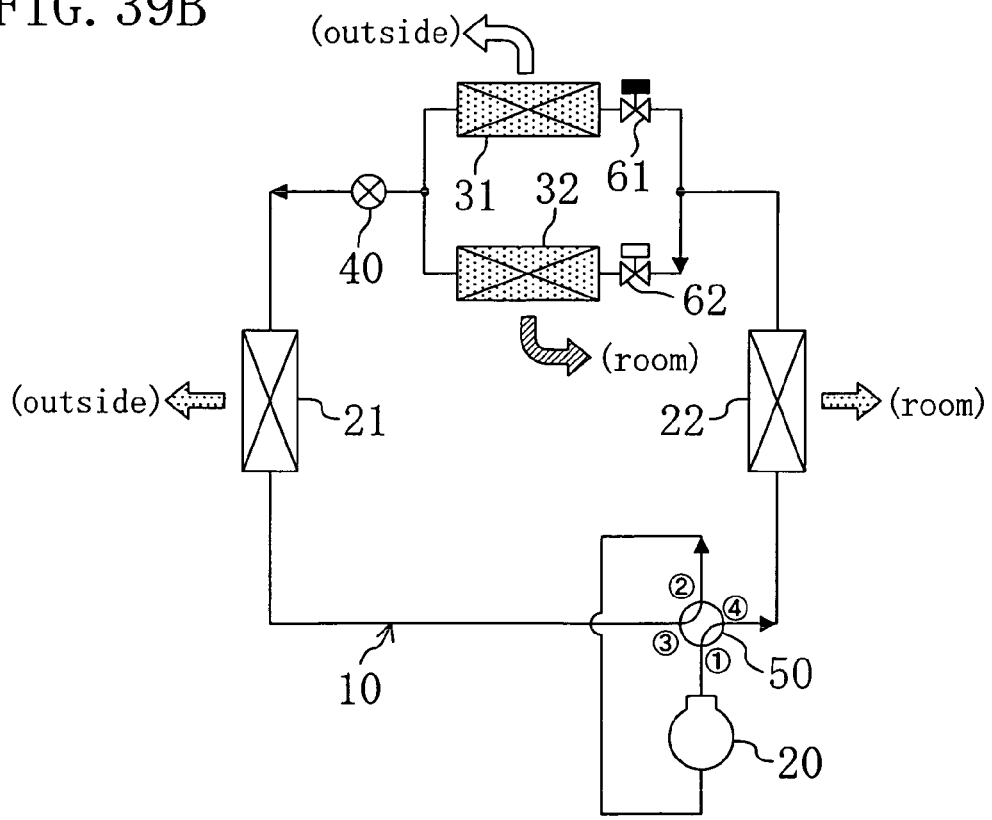

In the second mode, an adsorption action for the first adsorption heat exchanger (31) and a regeneration action for the second adsorption heat exchanger (32) concurrently take place. During the second mode, as shown in FIG. 39(B), the first solenoid valve (61) is closed and the second solenoid valve (62) is opened. The refrigerant discharged from the compressor (20) condenses while passing through the indoor heat exchanger (22) and the second adsorption heat exchanger (32) in this order, is reduced in pressure by the motor-operated expansion valve (40), evaporates in the outdoor heat exchanger (21), is sucked into and then compressed by the compressor (20). In this case, the flow of refrigerant into the first adsorption heat exchanger (31) is shut off by the first solenoid valve (61).

Further, during the humidification heating operation, the room air heated by the indoor heat exchanger (22) is supplied to the room while the room air humidified by the first adsorption heat exchanger (31) during the first mode and the room air humidified by the second adsorption heat exchanger (32) during the second mode are alternately supplied to the room.

Effects of Embodiment 16

According to the present embodiment, the same effects as obtained in the above Embodiment 14 can be obtained.

Other Embodiments

The air conditioning systems of the above embodiments may have the following configurations.

-First Modification-

Figure 40:
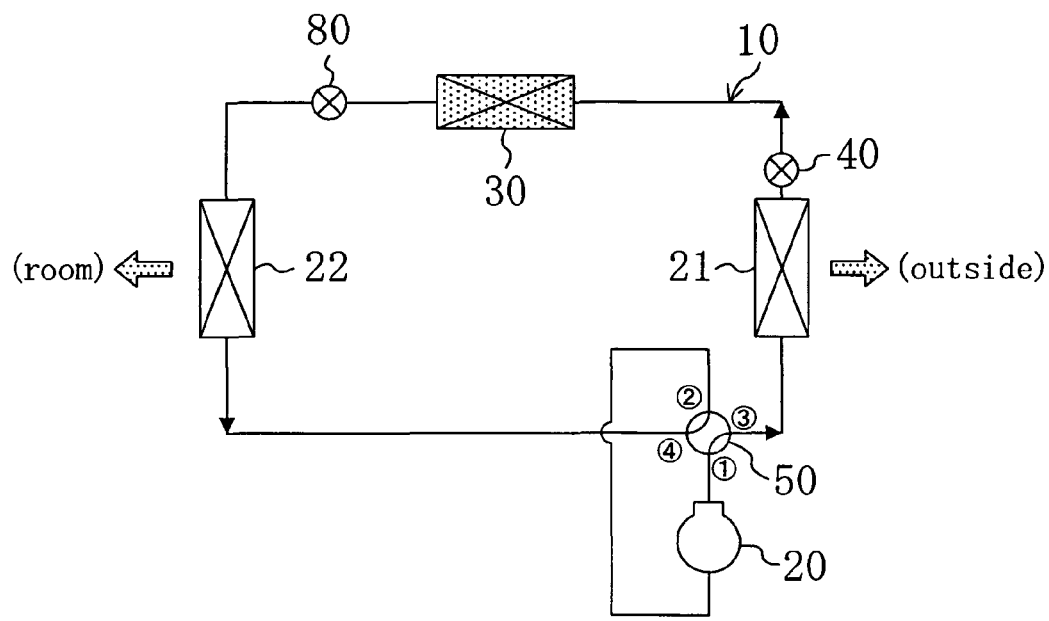
FIG. 40 is a schematic diagram showing the configuration of a refrigerant circuit in a first modification included in other embodiments and its behavior during the dehumidification cooling operation.
Figure 41:
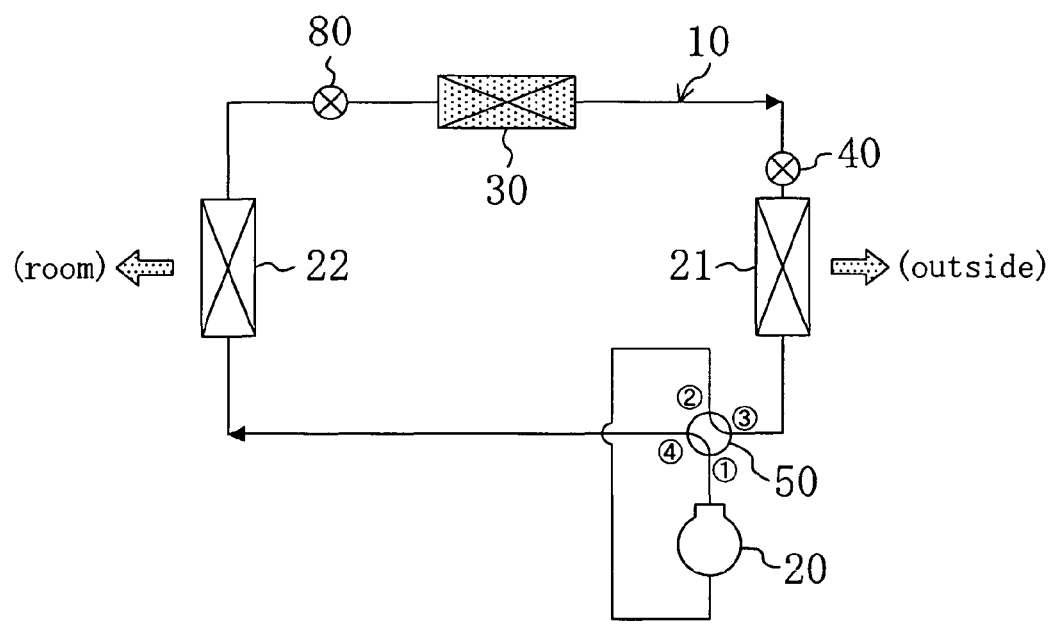
FIG. 41 is a schematic diagram showing the configuration of the refrigerant circuit in the first modification included in other embodiments and its behavior during the humidification heating operation.

In the air conditioning system of Embodiment 1, as shown in FIGS. 40 and 41, a motor-operated expansion valve (80) may be provided in place of the capillary tube (43) and the solenoid valve (60). In the refrigerant circuit (10), the motor-operated expansion valve (80) is placed between the indoor heat exchanger (22) and the adsorption heat exchanger (30).

As shown in FIG. 40, during the dehumidification cooling operation, the outdoor heat exchanger (21) serves as a condenser and the indoor heat exchanger (22) serves as an evaporator. Further, the adsorption heat exchanger (30) switches between a position serving as an evaporator and a position serving as a condenser by controlling the openings of the two motor-operated expansion valves (40, 80).

If the refrigerant is slightly reduced in pressure by the motor-operated expansion valve (80) under the conditions that the adsorption heat exchanger (30) and the indoor heat exchanger (22) are serving as evaporators, the refrigerant evaporation temperature in the indoor heat exchanger (22) is set to be lower than that in the adsorption heat exchanger (30). Thus, the balance is controlled between the amount of heat taken by refrigerant in the indoor heat exchanger (22) and the amount of heat taken by refrigerant in the adsorption heat exchanger (30). On the other hand, if the refrigerant is slightly reduced in pressure by the motor-operated expansion valve (40) under the conditions that the outdoor heat exchanger (21) and the adsorption heat exchanger (30) are serving as condensers, the refrigerant condensation temperature in the adsorption heat exchanger (30) is set to be lower than that in the outdoor heat exchanger (21). Thus, the balance is controlled between the amount of heat released by refrigerant in the outdoor heat exchanger (21) and the amount of heat released by refrigerant in the adsorption heat exchanger (30).

As described above, during the dehumidification cooling operation, the air conditioning system of this modification can control the amount of heat taken by refrigerant in the adsorption heat exchanger (30) serving as an evaporator and the amount of heat taken by refrigerant in the indoor heat exchanger (22) serving as an evaporator and can control the amount of heat released by refrigerant in the adsorption heat exchanger (30) serving as a condenser and the amount of heat released by refrigerant in the outdoor heat exchanger (21) serving as a condenser. Therefore, according to the air conditioning system of this modification, the balance between cooling capacity and dehumidification capacity can be changed.

As shown in FIG. 41, during the humidification heating operation, the indoor heat exchanger (22) serves as a condenser and the outdoor heat exchanger (21) serves as an evaporator. Further, the adsorption heat exchanger (30) switches between a state serving as an evaporator and a state serving as a condenser by controlling the openings of the two motor-operated expansion valves (40, 80).

If the refrigerant is slightly reduced in pressure by the motor-operated expansion valve (40) under the conditions that the adsorption heat exchanger (30) and the outdoor heat exchanger (21) are serving as evaporators, the refrigerant evaporation temperature in the outdoor heat exchanger (21) is set to be lower than that in the adsorption heat exchanger (30). Thus, the balance is controlled between the amount of heat taken by refrigerant in the outdoor heat exchanger (21) and the amount of heat taken by refrigerant in the adsorption heat exchanger (30). On the other hand, if the refrigerant is slightly reduced in pressure by the motor-operated expansion valve (80) under the conditions that the indoor heat exchanger (22) and the adsorption heat exchanger (30) are serving as condensers, the refrigerant condensation temperature in the adsorption heat exchanger (30) is set to be lower than that in the indoor heat exchanger (22). Thus, the balance is controlled between the amount of heat released by refrigerant in the indoor heat exchanger (22) and the amount of heat released by refrigerant in the adsorption heat exchanger (30).

As described above, during the humidification heating operation, the air conditioning system of this modification can control the amount of heat released by refrigerant in the adsorption heat exchanger (30) serving as a condenser and the amount of heat released by refrigerant in the indoor heat exchanger (22) serving as a condenser and can control the amount of heat taken by refrigerant in the adsorption heat exchanger (30) serving as an evaporator and the amount of heat taken by refrigerant in the outdoor heat exchanger (21) serving as an evaporator. Therefore, according to the air conditioning system of this modification, the balance between heating capacity and humidification capacity can be changed.

-Second Modification-

Figure 42:
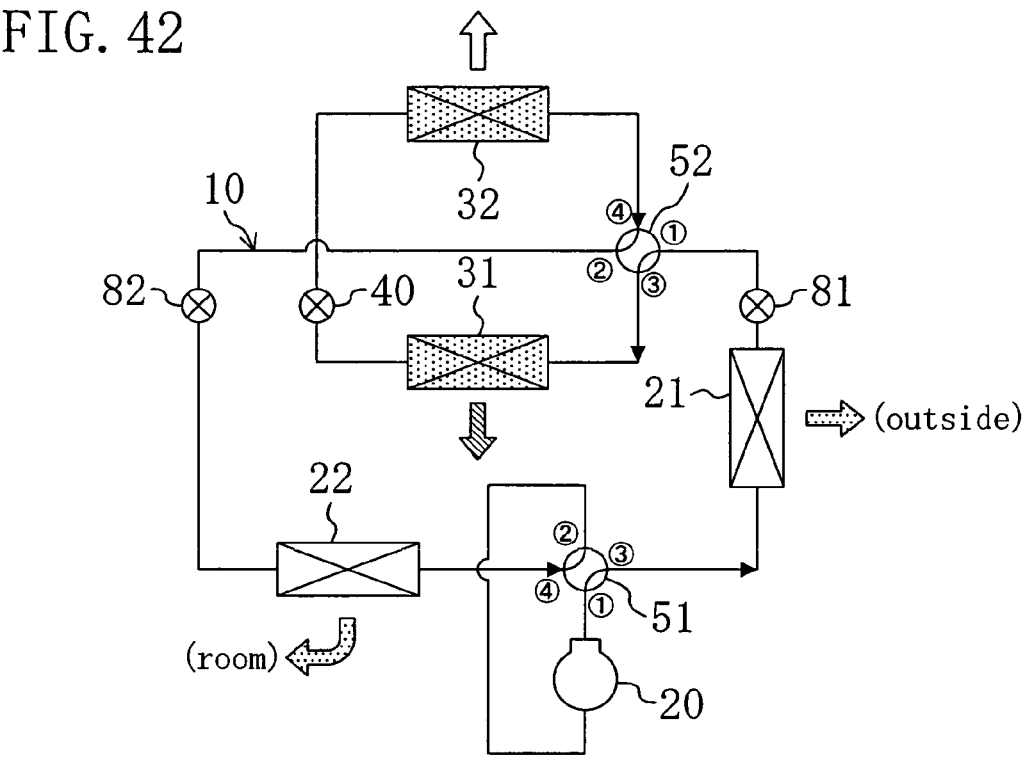
FIG. 42 is a schematic diagram showing the configuration of a refrigerant circuit in a second modification included in other embodiments and its behavior during the dehumidification cooling operation.
Figure 43:
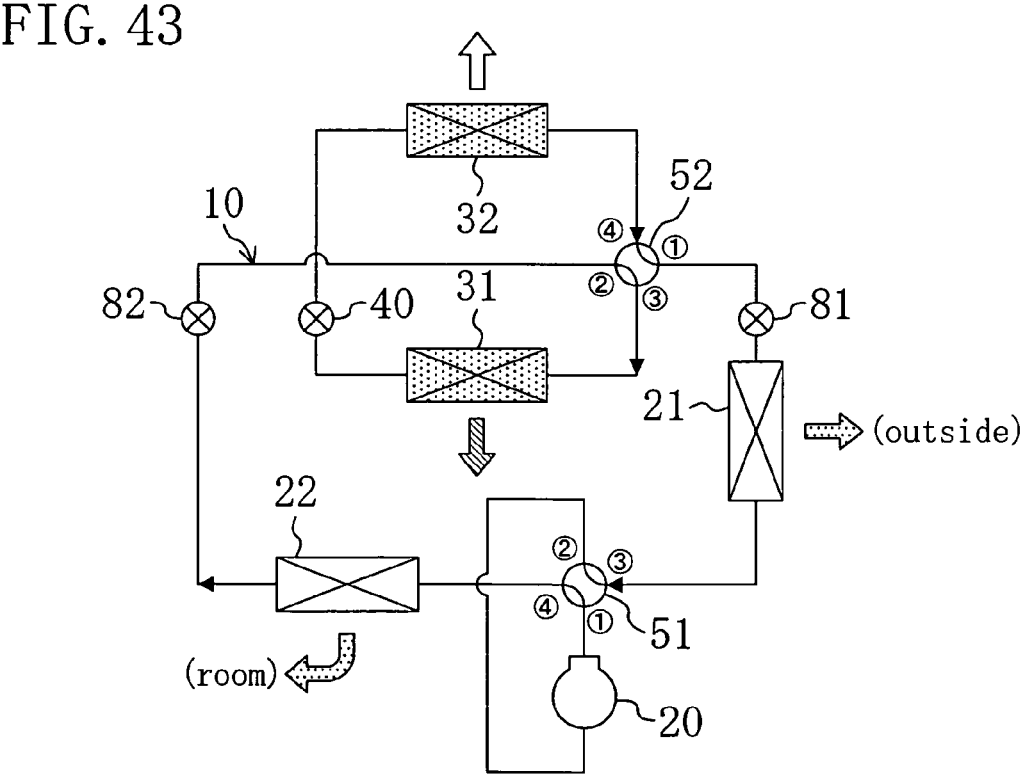
FIG. 43 is a schematic diagram showing the configuration of the refrigerant circuit in the second modification included in other embodiments and its behavior during the humidification heating operation.

In the air conditioning system of Embodiment 8, as shown in FIGS. 42 and 43, two auxiliary motor-operated expansion valves (81, 82) may be additionally provided in the refrigerant circuit (10). In the refrigerant circuit (10), the first auxiliary motor-operated expansion valve (81) is placed between the first port of the second four-way selector valve (52) and the outdoor heat exchanger (21). The second auxiliary motor-operated expansion valve (82) is placed between the second port of the second four-way selector valve (52) and the indoor heat exchanger (22).

As shown in FIG. 42, during the dehumidification cooling operation, the outdoor heat exchanger (21) serves as a condenser and the indoor heat exchanger (22) serves as an evaporator. Further, in the refrigerant circuit (10), a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated. The figure shows the conditions in the first mode.

For example, if the refrigerant is slightly reduced in pressure by the second auxiliary motor-operated expansion valve (82) under the conditions that the second adsorption heat exchanger (32) and the indoor heat exchanger (22) are serving as evaporators, the refrigerant evaporation temperature in the indoor heat exchanger (22) is set to be lower than that in the second adsorption heat exchanger (32). Also under the conditions that the first adsorption heat exchanger (31) is serving as an evaporator instead of the second adsorption heat exchanger (32), if the refrigerant is slightly reduced in pressure by the second auxiliary motor-operated expansion valve (82), the refrigerant evaporation temperature in the indoor heat exchanger (22) is set to be lower than that in the second adsorption heat exchanger (32).

Furthermore, if the refrigerant is slightly reduced in pressure by the first auxiliary motor-operated expansion valve (81) under the conditions that the outdoor heat exchanger (21) and the first adsorption heat exchanger (31) are serving as condensers, the refrigerant condensation temperature in the first adsorption heat exchanger (31) is set to be lower than that in the outdoor heat exchanger (21). Also under the conditions that the second adsorption heat exchanger (32) is serving as a condenser instead of the first adsorption heat exchanger (31), if the refrigerant is slightly reduced in pressure by the first auxiliary motor-operated expansion valve (81), the refrigerant condensation temperature in the second adsorption heat exchanger (32) is set to be lower than that in the outdoor heat exchanger (21).

During the dehumidification cooling operation, if the refrigerant evaporation temperatures in the adsorption heat exchanger (31, 32) and the indoor heat exchanger (22) both serving as evaporators are set to have different values in the above manner, each of the amounts of heat taken by refrigerant in these heat exchangers can be controlled. Further, if the refrigerant condensation temperatures in the adsorption heat exchanger (30) and the outdoor heat exchanger (21) both serving as condensers are set to have different values in the above manner, each of the amounts of heat released by refrigerant in these heat exchangers can be controlled. Therefore, in the air conditioning system of this modification, the balance between cooling capacity and dehumidification capacity can be changed.

As shown in FIG. 43, during the humidification heating operation, the indoor heat exchanger (22) serves as a condenser and the outdoor heat exchanger (21) serves as an evaporator. Further, in the refrigerant circuit (10), a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated. The figure shows the conditions in the first mode.

For example, if the refrigerant is slightly reduced in pressure by the first auxiliary motor-operated expansion valve (81) under the conditions that the second adsorption heat exchanger (32) and the outdoor heat exchanger (21) are serving as evaporators, the refrigerant evaporation temperature in the outdoor heat exchanger (21) is set to be lower than that in the second adsorption heat exchanger (32). Also under the conditions that the first adsorption heat exchanger (31) is serving as an evaporator instead of the second adsorption heat exchanger (32), if the refrigerant is slightly reduced in pressure by the first auxiliary motor-operated expansion valve (81), the refrigerant evaporation temperature in the outdoor heat exchanger (21) is set to be lower than that in the first adsorption heat exchanger (31).

Furthermore, if the refrigerant is slightly reduced in pressure by the second auxiliary motor-operated expansion valve (82) under the conditions that the indoor heat exchanger (22) and the first adsorption heat exchanger (31) are serving as condensers, the refrigerant condensation temperature in the first adsorption heat exchanger (31) is set to be lower than that in the indoor heat exchanger (22). Also under the conditions that the second adsorption heat exchanger (32) is serving as a condenser instead of the first adsorption heat exchanger (31), if the refrigerant is slightly reduced in pressure by the second auxiliary motor-operated expansion valve (82), the refrigerant condensation temperature in the second adsorption heat exchanger (32) is set to be lower than that in the indoor heat exchanger (22).

During the humidification heating operation, if the refrigerant condensation temperatures in the adsorption heat exchanger (31, 32) and the indoor heat exchanger (22) both serving as condensers are set to have different values in the above manner, each of the amounts of heat released by refrigerant in these heat exchangers can be controlled. Further, if the refrigerant evaporation temperatures in the adsorption heat exchanger (30) and the outdoor heat exchanger (21) both serving as evaporators are set to have different values in the above manner, each of the amounts of heat taken by refrigerant in these heat exchangers can be controlled. Therefore, in the air conditioning system of this modification, the balance between heating capacity and humidification capacity can be changed.

-Third Modification-

Figure 44:
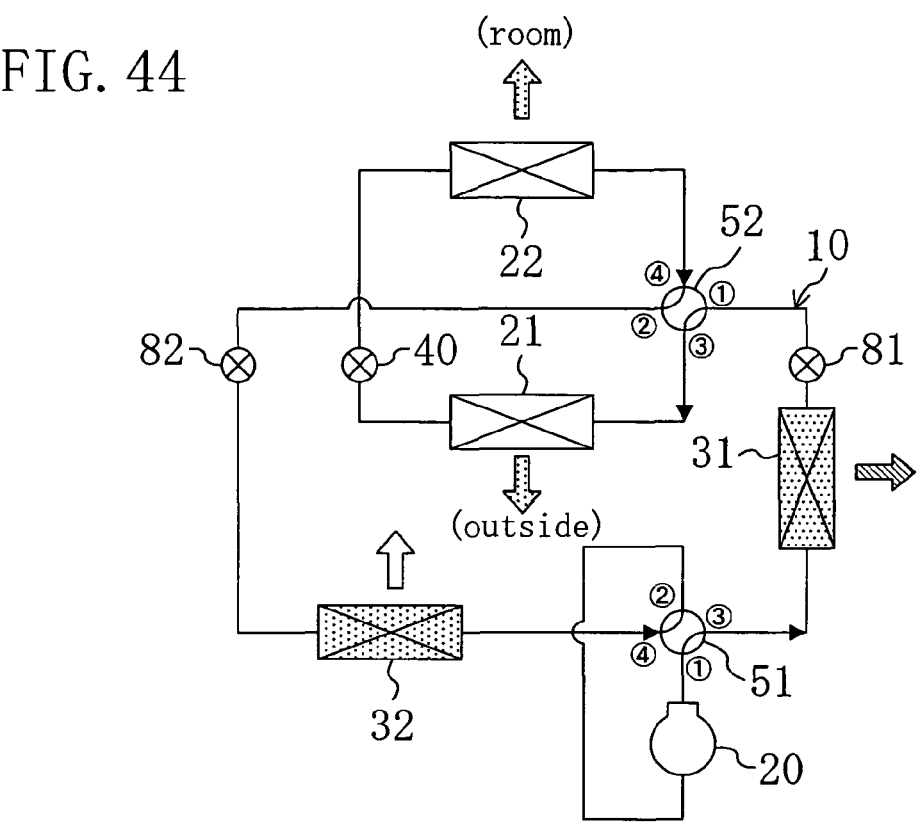
FIG. 44 is a schematic diagram showing the configuration of a refrigerant circuit in a third modification included in other embodiments and its behavior during the dehumidification cooling operation.
Figure 45:
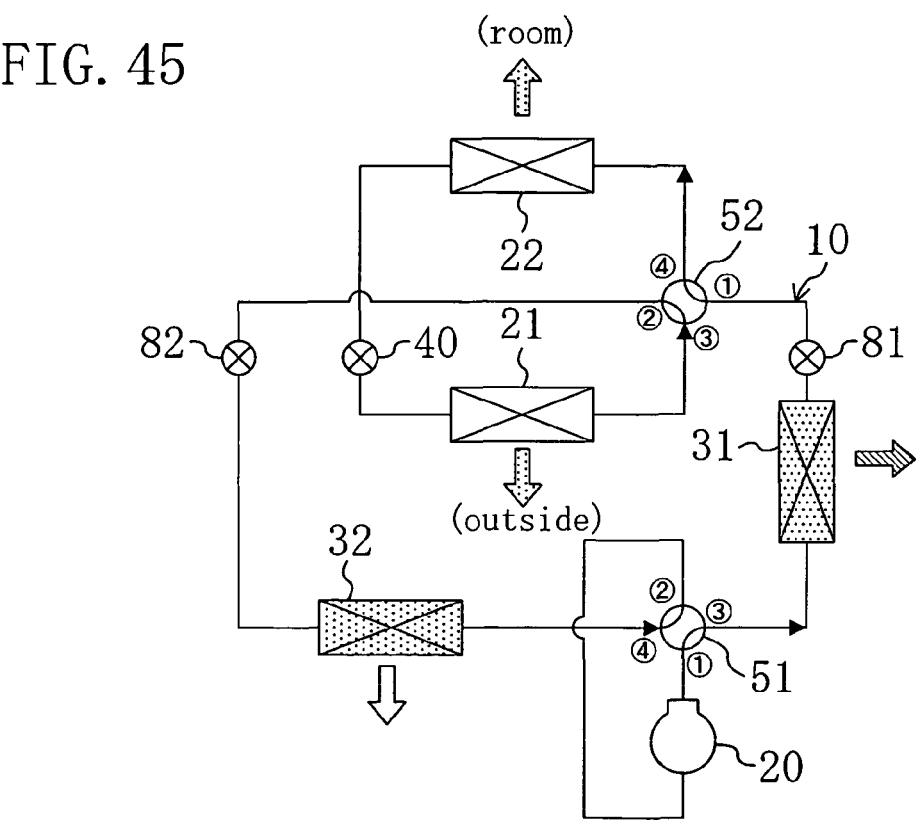
FIG. 45 is a schematic diagram showing the configuration of the refrigerant circuit in the third modification included in other embodiments and its behavior during the humidification heating operation.

In the air conditioning system of Embodiment 10, as shown in FIGS. 44 and 45, two auxiliary motor-operated expansion valves (81, 82) may be additionally provided in the refrigerant circuit (10). In the refrigerant circuit (10), the first auxiliary motor-operated expansion valve (81) is placed between the first port of the second four-way selector valve (52) and the first adsorption heat exchanger (31). The second auxiliary motor-operated expansion valve (82) is placed between the second port of the second four-way selector valve (52) and the second adsorption heat exchanger (32).

As shown in FIG. 44, during the dehumidification cooling operation, the outdoor heat exchanger (21) serves as a condenser and the indoor heat exchanger (22) serves as an evaporator. Further, in the refrigerant circuit (10), a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated. The figure shows the conditions in the first mode.

For example, if the refrigerant is slightly reduced in pressure by the second auxiliary motor-operated expansion valve (82) under the conditions that the indoor heat exchanger (22) and the second adsorption heat exchanger (32) are serving as evaporators, the refrigerant evaporation temperature in the second adsorption heat exchanger (32) is set to be lower than that in the indoor heat exchanger (22). Under the conditions that the first adsorption heat exchanger (31) is serving as an evaporator instead of the second adsorption heat exchanger (32), if the refrigerant is slightly reduced in pressure by the first auxiliary motor-operated expansion valve (81), the refrigerant evaporation temperature in the first adsorption heat exchanger (31) is set to be lower than that in the indoor heat exchanger (22).

Furthermore, if the refrigerant is slightly reduced in pressure by the first auxiliary motor-operated expansion valve (81) under the conditions that the first adsorption heat exchanger (31) and the outdoor heat exchanger (21) are serving as condensers, the refrigerant condensation temperature in the outdoor heat exchanger (21) is set to be lower than that in the first adsorption heat exchanger (31). Under the conditions that the second adsorption heat exchanger (32) is serving as a condenser instead of the first adsorption heat exchanger (31), if the refrigerant is slightly reduced in pressure by the second auxiliary motor-operated expansion valve (82), the refrigerant condensation temperature in the outdoor heat exchanger (21) is set to be lower than that in the second adsorption heat exchanger (32).

During the dehumidification cooling operation, if the refrigerant evaporation temperatures in the adsorption heat exchanger (31, 32) and the indoor heat exchanger (22) both serving as evaporators are set to have different values in the above manner, each of the amounts of heat taken by refrigerant in these heat exchangers can be controlled. Further, if the refrigerant condensation temperatures in the adsorption heat exchanger (30) and the outdoor heat exchanger (21) both serving as condensers are set to have different values in the above manner, each of the amounts of heat released by refrigerant in these heat exchangers can be controlled. Therefore, in the air conditioning system of this modification, the balance between cooling capacity and dehumidification capacity can be changed.

As shown in FIG. 45, during the humidification heating operation, the indoor heat exchanger (22) serves as a condenser and the outdoor heat exchanger (21) serves as an evaporator. Further, in the refrigerant circuit (10), a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated. The figure shows the conditions in the first mode.

For example, if the refrigerant is slightly reduced in pressure by the second auxiliary motor-operated expansion valve (82) under the conditions that the outdoor heat exchanger (21) and the second adsorption heat exchanger (32) are serving as evaporators, the refrigerant evaporation temperature in the second adsorption heat exchanger (32) is set to be lower than that in the outdoor heat exchanger (21). Under the conditions that the first adsorption heat exchanger (31) is serving as an evaporator instead of the second adsorption heat exchanger (32), if the refrigerant is slightly reduced in pressure by the first auxiliary motor-operated expansion valve (81), the refrigerant evaporation temperature in the first adsorption heat exchanger (31) is set to be lower than that in the outdoor heat exchanger (21).

Furthermore, if the refrigerant is slightly reduced in pressure by the first auxiliary motor-operated expansion valve (81) under the conditions that the first adsorption heat exchanger (31) and the indoor heat exchanger (22) are serving as condensers, the refrigerant condensation temperature in the indoor heat exchanger (22) is set to be lower than that in the first adsorption heat exchanger (31). Under the conditions that the second adsorption heat exchanger (32) is serving as a condenser instead of the first adsorption heat exchanger (31), if the refrigerant is slightly reduced in pressure by the second auxiliary motor-operated expansion valve (82), the refrigerant condensation temperature in the indoor heat exchanger (22) is set to be lower than that in the second adsorption heat exchanger (32).

During the humidification heating operation, if the refrigerant condensation temperatures in the adsorption heat exchanger (31, 32) and the indoor heat exchanger (22) both serving as condensers are set to have different values in the above manner, each of the amounts of heat released by refrigerant in these heat exchangers can be controlled. Further, if the refrigerant evaporation temperatures in the adsorption heat exchanger (30) and the outdoor heat exchanger (21) both serving as evaporators are set to have different values in the above manner, each of the amounts of heat taken by refrigerant in these heat exchangers can be controlled. Therefore, in the air conditioning system of this modification, the balance between heating capacity and humidification capacity can be changed.

-Fourth Modification-

In the air conditioning system of Embodiment 12, a single auxiliary motor-operated expansion valve may be additionally provided in the refrigerant circuit (10).

Figure 46:
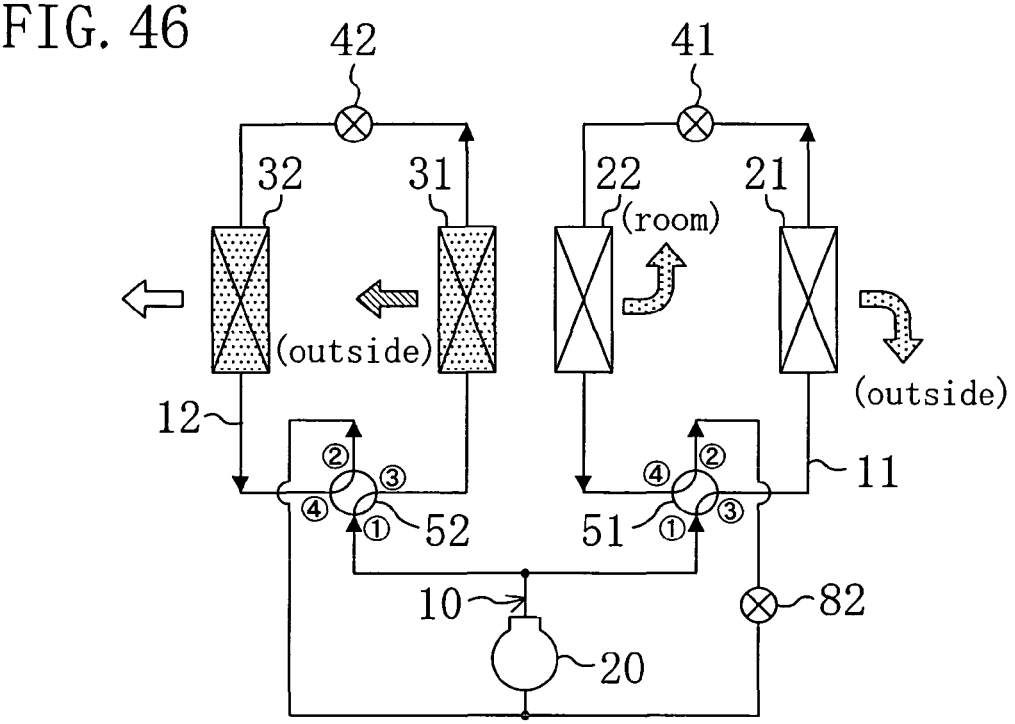
FIG. 46 is a schematic diagram showing the configuration of a refrigerant circuit in a fourth modification included in other embodiments and its behavior during the dehumidification cooling operation.
Figure 47:
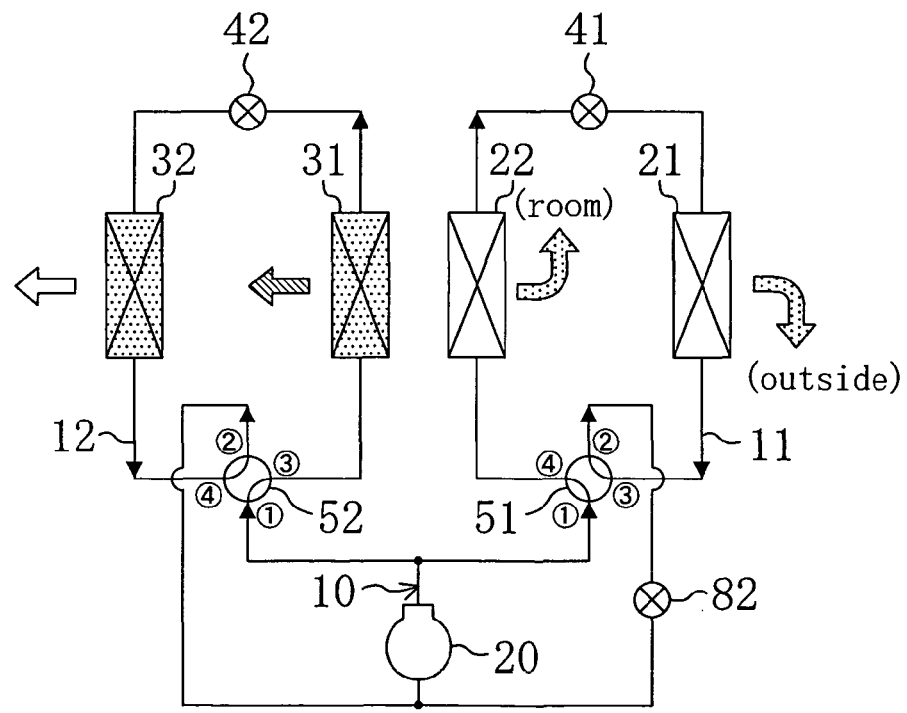
FIG. 47 is a schematic diagram showing the configuration of the refrigerant circuit in the fourth modification included in other embodiments and its behavior during the humidification heating operation.

For example, as shown in FIGS. 46 and 47, the single auxiliary motor-operated expansion valve (82) may be placed between the suction side of the compressor (20) and the first four-way selector valve (51) in the refrigerant circuit (10).

As shown in FIG. 46, during the dehumidification cooling operation, the outdoor heat exchanger (21) serves as a condenser and the indoor heat exchanger (22) serves as an evaporator. Further, in the refrigerant circuit (10), a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated. The figure shows the conditions in the first mode.

If the refrigerant is slightly reduced in pressure by the auxiliary motor-operated expansion valve (82) under the conditions that the second adsorption heat exchanger (32) and the indoor heat exchanger (22) are serving as evaporators, the refrigerant evaporation temperature in the indoor heat exchanger (22) is set to be higher than that in the second adsorption heat exchanger (32). Also under the conditions that the first adsorption heat exchanger (31) is serving as an evaporator instead of the second adsorption heat exchanger (32), if the refrigerant is reduced in pressure by the auxiliary motor-operated expansion valve (82), the refrigerant evaporation temperature in the indoor heat exchanger (22) is set to be higher than that in the first adsorption heat exchanger (31).

During the dehumidification cooling operation, if the refrigerant evaporation temperatures in the adsorption heat exchanger (31, 32) and the indoor heat exchanger (22) both serving as evaporators are set to have different values in the above manner, each of the amounts of heat taken by refrigerant in these heat exchangers can be controlled. Therefore, in the air conditioning system of this modification, the balance between cooling capacity and dehumidification capacity can be changed.

As shown in FIG. 47, during the humidification heating operation, the indoor heat exchanger (22) serves as a condenser and the outdoor heat exchanger (21) serves as an evaporator. Further, in the refrigerant circuit (10), a first mode in which the first adsorption heat exchanger (31) serves as a condenser and the second adsorption heat exchanger (32) serves as an evaporator and a second mode in which the second adsorption heat exchanger (32) serves as a condenser and the first adsorption heat exchanger (31) serves as an evaporator are repeatedly alternated. The figure shows the conditions in the first mode.

If the refrigerant is slightly reduced in pressure by the auxiliary motor-operated expansion valve (82) under the conditions that the outdoor heat exchanger (21) and the second adsorption heat exchanger (32) are serving as evaporators, the refrigerant evaporation temperature in the outdoor heat exchanger (21) is set to be higher than that in the second adsorption heat exchanger (32). Also under the conditions that the first adsorption heat exchanger (31) is serving as an evaporator instead of the second adsorption heat exchanger (32), if the refrigerant is reduced in pressure by the auxiliary motor-operated expansion valve (82), the refrigerant evaporation temperature in the outdoor heat exchanger (21) is set to be higher than that in the first adsorption heat exchanger (31).

During the humidification heating operation, if the refrigerant evaporation temperatures in the adsorption heat exchanger (31, 32) and the indoor heat exchanger (22) both serving as evaporators are set to have different values in the above manner, each of the amounts of heat taken by refrigerant in these heat exchangers can be controlled. Therefore, in the air conditioning system of this modification, the amount of heat taken by refrigerant in the refrigeration cycle and the amount of moisture adsorption of the adsorption heat exchanger (30) can be controlled. As a result, the balance between heating capacity and humidification capacity can be changed.

Figure 48:
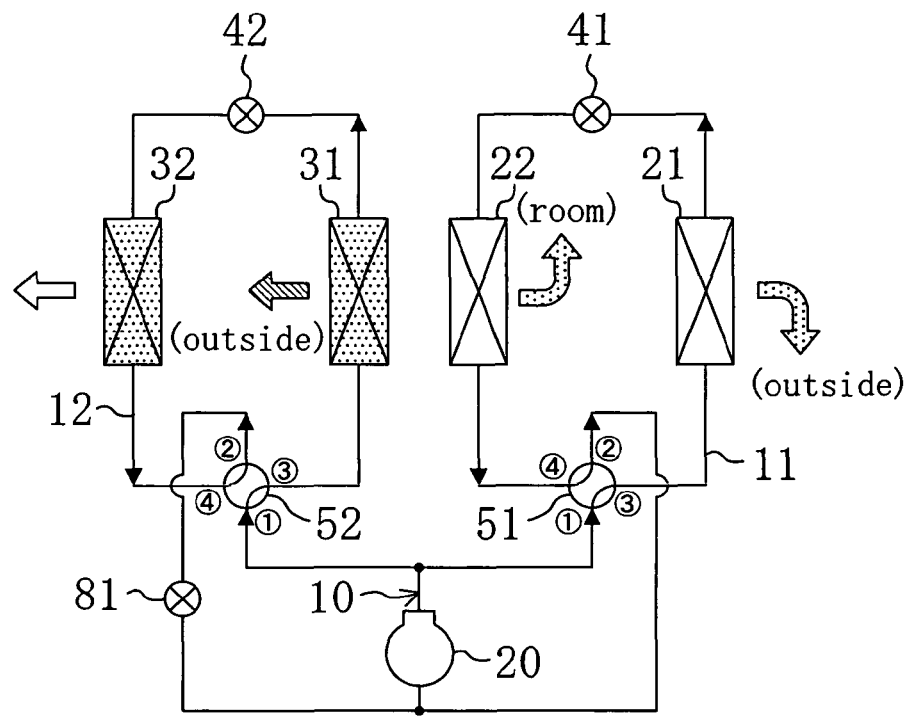
FIG. 48 is a schematic diagram showing the configuration of the refrigerant circuit in the fourth modification included in other embodiments.

Alternatively, as shown in FIG. 48, the single auxiliary motor-operated expansion valve (81) may be placed between the suction side of the compressor (20) and the second four-way selector valve (52) in the refrigerant circuit (10). If the refrigerant is slightly reduced in pressure by the auxiliary motor-operated expansion valve (81) under the conditions that the indoor heat exchanger (22) is serving as an evaporator, the refrigerant evaporation temperature in one of the adsorption heat exchangers (31, 32) serving as an evaporator is set to be higher than that in the indoor heat exchanger (22). Further, if the refrigerant is slightly reduced in pressure by the auxiliary motor-operated expansion valve (81) under the conditions that the outdoor heat exchanger (21) is serving as an evaporator, the refrigerant evaporation temperature in one of the adsorption heat exchangers (31, 32) serving as an evaporator is set to be higher than that in the outdoor heat exchanger (21).

-Fifth Modification-

In the air conditioning system of Embodiment 12, two auxiliary motor-operated expansion valves (81, 82) may be additionally provided in the refrigerant circuit (10).

Figure 49:
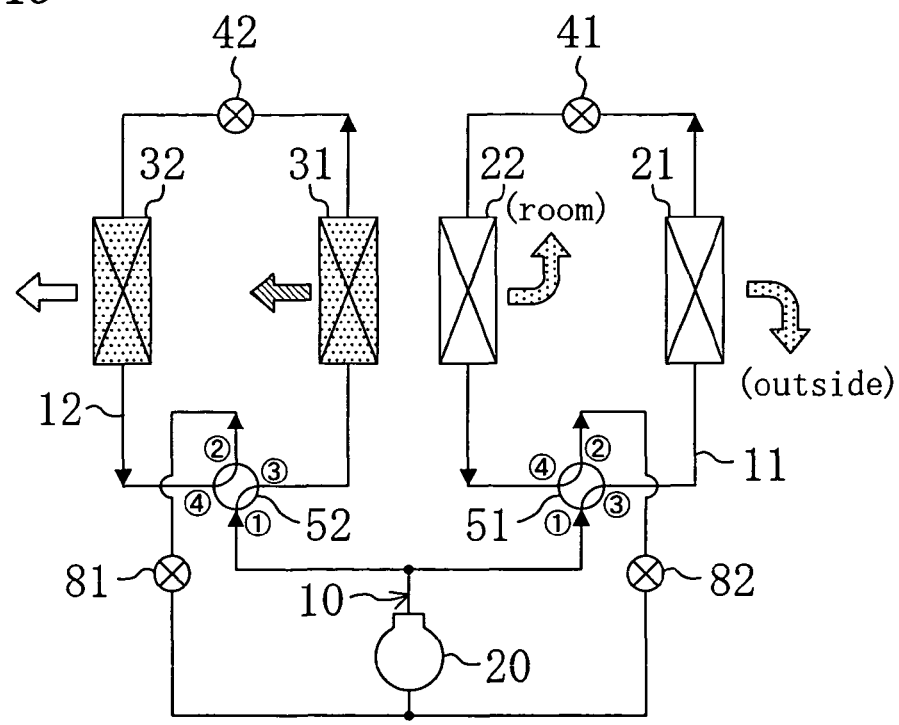
FIG. 49 is a schematic diagram showing the configuration of a refrigerant circuit in a fifth modification included in other embodiments.

As shown in FIG. 49, in the refrigerant circuit (10), the first auxiliary motor-operated expansion valve (81) is placed between the suction side of the compressor (20) and the second four-way selector valve (52) and the second auxiliary motor-operated expansion valve (82) is placed between the suction side of the compressor (20) and the first four-way selector valve (51). If the two auxiliary motor-operated expansion valves (81, 82) are additionally provided in the refrigerant circuit (10) in this manner, the refrigerant evaporation temperatures in the adsorption heat exchangers (31, 32) can be set to be higher and lower than that in the outdoor heat exchanger (21) or the indoor heat exchanger (22).

Suppose, for example, that the indoor heat exchanger (22) is serving as an evaporator. If, in this case, the opening of the first auxiliary motor-operated expansion valve (81) is set to be larger than that of the second motor-operated expansion valve (82), the refrigerant evaporation temperature in one of the adsorption heat exchangers (31, 32) serving as an evaporator is set to be lower than that in the indoor heat exchanger (22). On the contrary, if, in the above case, the opening of the first auxiliary motor-operated expansion valve (81) is set to be smaller than that of the second motor-operated expansion valve (82), the refrigerant evaporation temperature in the one adsorption heat exchanger (31, 32) serving as an evaporator is set to be higher than that in the indoor heat exchanger (22).

Suppose next that the outdoor heat exchanger (21) is serving as an evaporator. If, in this case, the opening of the first auxiliary motor-operated expansion valve (81) is set to be larger than that of the second motor-operated expansion valve (82), the refrigerant evaporation temperature in one of the adsorption heat exchangers (31, 32) serving as an evaporator is set to be lower than that in the outdoor heat exchanger (21). On the contrary, if, in the above case, the opening of the first auxiliary motor-operated expansion valve (81) is set to be smaller than that of the second motor-operated expansion valve (82), the refrigerant evaporation temperature in the one adsorption heat exchanger (31, 32) serving as an evaporator is set to be higher than that in the outdoor heat exchanger (21).

-Sixth Modification-

Figure 50:
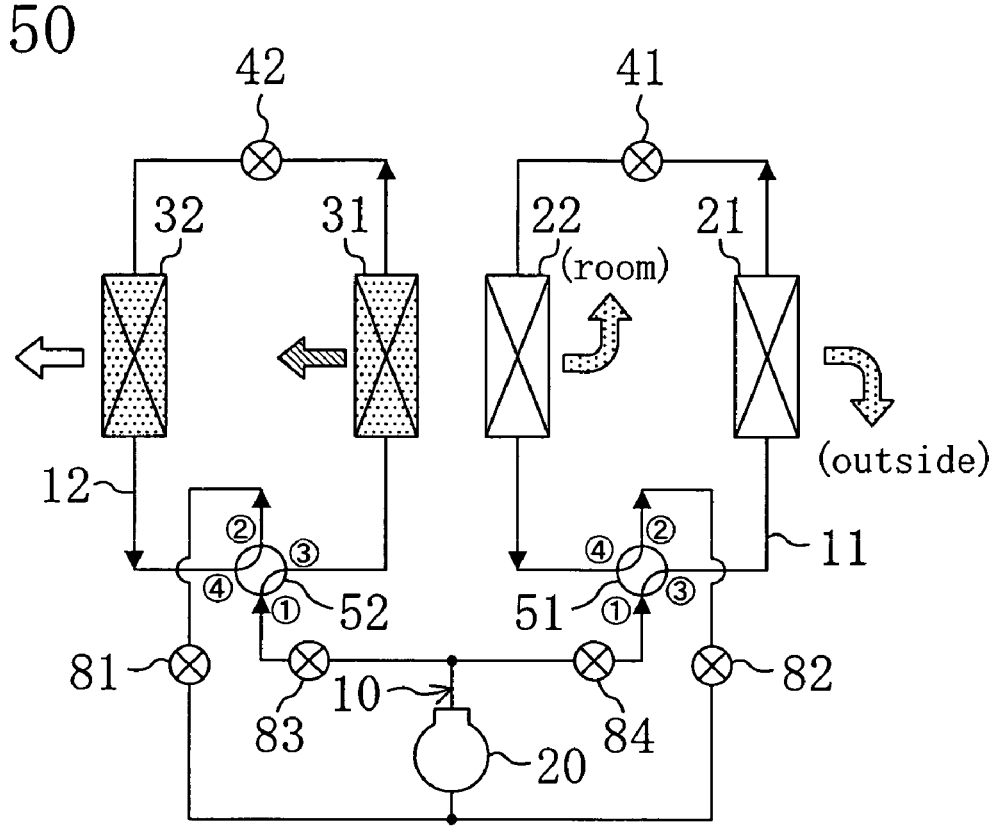
FIG. 50 is a schematic diagram showing the configuration of a refrigerant circuit in a sixth modification included in other embodiments.

In the air conditioning system of the fifth modification, as shown in FIG. 50, a third auxiliary motor-operated expansion valve (83) and a fourth auxiliary motor-operated expansion valve (84) may be additionally provided in the refrigerant circuit (10). In the refrigerant circuit (10), the third auxiliary motor-operated expansion valve (83) is placed between the discharge side of the compressor (20) and the second four-way selector valve (52). The fourth auxiliary motor-operated expansion valve (84) is placed between the discharge side of the compressor (20) and the first four-way selector valve (51).

If the third auxiliary motor-operated expansion valve (83) and the fourth auxiliary motor-operated expansion valve (84) are additionally provided in the refrigerant circuit (10) as in this modification, the refrigerant condensation temperatures in the adsorption heat exchangers (31, 32) can be set to be higher and lower than that in the outdoor heat exchanger (21) or the indoor heat exchanger (22). Specifically, if the opening of the third auxiliary motor-operated expansion valve (83) is set to be larger than that of the fourth motor-operated expansion valve (84), the refrigerant condensation temperature in the adsorption heat exchanger (31, 32) is set to be higher than that in the outdoor heat exchanger (21) or the indoor heat exchanger (22). On the contrary, if the opening of the third auxiliary motor-operated expansion valve (83) is set to be smaller than that of the fourth motor-operated expansion valve (84), the refrigerant condensation temperature in the adsorption heat exchanger (31, 32) is set to be lower than that in the outdoor heat exchanger (21) or the indoor heat exchanger (22).

In the air conditioning system of this modification, during the dehumidification cooling operation, if the refrigerant condensation temperatures in the adsorption heat exchanger (30) and the outdoor heat exchanger (21) both serving as condensers are set to have different values, each of the amounts of heat released by refrigerant in these heat exchangers can be controlled. Therefore, in the air conditioning system of this modification, the amount of heat released by refrigerant in the refrigeration cycle and the amount of regeneration of the adsorption heat exchanger (30) can be controlled. As a result, the balance between cooling capacity and dehumidification capacity can be changed.

Further, in the air conditioning system of this modification, during the humidification heating operation, if the refrigerant condensation temperatures in the adsorption heat exchanger (31, 32) and the indoor heat exchanger (22) both serving as condensers are set to have different values, each of the amounts of heat released by refrigerant in these heat exchangers can be controlled. Therefore, in the air conditioning system of this modification, the balance between heating capacity and humidification capacity can be changed.

-Seventh Modification-

Figure 51:
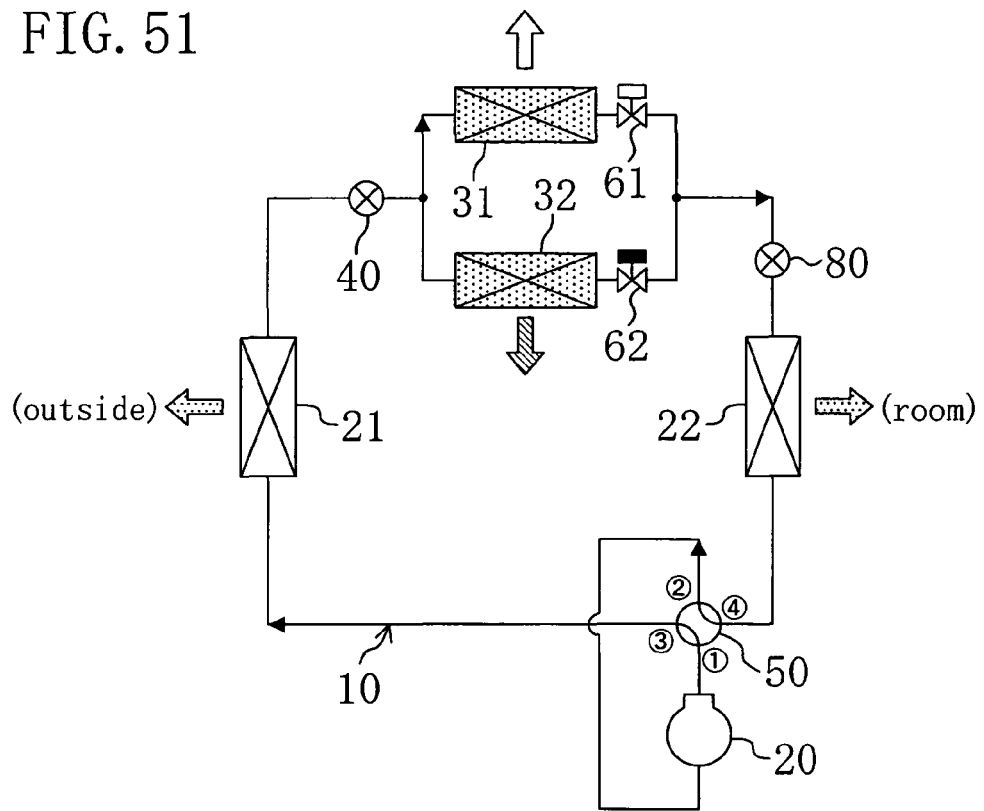
FIG. 51 is a schematic diagram showing the configuration of a refrigerant circuit in a seventh modification included in other embodiments and its behavior during the dehumidification cooling operation.
Figure 52:
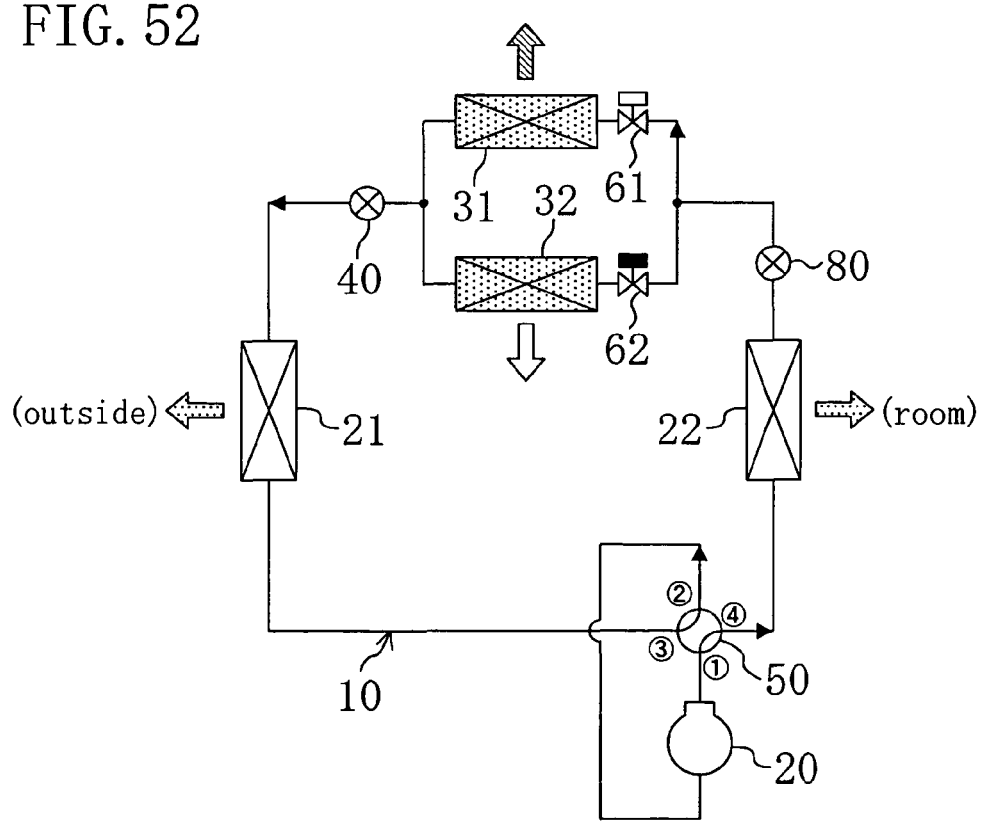
FIG. 52 is a schematic diagram showing the configuration of the refrigerant circuit in the seventh modification included in other embodiments and its behavior during the humidification heating operation.

In the air conditioning system of Embodiment 16, as shown in FIGS. 51 and 52, another motor-operated expansion valve (80) may be additionally provided in the refrigerant circuit (10). In the refrigerant circuit (10), the motor-operated expansion valve (80) is placed between each of the first solenoid valve (61) and the second solenoid valve (62) and the indoor heat exchanger (22).

As shown in FIG. 51, during the dehumidification cooling operation, the outdoor heat exchanger (21) serves as a condenser and the indoor heat exchanger (22) serves as an evaporator. Further, in the refrigerant circuit (10), a first mode in which the first adsorption heat exchanger (31) serves as an evaporator and the second adsorption heat exchanger (32) is in non-operating condition and a second mode in which the second adsorption heat exchanger (32) serves as an evaporator and the first adsorption heat exchanger (31) is in non-operating condition are repeatedly alternated. The figure shows the conditions in the first mode.

For example, if the refrigerant is slightly reduced in pressure by the motor-operated expansion valve (80) under the conditions that the first adsorption heat exchanger (31) and the indoor heat exchanger (22) are serving as evaporators, the refrigerant evaporation temperature in the indoor heat exchanger (22) is set to be lower than that in the first adsorption heat exchanger (31). Also under the conditions that the second adsorption heat exchanger (32) is serving as an evaporator instead of the first adsorption heat exchanger (31), if the refrigerant is reduced in pressure by the motor-operated expansion valve (80), the refrigerant evaporation temperature in the indoor heat exchanger (22) is set to be lower than that in the second adsorption heat exchanger (32).

During the dehumidification cooling operation, if the refrigerant evaporation temperatures in the adsorption heat exchanger (31, 32) and the indoor heat exchanger (22) both serving as evaporators are set to have different values in the above manner, each of the amounts of heat taken by refrigerant in these heat exchangers can be controlled. Therefore, in the air conditioning system of this modification, the balance between cooling capacity and dehumidification capacity can be changed.

As shown in FIG. 52, during the humidification heating operation, the indoor heat exchanger (22) serves as a condenser and the outdoor heat exchanger (21) serves as an evaporator. Further, in the refrigerant circuit (10), a first mode in which the first adsorption heat exchanger (31) serves as a condenser and the second adsorption heat exchanger (32) is in non-operating condition and a second mode in which the second adsorption heat exchanger (32) in the second circuit (12) serves as a condenser and the first adsorption heat exchanger (31) is in non-operating condition are repeatedly alternated. The figure shows the conditions in the first mode.

For example, if the refrigerant is slightly reduced in pressure by the motor-operated expansion valve (80) under the conditions that the indoor heat exchanger (22) and the first adsorption heat exchanger (31) are serving as condensers, the refrigerant condensation temperature in the first adsorption heat exchanger (31) is set to be lower than that in the indoor heat exchanger (22). Also under the conditions that the second adsorption heat exchanger (32) is serving as a condenser instead of the first adsorption heat exchanger (31), if the refrigerant is slightly reduced in pressure by the motor-operated expansion valve (80), the refrigerant condensation temperature in the second adsorption heat exchanger (32) is set to be lower than that in the indoor heat exchanger (22).

During the humidification heating operation, if the refrigerant condensation temperatures in the adsorption heat exchanger (31, 32) and the indoor heat exchanger (22) both serving as condensers are set to have different values in the above manner, each of the amounts of heat released by refrigerant in these heat exchangers can be controlled. Therefore, in the air conditioning system of this modification, the balance between heating capacity and humidification capacity can be changed.

-Eighth Modification-

The air conditioning system of each of the above embodiments may be provided with a heat exchange element (90). A description will be given here to the air conditioning system of Embodiment 8 additionally provided with a heat exchange element (90) with reference to FIGS. 53 and 54.

The heat exchange element (90) is composed of a rotary sensible heat exchanger. The heat exchange element (90) is formed in the shape of a slightly thick disc and is driven into rotation around its central axis. Further, the heat exchange element (90) is placed to pass a first air through part thereof and pass a second air through the remaining part, thereby allowing the first and second airs to exchange heat with each other.

Figure 53A:
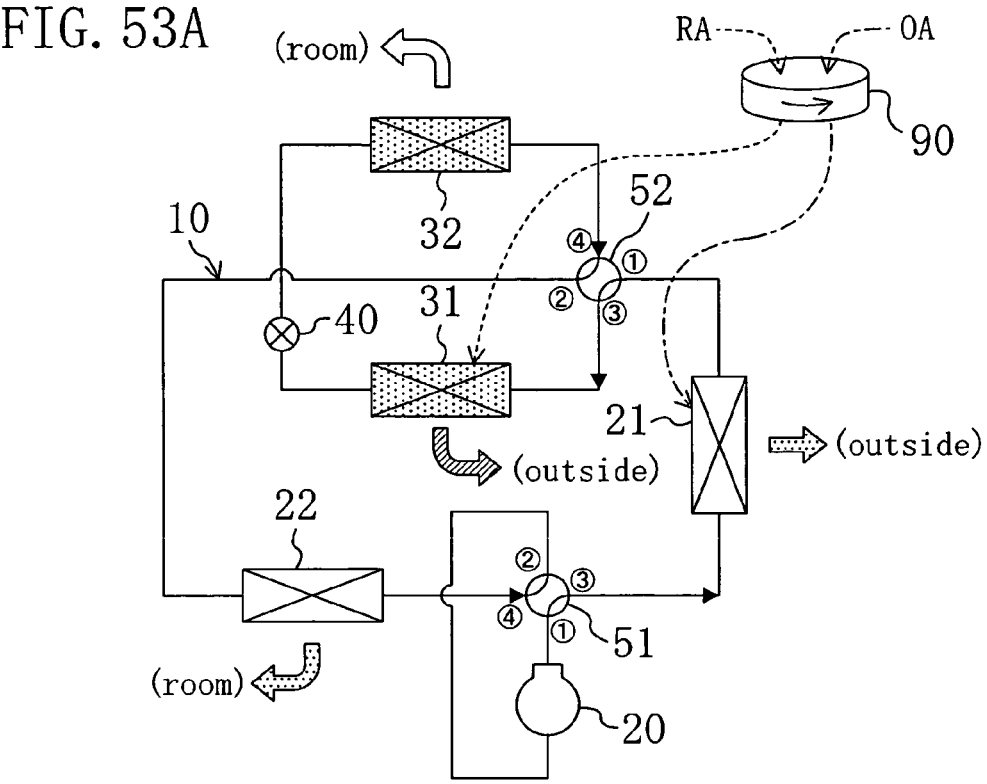
FIG. 53 is a schematic diagram showing the configuration of a refrigerant circuit in an eighth modification included in other embodiments and its behavior during the dehumidification cooling operation.
Figure 53B:
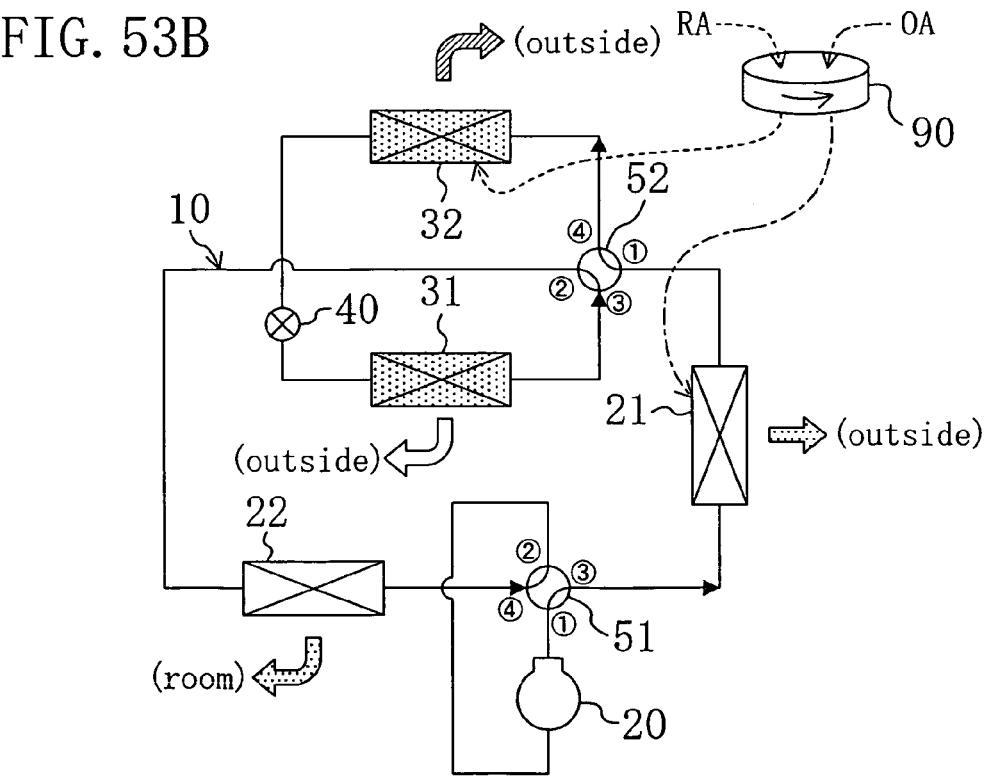

During the dehumidification cooling operation, high-temperature outdoor air (OA) is supplied as the first air to the heat exchange element (90) and low-temperature room air (RA) is supplied as the second air to the heat exchange element (90) (see FIG. 53). In the heat exchange element (90), heat exchange occurs between the first air (outdoor air) and the second air (room air) so that the first air is cooled and the second air is heated. The first air cooled by the heat exchange element (90) is fed to the outdoor heat exchanger (21). The second air heated by the heat exchange element (90) is fed as air for regeneration to one of the adsorption heat exchangers (31, 32) serving as a condenser. In other words, the first air is fed to the first adsorption heat exchanger (31) during the first mode (see FIG. 53(A)), and it is fed to the second adsorption heat exchanger (32) during the second mode (see FIG. 53(B)).

Figure 54A:
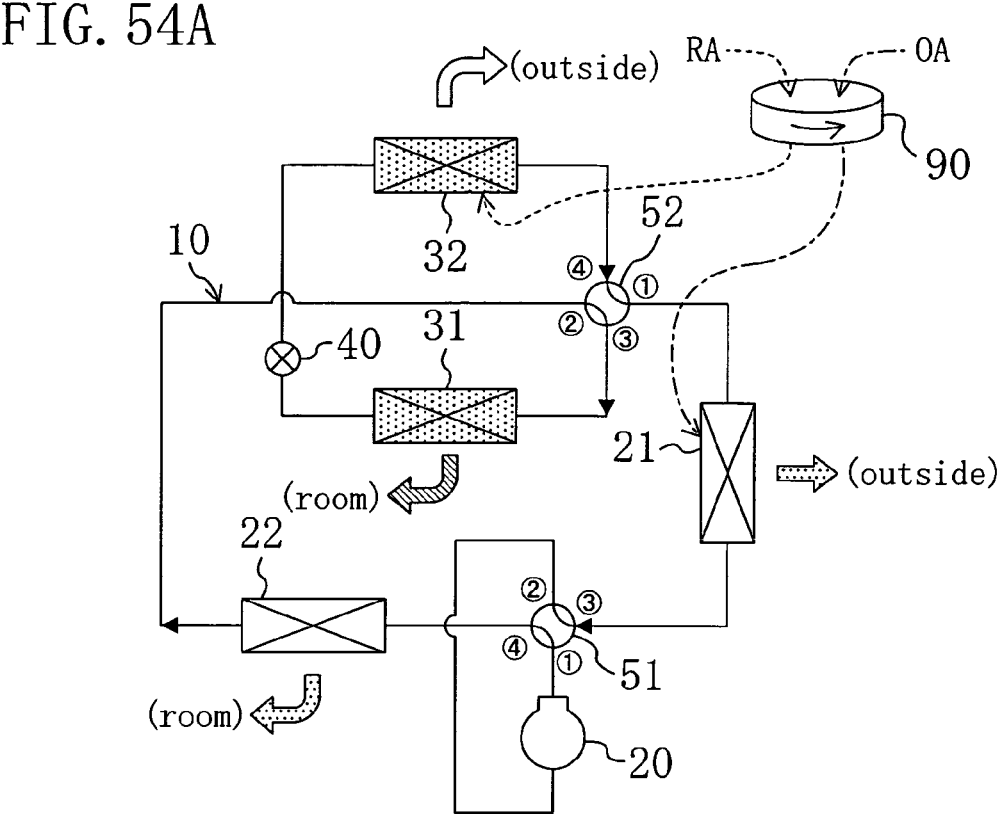
FIG. 54 is a schematic diagram showing the configuration of the refrigerant circuit in the eighth modification included in other embodiments and its behavior during the humidification heating operation.
Figure 54B:
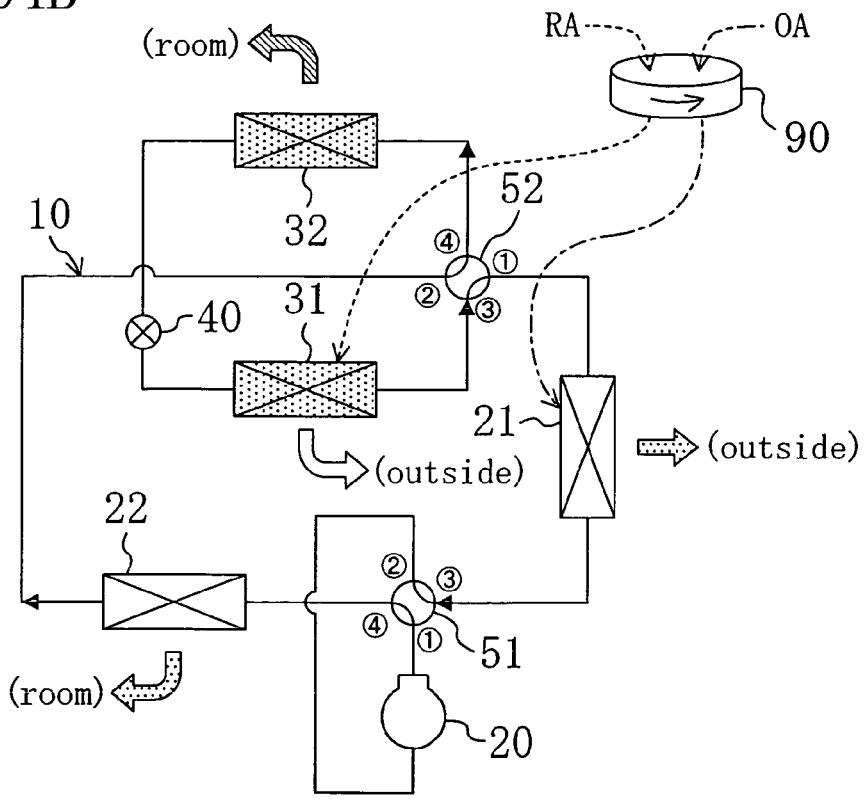

During the humidification heating operation, high-temperature room air (RA) is supplied as the first air to the heat exchange element (90) and low-temperature outdoor air (OA) is supplied as the second air to the heat exchange element (90) (see FIG. 54). In the heat exchange element (90), heat exchange occurs between the first air (room air) and the second air (outdoor air) so that the first air is cooled and the second air is heated. The first air cooled by the heat exchange element (90) is fed as air for adsorption to one of the adsorption heat exchangers (31, 32) serving as an evaporator. In other words, the first air is fed to the second adsorption heat exchanger (32) during the first mode (see FIG. 54(A)), and it is fed to the first adsorption heat exchanger (31) during the second mode (see FIG. 54(B)). On the other hand, the second air heated by the heat exchange element (90) is fed to the outdoor heat exchanger (21).

According to this modification, since the second air as air for regeneration is previously heated by the heat exchange element (90) during the dehumidification cooling operation, the adsorbent can be efficiently regenerated. This increases the amount of moisture adsorbed by the adsorption heat exchanger (31, 32), which enhances the dehumidification capacity of the air conditioning system. Further, since the first air as air for adsorption is previously cooled by the heat exchange element (90) during the heating humidification mode, the adsorbent can efficiently adsorb moisture. This increases the amount of moisture desorbed from the adsorption heat exchanger (31, 32) and then applied to the air, which enhances the humidification capacity of the air conditioning system.

-Ninth Modification-

The air conditioning system of each of the above embodiments may be provided with adsorption rotor (95) as a latent heat handling element. A description will be given here to the air conditioning system of Embodiment 8 additionally provided with an adsorption rotor (95) with reference to FIGS. 55 and 56.

The adsorption rotor (95) is formed in the shape of a slightly thick disc and is driven into rotation around its central axis. An adsorbent such as zeolite is carried on the surface of the adsorption rotor (95). The adsorption rotor (95) is placed to pass air for adsorption through part thereof and pass air for regeneration through the remaining part. Further, the adsorption rotor (95) allows the air passing through it to come into contact with the adsorbent and thereby give or take moisture to or from the air.

In the air conditioning system of this modification, part of the room air taken therein is supplied as air for adsorption to one of the adsorption heat exchangers (31, 32) serving as an evaporator while the remaining part is supplied as air for regeneration to the other adsorption heat exchanger (31, 32) serving as a condenser. In this case, supplied to the adsorption rotor (95) are the air for adsorption before supplied to the adsorption heat exchanger (31, 32) and the air for regeneration after passing through the adsorption heat exchanger (31, 32). Then, the air for adsorption is dehumidified while passing through the adsorption rotor (95) and then dehumidified by the adsorption heat exchanger (31, 32) serving as an evaporator. On the other hand, the air for regeneration is given moisture and heat while passing through the adsorption heat exchanger (31, 32) serving as a condenser and then supplied to the adsorption rotor (95) to regenerate the adsorbent.

Figure 55A:
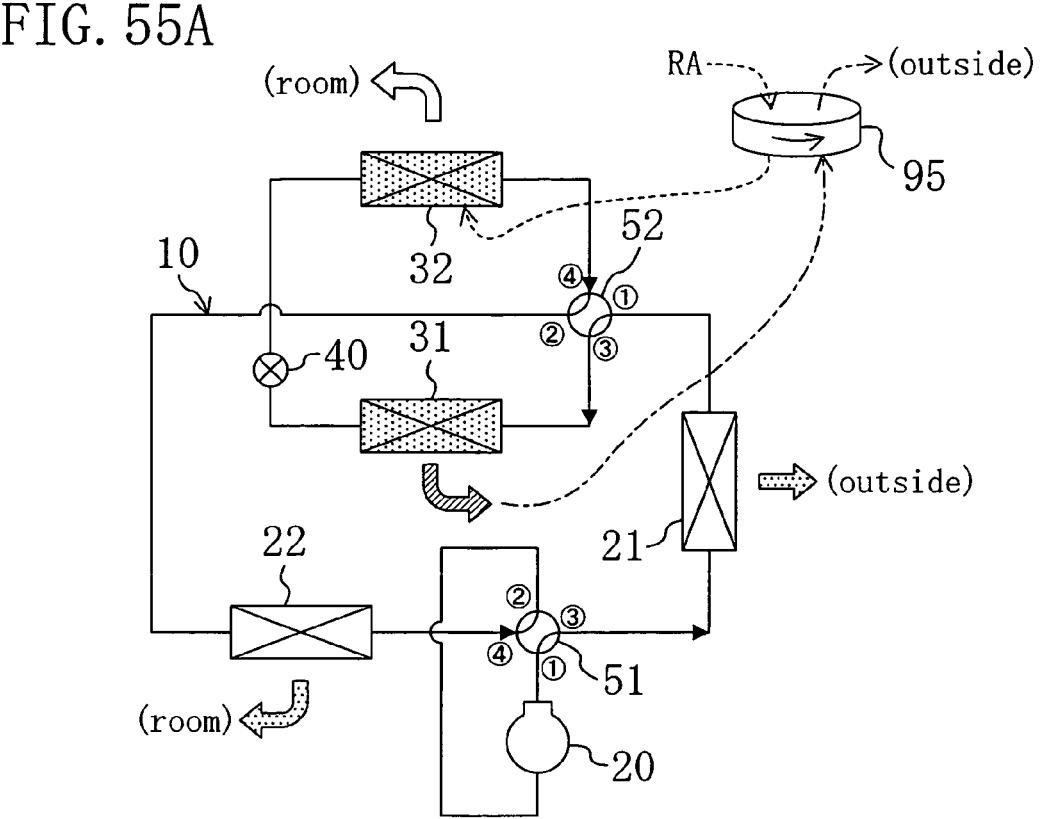
FIG. 55 is a schematic diagram showing the configuration of a refrigerant circuit in a ninth modification included in other embodiments and its behavior during the dehumidification cooling operation.
Figure 55B:
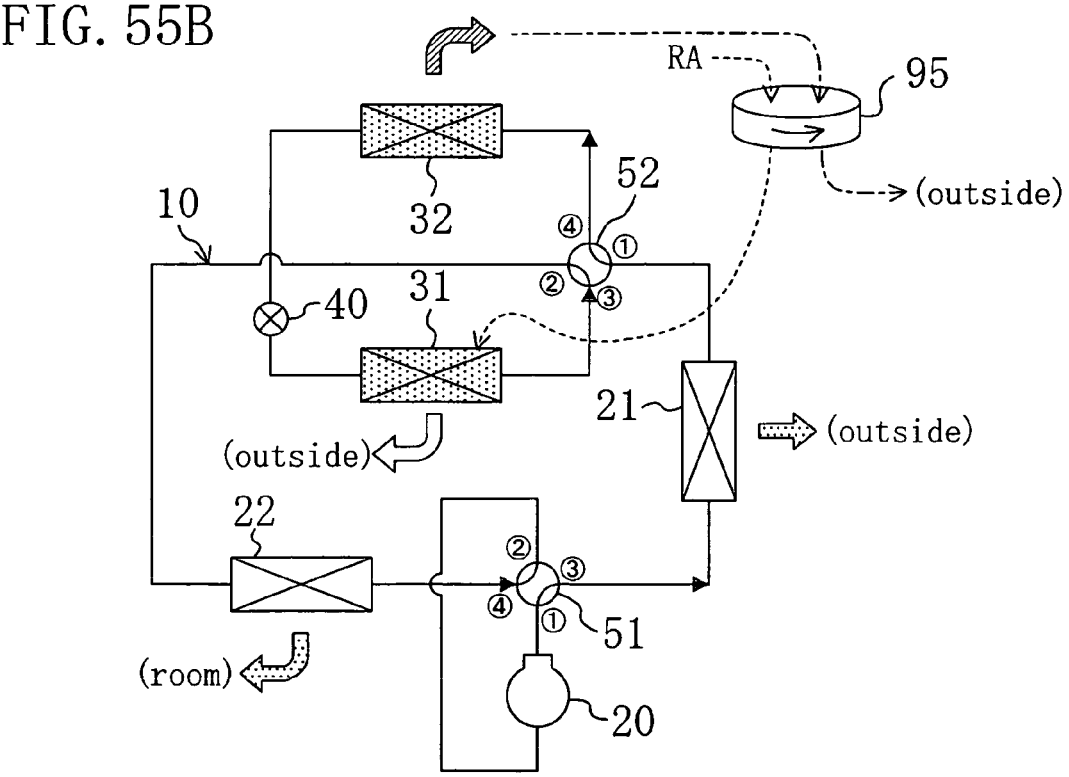
Figure 56A:
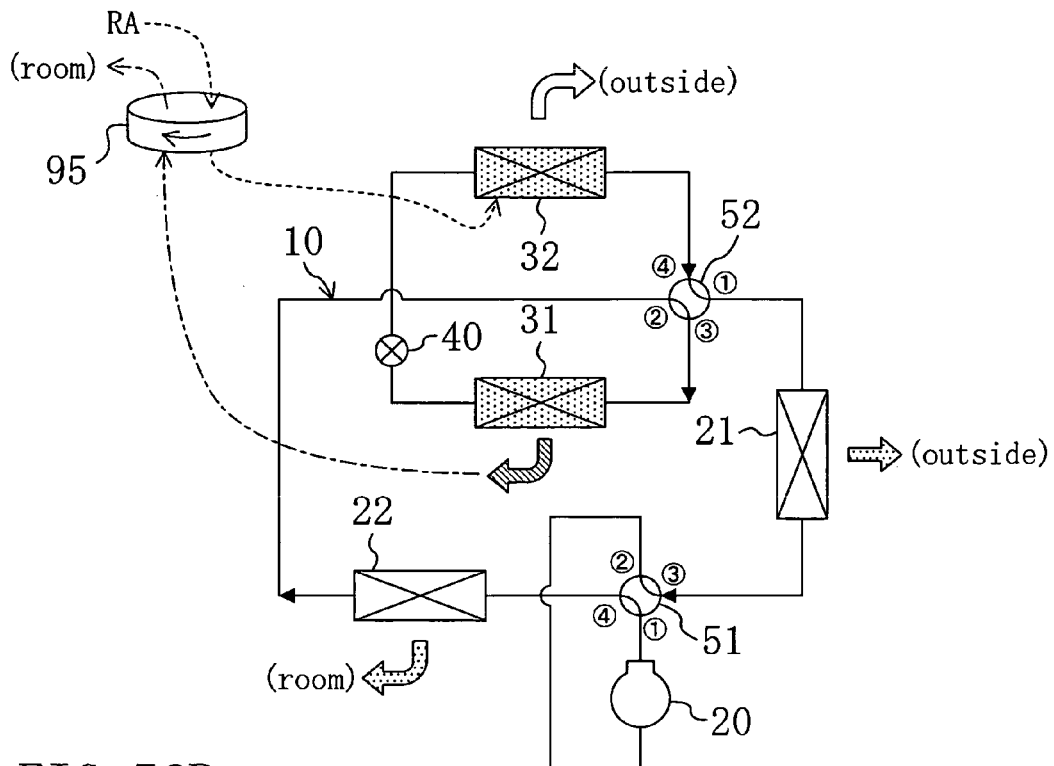
FIG. 56 is a schematic diagram showing the configuration of the refrigerant circuit in the ninth modification included in other embodiments and its behavior during the humidification heating operation.
Figure 56B:
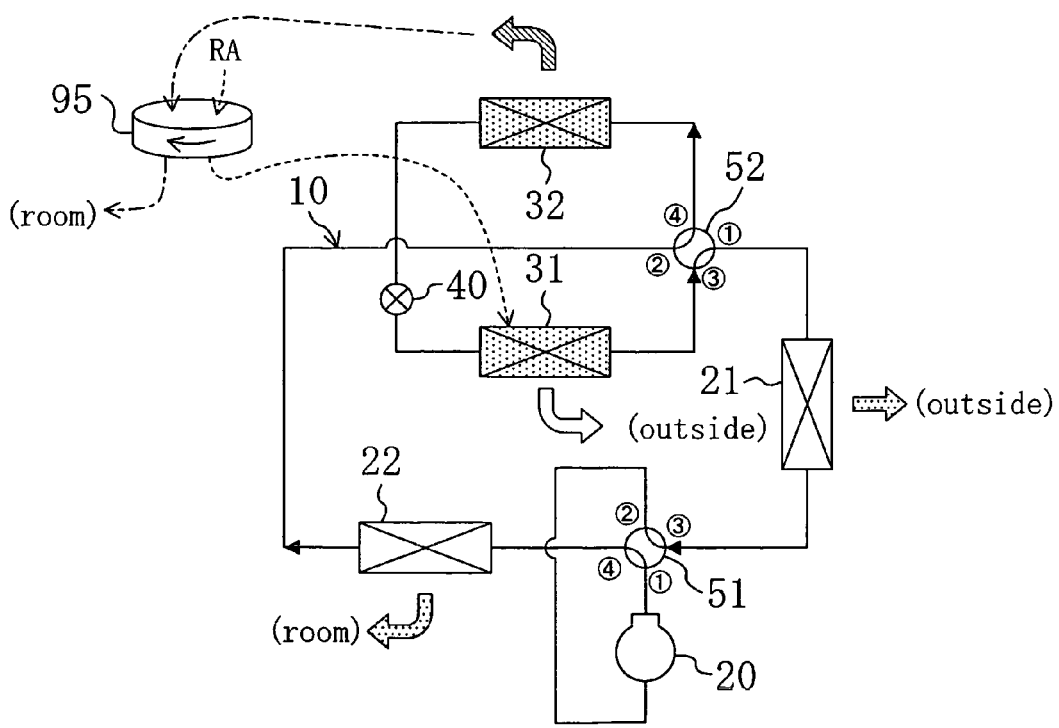

In other words, during the first mode in the dehumidification cooling operation or the first mode in the humidification heating operation, the air for adsorption passes through the adsorption rotor (95) and the second adsorption heat exchanger (32) in this order while the air for regeneration passes through the first adsorption heat exchanger (31) and the adsorption rotor (95) in this order (see FIGS. 55(A) and 56(A)). On the other hand, during the second mode in the dehumidification cooling operation or the second mode in the humidification heating operation, the air for adsorption passes through the adsorption rotor (95) and the first adsorption heat exchanger (31) in this order while the air for regeneration passes through the second adsorption heat exchanger (32) and the adsorption rotor (95) in this order (see FIGS. 55(B) and 56(B)).

According to this modification, since the air for adsorption supplied to the room is dehumidified during the dehumidification cooling operation in two steps, i.e., by the adsorption rotor (95) and the adsorption heat exchanger (31, 32), this enhances the dehumidification capacity of the air conditioning system. Further, since the air for regeneration supplied to the room is humidified during the humidification heating operation in two steps, i.e., by the adsorption heat exchanger (31, 32) and the adsorption rotor (95), this enhances the humidification capacity of the air conditioning system.

INDUSTRIAL APPLICABILITY

As seen from the above description, the present invention is useful for air conditioning systems for running a refrigeration cycle to cope with indoor latent heat load and sensible heat load.

The invention claimed is:

1. An air conditioning system comprising:
   a compressor;
   a first refrigerant circuit provided with a heat-source side heat exchanger, an air heat exchanger, a first four-way selector valve, and a first variable-opening expansion valve; and
   a second refrigerant circuit provided with a first adsorption heat exchanger, a second adsorption heat exchanger, a second four-way selector valve, and a second variable-opening expansion valve; wherein
   the first and second adsorption heat exchangers are provided with an adsorbent on the surface thereof and the air heat exchanger is without an adsorbent, the air conditioning system supplies the air having passed through the first or second adsorption heat exchanger to a room to cope with latent heat load in the room and supplies the air having passed through the air heat exchanger to the room to cope with sensible heat load in the room,
   the first and second four-way selector valves are controlled for providing a flow passage of refrigerant from the compressor to the air heat exchanger and the heat source side heat exchanger and back to the compressor via the first four-way selector valve, while providing a flow passage of refrigerant from the compressor to the first and second adsorption heat exchangers and back to the compressor via the second four-way selector valve, and
   the refrigerant circuit alternately creates an adsorption action of allowing moisture in the air to adsorb on the first or second adsorption heat exchanger and a regeneration action of allowing moisture to desorb from the first or second adsorption heat exchanger.

2. The air conditioning system of claim 1, wherein
   the first refrigerant circuit is configured to operate in a mode in which the air heat exchanger serves as an evaporator and the heat-source side heat exchanger serves as a condenser or a mode in which the air heat exchanger serves as a condenser and the heat source-side heat exchanger serves as an evaporator.

3. The air conditioning system of claim 2, wherein
   the second refrigerant circuit is configured to repeatedly alternate between a mode in which the first or second adsorption heat exchanger serves as an evaporator and a mode in which the first or second adsorption heat exchanger serves as a condenser,
   the second refrigerant circuit dehumidifies air in the adsorption action by allowing moisture in the air to adsorb on the first or second adsorption heat exchanger serving as an evaporator and humidifies air in the regeneration action by allowing moisture to desorb from the first or second adsorption heat exchanger serving as a condenser, and
   the air conditioning system supplies the air dehumidified or humidified by the first or second adsorption heat exchanger to the room to cope with latent heat load in the room.

4. The air conditioning system of claim 2, wherein
   the second refrigerant circuit is configured to repeatedly alternate between a mode in which the first adsorption heat exchanger serves as an evaporator and the second adsorption heat exchanger serves as a condenser and a mode in which the first adsorption heat exchanger serves as a condenser and the second adsorption heat exchanger serves as an evaporator,
   the second refrigerant circuit dehumidifies air in the adsorption action by allowing moisture in the air to adsorb on the first or second adsorption heat exchanger serving as an evaporator and humidifies air in the regeneration action by allowing moisture to desorb from the first or second adsorption heat exchanger serving as a condenser, and
   the air conditioning system supplies the air dehumidified or humidified by the first or second adsorption heat exchanger to the room to cope with latent heat load in the room.

5. The air conditioning system of claim 2, wherein
   the second refrigerant circuit is configured to repeatedly alternate between a mode in which the first adsorption heat exchanger serves as an evaporator and the second adsorption heat exchanger is in non-operating condition and a mode in which the second adsorption heat exchanger serves as an evaporator and the first adsorption heat exchanger is in non-operating condition,
   the second refrigerant circuit dehumidifies air in the adsorption action by allowing moisture in the air to adsorb on the first or second adsorption heat exchanger serving as an evaporator and allows moisture to desorb from the first or second adsorption heat exchanger in non-operating condition in the regeneration action by supplying air to the first or second adsorption heat exchanger in non-operating condition, and the air conditioning system supplies the air dehumidified by the first or second adsorption heat exchanger serving as an evaporator or the air humidified by the first or second adsorption heat exchanger in non-operating condition to the room to cope with latent heat load in the room.

6. The air conditioning system of claim 2, wherein
the second refrigerant circuit is configured to repeatedly alternate between a mode in which the first adsorption heat exchanger serves as a condenser and the second adsorption heat exchanger is in non-operating condition and a mode in which the second adsorption heat exchanger serves as a condenser and the first adsorption heat exchanger is in non-operating condition,
the second refrigerant circuit allows moisture in the air to adsorb on the first or second adsorption heat exchanger in non-operating condition in the adsorption action and humidifies air in the regeneration action by allowing moisture to desorb from the first or second adsorption heat exchanger serving as a condenser, and
the air conditioning system supplies the air dehumidified by the first or second adsorption heat exchanger in non-operating condition or the air humidified by the first or second adsorption heat exchanger serving as a condenser to the room to cope with latent heat load in the room.

7. The air conditioning system of claim 3, switchable between a dehumidification cooling operation for supplying air cooled by the air heat exchanger and air dehumidified by the first or second adsorption heat exchanger to the room and a humidification heating operation for supplying air heated by the air heat exchanger and air humidified by the first or second adsorption heat exchanger.

8. The air conditioning system of claim 1, wherein
the first and second refrigerant circuits are configured to run in an operation in which the first and second adsorption heat exchangers alternately serve as an evaporator while the heat-source side heat exchanger serves as a condenser or an operation in which the first and second adsorption heat exchangers alternately serve as a condenser while the heat-source side heat exchanger serves as an evaporator, and
the air conditioning system supplies air having passed through the first or second adsorption heat exchanger serving as an evaporator or air having passed through the first or second adsorption heat exchanger serving as a condenser to the room to cope with sensible heat load and latent heat load in the room.

9. The air conditioning system of claim 8, wherein
the second refrigerant circuit is configured to repeatedly alternate between a mode in which the first adsorption heat exchanger serves as an evaporator and the second adsorption heat exchanger serves as a condenser and a mode in which the first adsorption heat exchanger serves as a condenser and the second adsorption heat exchanger serves as an evaporator, and
the second refrigerant circuit dehumidifies air in the adsorption action by allowing moisture in the air to adsorb on the first or second adsorption heat exchanger serving as an evaporator and humidifies air in the regeneration action by allowing moisture to desorb from the first or second adsorption heat exchanger serving as a condenser.

10. The air conditioning system of claim 8, wherein
the second refrigerant circuit is configured to repeatedly alternate between a mode in which the first adsorption heat exchanger serves as an evaporator and the second adsorption heat exchanger is in non-operating condition and a mode in which the second adsorption heat exchanger serves as an evaporator and the first adsorption heat exchanger is in non-operating condition, and
the second refrigerant circuit dehumidifies air in the adsorption action by allowing moisture in the air to adsorb on the first or second adsorption heat exchanger serving as an evaporator and allows moisture to desorb from the first or second adsorption heat exchanger in non-operating condition in the regeneration action by supplying air to the first or second adsorption heat exchanger in non-operating condition.

11. The air conditioning system of claim 8, wherein
the second refrigerant circuit is configured to repeatedly alternate between a mode in which the first adsorption heat exchanger serves as a condenser and the second adsorption heat exchanger is in non-operating condition and a mode in which the second adsorption heat exchanger serves as a condenser and the first adsorption heat exchanger is in non-operating condition, and
the second refrigerant circuit allows moisture in the air to adsorb on the first or second adsorption heat exchanger in non-operating condition in the adsorption action and humidifies air in the regeneration action by allowing moisture to desorb from the first or second adsorption heat exchanger serving as a condenser.

12. The air conditioning system of claim 9, switchable between a dehumidification cooling operation for supplying air having passed through the first or second adsorption heat exchanger serving as an evaporator to the room and a humidification heating operation for supplying air having passed through the first or second adsorption heat exchanger serving as a condenser.

13. The air conditioning system of claim 1, wherein the first and second refrigerant circuits are operable in a mode in which the heat-source side heat exchanger and the first or second adsorption heat exchanger concurrently serve as condensers and configured so that during the mode refrigerant flows into the first or second adsorption heat exchanger serving as a condenser after passing through the heat-source side heat exchanger.

14. The air conditioning system of claim 2, wherein the first and second refrigerant circuits are operable in a mode in which the air heat exchanger and the first or second adsorption heat exchanger concurrently serve as condensers and configured so that during the mode refrigerant flows into the first or second adsorption heat exchanger serving as a condenser after passing through the air heat exchanger serving as a condenser.

15. The air conditioning system of claim 1, wherein the first and second refrigerant circuits are operable in a mode in which the heat-source side heat exchanger and the first or second adsorption heat exchanger concurrently serve as condensers and configured so that during the mode refrigerant flows into the heat-source side heat exchanger after passing through the first or second adsorption heat exchanger serving as a condenser.

16. The air conditioning system of claim 2, wherein the first and second refrigerant circuits are operable in a mode in which the air heat exchanger and the first or second adsorption heat exchanger concurrently serve as condensers and configured so that during the mode refrigerant flows into the air heat exchanger serving as a condenser after passing through the first or second adsorption heat exchanger serving as a condenser.

17. The air conditioning system of claim 1, wherein the first and second refrigerant circuits are operable in a mode in which the heat-source side heat exchanger and the first or second adsorption heat exchanger concurrently serve as evaporators and configured so that during the mode refrigerant flows into the first or second adsorption heat exchanger serving as an evaporator after passing through the heat-source side heat exchanger.

18. The air conditioning system of claim 2, wherein the first and second refrigerant circuits are operable in a mode in which the air heat exchanger and the first or second adsorption heat exchanger concurrently serve as evaporators and configured so that during the mode refrigerant flows into the first or second adsorption heat exchanger serving as an evaporator after passing through the air heat exchanger serving as an evaporator.

19. The air conditioning system of claim 1, wherein the first and second refrigerant circuits are operable in a mode in which the heat-source side heat exchanger and the first or second adsorption heat exchanger concurrently serve as evaporators and configured so that during the mode refrigerant flows into the heat-source side heat exchanger after passing through the first or second adsorption heat exchanger serving as an evaporator.

20. The air conditioning system of claim 2, wherein the first and second refrigerant circuits are operable in a mode in which the air heat exchanger and the first or second adsorption heat exchanger concurrently serve as evaporators and configured so that during the mode refrigerant flows into the air heat exchanger serving as an evaporator after passing through the first or second adsorption heat exchanger serving as an evaporator.

21. The air conditioning system of claim 2, wherein
in which in the first refrigerant circuit, the heat-source side heat exchanger, the first variable-opening expansion valve and the air heat exchanger are arranged in series and in the second refrigerant circuit, the first adsorption heat exchanger, the second variable-opening expansion valve and the second adsorption heat exchanger are arranged in series, the first and second refrigerant circuits being connected in parallel with each other.

22. The air conditioning system of claim 3, wherein the first and second refrigerant circuits are configured so that the refrigerant evaporation temperature in one of the heat-source side heat exchanger and the air heat exchanger which serves as an evaporator and the refrigerant evaporation temperature in the first or second adsorption heat exchanger serving as an evaporator can be set to have different values.

23. The air conditioning system of claim 3, wherein the first and second refrigerant circuits are configured so that the refrigerant condensation temperature in one of the heat-source side heat exchanger and the air heat exchanger which serves as a condenser and the refrigerant condensation temperature in the first or second adsorption heat exchanger serving as a condenser can be set to have different values.

24. The air conditioning system of claim 1, wherein
the air conditioning system includes a heat exchange element for exchanging heat between a first air and a second air, and
at least one of the first and second airs is air for adsorption or air for regeneration before passing through the first or second adsorption heat exchanger.

25. The air conditioning system of claim 1, wherein the flow passage for air for adsorption or air for regeneration passing through the first or second adsorption heat exchanger is provided with a latent heat handling element for coping with latent heat in the air.

26. The air conditioning system of claim 4, wherein
the first four-way selector valve changes a flow passage of refrigerant to switch between a state in which the air heat exchanger serves as an evaporator and the heat-source side heat exchanger serves as a condenser and a state in which the air heat exchanger serves as a condenser and the heat-source side heat exchanger serves as an evaporator; and
the second four-way selector valve changes a flow passage of refrigerant to switch between a state in which the first adsorption heat exchanger serves as an evaporator and the second adsorption heat exchanger serves as a condenser and a state in which the first adsorption heat exchanger serves as a condenser and the second adsorption heat exchanger serves as an evaporator.

27. The air conditioning system of claim 21,
wherein the first four-way selector valve for changing a flow passage of refrigerant to switch between a state in which the air heat exchanger serves as an evaporator and the heat-source side heat exchanger serves as a condenser and a state in which the air heat exchanger serves as a condenser and the heat-source side heat exchanger serves as an evaporator is connected to the first refrigerant circuit; and
the second four-way selector valve for changing a flow passage of refrigerant to switch between a state in which the first adsorption heat exchanger serves as an evaporator and the second adsorption heat exchanger serves as a condenser and a state in which the first adsorption heat exchanger serves as a condenser and the second adsorption heat exchanger serves as an evaporator is connected to the second refrigerant circuit.

28. The air conditioning system of claim 21, wherein
the first four-way selector valve is configured such that a first port of the first four-way selector valve is connected to a discharge side of the compressor, a second port of the first four-way selector valve is connected to a suction side of the compressor, a third port of the first four-way selector valve is connected to one end of the first refrigerant circuit, and a fourth port of the first four-way selector valve is connected to one other of the first refrigerant circuit,
the first four-way selector valve switches between a position in which the first and third ports communicate and the second and fourth ports communicate, and another position in which the first and fourth ports communicate and the second and third ports communicate,
the second four-way selector valve is configured such that a first port of the first four-way selector valve is connected to a discharge side of the compressor, a second port of the first four-way selector valve is connected to a suction side of the compressor, a third port of the first four-way selector valve is connected to one end of the second refrigerant circuit, and a fourth port of the first four-way selector valve is connected to one other of the second refrigerant circuit, and
the second four-way selector valve switches between a position in which the first and third ports communicate and the second and fourth ports communicate, and another position in which the first and fourth ports communicate and the second and third ports communicate.

* * * * *